United States Patent
Shibutani et al.

(10) Patent No.: US 10,425,226 B2
(45) Date of Patent: Sep. 24, 2019

(54) ENCRYPTION PROCESSING DEVICE AND ENCRYPTION PROCESSING METHOD

(71) Applicant: SONY CORPORATION, Tokyo (JP)

(72) Inventors: Kyoji Shibutani, Tokyo (JP); Takanori Isobe, Tokyo (JP)

(73) Assignee: SONY CORPORATION, Tokyo (JP)

(*) Notice: Subject to any disclaimer, the term of this patent is extended or adjusted under 35 U.S.C. 154(b) by 239 days.

(21) Appl. No.: 15/127,109

(22) PCT Filed: Feb. 24, 2015

(86) PCT No.: PCT/JP2015/055281
§ 371 (c)(1),
(2) Date: Sep. 19, 2016

(87) PCT Pub. No.: WO2015/146431
PCT Pub. Date: Oct. 1, 2015

(65) Prior Publication Data
US 2017/0118016 A1   Apr. 27, 2017

(30) Foreign Application Priority Data
Mar. 28, 2014  (JP) .................... 2014-068292

(51) Int. Cl.
*H04L 29/06* (2006.01)
*H04L 9/08* (2006.01)
(Continued)

(52) U.S. Cl.
CPC .......... *H04L 9/0861* (2013.01); *G06F 21/602* (2013.01); *G09C 1/00* (2013.01);
(Continued)

(58) Field of Classification Search
CPC .... G06F 21/602; H04L 9/0618; H04L 9/0631
See application file for complete search history.

(56) References Cited

U.S. PATENT DOCUMENTS 5,724,427 A * 3/1998 Reeds, III ............... H04L 9/065
380/259
2005/0180565 A1* 8/2005 Kurdziel ............... H04L 9/0631
380/42
(Continued)

FOREIGN PATENT DOCUMENTS

JP   2012-215813 A   11/2012

OTHER PUBLICATIONS

Gong et al., "KLEIN: A New Family of Lightweight Block Ciphers", 18 pages (Year: 2011).*

(Continued)

*Primary Examiner* — Thaddeus J Plecha
(74) *Attorney, Agent, or Firm* — Chip Law Group

(57) ABSTRACT

An encryption processing device includes an encryption processing section that repeats a round operation on input data and generate output data, and a key scheduling section that outputs a round key to be applied in the round operation to the encryption processing section. The encryption processing section has an involution property in which a data conversion function E and an inverse function $E^{-1}$ are executed sequentially, and executes the round operation in which a constant is applied once or more in only one of the function E and the inverse function $E^{-1}$. The constant is a state that satisfies a condition that all of constituent elements of a state which is a result of a matrix operation with the linear conversion matrix which is applied in the linear conversion processing section at a position adjacent to the exclusive-OR section to which the constant is input are nonzero.

18 Claims, 74 Drawing Sheets

(51) Int. Cl.
*H04L 9/06* (2006.01)
*G06F 21/60* (2013.01)
*G09C 1/00* (2006.01)
*H04L 9/14* (2006.01)
*G06F 17/16* (2006.01)

(52) U.S. Cl.
CPC .......... *H04L 9/0618* (2013.01); *H04L 9/0625* (2013.01); *H04L 9/0631* (2013.01); *H04L 9/0822* (2013.01); *H04L 9/14* (2013.01); *G06F 17/16* (2013.01); *H04L 2209/12* (2013.01); *H04L 2209/24* (2013.01)

(56) References Cited

U.S. PATENT DOCUMENTS

| | | | |
|---|---|---|---|
| 2009/0202070 A1* | 8/2009 | Mantin | H04L 9/0618 380/44 |
| 2011/0231636 A1* | 9/2011 | Olson | H03M 13/158 712/222 |
| 2012/0159183 A1* | 6/2012 | Adams | G06F 21/577 713/189 |
| 2013/0083921 A1* | 4/2013 | Fujisaki | H04L 9/0836 380/44 |
| 2014/0006805 A1* | 1/2014 | Colp | G06F 12/1425 713/193 |
| 2015/0222421 A1* | 8/2015 | Guo | H04L 9/003 380/28 |

OTHER PUBLICATIONS

Daemen, et al., "Nessie Proposal: NOEKEON", http://gro.noekeon.org/Noekeon-spec.pdf, Oct. 27, 2000, 30 pages.
Extended European Search Report of EP Application No. 15768190.9, dated Mar. 2, 2018, 8 pages of EESR.
Daemen, et al., "Nessie Proposal: Noekeon", Oct. 27, 2000, 30 pages.
Borghoff, et al., "PRINCE—A Low-latency Block Cipher for Pervasive Computing Applications", 2012, 25 pages.
Guo, et al., "The LED Block Cipher", International Association for Cryptologic Research, Springer-Verlag Berlin Heidelberg, 2011, pp. 326-341.
Extended European Search Report of EP Patent Application No. 15768190.9, dated Nov. 27, 2017, 11 pages.
Julia Borghoff et al., "PRINCE—A Low-latency Block Cipher for Pervasive Computing Applications", Cryptology ePrint Archive: Report 2012/529, Jun. 12, 2014, p. 27.
Cheng Wang et al, "An Ultra Compact Block Cipher for Serialized Architecture Implementation", CCECE '09. Canadian Conference on Electrical and Computer Engineering, IEEE, St. John's, NL, DOI: 10.1109/CCECE.2009.50902962009, p. 1085-1090.
Paulo S.L.M. Barreto et al., "The Anubis Block Cipher", Cryptology ePrint Archive: Report 2012/529, Jun. 12, 2014, p. 27.
Borghoff, et al., "PRINCE—A Low-latency Block Cipher for Pervasive Computing Applications (Full Version)", ASIACRYPT paper, 2012, 27 pages.
Wang, et al., "An Ultra Compact Block Cipher for Serialized Architecture Implementations", Electrical and Computer Engineering, CCECE, 2009, pp. 1085-1090.
Office Action for JP Patent Application No. 2016-510146, dated Aug. 7, 2018, 3 pages of Office Action and 3 pages of English Translation.
Borghoff, et al., "PRINCE—A Low-Latency Block Cipher for Pervasive Computing Applications", Cryptology eprint archive report 2012/529, Sep. 13, 2012, 26 pages.
Wang, et al., "An Ultra Compact Block Cipher for Serialized Architecture Implementations", 2009 Canadian Conference on Electrical and Computer Engineering, IEEE, May 3-6, 2009, 8 pages.
Barreto, et al., "The Anubis Block Cipher", NESSIE workshop, Nov. 2000, 26 pages.
Office Action for CN Patent Application No. 201580015013.9, dated Feb. 3, 2019, 5 pages of Office Action and 8 pages of English Translation.
Daemen, et al., "Nessie Proposal: Noekeon", Oct. 27, 2010, pp. 1-30.

* cited by examiner

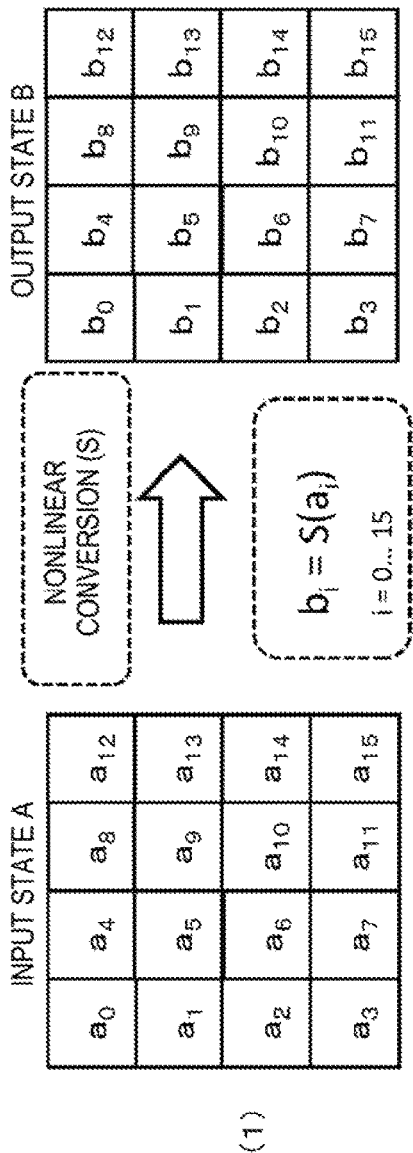
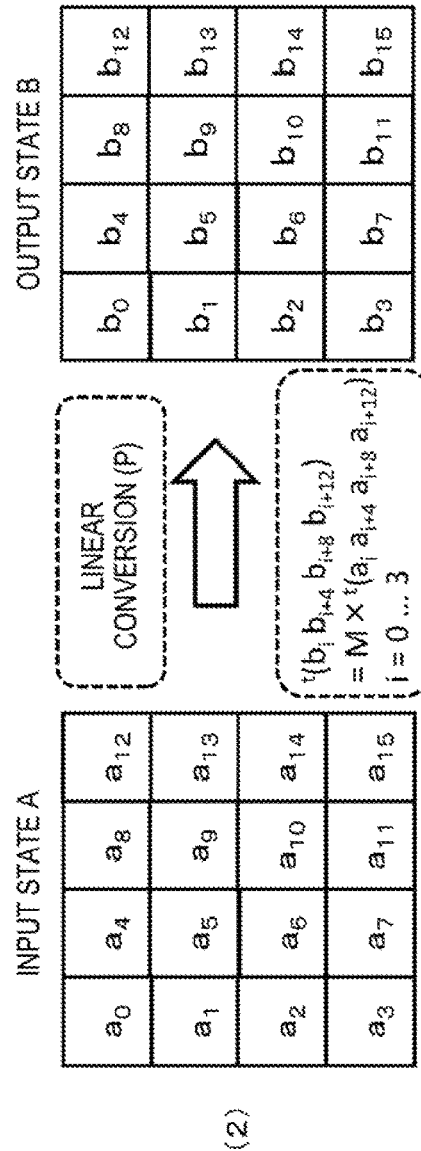
FIG. 13

FIG. 24

(1) EXAMPLES OF FOUR KINDS OF MATRIXES APPLIED TO LINEAR CONVERSION PROCESS $M_0$
$\begin{pmatrix} 0111 \\ 1011 \\ 1101 \\ 1110 \end{pmatrix}$ $M_1$
$\begin{pmatrix} 1101 \\ 1110 \\ 0111 \\ 1011 \end{pmatrix}$ $M_2$
$\begin{pmatrix} 1110 \\ 1101 \\ 1011 \\ 0111 \end{pmatrix}$ $M_3$
$\begin{pmatrix} 1011 \\ 0111 \\ 1110 \\ 1101 \end{pmatrix}$ (2) EXAMPLES OF THREE KINDS OF MATRIX OPERATIONS APPLIED TO LINEAR CONVERSION PROCESS P1: COLUMN DIFFUSION OPERATION (MixColumn)

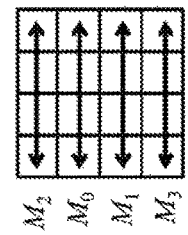

$M_0\ M_0\ M_0\ M_0$ $MC[M_0]$
$(= MC[M_0, M_0, M_0, M_0])$

P2: ROW DIFFUSION OPERATION TYPE 1 (MixRow1)

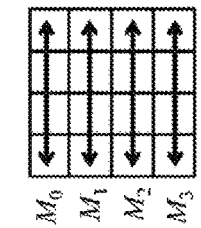

$M_0$
$M_1$
$M_2$
$M_3$ $MR[M_0, M_1, M_2, M_3]$

P2: ROW DIFFUSION OPERATION TYPE 2 (MixRow2)

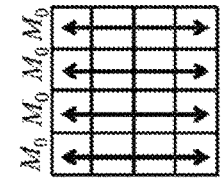

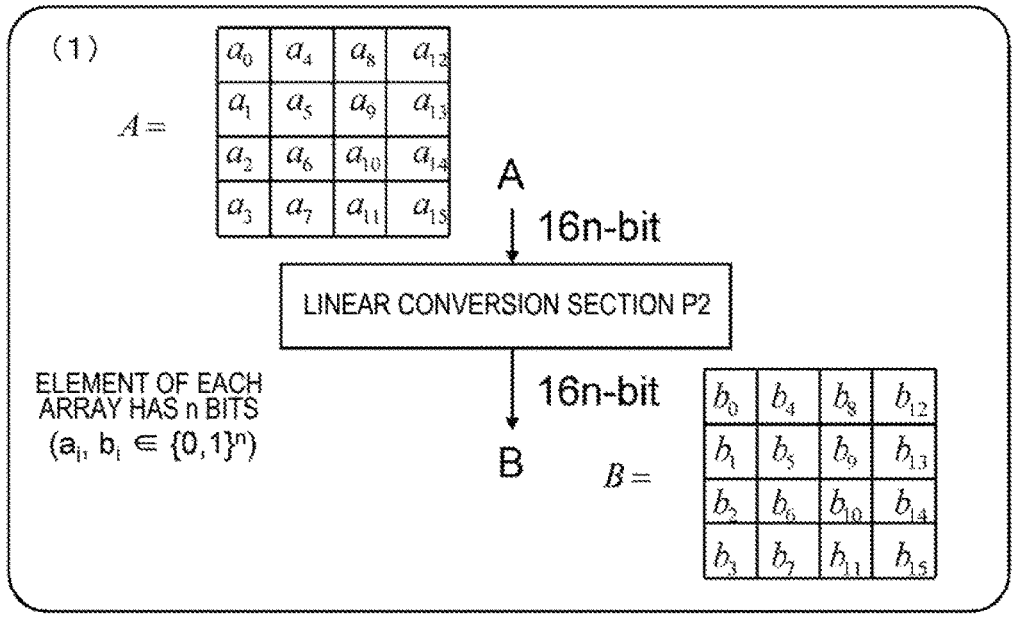

$$A = \begin{pmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{pmatrix}$$

A ↓ 16n-bit

LINEAR CONVERSION SECTION P2

↓ 16n-bit
B

ELEMENT OF EACH ARRAY HAS n BITS
($a_i, b_i \in \{0,1\}^n$)

$$B = \begin{pmatrix} b_0 & b_4 & b_8 & b_{12} \\ b_1 & b_5 & b_9 & b_{13} \\ b_2 & b_6 & b_{10} & b_{14} \\ b_3 & b_7 & b_{11} & b_{15} \end{pmatrix}$$

(2)

$$\begin{pmatrix} b_0 \\ b_4 \\ b_8 \\ b_{12} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_0 \\ a_4 \\ a_8 \\ a_{12} \end{pmatrix} \quad \begin{pmatrix} b_1 \\ b_5 \\ b_9 \\ b_{13} \end{pmatrix} = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \cdot \begin{pmatrix} a_1 \\ a_5 \\ a_9 \\ a_{13} \end{pmatrix}$$

$$\begin{pmatrix} b_2 \\ b_6 \\ b_{10} \\ b_{14} \end{pmatrix} = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \cdot \begin{pmatrix} a_2 \\ a_6 \\ a_{10} \\ a_{14} \end{pmatrix} \quad \begin{pmatrix} b_3 \\ b_7 \\ b_{11} \\ b_{15} \end{pmatrix} = \begin{pmatrix} 1 & 0 & 1 & 1 \\ 0 & 1 & 1 & 1 \\ 1 & 1 & 1 & 0 \\ 1 & 1 & 0 & 1 \end{pmatrix} \cdot \begin{pmatrix} a_3 \\ a_7 \\ a_{11} \\ a_{15} \end{pmatrix}$$

$b_0 = a_4 + a_8 + a_{12},$    $b_8 = a_0 + a_4 + a_{12},$
$b_1 = a_1 + a_5 + a_{13},$    $b_9 = a_5 + a_9 + a_{13},$
$b_2 = a_2 + a_6 + a_{10},$    $b_{10} = a_2 + a_{10} + a_{14},$
$b_3 = a_3 + a_{11} + a_{15},$    $b_{11} = a_3 + a_7 + a_{11},$ $b_4 = a_0 + a_8 + a_{12},$    $b_{12} = a_0 + a_4 + a_8,$
$b_5 = a_1 + a_5 + a_9,$    $b_{13} = a_1 + a_9 + a_{13},$
$b_6 = a_2 + a_6 + a_{14},$    $b_{14} = a_6 + a_{10} + a_{14},$
$b_7 = a_7 + a_{11} + a_{15},$    $b_{15} = a_3 + a_7 + a_{15}$ (HERE, + REPRESENTS XOR (EXCLUSIVE-OR))

$A = \begin{pmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{pmatrix}$ A ↓ 16n-bit

LINEAR CONVERSION SECTION P3

↓ 16n-bit
B

ELEMENT OF EACH ARRAY HAS n BITS
($a_i$, $b_i \in \{0,1\}^n$)

$B = \begin{pmatrix} b_0 & b_4 & b_8 & b_{12} \\ b_1 & b_5 & b_9 & b_{13} \\ b_2 & b_6 & b_{10} & b_{14} \\ b_3 & b_7 & b_{11} & b_{15} \end{pmatrix}$ (2)

$$\begin{pmatrix} b_0 \\ b_4 \\ b_8 \\ b_{12} \end{pmatrix} = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \cdot \begin{pmatrix} a_0 \\ a_4 \\ a_8 \\ a_{12} \end{pmatrix} \quad \begin{pmatrix} b_1 \\ b_5 \\ b_9 \\ b_{13} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_1 \\ a_5 \\ a_9 \\ a_{13} \end{pmatrix}$$

$$\begin{pmatrix} b_2 \\ b_6 \\ b_{10} \\ b_{14} \end{pmatrix} = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \cdot \begin{pmatrix} a_2 \\ a_6 \\ a_{10} \\ a_{14} \end{pmatrix} \quad \begin{pmatrix} b_3 \\ b_7 \\ b_{11} \\ b_{15} \end{pmatrix} = \begin{pmatrix} 1 & 0 & 1 & 1 \\ 0 & 1 & 1 & 1 \\ 1 & 1 & 1 & 0 \\ 1 & 1 & 0 & 1 \end{pmatrix} \cdot \begin{pmatrix} a_3 \\ a_7 \\ a_{11} \\ a_{15} \end{pmatrix}$$

$b_0 = a_0 + a_4 + a_8,$   $b_8 = a_0 + a_8 + a_{12},$
$b_1 = a_5 + a_9 + a_{13},$   $b_9 = a_1 + a_5 + a_{13},$
$b_2 = a_2 + a_6 + a_{14},$   $b_{10} = a_6 + a_{10} + a_{14},$
$b_3 = a_3 + a_{11} + a_{15},$   $b_{11} = a_3 + a_7 + a_{11},$ $b_4 = a_0 + a_4 + a_{12},$   $b_{12} = a_4 + a_8 + a_{12},$
$b_5 = a_1 + a_9 + a_{13},$   $b_{13} = a_1 + a_5 + a_9,$
$b_6 = a_2 + a_6 + a_{10},$   $b_{14} = a_2 + a_{10} + a_{14},$
$b_7 = a_7 + a_{11} + a_{15},$   $b_{15} = a_3 + a_7 + a_{15}$ (HERE, + REPRESENTS XOR (EXCLUSIVE-OR))

FIG. 30

| NUMBER OF ROUNDS | MINIMUM NUMBERS OF DIFFERENTIAL active S-boxes AND LINEAR active S-boxes IN ENCRYPTION PROCESSING CONFIGURATION OF RELATED ART IN WHICH SAME LINEAR CONVERSION IS EXECUTED | MINIMUM NUMBERS OF DIFFERENTIAL active S-boxes AND LINEAR active S-boxes IN ENCRYPTION PROCESSING CONFIGURATION IN WHICH PLURALITY OF DIFFERENT LINEAR CONVERSIONS ARE EXECUTED |
|---|---|---|
| 4 | 16 | 16 |
| 6 | 20 | 28 |
| 8 | 32 | 32 |
| 10 | 36 | 44 |
| 12 | 48 | 56 |
| 14 | 52 | 60 |
| 16 | 64 | 72 |
| 18 | 68 | 84 |
| 20 | 80 | 88 |
| 22 | 84 | 100 |
| 24 | 96 | 112 |

(1) ENCRYPTION PROCESSING CONFIGURATION WHEN KEY CONVERSION FUNCTION F HAS NO INVOLUTION PROPERTY

FIG. 40
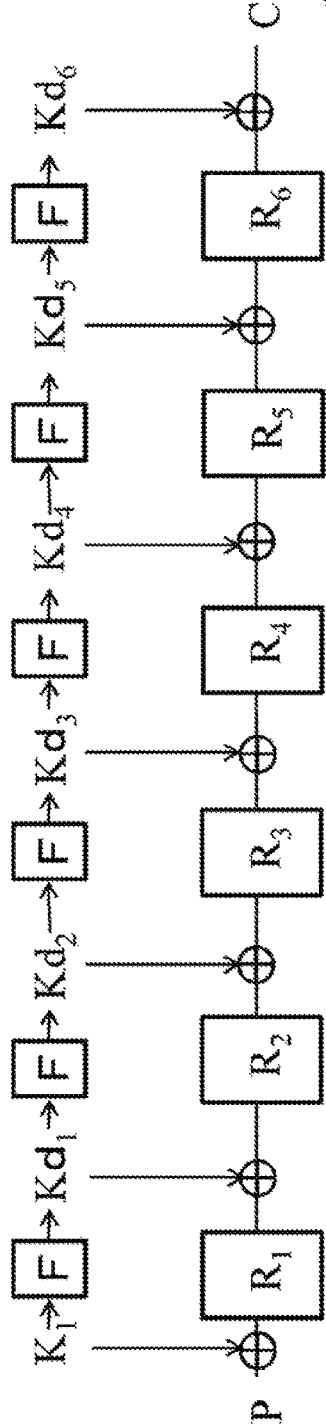
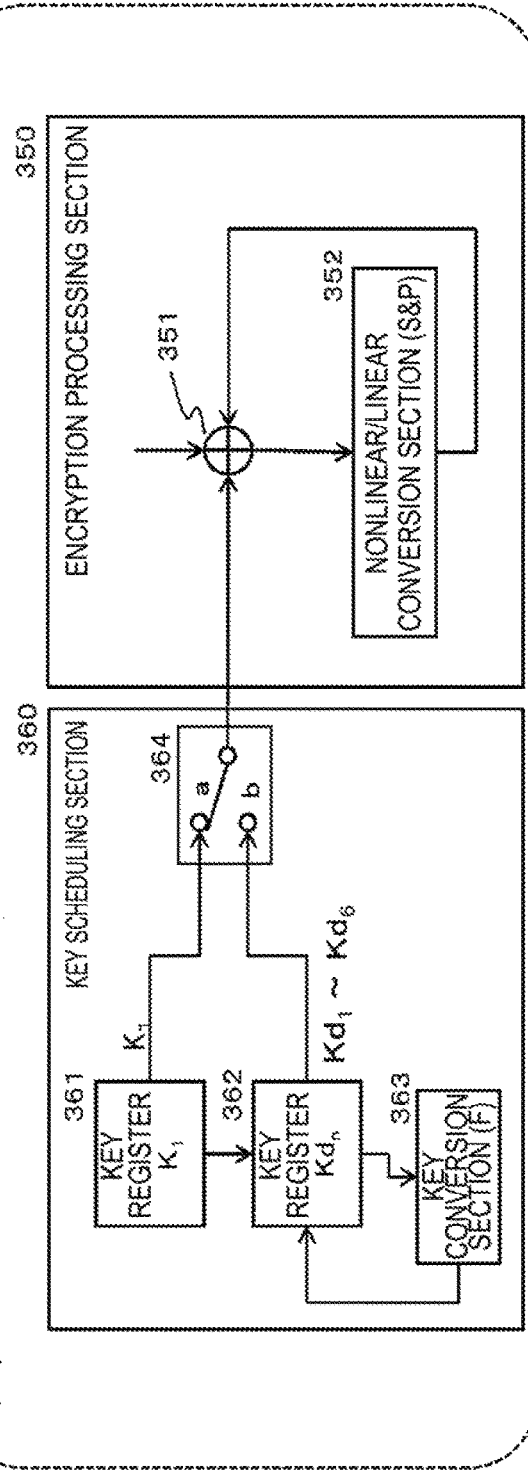

ENCRYPTION PROCESSING DEVICE AND ENCRYPTION PROCESSING METHOD

CROSS REFERENCE TO RELATED APPLICATIONS

This application is a U.S. National Phase of International Patent Application No. PCT/JP2015/055281 filed on Feb. 24, 2015, which claims priority benefit of Japanese Patent Application No. JP 2014-068292 filed in the Japan Patent Office on Mar. 28, 2014. Each of the above-referenced applications is hereby incorporated herein by reference in its entirety.

TECHNICAL FIELD

The present disclosure relates to an encryption processing device, an encryption processing method, and a program, and more particularly, to an encryption processing device, an encryption processing method, and program executing common key system encryption.

BACKGROUND ART

With the development of information society, information security technologies for securely protecting information to be handled have become more important. As one constituent element of the information security technologies, there is encryption technology. Encryption technology is currently used for various products and systems.

There are various encryption processing algorithms. As one of the basic technologies, there is a technology called common key block encryption. In common key block encryption, an encryption key and a decryption key are common. In both an encryption process and a decryption process, a plurality of keys are generated from the common key and a data conversion process is repeatedly executed in a certain block unit, for example, a block data unit of 64 bits, 128 bits, 256 bits, or the like.

As representative common key block encryption algorithms, there are data encryption standard (DES) which is the past American standard and advanced encryption standard (AES) which is the current American standard. Additionally, various types of common key block encryption also continue to be currently proposed. CLEFIA proposed in 2007 by Sony Corporation is one type of common key block encryption.

As a technology of the related art in which common key block encryption is disclosed, for example, there is Patent Literature 1 (JP 2012-215813A).

Such a common key block encryption algorithm is configured to mainly include an encryption processing section including a round function execution section that repeatedly converts input data and a key scheduling section generating a round key which is applied to each round of a round function section. The key scheduling section first generates an expanded key in which the number of bits is increased based on a master key (main key) which is a private key and generates a round key (subkey) which is applied to each round function section of the encryption processing section based on the generated expanded key.

As a specific structure that executes such an algorithm, a structure that repeatedly executes a round function that has a linear conversion section and a nonlinear conversion section is known. As representative structures, for example, there are a substitution-permutation network (SPN) structure, a Feistel structure, and an expanded Feistel structure.

Such structures are all structures in which plaintext is converted into ciphertext by repeatedly executing a round function that has a linear conversion section and a nonlinear conversion section.

CITATION LIST

Patent Literature

Patent Literature 1: JP 2012-215813A

SUMMARY OF INVENTION

Technical Problem

As attacks of trying to decode an encryption algorithm or a private key, for example, there are a differential attack and a linear attack. For encryption processing devices, resistance to such various attacks, high-speed processing, miniaturization, and the like are necessary.

The present disclosure is devised in view of the circumstances described above, for example, and it is desirable to provide an encryption processing device, an encryption processing method, and a program realizing an improvement in various elements, such as security, high speed, and miniaturization, necessary for the encryption processing device.

Solution to Problem

A first aspect of the present disclosure provides an encryption processing device including: an encryption processing section configured to execute a round operation on input data and generate output data; and a key scheduling section configured to output a round key to be applied in the round operation by the encryption processing section to the encryption processing section. The encryption processing section has an involution property in which a data conversion function E and an inverse function $E^{-1}$ of the data conversion function E are executed sequentially, and executes the round operation in which a constant is applied once or more in one of the function E and the inverse function $E^{-1}$.

Further, a second aspect of the present disclosure provides an encryption processing device including: an encryption processing section configured to execute a round operation on input data and generate output data; and a key scheduling section configured to output a round key to be applied in the round operation by the encryption processing section to the encryption processing section. The encryption processing section has an involution property in which a data conversion function E and an inverse function $E^{-1}$ of the data conversion function E are executed sequentially, and the encryption processing section has a configuration in which the round operation in which a constant is applied once or more is executed in both the function E and the inverse function $E^{-1}$, and a constant application position is set at a non-correspondence position of the function E and the inverse function $E^{-1}$.

Further, a third aspect of the present disclosure provides an encryption processing method executed in an encryption processing device. The encryption processing device includes an encryption processing section configured to execute a round operation on input data and generate output data, and a key scheduling section configured to output a round key to be applied in the round operation by the encryption processing section to the encryption processing section. The encryption processing section has an involution property in which a data conversion function E and an inverse function $E^{-1}$ of the data conversion function E are executed sequentially, and executes the round operation in which a constant is applied once or more in one of the function E and the inverse function $E^{-1}$.

Further, a fourth aspect of the present disclosure provides an encryption processing method executed in an encryption processing device. The encryption processing device includes an encryption processing section configured to execute a round operation on input data and generate output data, and a key scheduling section configured to output a round key to be applied in the round operation by the encryption processing section to the encryption processing section. The encryption processing section has an involution property in which a data conversion function E and an inverse function $E^{-1}$ of the data conversion function E are executed sequentially, has a configuration in which a constant application position is set at a non-correspondence position of the function E and the inverse function $E^{-1}$, and executes the round operation in which a constant is applied once or more in both the function E and the inverse function $E^{-1}$.

Further, a fifth aspect of the present disclosure provides a program for causing an encryption processing device to execute an encryption processing method. The encryption processing device includes an encryption processing section configured to execute a round operation on input data and generate output data, and a key scheduling section configured to output a round key to be applied in the round operation by the encryption processing section to the encryption processing section. The encryption processing section has an involution property in which a data conversion function E and an inverse function $E^{-1}$ of the data conversion function E are executed sequentially, and the program causes the encryption processing section to execute the round operation in which a constant is applied once or more in one of the function E and the inverse function $E^{-1}$.

Further, a sixth aspect of the present disclosure provides a program for causing an encryption processing device to execute an encryption processing method. The encryption processing device includes an encryption processing section configured to execute a round operation on input data and generate output data, and a key scheduling section configured to output a round key to be applied in the round operation by the encryption processing section to the encryption processing section. The encryption processing section has an involution property in which a data conversion function E and an inverse function $E^{-1}$ of the data conversion function E are executed sequentially, and has a configuration in which a constant application position is set at a non-correspondence position of the function E and the inverse function $E^{-1}$, and the program causes the encryption processing section to execute the round operation in which a constant is applied once or more in both the function E and the inverse function $E^{-1}$.

The program according to the present disclosure is recorded in a recording medium and is provided to an information processing apparatus or a computer system that can execute various program codes. By executing the program by a program executing unit on the information processing apparatus or the computer system, processing according to the program is realized.

The object, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

Advantageous Effects of Invention

According to the configuration of an embodiment of the present disclosure, an encryption process excellent in security and highly resistant to various attacks is realized.

Specifically, the encryption processing device includes: the encryption processing section configured to repeat a round operation on input data and generate output data; and the key scheduling section configured to output a round key to be applied in the round operation by the encryption processing section to the encryption processing section. The encryption processing section has an involution property in which the data conversion function E and the inverse function $E^{-1}$ of the data conversion function E are executed sequentially, and executes the round operation in which a constant is applied once or more in one of the function E and the inverse function $E^{-1}$. The constant is configured as a state that satisfies a condition that all of constituent elements of a state which is a result of a matrix operation with the linear conversion matrix which is applied in the linear conversion processing section at a position adjacent to the exclusive-OR section to which the constant is input are nonzero.

The encryption processing configuration in which resistance to various attacks is improved and security is high is realized by the present configuration.

In addition, the effects described in the present specification are not limiting but are merely examples, and there may be additional effects.

BRIEF DESCRIPTION OF DRAWINGS

FIG. 13 is a diagram for describing an example of the data conversion process on the state.

FIG. 24 is a diagram for describing matrixes which are applied to a linear conversion process.

FIG. 26 is a diagram for describing a row diffusion operation executed by a linear conversion section P2.

FIG. 27 is a diagram for describing a row diffusion operation executed by a linear conversion section P3.

FIG. 30 is a diagram for describing compared data of the numbers of active S-boxes when the linear conversion sections of the encryption processing section have a configuration in which different linear conversion processes are executed and a configuration in which the same linear conversion process is executed.

FIG. 40 is a diagram for describing a process and configuration of the key scheduling section when the key conversion function has no involution property.

DETAILED DESCRIPTION

Figure 1:
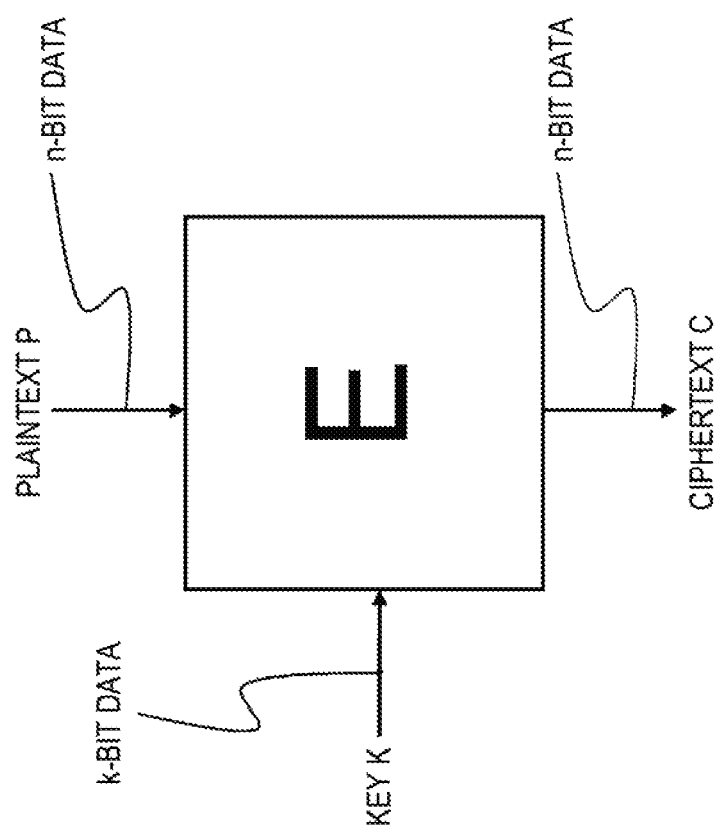
FIG. 1 is a diagram for describing an n-bit common key block encryption algorithm corresponding to a k-bit key length.

Hereinafter, an encryption processing device, an encryption processing method, and a program according to the present disclosure will be described in detail with reference to the drawings. The following items will be described.

1. Overview of common key block encryption
2. Index of security in common key block encryption
3. Overall configuration overview of common key encryption process in which security is improved
4. Process and configuration of linear conversion sections of encryption processing section
5. Process and configuration of key scheduling section
5-1. Description of process and configuration of key scheduling section
5-2. Effects based on full-diffusion property of key scheduling section
5-3. Effects based on involution property of key conversion section
5-3-a. Effects in unrolled mounting
5-3-b. Effects in round mounting
5-4. Conclusion of configuration and effects of key scheduling section according to present disclosure
5-5. Other examples of configuration of key scheduling section
5-6. Example of configuration of key conversion section having full diffusion property
6. Configuration for realizing improvement in security by constant input 6-1. Configuration for realizing improvement in security by constant input and problem in related art
6-2. Configuration of encryption processing device having constant input configuration in which security is high
6-3. Variation of input insertion position
7. Example of specific configuration of S-boxes which are applied to nonlinear conversion section
8. Specific example of encryption processing device
9. Mounting example of encryption processing device
10. Conclusion of constitution according to present disclosure

[1. Overview of Common Key Block Encryption]

First, an overview of common key block encryption will be described.

(1-1. Common Key Block Encryption)

Common key block encryption (hereinafter sometimes referred to as block encryption) as used herein will be defined later.

In block encryption, plaintext P and a key k are taken as inputs, and ciphertext C is output. Bit lengths of the plaintext and the ciphertext are referred to as block sizes. For example, the block size=n is set. Here, n is any integer value and is a value that is normally decided in advance as one value for each block encryption algorithm. The block encryption with the block length of n is also referred to as n-bit block encryption.

The bit length of a key is indicated by k. The key can take any integer value. A common key block encryption algorithm corresponds to one key size or a plurality of key sizes. For example, a certain block encryption algorithm A is assumed to have a configuration which can correspond to a block size n=128 and a key size k=128, k=192, or k=256.

Plaintext P: n bits
Ciphertext C: n bits
Key K: k bits

FIG. 1 is a diagram illustrating a common key block encryption algorithm E with n bits corresponding to a key length of k bits.

Figure 2:
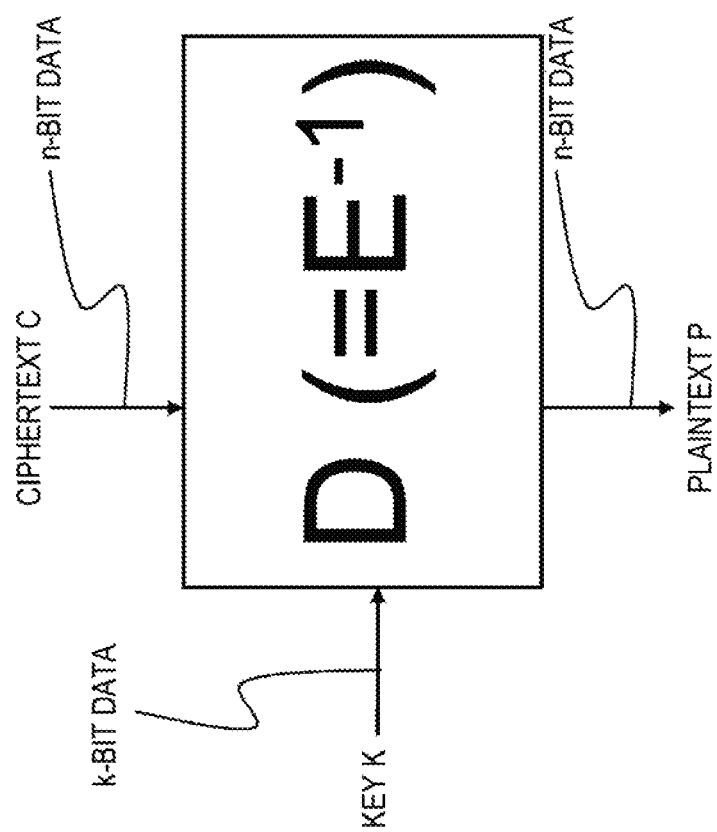
FIG. 2 is a diagram for describing a decryption algorithm corresponding to the n-bit common key block encryption algorithm corresponding to the k-bit key length illustrated in FIG. 1.

A decryption algorithm D corresponding to the encryption algorithm E can be defined as an inverse function $E^{-1}$ of the encryption algorithm E, and takes the ciphertext C and the key K as inputs and outputs the plaintext P. FIG. 2 is a diagram illustrating the decryption algorithm D corresponding to the encryption algorithm E illustrated in FIG. 1.

(1-2. Internal Configuration)

The block encryption can be considered to be split into two portions. One portion is a "key scheduling section" that outputs a round key which is applied to each round of an encryption processing section in a certain decided step when one private key K is input. The other portion is an "encryption processing section" that executes data conversion and outputs the ciphertext C when the plaintext P and the round key are input from the key scheduling section.

Figure 3:
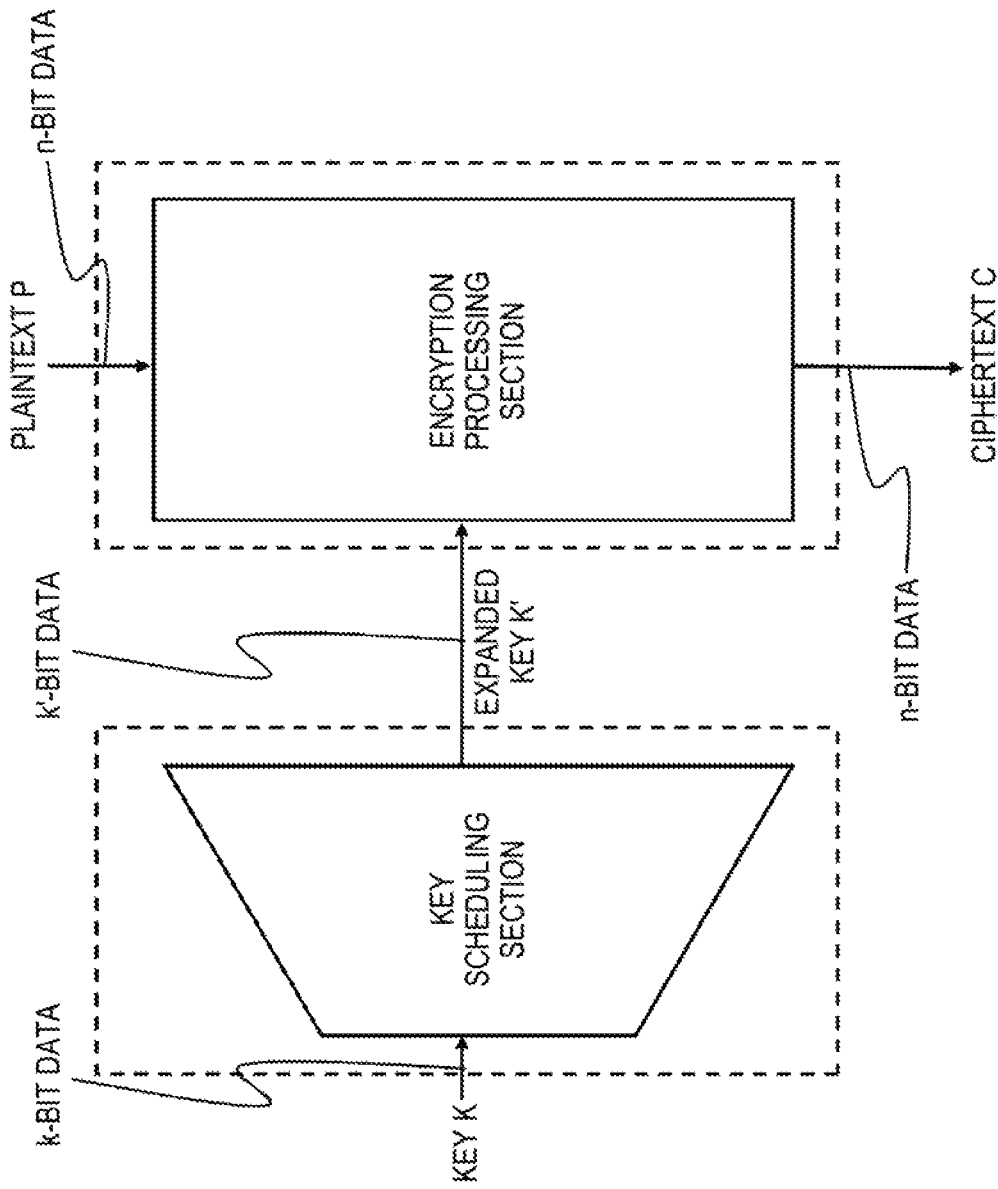
FIG. 3 is a diagram for describing a relation between a key scheduling section and an encryption processing section.

A relation between the two portions is illustrated in FIG. 3.

The encryption processing section has a configuration in which a decryption process of inputting the ciphertext C and outputting the plaintext P can also be executed in many cases. Even in such cases, a decryption process in which a round key supplied from the key scheduling section is applied is executed.

A relation between the two portions is illustrated in FIG. 3.

(1-3. Encryption Processing Section)

The encryption processing section used in the following description is assumed to be split into a processing unit referred to as a round function. The round function executes predetermined data conversion on input data and outputs converted data. The input data to the round function is, for example, n-bit data during encryption. An output of the round function in a certain round is supplied as an input of a subsequent round. An operation configuration with a round key generated based on a key output from the key scheduling section is included as one configuration of the round function. Specifically, an exclusive-OR operation of a round key and n-bit data during the encryption is executed.

A total number of round functions is referred to as a total round number and is a value which is decided in advance for each encryption algorithm.

Figure 4:
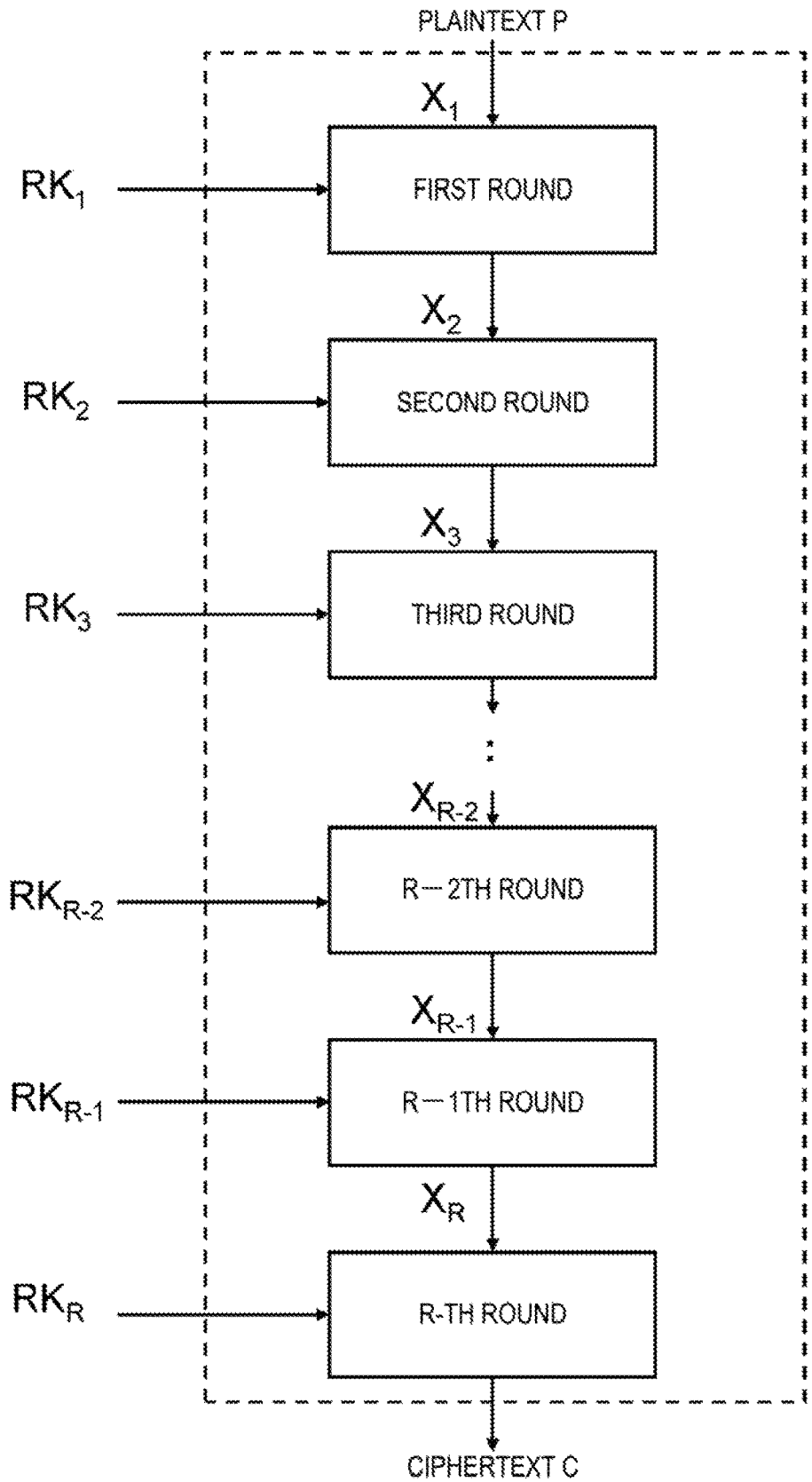
FIG. 4 is a diagram for describing an example of the configuration of an encryption processing section.

When $X_1$ is input data of the first round from the viewpoint of the input side of the encryption processing section, $X_i$ is data which is input to an i-th round function, and $RK_i$ is a round key, the entire encryption processing section is as illustrated in FIG. 4.

(1-4. Round Function)

The round functions can have various forms in accordance with a block encryption algorithm. The round functions can be classified according to structures adopted by the encryption algorithm. As representative structures, the substitution-permutation network (SPN) structure, the Feistel structure, and the expanded Feistel structure are exemplified herein.

(A) Substitution-Permutation Network (SPN) Structure Round Function

Figure 5:
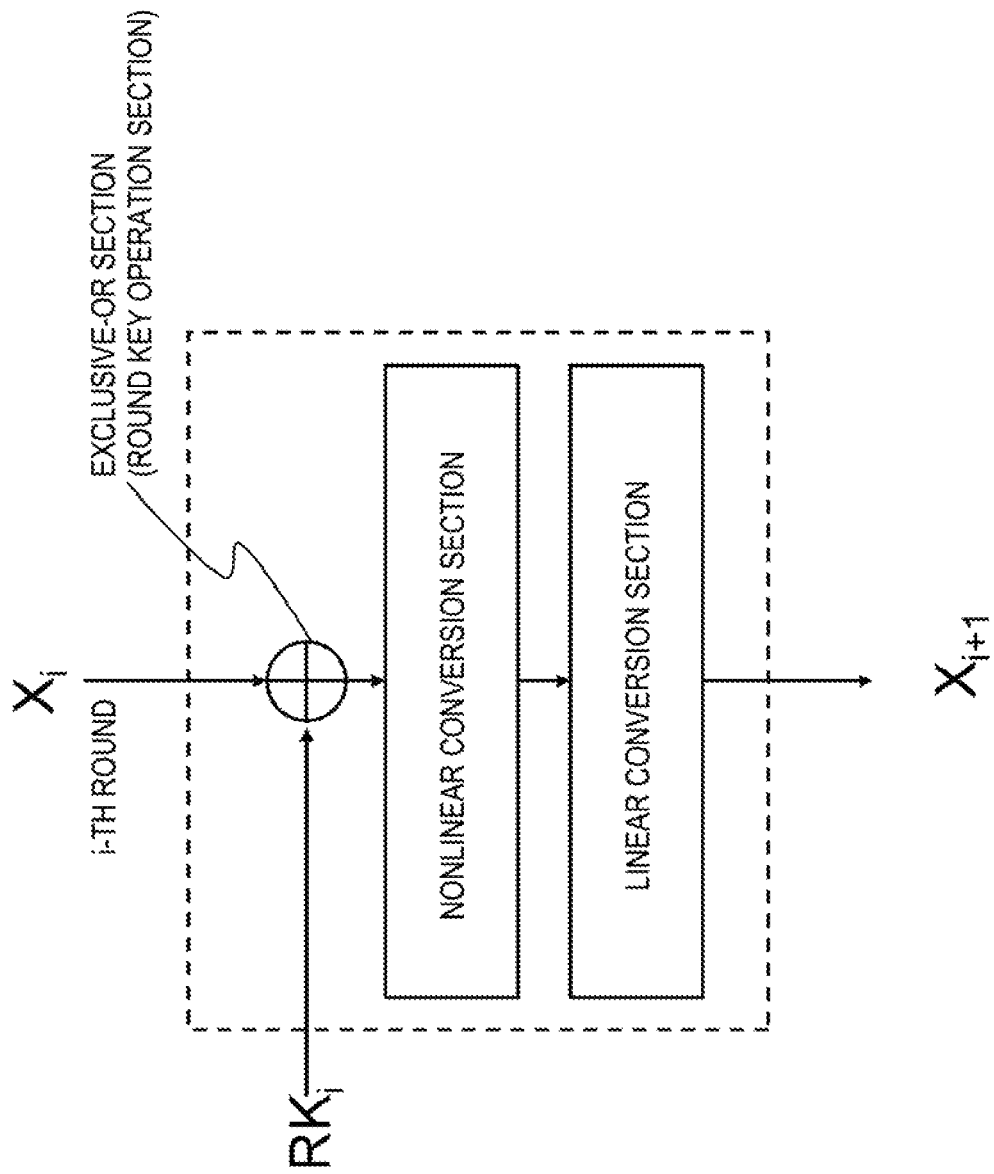
FIG. 5 is a diagram for describing an example of a round function with an SPN structure.

In a configuration, an exclusive-OR operation with a round key, nonlinear conversion, a linear conversion process, or the like is applied to all of the n-bit input data. A sequence of operations is not particularly decided. FIG. 5 illustrates an example of a round function with the SPN structure. The linear conversion section is also referred to as a P layer (Permutation-layer) in some cases.

(B) Feistel Structure

Figure 6:
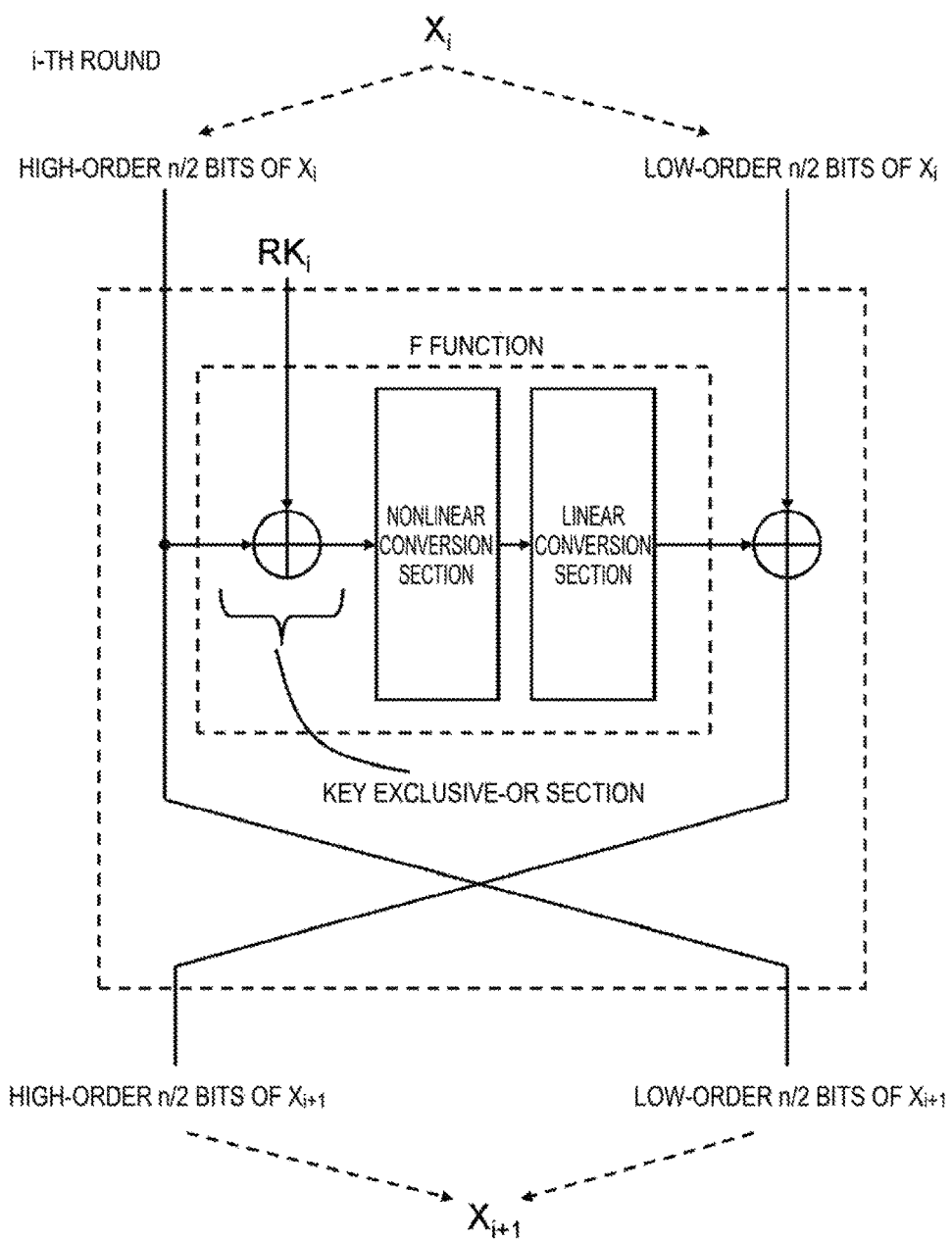
FIG. 6 is a diagram for describing an example of a round function with a Feistel structure.

The n-bit input data is split into two pieces of n/2-bit data. A function (F function) which has one piece of bit data and a round key as inputs is applied and an output is subjected to exclusive-OR with the other piece of data. Thereafter, data obtained by permutation of the right and left of the data is set as output data. There are various types of internal configurations of an F function. Basically, the internal configurations are realized by combining an exclusive-OR operation with round key data, a nonlinear operation, and linear conversion, as in the SPN structure. FIG. 6 illustrates an example of a round function with the Feistel structure.

(C) Expanded Feistel Structure

Figure 7:
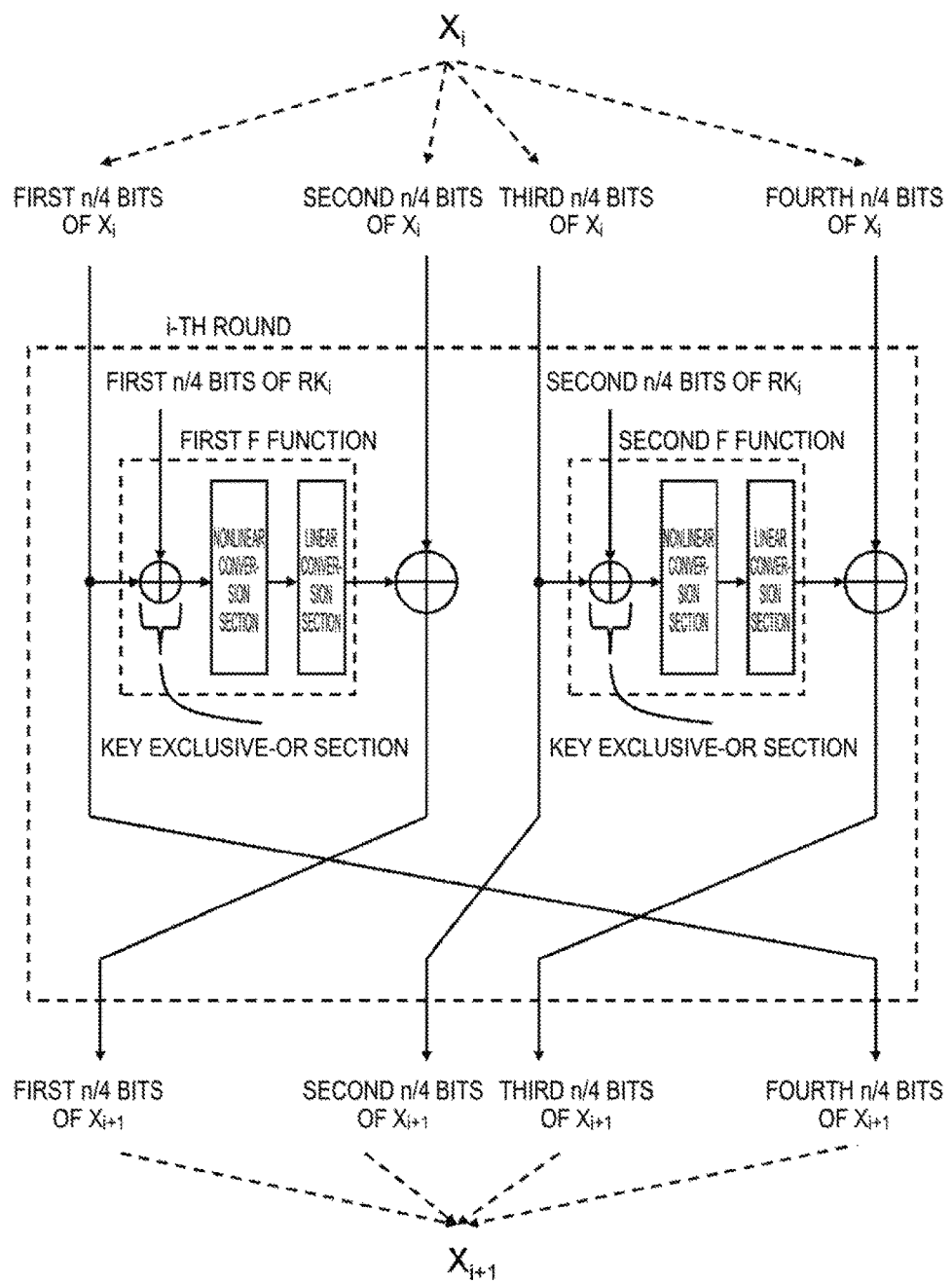
FIG. 7 is a diagram for describing an example of a round function with an expanded Feistel structure.
Figure 8:
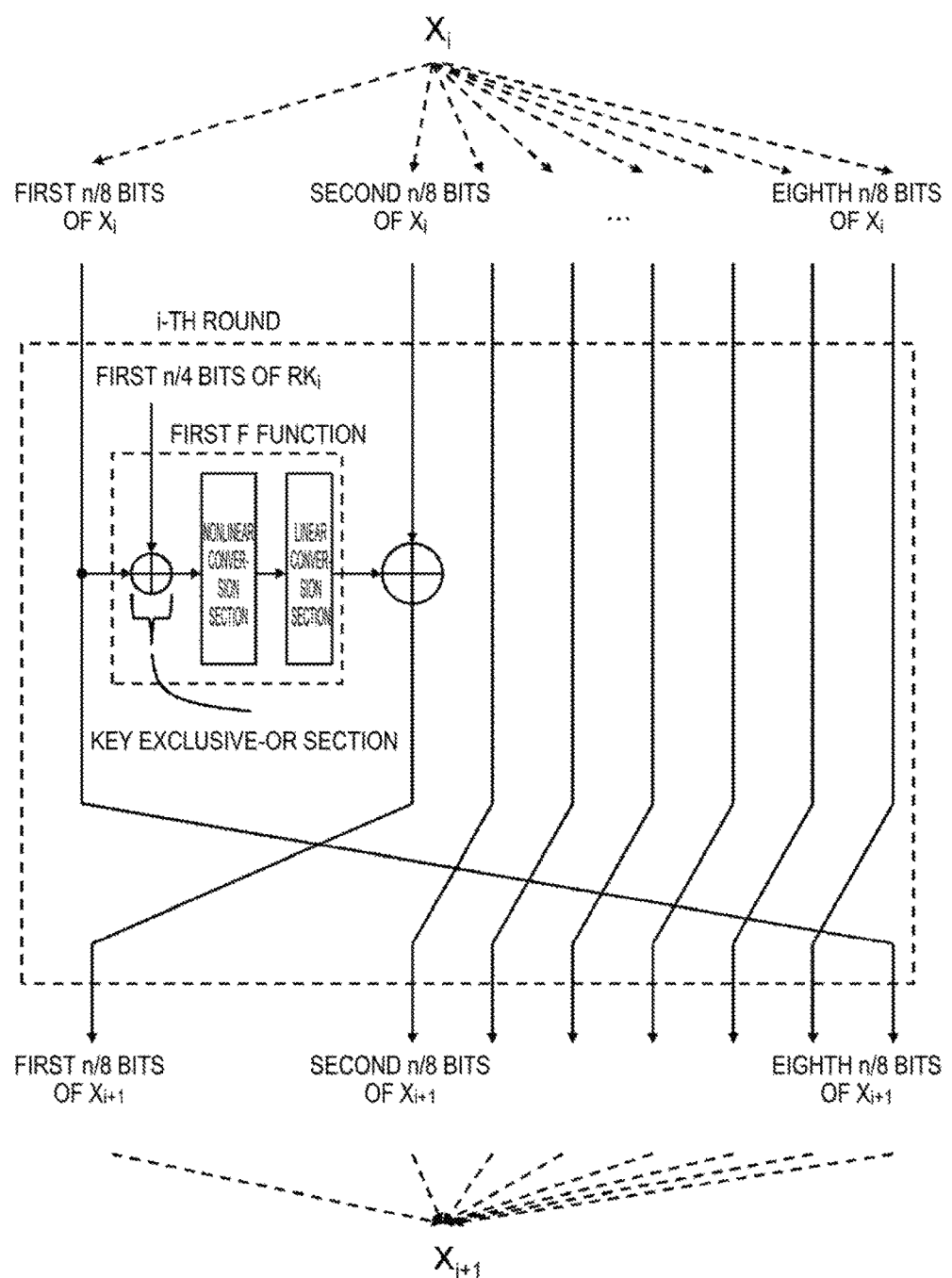
FIG. 8 is a diagram for describing an example of a round function with an expanded Feistel structure.

The expanded Feistel structure is a structure obtained by expanding the Feistel structure in which the number of split pieces of data is 2 to a form in which the number of split pieces of data is 3 or more. When d is the number of split pieces of data, various expanded Feistel structures can be defined in accordance with d. Since input and output sizes of an F function are relatively small, the expanded Feistel structure is suitable for miniature mounting. FIG. 7 illustrates an example of the expanded Feistel structure when d=4 is set and two F functions are applied in parallel in one round. FIG. 8 illustrates an example of the expanded Feistel structure when d=8 is set and one F function is applied in one round.

(1-5. Nonlinear Conversion Section)

The nonlinear conversion section has a tendency to increase a mounting cost when the size of input data increases. To avoid this, many nonlinear conversion sections have a configuration in which target data is split into a plurality of units and nonlinear conversion is executed in each unit. For example, the nonlinear conversion section has a configuration in which an input size is ms bits, the input size is split into m pieces of data with s bits, and nonlinear conversion with an s-bit input and output is executed on each piece of data. Such a nonlinear conversion execution section of an s-bit unit is referred to as an S-box. An example of the S-box is illustrated in FIG. 9.

Figure 9:
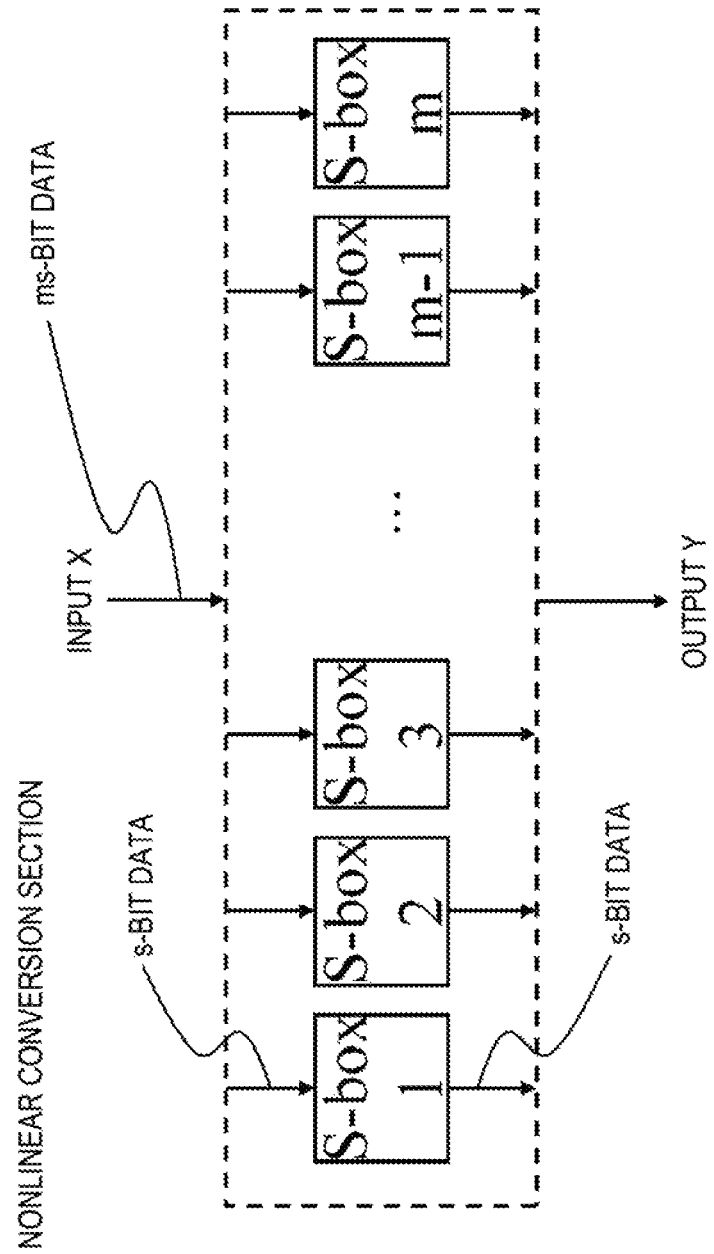
FIG. 9 is a diagram for describing an example of the configuration of a nonlinear conversion section.

An example illustrated in FIG. 9 is a configuration in which input data with ms bits is split into m pieces of s-bit data, the pieces of data are input to m S-boxes that execute an s-bit nonlinear conversion process, and outputs of the S-boxes are linked to obtain an ms-bit nonlinear conversion result.

(1-6. Linear Conversion Section)

Figure 10:
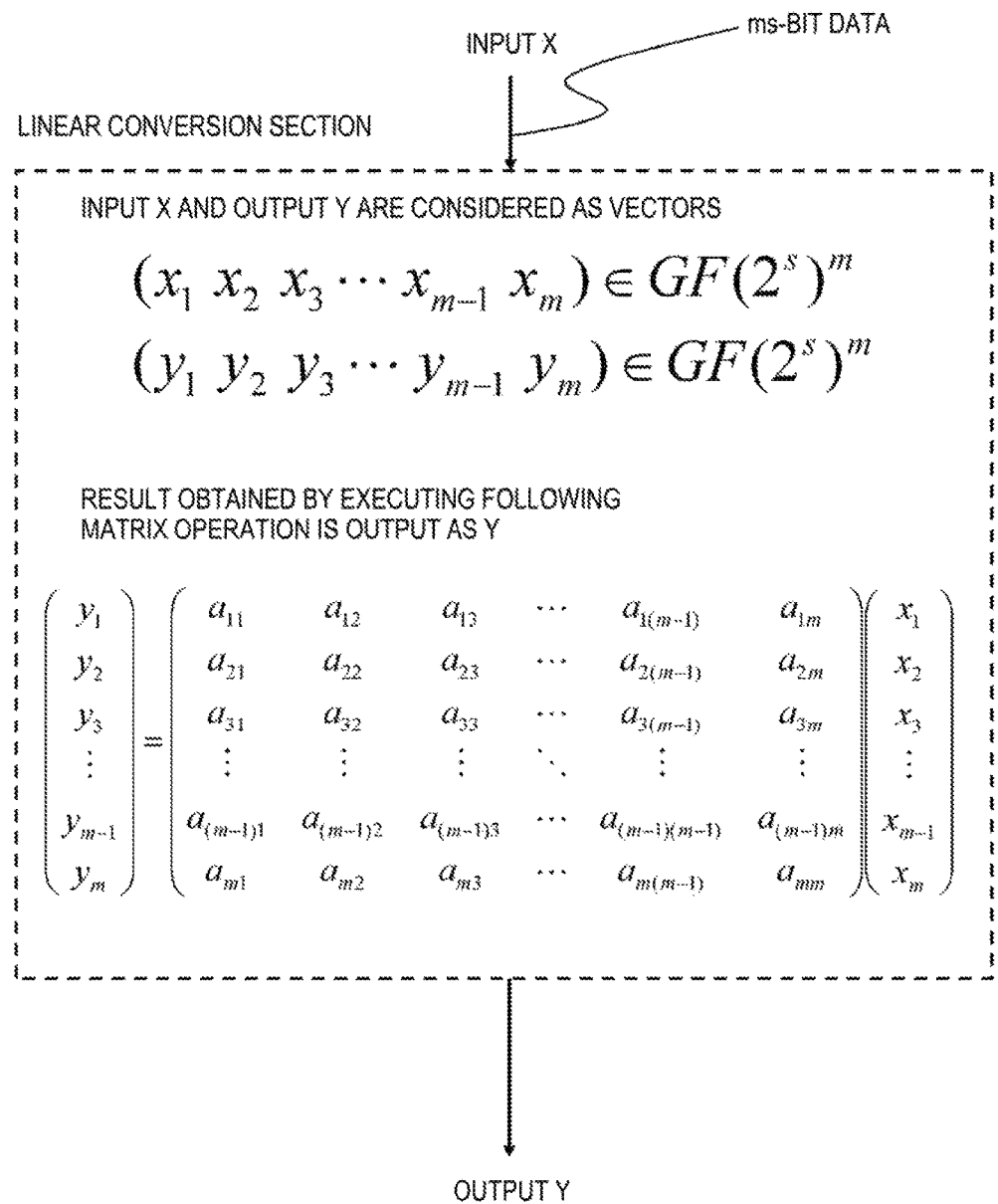
FIG. 10 is a diagram for describing an example of the configuration of a linear conversion section.

The linear conversion section can be defined as a matrix by its nature. In general, elements of a matrix can be diversely expressed, such as elements of expansions $GF(2^8)$ and elements of $GF(2)$. FIG. 10 illustrates an example of a linear conversion section that has an ms-bit input and output and is defined by an m×m matrix defined on $GF(2^s)$.

(1-7. Data Expression using State)

When each piece of data (plaintext, ciphertext, a key, or the like) is expressed, the data is sometimes expressed as m×n array data with a matrix type of m rows and n columns. The data expressed by the m×n array is referred to as a state or state-expression data.

Figure 11:
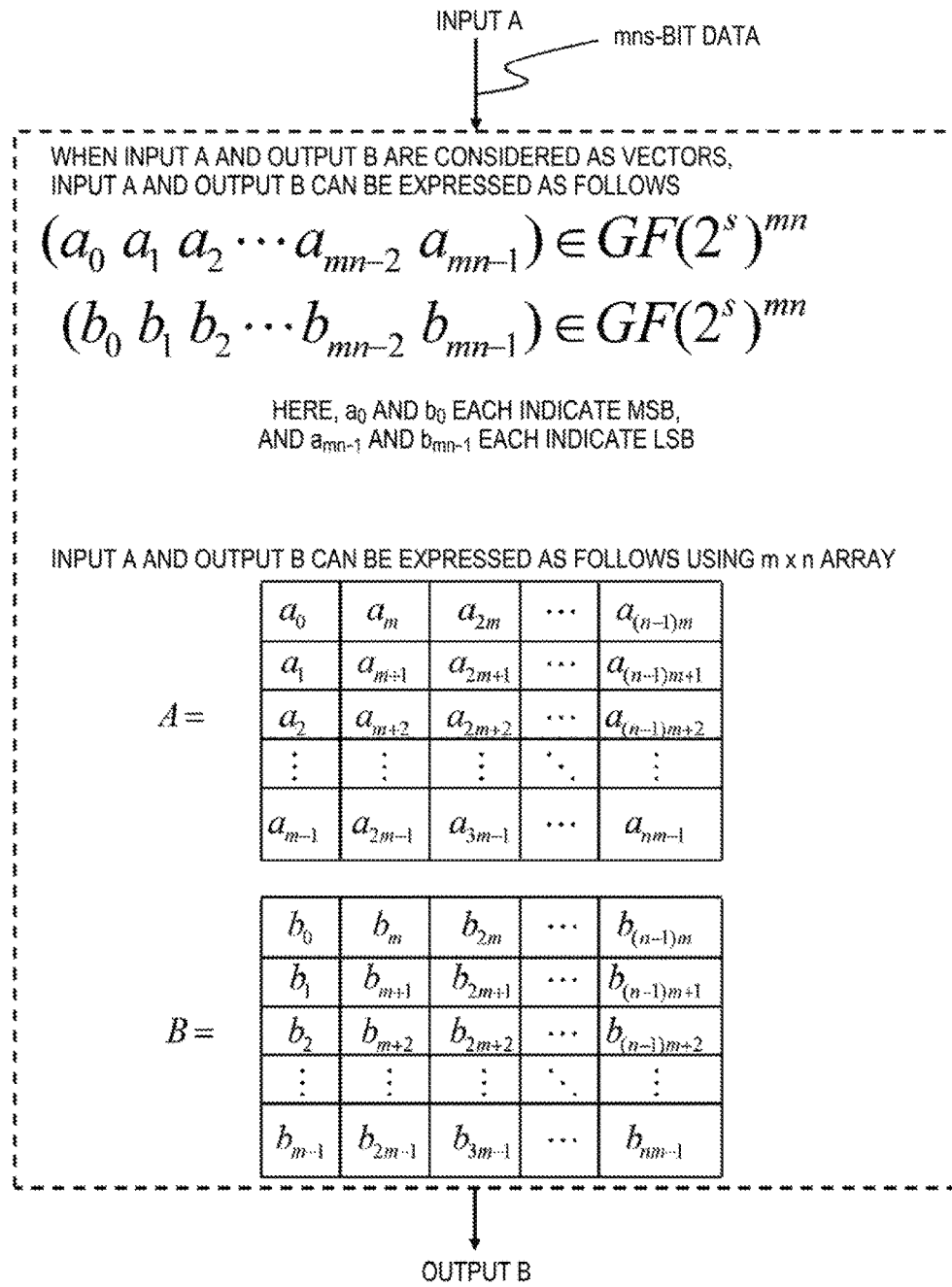
FIG. 11 is a diagram for describing an example of a data conversion process on a state (state expression data).

FIG. 11 illustrates an example in which, when A is input data and B is output data after data conversion on the input data A, the input data A and the output data B are each expressed as a state with the m×n array.

The input data A has elements of an expansion $GF(2^s)^{mm}$.

The input data $A=(a_0 a_1 a_2 \ldots 2_{mm-2} a_{mm-1})$.

Further, $a_0$ is bit data on the MSB side and $a_{mm-1}$ is bit data of the LSB side.

Similarly, the output data B also has elements of the expansion $GF(2^s)^{mm}$.

The output data $B=(b_0 b_1 b_2 \ldots b_{mm-2} b_{mm-1})$.

Further, $b_0$ is bit data on the MSB side and $b_{mm-1}$ is bit data of the LSB side.

As illustrated in the drawing, m×n elements are included in an m×n array state.

For example, mn elements of $a_0$ to $a_{mm-1}$ are included in the state A illustrated in FIG. 11. The elements of the state B are mn elements of $b_0$ to $b_{mm-1}$.

Each of the mn elements is s-bit data (where s=1 or more). Specifically, each element is, for example, bit data such as 4-bit data or 8-bit (1 byte) data.

In the following embodiment, an embodiment in which each element is 4-bit data will be described. However, a process of the present disclosure can also be applied to a configuration other than 4-bit element data.

Figure 12:
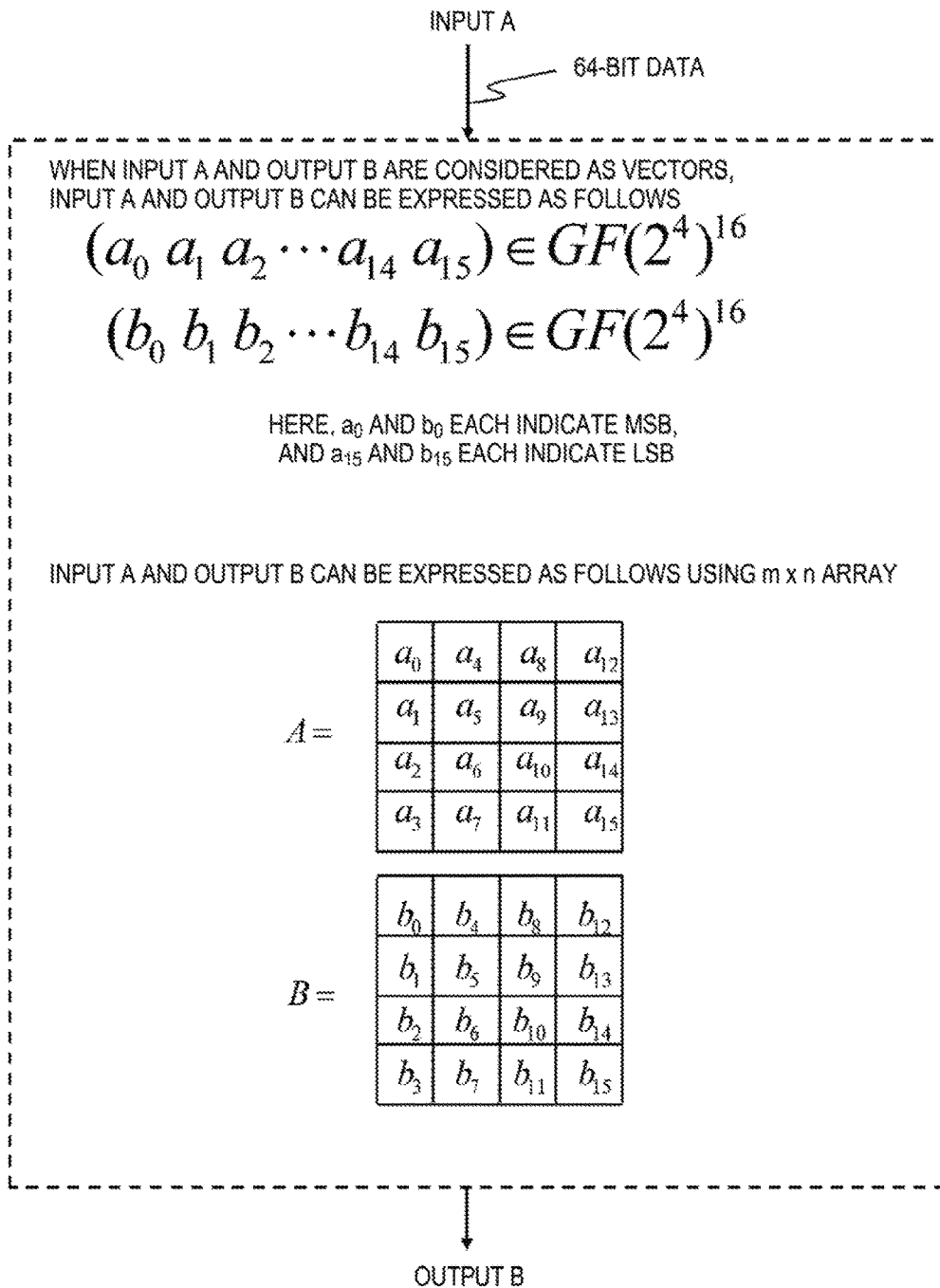
FIG. 12 is a diagram for describing an example of the data conversion process on the state.

FIG. 12 illustrates an example of a 4×4 state when each of 16 elements included in the 4×4 state is 4-bit data.

In the example illustrated in FIG. 12, it is assumed that A is input data and B is output data after any data conversion, as in FIG. 11.

The input data A has elements of an expansion $GF(2^4)^{4\times 4}$.

The input data $A=(a_0 a_1 a_2 \ldots a_{14} a_{15})$.

Further, $a_0$ is bit data on the MSB side and $a_{15}$ is bit data of the LSB side.

Similarly, the output data B also has elements of the expansion $GF(2^4)^{4\times 4}$.

The output data $B=(b_0 b_1 b_2 \ldots b_{14} b_{15})$.

Further, $b_0$ is bit data on the MSB side and $b_{15}$ is bit data of the LSB side.

The example illustrated in FIG. 12 is an example in which the input data A and the output B are expressed as states with a 4×4 array in which each element is 4-bit data.

For example, the state A illustrated in FIG. 12 includes 16 elements, $a_0$ to $a_{15}$. Each element is 4-bit data.

That is, when 64-bit input data A is indicated as a state, the state can be expressed as the state A that has the 4×4 array in which each element illustrated in FIG. 12 is 4-bit data.

Similarly, the state B illustrated in FIG. 12 includes 16 elements, $b_0$ to $b_{15}$. Each element is also 4-bit data.

That is, when 64-bit output data B is indicated as a state, the state can be expressed as the state B that has the 4×4 array in which each element illustrated in FIG. 12 is 4-bit data.

(1-8. Basic Operation on State Expression Data)

Next, an operation process on a state (state expression data) will be described.

(1) Nonlinear Conversion Process (S)

For example, a nonlinear conversion process is executed by applying a plurality of S-boxes in which nonlinear conversion is executed on each element of the state in a 4-bit unit.

As illustrated in FIG. 13(1), the state B is assumed to be generated through the nonlinear conversion process on the input state A.

In this case, a relation between an output $b_i$ and an input $a_i$ of the 4-bit unit of each element is as follows:

$$b_i = S(a_i),$$

where $i = 0, 1, \ldots, 15$.

(2) Linear Conversion Process (P)

As illustrated in FIG. 13(2), the state B is assumed to be generated through a linear conversion process on the input state A.

The linear conversion process on the 4×4 state is executed as an operation of updating a value, for example, by considering four pieces of data of each row of the 4×4 state as vectors and executing an operation on a 4×4 matrix [M]. This is called a row diffusion operation.

A relation between an output $b_i$ and an input $a_i$ of the 4-bit unit of each element of the state after the conversion process is as follows:

$$^t(b_i, b_{i+4}, b_{i+8}, b_{i+12}) = M \times {}^t(a_i, a_{i+4}, a_{i+8}, a_{i+12}),$$

where $i = 1, 2, 3$.

Here, $^tX$ indicates a transposed matrix of X. As the linear conversion process, there are various methods such as a column diffusion operation and bit substitution in addition to the row diffusion operation.

(3) Exclusive-OR Operation (Key Application Operation Process (K))

Figure 14:
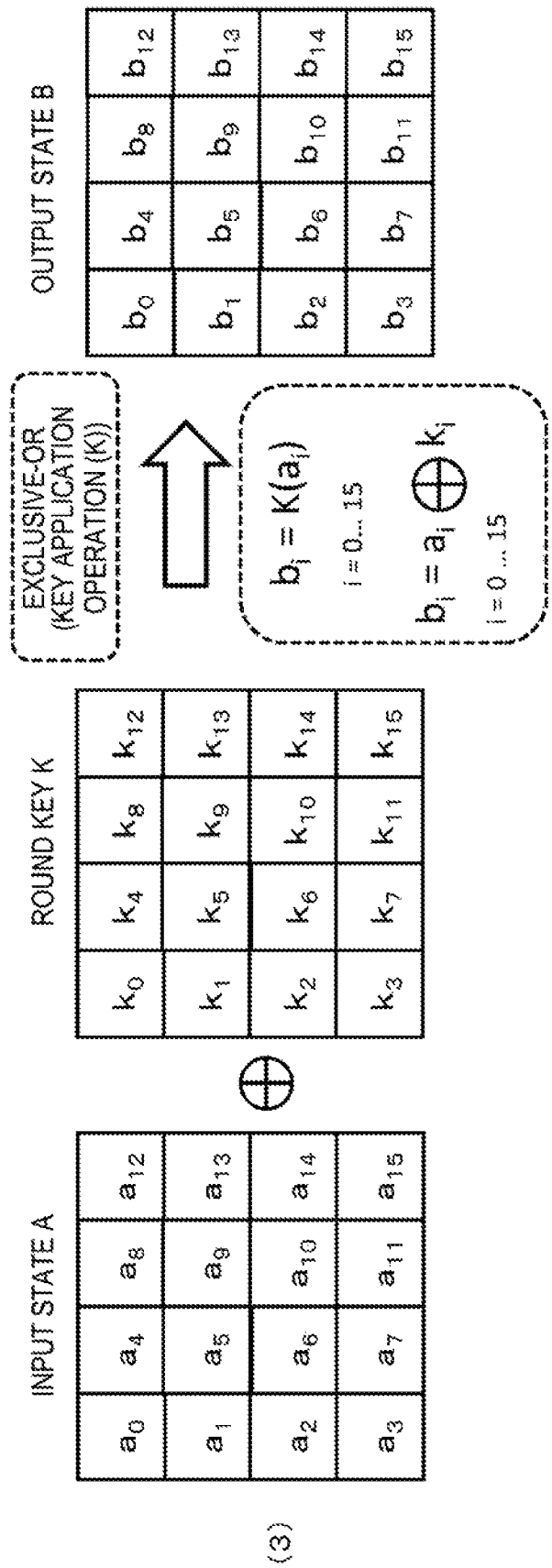
FIG. 14 is a diagram for describing an example of the data conversion process on the state.

As illustrated in FIG. 14, the state B is assumed to be generated through an exclusive-OR operation process on the input state A.

For example, an operation of calculating the output data B through an exclusive-OR operation of a round key K output from the key scheduling section and the input data A is executed. All of the input data A, the round key K, and the output data B are 64-bit data in which a state formed by 16 4-bit elements is expressed.

A relation among an output $b_i$, an input $a_i$, and a round key $k_i$ of the 4-bit unit of each element of the state after the conversion process is as follows:

$$b_i = a_i (\text{XOR}) k_i,$$

where $i = 0, 1, \ldots, 15$.

In the above formula, (XOR) indicates an exclusive-OR operation.

One round operation is set through an operation combination in which the foregoing operations (1) to (3) are sequentially executed in a predetermined sequence. Output data, for example, encrypted data, is generated and output by repeatedly executing a round operation on the input data.

A basic round operation is set by executing an exclusive-OR operation with a round key, a linear conversion process, and a nonlinear conversion process once. However, an irregular round operation configuration can also be set in the round operation executed in an encryption processing sequence. For example, a different round operation from another round operation, such as a configuration in which a round operation including the exclusive-OR operation with a round key a plurality of times or the linear changing process is omitted, can also be set.

A configuration in which only an operation with the round key is executed at the beginning or end of the encryption processing sequence is also used often. This process is referred to as a key whitening process and is generally not counted as the number of rounds.

(1-9. Column Diffusion Operation on State Expression Data)

Next, a column diffusion operation process on the state expression data indicated as an m×n matrix array will be described with reference to FIGS. 15 and 16.

Each of $X_0, X_1, X_{n-1}$ assumed to be an m×m matrix in which each element is an element on $GF(2^s)$.

Figure 15:
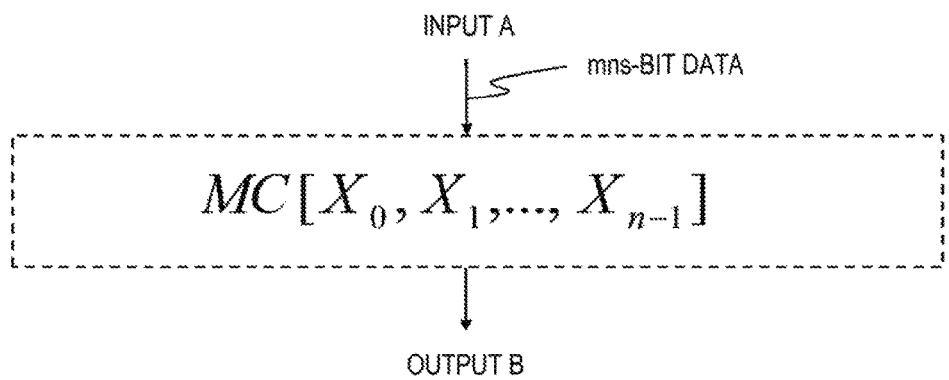
FIG. 15 is a diagram for describing a column diffusion calculation process on the state.

$MC[X_0, X_1, \ldots, X_{n-1}]$ is illustrated in FIG. 15.

The above operation, that is, a matrix operation in which elements of each column (0 to n−1) of the state and matrixes $X_0, X_1, \ldots,$ and $X_{n-1}$ corresponding to each column are applied to elements of the state expression data, is defined as a column diffusion operation.

MC means a diffusion (Mix) of a column unit, that is, (MixColumn).

In the column diffusion operation, a matrix operation in which one matrix $X_k$ is applied to elements of one column of the state is executed.

For the matrix $X_k$ which is applied to each of a plurality of columns that form a state, either setting of the same matrix or setting of different matrixes can be set.

For example, an operation formula for calculating the state B which is output data by executing the column diffusion operation on the state A which is input data can be expressed as follows:

$$B = MC[X_0, X_1, \ldots, X_{n-1}](A).$$

The column diffusion operation process is a process that is expressed by the following formulae, as illustrated in the lower part of FIG. 15.

That is, the elements of the state B calculated through the above operation formula are as follows:

$$^t(b_0 b_1 \ldots b_{m-1}) = X_0 \times {}^t(a_0 a_1 \ldots a_{m-1}),$$

$$^t(b_m b_{m+1} \ldots b_{2m-1}) = X_1 \times {}^t(a_m a_{m+1} \ldots a_{2m-1}),$$

$$\ldots$$

$$^t(b_{(n-1)m} b_{(n-1)m-1} \ldots b_{nm-1}) = X_{n-1} \times {}^t(a_{(n-1)m} a_{(n-1)m+1} \ldots a_{nm-1}).$$

In the foregoing formula, $^t(b_1, b_2 \ldots b_k)$ indicates a transposed matrix of $(b_1, b_2 \ldots b_k)$.

When the operation formula is expressed according to the element arrays of the actual states A and B, the operation formula becomes the following operation formula, as illustrated in the lower part of FIG. 15.

$$\begin{pmatrix} b_0 \\ b_1 \\ \vdots \\ b_{m-1} \end{pmatrix} = X_0 \cdot \begin{pmatrix} a_0 \\ a_1 \\ \vdots \\ a_{m-1} \end{pmatrix},$$

$$\begin{pmatrix} b_m \\ b_{m+1} \\ \vdots \\ b_{2m-1} \end{pmatrix} = X_1 \cdot \begin{pmatrix} a_m \\ a_{m+1} \\ \vdots \\ a_{2m-1} \end{pmatrix}, \ldots, \ldots,$$

$$\begin{pmatrix} b_{(n-1)m} \\ b_{(n-1)m+1} \\ \vdots \\ b_{nm-1} \end{pmatrix} = X_{n-1} \cdot \begin{pmatrix} a_{(n-1)m} \\ a_{(n-1)m+1} \\ \vdots \\ a_{nm-1} \end{pmatrix}$$

[Math. 1]

Figure 16:
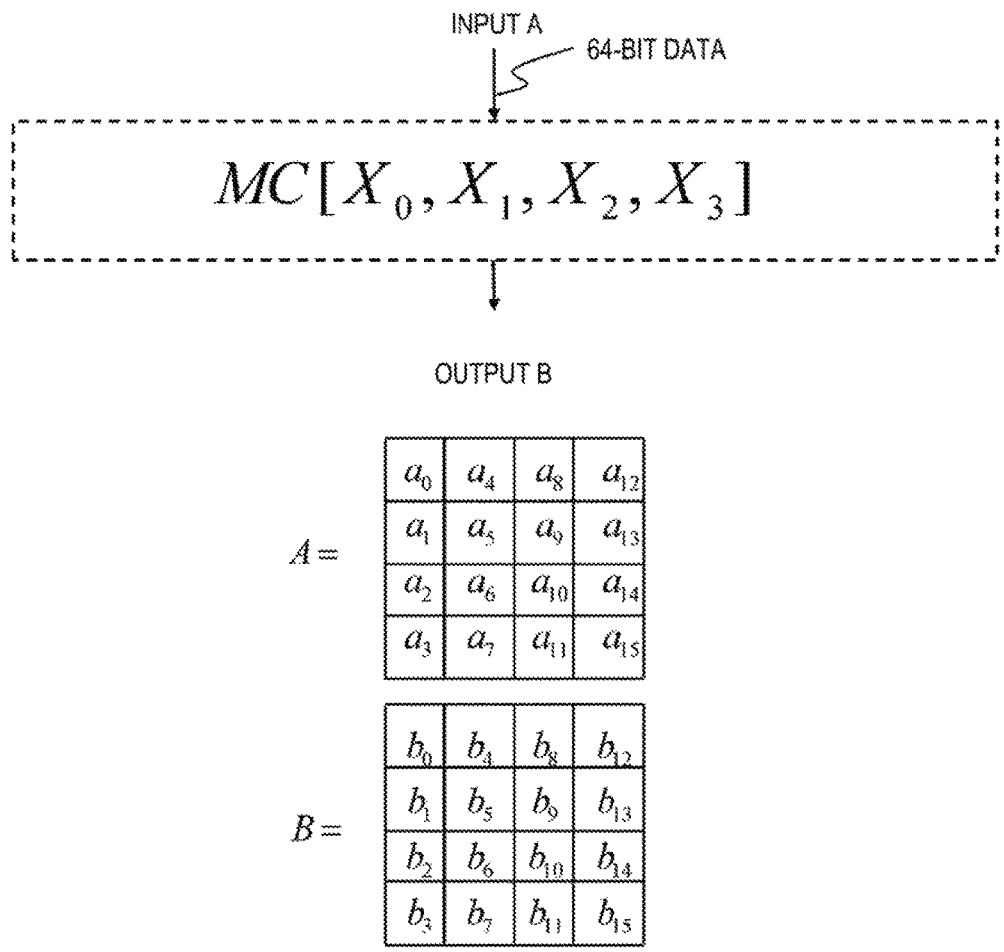
FIG. 16 is a diagram for describing a column diffusion calculation process on the state.

FIG. 16 is a diagram illustrating an application processing example of the column diffusion operation: MC $[X_0, X_1, X_2, X_3]$ when the input data A is 64-bit data and the state A is set as a state A formed by 16 4-bit data elements, and the output data B is also 64-bit data and the state B is set as a state B formed by 16 4-bit data elements.

That is, as described with reference to FIG. 15, a calculation processing example of the elements of the state B is illustrated by the following column diffusion operation process:

$B=MC[X_0,X_1,X_2,X_3](A)$.

That is, the elements of the state B calculated in accordance with the above operation formula are as follows:

$^t(b_0b_1b_2b_3)=X_0 \times {}^t(a_0a_1a_2a_3)$, $^t(b_4b_5b_6b_7)=X_1 \times {}^t(a_4a_5a_6a_7)$, $^t(b_8b_9b_{10}b_{11})=X_2 \times {}^t(a_8a_9a_{10}a_{11})$, and $^t(b_{12}b_{13}b_{14}b_{15})=X_3 \times {}^t(a_{12}a_{13}a_{14}a_{15})$, When the above operation formula is expressed according to the element arrays of the actual states A and B, the following operation formula can be obtained, as illustrated in the lower part of FIG. 16.

$$\begin{pmatrix} b_0 \\ b_1 \\ b_2 \\ b_3 \end{pmatrix} = X_0 \cdot \begin{pmatrix} a_0 \\ a_1 \\ a_2 \\ a_3 \end{pmatrix}, \begin{pmatrix} b_4 \\ b_5 \\ b_6 \\ b_7 \end{pmatrix} = X_1 \cdot \begin{pmatrix} a_4 \\ a_5 \\ a_6 \\ a_7 \end{pmatrix},$$

$$\begin{pmatrix} b_8 \\ b_9 \\ b_{10} \\ b_{11} \end{pmatrix} = X_2 \cdot \begin{pmatrix} a_8 \\ a_9 \\ a_{10} \\ a_{11} \end{pmatrix}, \begin{pmatrix} b_{12} \\ b_{13} \\ b_{14} \\ b_{15} \end{pmatrix} = X_3 \cdot \begin{pmatrix} a_{12} \\ a_{13} \\ a_{14} \\ a_{15} \end{pmatrix}$$

[Math. 2]

When a matrix operation in which the same matrix X is applied to each column element of the state is executed, the matrix operation can also be expressed as follows:

MC[X].

That is, MC [X] and MC [X, X, . . . , X] are the same operation.
(1-10. Row Diffusion Operation on State Expression Data)

Next, a row diffusion operation process on the state expression data indicated as an m×n matrix array will be described with reference to FIGS. 17 and 18.

Each of $X_0, X_1, X_{m-1}$ is assumed to be an n×n matrix in which each element is an element on $GF(2^s)$.

Figure 17:
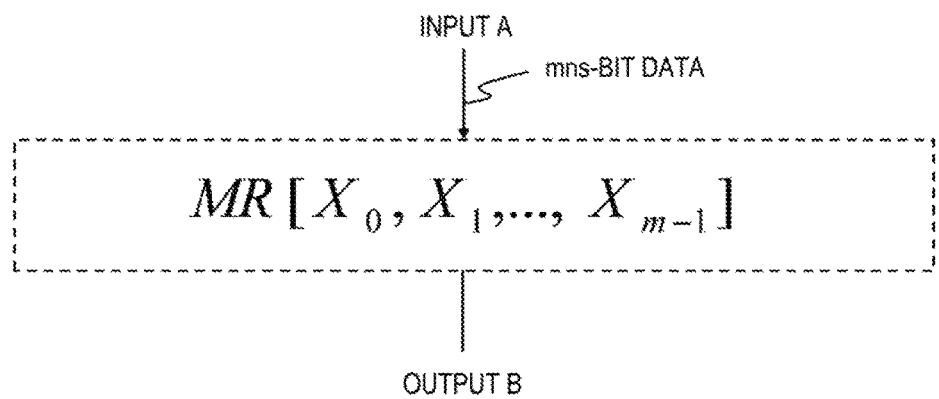
FIG. 17 is a diagram for describing a row diffusion calculation process on the state.

MR $[X_0, X_1, \ldots, X_{m-1}]$ is illustrated in FIG. 17.

The above operation, that is, a matrix operation in which elements of each row (0 to n−1) of the state and matrixes $X_0, X_1, \ldots,$ and $X_{m-1}$ corresponding to each row are applied to elements of the state expression data, is defined as a column diffusion operation.

MR means a diffusion (Mix) of a row unit, that is, (MixRow).

In the row diffusion operation, a matrix operation in which one matrix $X_k$ is applied to elements of one row of the state is executed.

For the matrix $X_k$ which is applied to each of a plurality of rows that form a state, either setting of the same matrix or setting of different matrixes can be set.

For example, an operation formula for calculating the state B which is output data by executing the row diffusion operation on the state A which is input data can be expressed as follows.

$B=MR[X_0,X_1, \ldots ,X_{m-1}](A)$.

This row diffusion operation process is a process illustrated in the lower part of FIG. 17.

That is, the elements of the state B calculated through the above operation formula are as follows:

$^t(b_0b_m \ldots b_{(n-1)m})=X_0 \times {}^t(a_0a_m \ldots a_{(n-1)m})$, $^t(b_1b_{m+1} \ldots b_{(n-1)m+1})=X_1 \times {}^t(a_1a_{m+1} \ldots a_{(n-1)m+1})$,

. . .

$^t(b_{m-1}b_{2m-1} \ldots b_{nm-1})=X_1 \times {}^t(a_ma_{2m-1} \ldots a_{nm-1})$.

In the foregoing formula, $^t(b_1, b_2 \ldots b_k)$ indicates a transposed matrix of $(b_1, b_2 \ldots b_k)$.

When the operation formula is expressed according to the element arrays of the actual states A and B, the operation formula becomes the following operation formula, as illustrated in the lower part of FIG. 17.

$$\begin{pmatrix} b_0 \\ b_m \\ \vdots \\ b_{(n-1)m} \end{pmatrix} = X_0 \cdot \begin{pmatrix} a_0 \\ a_m \\ \vdots \\ a_{(n-1)m} \end{pmatrix},$$

$$\begin{pmatrix} b_1 \\ b_{m+1} \\ \vdots \\ b_{(n-1)m+1} \end{pmatrix} = X_1 \cdot \begin{pmatrix} a_1 \\ a_{m+1} \\ \vdots \\ a_{(n-1)m+1} \end{pmatrix}, \ldots, \ldots,$$

$$\begin{pmatrix} b_{m-1} \\ b_{2m-1} \\ \vdots \\ b_{nm-1} \end{pmatrix} = X_{m-1} \cdot \begin{pmatrix} a_{m-1} \\ a_{2m-1} \\ \vdots \\ a_{nm-1} \end{pmatrix}$$

[Math. 3]

Figure 18:
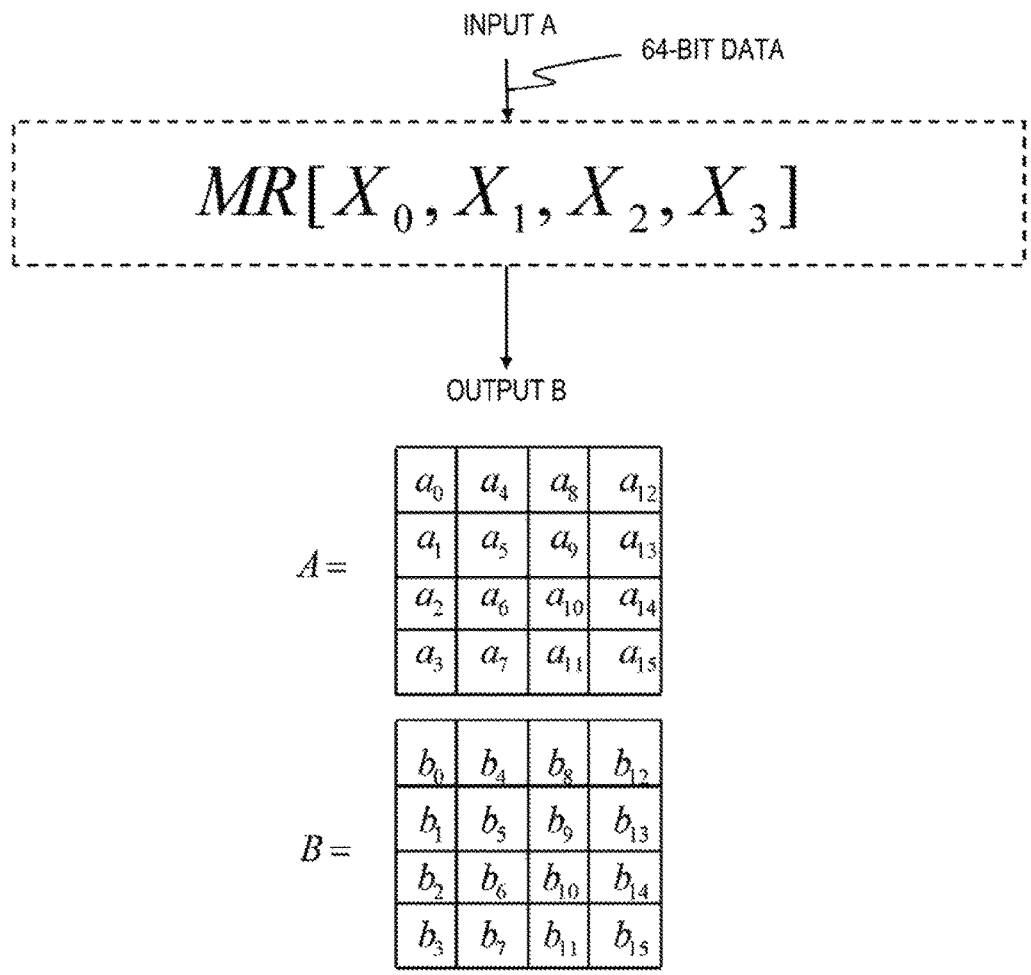
FIG. 18 is a diagram for describing a row diffusion calculation process on the state.

FIG. 18 is a diagram illustrating an application processing example of the row diffusion operation: MR $[X_0, X_1, X_2, X_3]$ when the input data A is 64-bit data and the state A is set as a state A formed by 16 4-bit data elements, and the output data B is also 64-bit data and the state B is set as a state B formed by 16 4-bit data elements.

That is, as described with reference to FIG. 17, a calculation processing example of the elements of the state B is illustrated by the following row diffusion operation process:

$$B=MR[X_0,X_1,X_2,X_3](A).$$

That is, the elements of the state B calculated in accordance with the above operation formula are as follows:

$${}^t(b_0 b_4 b_8 b_{12}) = X_0 \times {}^t(a_0 a_4 a_8 a_{12}),$$

$${}^t(b_1 b_5 b_9 b_{13}) = X_1 \times {}^t(a_1 a_5 a_9 a_{13}),$$

$${}^t(b_2 b_6 b_{10} b_{14}) = X_2 \times {}^t(a_2 a_6 a_{10} a_{14}),\text{ and}$$

$${}^t(b_3 b_7 b_{11} b_{15}) = X_1 \times {}^t(a_3 a_7 a_{11} a_{15}),$$

When the operation formula is expressed according to the element arrays of the actual states A and B, the operation formula becomes the following operation formula, as illustrated in the lower part of FIG. 18.

$$\begin{pmatrix} b_0 \\ b_4 \\ b_8 \\ b_{12} \end{pmatrix} = X_0 \cdot \begin{pmatrix} a_0 \\ a_4 \\ a_8 \\ a_{12} \end{pmatrix}, \begin{pmatrix} b_1 \\ b_5 \\ b_9 \\ b_{13} \end{pmatrix} = X_1 \cdot \begin{pmatrix} a_1 \\ a_5 \\ a_9 \\ a_{13} \end{pmatrix},$$

$$\begin{pmatrix} b_2 \\ b_6 \\ b_{10} \\ b_{14} \end{pmatrix} = X_2 \cdot \begin{pmatrix} a_2 \\ a_6 \\ a_{10} \\ a_{14} \end{pmatrix}, \begin{pmatrix} b_3 \\ b_7 \\ b_{11} \\ b_{15} \end{pmatrix} = X_3 \cdot \begin{pmatrix} a_3 \\ a_7 \\ a_{11} \\ a_{15} \end{pmatrix}$$

[Math. 4]

When a matrix operation in which the same matrix X is applied to each row element of the state is executed, the matrix operation can also be expressed as follows:

$$MR[X].$$

That is, MR [X] and MR [X, X, . . . , X] are the same operation.

(1-11. Involution Property)

When round keys are K1, K2, . . . , and KR which are applied to rounds in the common key block encryption in which the ciphertext C is generated from the plaintext P, an encryption function E that calculates the ciphertext C from the plaintext P can be expressed as follows:

$$C=E(P,K1,K2,\ldots,KR).$$

At this time, a decryption function D that calculates the plaintext P from the ciphertext C is expressed as follows:

$$P=D(C,k1,k2,\ldots,kr).$$

However, when the foregoing decryption function D satisfies:

$$D(C,k1,k2,\ldots,kr)=E(C,KR,\ldots,K2,K1),$$

That is, when an application sequence of the round keys of the decryption function D is reverse to the application sequence of the round keys of the encryption function E and the same function can be used in others, the common key block encryption is assumed to have an involution property.

In this way, the common key block encryption in which the decryption function D can be configured by merely changing an input sequence of the round keys using the encryption function E can be said to have the involution property. For example, a Feistel type of common key block encryption in which an encryption function and a decryption function can normally be executed by the same circuit merely reversing a use sequence of round keys to be used is known, and thus can be said to have the involution property.

Since an encryption function and a decryption function can basically be realized by merely mounting the encryption function in the common key block encryption that has the involution property, the number of necessary circuits is small, weight reduction (miniaturization) is possible, and mounting efficiency is improved.

[2. Index of Security in Common Key Block Encryption]

As attacks on the common key block encryption, for example, various attacks carried out to decrypt private keys are known. Specifically, there are a differential attack and a linear attack.

The differential attack is an attack carried out to estimate a key by inputting data with a specific difference to an encryption device and detecting data reflecting the input difference from an output. A propagation probability of a difference value is referred to as a difference probability.

The linear attack is an attack carried to estimate a key by measuring correlation between exclusive-OR of input specific bits and exclusive-OR of output specific bits and finding strong correlation. A correlation coefficient of the input and output specific bits is referred to as a linear probability.

Encryption with high security is encryption which has high resistance to the foregoing various attacks, that is, encryption which has high decryption difficulty of private information which is applied to an encryption process, for example, a key.

Hereinafter, a plurality of pieces of data serving as security indexes for encryption algorithms will be described.

(2-1. Number of Branches)

In the common key block encryption, for example, various kinds of data conversion such as the linear conversion, the nonlinear conversion, and the exclusive-OR operation described above are executed.

As a security index regarding decryption difficulty of such data conversion, there is the number of branches.

For example, mapping θ from n×a-bit data to n×b-bit data is as follows:

$$\theta: \{0,1\}^{na} \rightarrow \{0,1\}^{nb}.$$

The number of branches (Branch$_n$(θ)) for the mapping θ is defined as follows.

$$\text{Branch}_n(\theta)=\min_{\alpha \neq 0}\{hw_n(\alpha)+hw_n(\theta(\alpha))\}$$

Here, min$_{\alpha \neq 0}$ {X(α)} indicates a minimum value among all X$_\alpha$ satisfying α≠0, and hw$_n$(Y) is a function that returns the number of components in which none of the pieces of n-bit data is 0 (all are nonzero) when a bit stream Y is partitioned for each n bits.

In general, the decryption difficulty is higher as the number of branches is higher. Thus, resistance to a differential attack or a linear attack is said to be improved.

Mapping θ in which the number of branches Branch$_n$(θ) is b+1 is referred to as optimum diffusion conversion (optimum diffusion mappings).

As a matrix for linear conversion with the large number of branches, for example, there is a maximum distance separable (MDS) matrix for executing the optimum diffusion conversion. The MDS matrix is a matrix in which any submatrix forming a matrix is a regular matrix. A regular matrix is a matrix which has an inverse matrix. When a matrix is A and an inverse matrix is $A^{-1}$, the following is satisfied:

$$AA^{-1}=A^{-1}A=E,$$

where E is a unit matrix.

The matrix A which has the inverse matrix $A^{-1}$ for which the foregoing formula is satisfied is a regular matrix.

(2-2. Minimum Number of Differential Active S-Boxes)

As described above, an S-box that executes the nonlinear conversion in an s-bit unit is used in the nonlinear conversion section set with the common key block encryption.

As an index for realizing resistance to a differential attack, there is the minimum number of differential active S-boxes, that is, the minimum number of differential active S-boxes included in a differential path expressing a difference connection relation.

The differential path designates a specific differential value for all pieces of data excluding key data in an encryption function. The differential value is not decided freely and the differential values before and after the conversion process are mutually relevant. Before and after the linear conversion process, a relation between input and output differences is decided on a one-to-one basis. Before and after the nonlinear conversion, a relation between input and output differences is not decided on a one-to-one basis, but a concept of a probability is introduced. Probabilities of a certain input difference and a certain output difference are assumed to be calculable in advance. When all of the probabilities of all outputs are added, 1 is obtained.

In general encryption (block encryption), the nonlinear conversion is only a part of processes executed by the S-boxes. Accordingly, in this case, a differential path with a probability other than 0 is a set of pieces of differential data starting from a differential value of plaintext (input) and reaching a differential value of ciphertext (output). Differential values given before and after all the S-boxes are probabilities other than 0. An S-box for which a differential value input to an S-box of the differential path with a probability other than 0 is not 0 is referred to as a differential active S-box. The smallest number among the numbers of S-boxes in all the differential paths which have probabilities other than 0 is referred to as a minimum number of differential active S-boxes. This number of S-boxes is known as a security index against a differential attack.

In general, when the minimum number of differential active S-boxes is ensured to be sufficiently large, security against a differential attack can be demonstrated. Encryption ensuring that the minimum number of differential active S-boxes is larger with a smaller number of repetitions of the round function can be considered to be encryption with higher performance. In a differential path in which all of the differential values are 0, a probability is 1, and thus it has not significance as an attack.

(2-3. Minimum Number of Linear Active S-Boxes)

As one of the indexes indicating resistance to a linear attack, a minimum number of linear active S-boxes included in a linear path that expresses a connection relation between linear masks can be exemplified.

The linear path is also referred to as linear approximation, but a path is used herein to correspond to a difference.

The linear path designates specific linear mask values for all pieces of data excluding key data in an encryption function. The linear mask values are not decided freely and the linear mask values before and after a conversion process are mutually related. Before and after the linear conversion process, a relation between input linear mask values and output linear mask values is decided on a one-to-one basis.

Before and after the nonlinear conversion, a relation between input linear mask values and output linear mask value is not decided on a one-to-one basis, but a concept of a probability is introduced. There is a set of one or more linear mask values which can be output with respect to the input linear mask values, and a probability at which each linear mask value is output can be calculated in advance. When probabilities of all outputs are added, 1 is obtained.

In general encryption (block encryption), the nonlinear conversion is only a part of processes executed by the S-boxes. Accordingly, in this case, a differential path with a probability other than 0 is a set of pieces of linear mask values data starting from the linear mask value of plaintext (input) and reaching the linear mask value of ciphertext (output). The linear mask values given before and after all the S-boxes are probabilities other than 0. An S-box for which the linear mask value input to an S-box of the linear path with a probability other than 0 is not 0 is referred to as a linear active S-box. The smallest number among the numbers of S-boxes in all the linear paths which have probabilities other than 0 is referred to as a minimum number of linear active S-boxes. The number of S-boxes is known as a security index against a linear attack.

In general, when the minimum number of linear active S-boxes is ensured to be sufficiently large, the security against to a linear attack can be demonstrated. Encryption ensuring that the minimum number of linear active S-boxes is larger with a smaller number of repetitions of the round function can be considered to be encryption with higher performance. In a linear path in which all of the linear mask values are 0, a probability is 1, and thus it has no significance as an attack.

[3. Overall Configuration Overview of Common Key Encryption Process in which Security is Improved]

Next, a process and a configuration of the common key encryption processing device according to the present disclosure in which security is improved will be described.

The encryption processing device according to the present disclosure to be described below is a device that executes common key block encryption (block encryption) and is a device that has a substitution-permutation network (SPN) structure round function.

The exclusive-OR operation with a round key, the nonlinear conversion, and the linear conversion process are configured to be executed repeatedly by a plurality of rounds on all of the pieces of n-bit input data.

Figure 19:
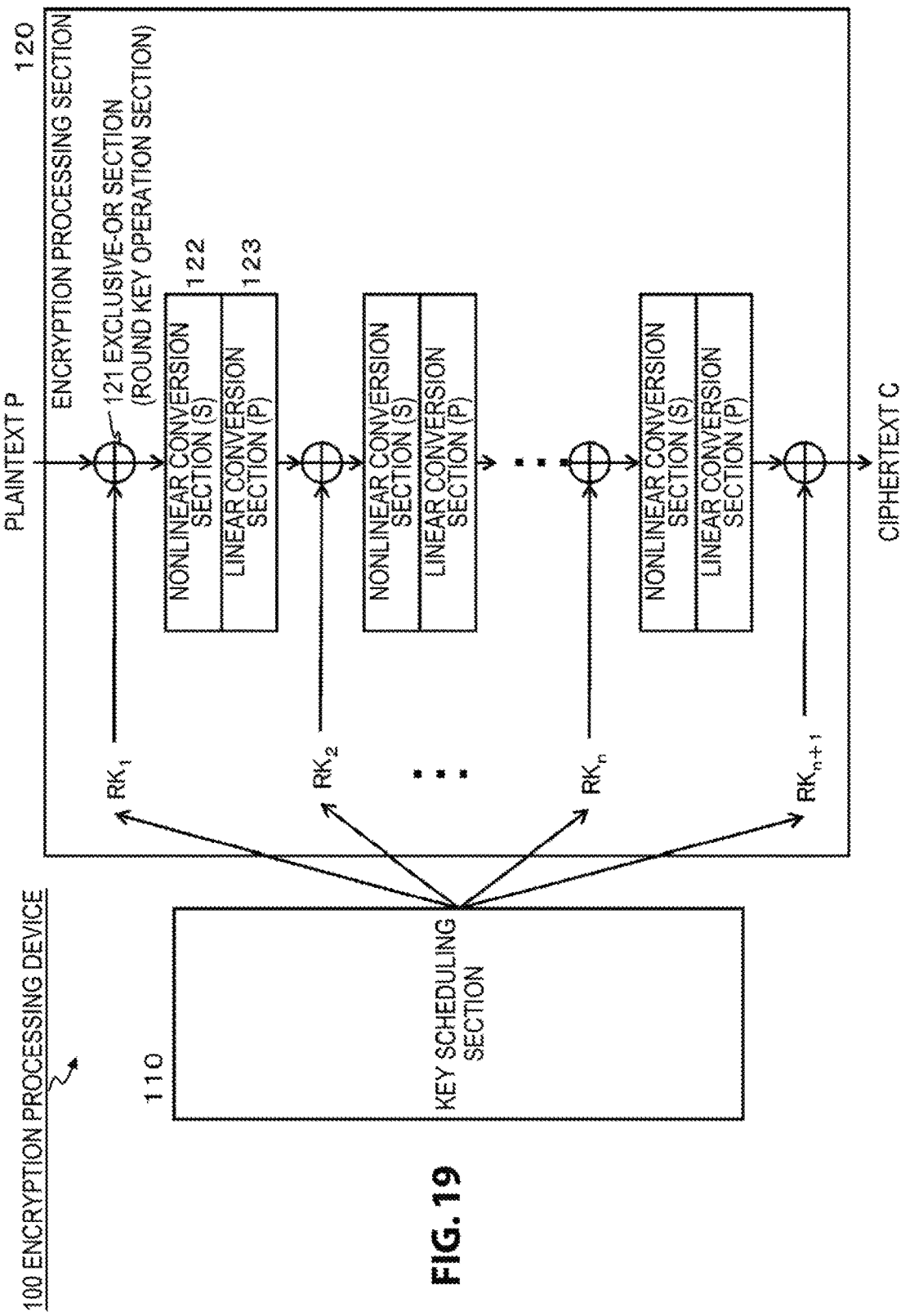
FIG. 19 is a diagram for describing an example of the configuration of an encryption processing device according to one embodiment of the present disclosure.

One specific configuration example of the common key encryption processing device according to the present disclosure is illustrated in FIG. 19.

As illustrated in FIG. 19, the encryption processing device 100 includes a key scheduling section 110 and an encryption processing section 120.

The key scheduling section 110 outputs the round keys which are applied to rounds of the encryption processing section 120 according to a predetermined key generation algorithm when the private key K is input. When the round keys are input from the key scheduling section 110, the encryption processing section 120 performs data conversion on the plaintext P and outputs the ciphertext C.

The encryption processing section 120 can also execute a decryption process of outputting the plaintext P when the ciphertext C is input. When the decryption process is executed, a process which is applied in reverse order to the order of the encryption process for the round keys supplied from the key scheduling section 110 is executed.

The encryption processing section 120 includes an exclusive-OR section 121 that executes an exclusive-OR operation of input data and the round key, a nonlinear conversion section 122 that executes the nonlinear conversion process on the input data, and a linear conversion section 123 that executes the linear conversion process on the input data.

As illustrated in the drawing, the encryption processing section 120 of the encryption processing device 100 according to the present disclosure has a configuration in which the exclusive-OR section 121, the nonlinear conversion section 122, and the linear conversion section 123 repeatedly execute three different data conversion processes.

Figure 20:
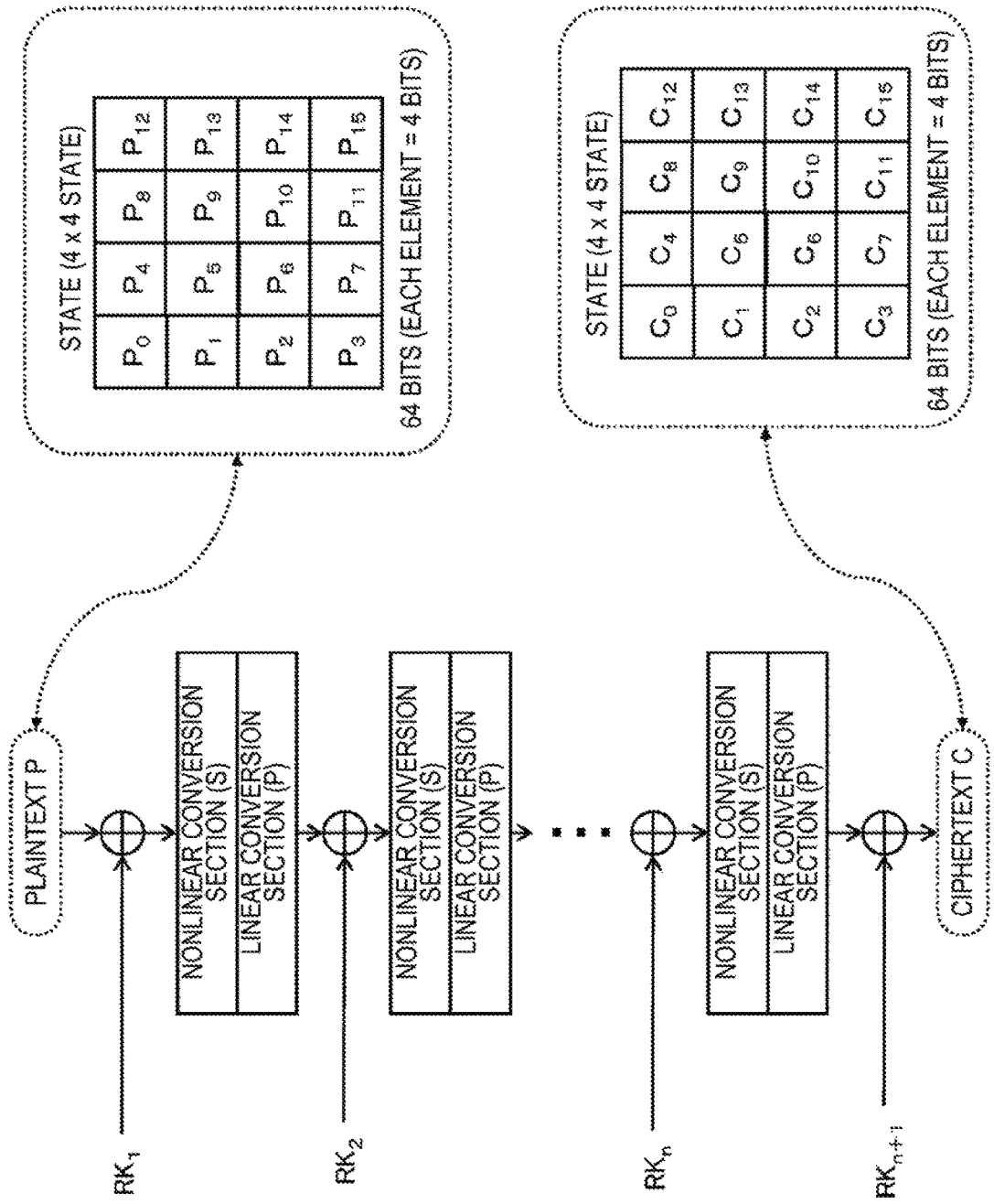
FIG. 20 is a diagram for describing an example of the configuration of an encryption processing device according to one embodiment of the present disclosure.

The plaintext P which is input data and the ciphertext C which is output data are the above-described state expression data, as illustrated in FIG. 20, and are 64-bit data that is formed by 16 elements of 4×4, each of which is 4-bit data.

Figure 21:
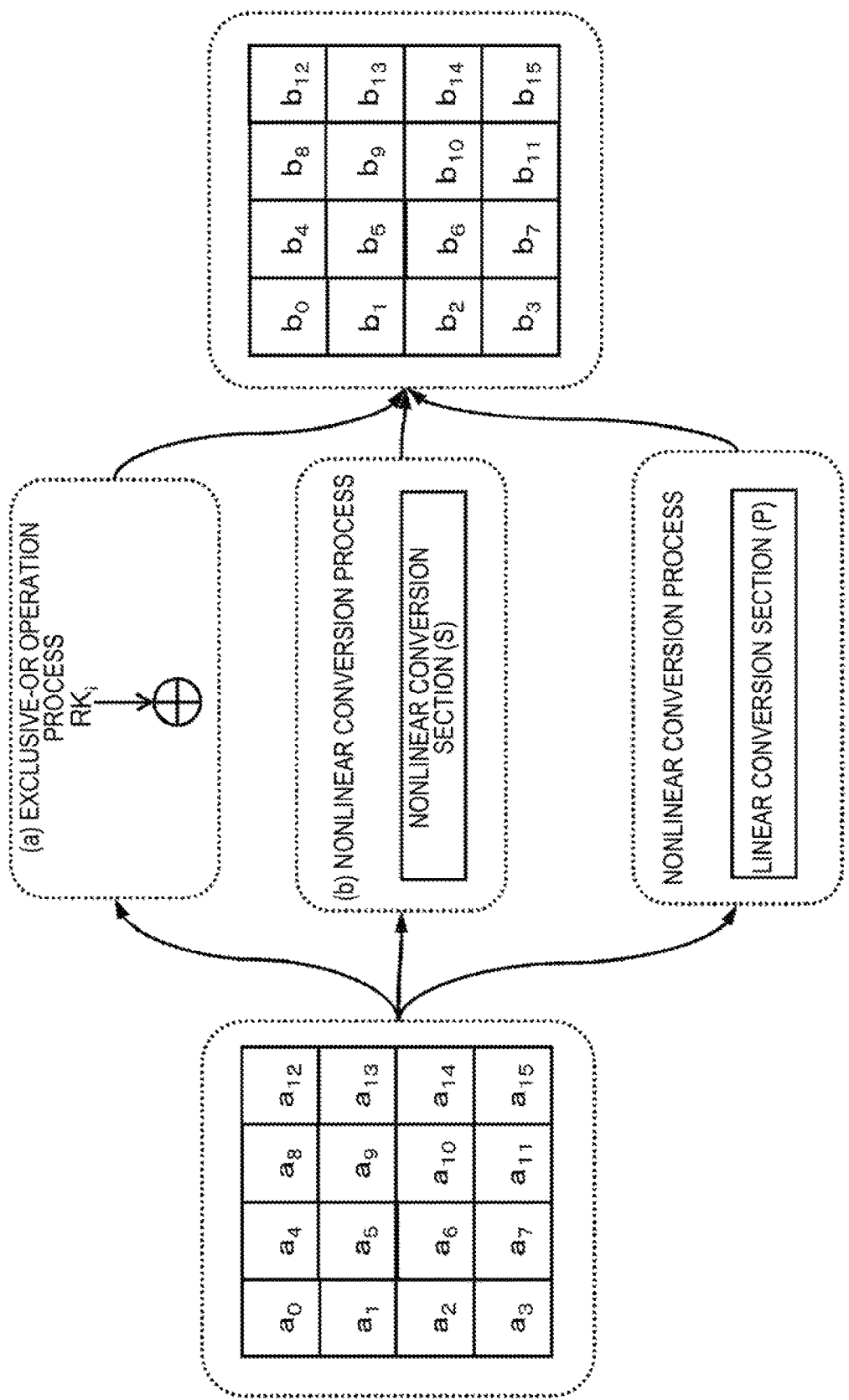
FIG. 21 is a diagram for describing an example of the data conversion process executed in the encryption processing section.

The round keys input from the key scheduling section 110 are also 64-bit data in which a state formed by 16 4-bit elements is expressed As illustrated in FIG. 21, the encryption processing section 120 repeatedly executes the following 3 kinds of data conversion processes:

(a) an exclusive-OR operation process;
(b) a nonlinear conversion process; and
(c) a linear conversion process.

The processes are executed as processes on the state. These processes on the state have been described with reference to FIGS. 13 and 14.

Figure 22:
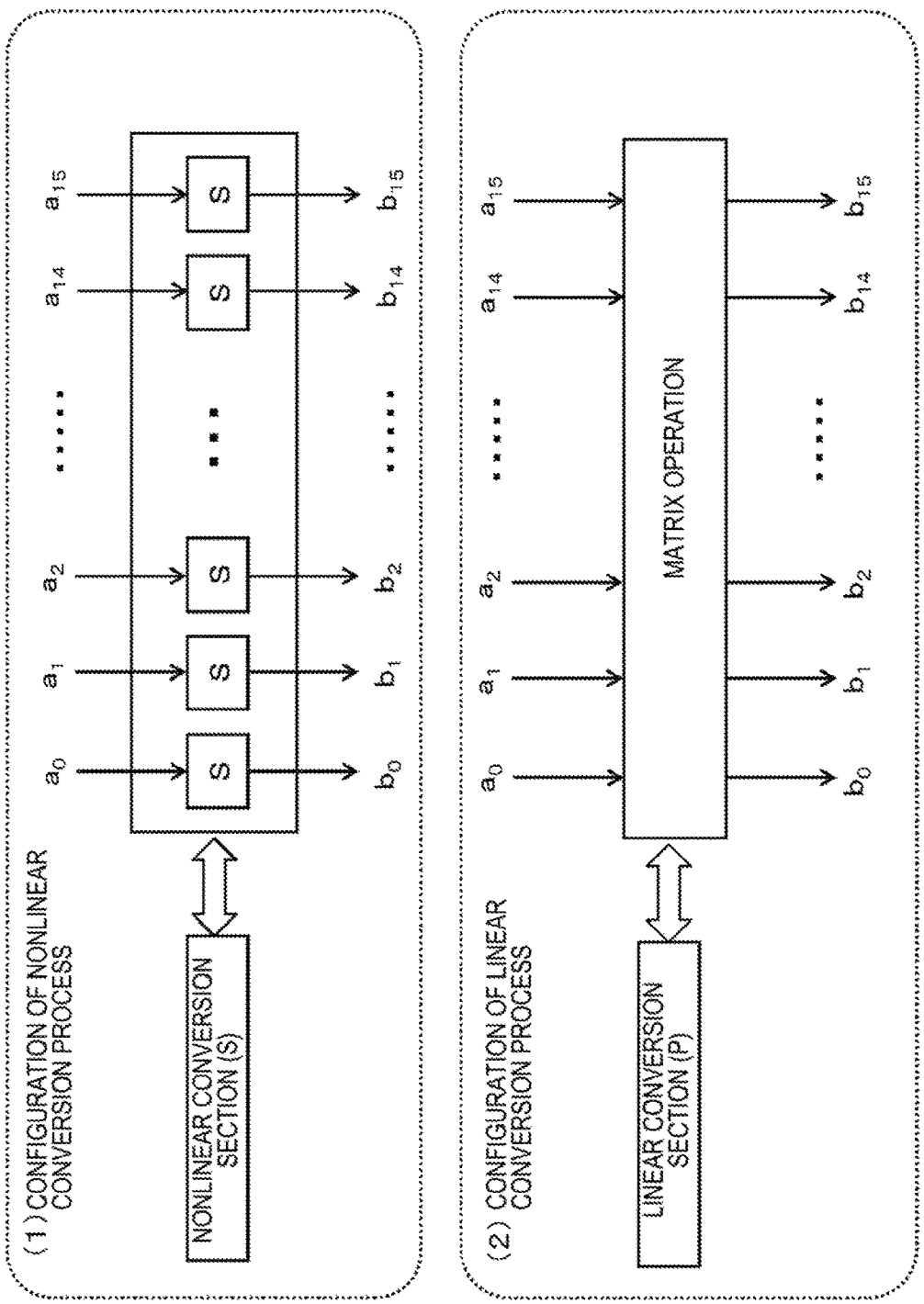
FIG. 22 is a diagram for describing processes and configurations of a nonlinear conversion section and a linear conversion section of the encryption processing section.

The nonlinear conversion process executed by the nonlinear conversion section of the encryption processing section 120 is executed using the plurality of S-boxes, for example, as illustrated in FIG. 22(1).

Each S-box is, for example, a nonlinear conversion section that has a 4-bit input and output configuration, and a nonlinear conversion process of 4×16=64 bits is executed through parallel processes of the 16 S-boxes.

The linear conversion process executed by the linear conversion section of the encryption processing section 120 is executed as a matrix operation process, for example, as illustrated in FIG. 22(2).

[4. Process and Configuration of Linear Conversion Sections of Encryption Processing Section]

As described with reference to FIG. 19, the encryption processing section 120 of the encryption processing device 100 according to the present disclosure has the configuration in which the exclusive-OR operation with the round key, the nonlinear conversion, and the linear conversion process are repeatedly executed by a plurality of rounds.

One of the characteristics of the encryption processing device according to the present disclosure is that the linear conversion process executed in each round is configured to be executed as a different process for each round.

Hereinafter, the linear conversion process executed by the encryption processing device according to the present disclosure will be described in detail.

Figure 23:
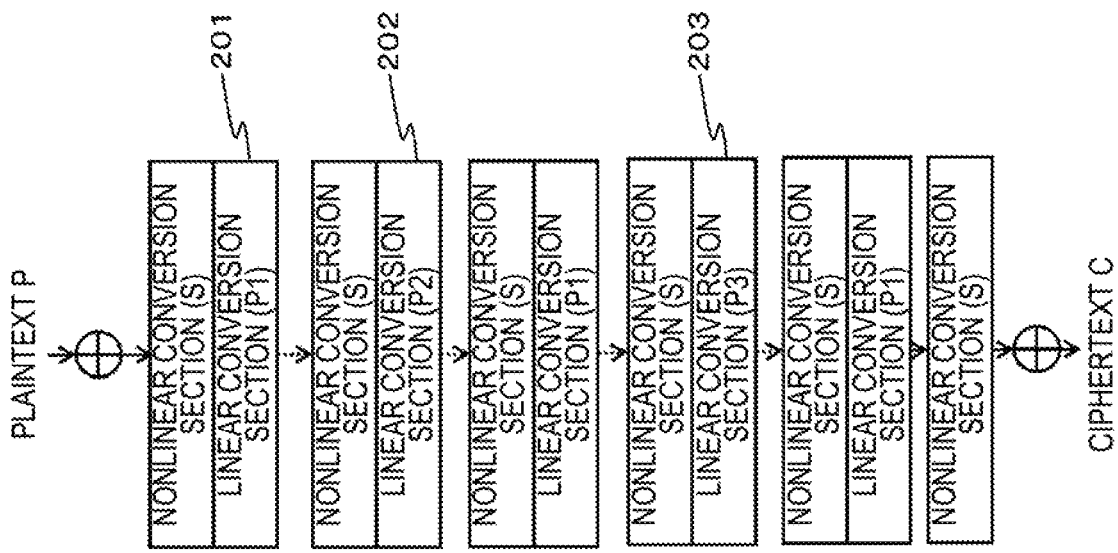
FIG. 23 is a diagram for describing a process and configuration of the linear conversion sections of the encryption processing section.

FIG. 23 is a diagram for describing an example of the configuration of different linear conversion sections included in the encryption processing section of the encryption processing device according to the present disclosure.

The configuration diagram of FIG. 23 is a diagram illustrating a configuration in which the exclusive-OR section is omitted.

In the example illustrated in FIG. 23, linear conversion sections executing three different linear conversion processes are included in the configuration.

That is, the following 3 different linear conversion sections are included:

a linear conversion section P1, 201;
a linear conversion section P2, 202; and
a linear conversion section P3, 203.

In this configuration, any of 3 kinds of different linear conversion processes is executed in each round. In consecutive rounds, the same linear changing process does not continue, but different linear conversion processes are set to be executed.

In the example illustrated in FIG. 23, the linear conversion process is executed in order from the input side of the plaintext P five times in the following order:

the linear conversion section P1;
the linear conversion section P2;
the linear conversion section P1;
the linear conversion section P3; and
the linear conversion section P1.

In the five linear conversion processes, the same linear changing process does not continue in consecutive rounds, but the different conversion processes are executed according to switching of the rounds.

In the foregoing example, the same linear conversion is set not to be executed in consecutive rounds by combining and executing the 3 kinds of different linear conversions P1, P2, and P3.

In this way, in the encryption process, the minimum number of differential active S-boxes and the minimum number of linear active S-boxes can be increased by changing a linear conversion form according to round transition. Thus, it is possible to improve the resistance to the differential attack or the linear attack.

Specific processes of the 3 kinds of linear conversion processes will be described with reference to FIG. 24 and the subsequent drawings.

In the linear conversion processes P1 to P3, four different matrixes $M_0$ to $M_3$ illustrated in FIG. 24(1) are combined to be used. That is, the following 4×4 matrixes $M_0$ to $M_3$ are configured to be combined.

$$M_0 = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \quad M_1 = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \quad \text{[Math. 5]}$$

$$M_2 = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \quad M_3 = \begin{pmatrix} 1 & 0 & 1 & 1 \\ 0 & 1 & 1 & 1 \\ 1 & 1 & 1 & 0 \\ 1 & 1 & 0 & 1 \end{pmatrix}$$

In the linear conversion processes P1 to P3, the foregoing four different matrixes $M_0$ to $M_3$ are combined to be used.

The foregoing four matrixes are not the above-described maximum distance separable (MDS) matrixes, but non-MDS matrixes.

In the embodiment to be described below, an example of linear conversion processes using the non-MDS matrixes will be described. However, the MDS matrixes may be configured to be applied.

FIG. 24(2) is a diagram for describing a form of a specific matrix operation of the linear conversion processes P1 to P3.

Here, 4×4 rectangles illustrated in FIG. 24(2) represent states that are each formed by 16 4-bit elements which are targets to be subjected to the linear conversion process. That is, the states are 64-bit 4×4 states.

A matrix operation of combining and using the matrixes $M_0$ to $M_3$ is executed on input data of the 4×4 states.

In the linear conversion process P1, a matrix operation in which one matrix $M_0$ is applied to elements of each column of the input data of the 4×4 states in a column unit is executed.

This operation is the column diffusion operation (Mix-Colum) described above with reference to FIGS. 15 and 16.

That is, the linear conversion process P1 is the column diffusion operation (MC) expressed by the following formula:

$$MC[M_0].$$

MC [$M_0$] is a formula that expresses a matrix operation in which the same matrix $M_0$ is applied to each column of the state and has the same meaning as the following formula individually indicating a matrix which is applied to each column of the state:

$$MC[M_0, M_0, M_0, M_0].$$

Next, the linear conversion process P2 will be described.

As illustrated in FIG. 24(2), the linear conversion process P2 executes a matrix operation in which different matrixes are applied on elements of each row of the input data of the 4×4 states in each row unit. In the linear conversion process P2, a matrix operation in which the following matrixes are applied is executed on the high-order first row to the fourth row:

the first row: application matrix $M_0$;
the second row: application matrix $M_1$;
the third row: application matrix $M_2$; and
the fourth row: application matrix $M_3$.

This operation is the row diffusion operation (MixRow) described above with reference to FIGS. 17 and 18.

That is, the linear conversion process P2 is the row diffusion operation (MixRow) expressed by the following formula:

$$MR[M_0, M_1, M_2, M_3].$$

Next, the linear conversion process P3 will be described.

In the linear conversion process P3, as illustrated in FIG. 24(2), a matrix operation in which different matrixes are applied is executed on elements of each row of the input data of the 4×4 states in each row unit like the linear conversion process P2. In the linear conversion process P3, a matrix operation in which the following matrixes are applied is executed on the high-order first row to the fourth row, unlike the linear conversion process P2:

the first row: application matrix $M_2$;
the second row: application matrix $M_0$;
the third row: application matrix $M_1$; and
the fourth row: application matrix $M_3$.

This operation is the row diffusion operation (MixRow) described above with reference to FIGS. 17 and 18.

That is, the linear conversion process P3 is the row diffusion operation (MixRow) expressed by the following formula:

$$MR[M_2, M_0, M_1, M_3].$$

To distinguish the linear conversion processes P2 and P3 from each other, the linear conversion process P2 is referred to as row diffusion operation type 1 (MixRow1) and the linear conversion process P3 is referred to as row diffusion operation type 2 (MixRow2) below.

The linear conversion process P1 is the column diffusion operation (MixColumn).

Calculation process examples of specific matrix operations of the three linear conversion processes P1 to P3 will be described with reference to FIG. 25 and the subsequent drawings.

Figure 25:
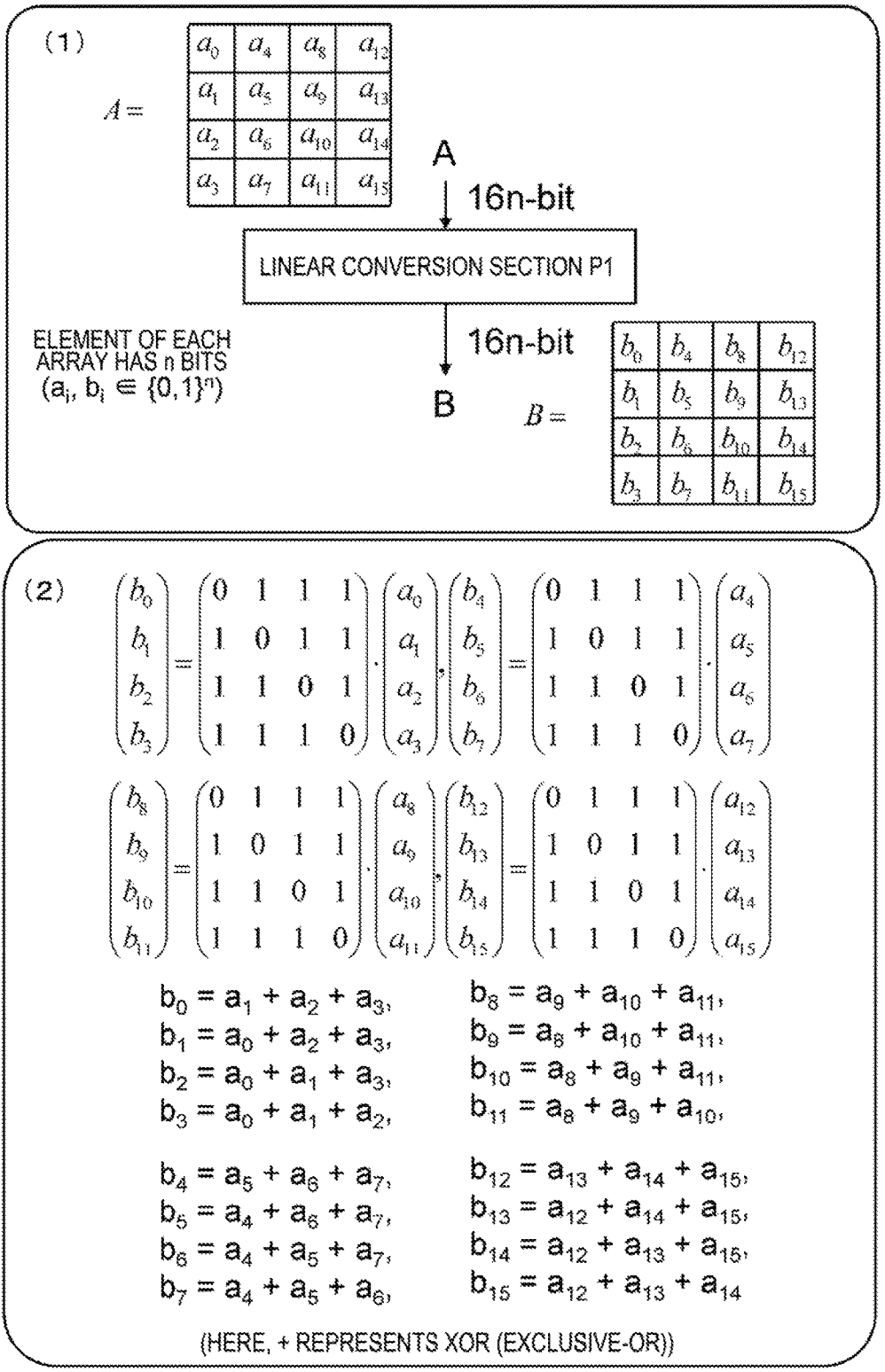
FIG. 25 is a diagram for describing a column diffusion operation executed by a linear conversion section P1.

FIG. 25 is a diagram for describing an example of the linear conversion process P1, that is, a specific calculation process example of the column diffusion operation (Mix-Column).

FIG. 25(1) illustrates examples of input data and output data of the linear conversion section P1.

An input A is a state that is formed by 16 elements $a_0$ to $a_{15}$ of n-bit data.

An output B is a state that is formed by 16 elements $b_0$ to $b_{15}$ of n-bit data.

The elements $a_i$ and $b_i$ (where i=0 to 15) of the input data and the output data are n-bit data configured to have either 0 or 1.

In the embodiment, n=4 is set, each element is 4-bit data, and the input A and the output B have 64 bits.

FIG. 25(2) illustrates the linear conversion process P1, that is, a specific calculation process example of the column diffusion operation (MixColumn).

The column diffusion operation (MixColumn) executed as the linear conversion process P1 is a matrix operation according to the following formula.

$$\begin{pmatrix} b_0 \\ b_1 \\ b_2 \\ b_3 \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_0 \\ a_1 \\ a_2 \\ a_3 \end{pmatrix}, \quad [\text{Math. 6}]$$

$$\begin{pmatrix} b_4 \\ b_5 \\ b_6 \\ b_7 \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_4 \\ a_5 \\ a_6 \\ a_7 \end{pmatrix},$$

$$\begin{pmatrix} b_8 \\ b_9 \\ b_{10} \\ b_{11} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_8 \\ a_9 \\ a_{10} \\ a_{11} \end{pmatrix},$$

$$\begin{pmatrix} b_{12} \\ b_{13} \\ b_{14} \\ b_{15} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_{12} \\ a_{13} \\ a_{14} \\ a_{15} \end{pmatrix}$$

The 16 elements $b_0$ to $b_{15}$ of the output B are calculated through the following operations based on the matrix $M_0$ and the 16 elements $a_0$ to $a_{15}$ of the input A:

$b_0 = a_1(+)a_2(+)a_3;$ $b_1 = a_0(+)a_2(+)a_3;$ $b_2 = a_0(+)a_1(+)a_3;$ $b_3 = a_0(+)a_1(+)a_2;$ $b_4 = a_5(+)a_6(+)a_7;$ $b_5 = a_4(+)a_6(+)a_7;$ $b_6 = a_4(+)a_5(+)a_7;$ $b_7 = a_4(+)a_5(+)a_6;$ $b_8 = a_9(+)a_{10}(+)a_{11};$ $b_9 = a_8(+)a_{10}(+)a_{11};$ $b_{10} = a_8(+)a_9(+)a_{11};$ $b_{11}=a_8(+)a_9(+)a_{10}$;

$b_{12}=a_{13}(+)a_{14}(+)a_{15}$;

$b_{13}=a_{12}(+)a_{14}(+)a_{15}$;

$b_{14}=a_{12}(+)a_{13}(+)a_{15}$; and $b_{15}=a_{12}(+)a_{13}(+)a_{14}$.

In the foregoing formula, an operator (+) means an exclusive-OR operation.

In the column diffusion operation (MixColumn) executed as the linear conversion process P1, the 16 elements $b_0$ to $b_{15}$ of the output B are calculated based on the matrix $M_0$ and the 16 elements $a_0$ to $a_{15}$ of the input A.

FIG. 26 is a diagram for describing an example of the linear conversion process P2, that is, a specific calculation process example of the row diffusion operation type 1 (MixRow1).

FIG. 26(1) illustrates examples of input data and output data of the linear conversion section P2.

An input A is a state that is formed by 16 elements $a_0$ to $a_{15}$ of n-bit data.

An output B is a state that is formed by 16 elements $b_0$ to $b_{15}$ of n-bit data.

The elements $a_i$ and $b_i$ (where i=0 to 15) of the input data and the output data are n-bit data configured to have either 0 or 1.

In the embodiment, n=4 is set, each element is 4-bit data, and the input A and the output B have 64 bits.

FIG. 26(2) illustrates the linear conversion process P2, that is, a specific calculation process example of the row diffusion operation type 1 (MixRow1).

The row diffusion operation type 1 (MixRow1) executed as the linear conversion process P2 is a matrix operation according to the following formula.

$$\begin{pmatrix} b_0 \\ b_4 \\ b_8 \\ b_{12} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_0 \\ a_4 \\ a_8 \\ a_{12} \end{pmatrix}, \begin{pmatrix} b_1 \\ b_5 \\ b_9 \\ b_{13} \end{pmatrix} = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \cdot \begin{pmatrix} a_1 \\ a_5 \\ a_9 \\ a_{13} \end{pmatrix}$$ [Math. 7]

$$\begin{pmatrix} b_2 \\ b_6 \\ b_{10} \\ b_{14} \end{pmatrix} = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \cdot \begin{pmatrix} a_2 \\ a_6 \\ a_{10} \\ a_{14} \end{pmatrix}, \begin{pmatrix} b_3 \\ b_7 \\ b_{11} \\ b_{15} \end{pmatrix} = \begin{pmatrix} 1 & 0 & 1 & 1 \\ 0 & 1 & 1 & 1 \\ 1 & 1 & 1 & 0 \\ 1 & 1 & 0 & 1 \end{pmatrix} \cdot \begin{pmatrix} a_3 \\ a_7 \\ a_{11} \\ a_{15} \end{pmatrix}$$

The 16 elements $b_0$ to $b_{15}$ of the output B are calculated through the following operations based on the matrixes $M_0$, $M_1$, $M_2$, and $M_3$ and the 16 elements $a_0$ to $a_{15}$ of the input A:

$b_0=a_4(+)a_8(+)a_{12}$;

$b_1=a_1(+)a_5(+)a_{13}$;

$b_2=a_2(+)a_6(+)a_{10}$;

$b_3=a_3(+)a_{11}(+)a_{15}$;

$b_4=a_0(+)a_8(+)a_{12}$;

$b_5=a_1(+)a_5(+)a_9$;

$b_6=a_2(+)a_6(+)a_{14}$;

$b_7=a_7(+)a_{11}(+)a_{15}$;

$b_8=a_0(+)a_4(+)a_{12}$;

$b_9=a_5(+)a_9(+)a_{13}$;

$b_{10}=a_2(+)a_{10}(+)a_{14}$;

$b_{11}=a_3(+)a_7(+)a_{11}$;

$b_{12}=a_0(+)a_4(+)a_8$;

$b_{13}=a_1(+)a_9(+)a_{13}$;

$b_{14}=a_6(+)a_{10}(+)a_{14}$; and $b_{15}=a_3(+)a_7(+)a_{15}$.

In the foregoing formula, an operator (+) means an exclusive-OR operation.

In the row diffusion operation type 1 (MixRow1) executed as the linear conversion process P2, the 16 elements $b_0$ to $b_{15}$ of the output B are calculated based on the matrixes $M_0$, $M_1$, $M_2$, and $M_3$ and the 16 elements $a_0$ to $a_{15}$ of the input A.

FIG. 27 is a diagram for describing an example of the linear conversion process P3, that is, a specific calculation process example of the row diffusion operation type 2 (MixRow2).

FIG. 27(1) illustrates examples of input data and output data of the linear conversion section P2.

An input A is a state that is formed by 16 elements $a_0$ to $a_{15}$ of n-bit data.

An output B is a state that is formed by 16 elements $b_0$ to $b_{15}$ of n-bit data.

The elements $a_i$ and $b_i$ (where i=0 to 15) of the input data and the output data are n-bit data configured to have either 0 or 1.

In the embodiment, n=4 is set, each element is 4-bit data, and the input A and the output B have 64 bits.

FIG. 27(2) illustrates the linear conversion process P2, that is, a specific calculation process example of the row diffusion operation type 2 (MixRow2).

The row diffusion operation type 2 (MixRow2) executed as the linear conversion process P3 is a matrix operation according to the following formula.

$$\begin{pmatrix} b_0 \\ b_4 \\ b_8 \\ b_{12} \end{pmatrix} = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \cdot \begin{pmatrix} a_0 \\ a_4 \\ a_8 \\ a_{12} \end{pmatrix}, \begin{pmatrix} b_1 \\ b_5 \\ b_9 \\ b_{13} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_1 \\ a_5 \\ a_9 \\ a_{13} \end{pmatrix}$$ [Math. 8]

$$\begin{pmatrix} b_2 \\ b_6 \\ b_{10} \\ b_{14} \end{pmatrix} = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \cdot \begin{pmatrix} a_2 \\ a_6 \\ a_{10} \\ a_{14} \end{pmatrix}, \begin{pmatrix} b_3 \\ b_7 \\ b_{11} \\ b_{15} \end{pmatrix} = \begin{pmatrix} 1 & 0 & 1 & 1 \\ 0 & 1 & 1 & 1 \\ 1 & 1 & 1 & 0 \\ 1 & 1 & 0 & 1 \end{pmatrix} \cdot \begin{pmatrix} a_3 \\ a_7 \\ a_{11} \\ a_{15} \end{pmatrix}$$

The 16 elements $b_0$ to $b_{15}$ of the output B are calculated through the following operations based on the matrixes $M_0$, $M_1$, $M_2$, and $M_3$ and the 16 elements $a_0$ to $a_{15}$ of the input A:

$b_0=a_0(+)a_4(+)a_8$;

$b_1=a_5(+)a_9(+)a_{13}$;

$b_2=a_2(+)a_6(+)a_{14}$;

$b_3=a_3(+)a_{11}(+)a_{15}$;

$b_4 = a_0(+)a_4(+)a_{12}$;

$b_5 = a_1(+)a_9(+)a_{13}$;

$b_6 = a_2(+)a_6(+)a_{10}$;

$b_7 = a_7(+)a_{11}(+)a_{15}$;

$b_8 = a_0(+)a_8(+)a_{12}$;

$b_9 = a_1(+)a_5(+)a_{13}$;

$b_{10} = a_6(+)a_{10}(+)a_{14}$;

$b_{11} = a_3(+)a_7(+)a_{11}$;

$b_{12} = a_4(+)a_8(+)a_{12}$;

$b_{13} = a_1(+)a_5(+)a_9$;

$b_{14} = a_2(+)a_{10}(+)a_{14}$; and $b_{15} = a_3(+)a_7(+)a_{15}$.

In the foregoing formula, an operator (+) means an exclusive-OR operation.

In the row diffusion operation type 2 (MixRow2) executed as the linear conversion process P3, the 16 elements $b_0$ to $b_{15}$ of the output B are calculated based on the matrixes $M_0$, $M_1$, $M_2$, and $M_3$ and the 16 elements $a_0$ to $a_{15}$ of the input A.

In this way, the minimum number of differential active S-boxes and the minimum number of linear active S-boxes can be increased by changing the plurality of linear conversion processes in a one-time encryption processing sequence for each round. Thus, it is possible to improve the resistance to the differential attack or the linear attack.

A verification result of the number of active S-boxes will be described.

The numbers of active S-boxes in the encryption processing device according to the present disclosure, that is, the encryption processing device executing the 3 kinds of different linear conversion processes P1 to P3, and an encryption processing device repeatedly executing a single kind of linear conversion process of the related art have been verified.

Figure 28:
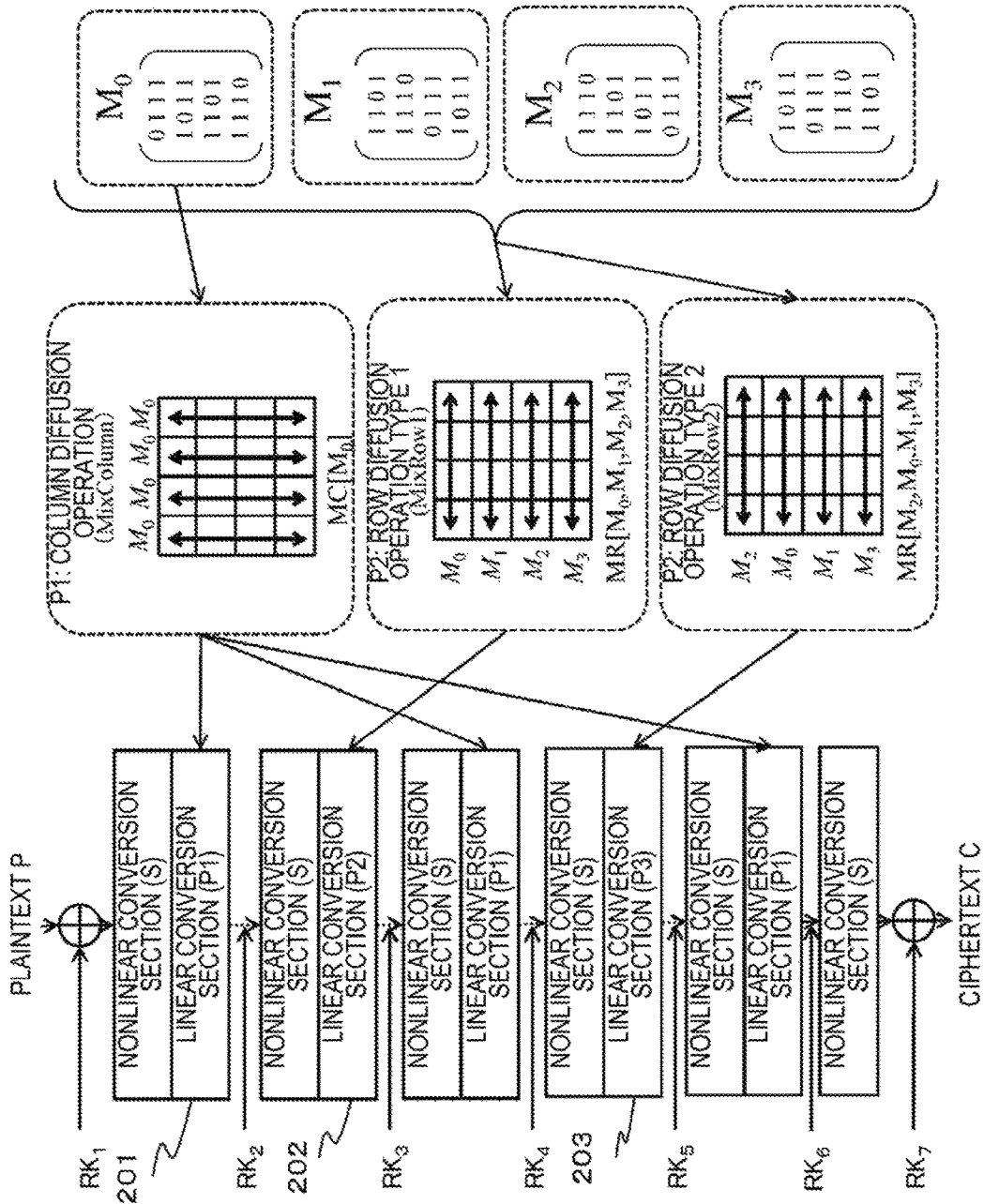
FIG. 28 is a diagram for describing processes and configurations of the linear conversion sections of the encryption processing section.

The encryption processing device according to the present disclosure has a configuration in which 3 kinds of linear conversion processes are used in the encryption processing sequence and the linear conversion processes are switched for each round, as illustrated in FIG. 28.

In the drawing illustrated in FIG. 28, the exclusive-OR operation section with the round key is omitted.

In the encryption processing device illustrated in FIG. 28, since the number of nonlinear conversion sections=6, 6 rounds are configured. There are various methods of defining the number of rounds. Here, the number of nonlinear conversion sections is used as the number of rounds.

In the example illustrated in FIG. 28, 7 round keys, round keys $RK_1$ to $RK_7$, are applied. Since the nonlinear conversion sections are in 6 layers, the encryption processing device of 6 rounds is assumed.

As illustrated in FIG. 28, 3 different linear conversion processes are executed at least once in the course of the encryption process.

The linear conversion process P1 is the column diffusion operation (MixColumn) in which the matrix $M_0$ is applied.

The linear conversion process P2 is the row diffusion operation type 1 (MixRow1) in which the matrixes $M_0$, $M_1$, $M_2$, and $M_3$ are applied.

The linear conversion process P3 is the row diffusion operation type 2 (MixRow2) in which the matrixes $M_0$, $M_1$, $M_2$, and $M_3$ are applied.

Figure 29:
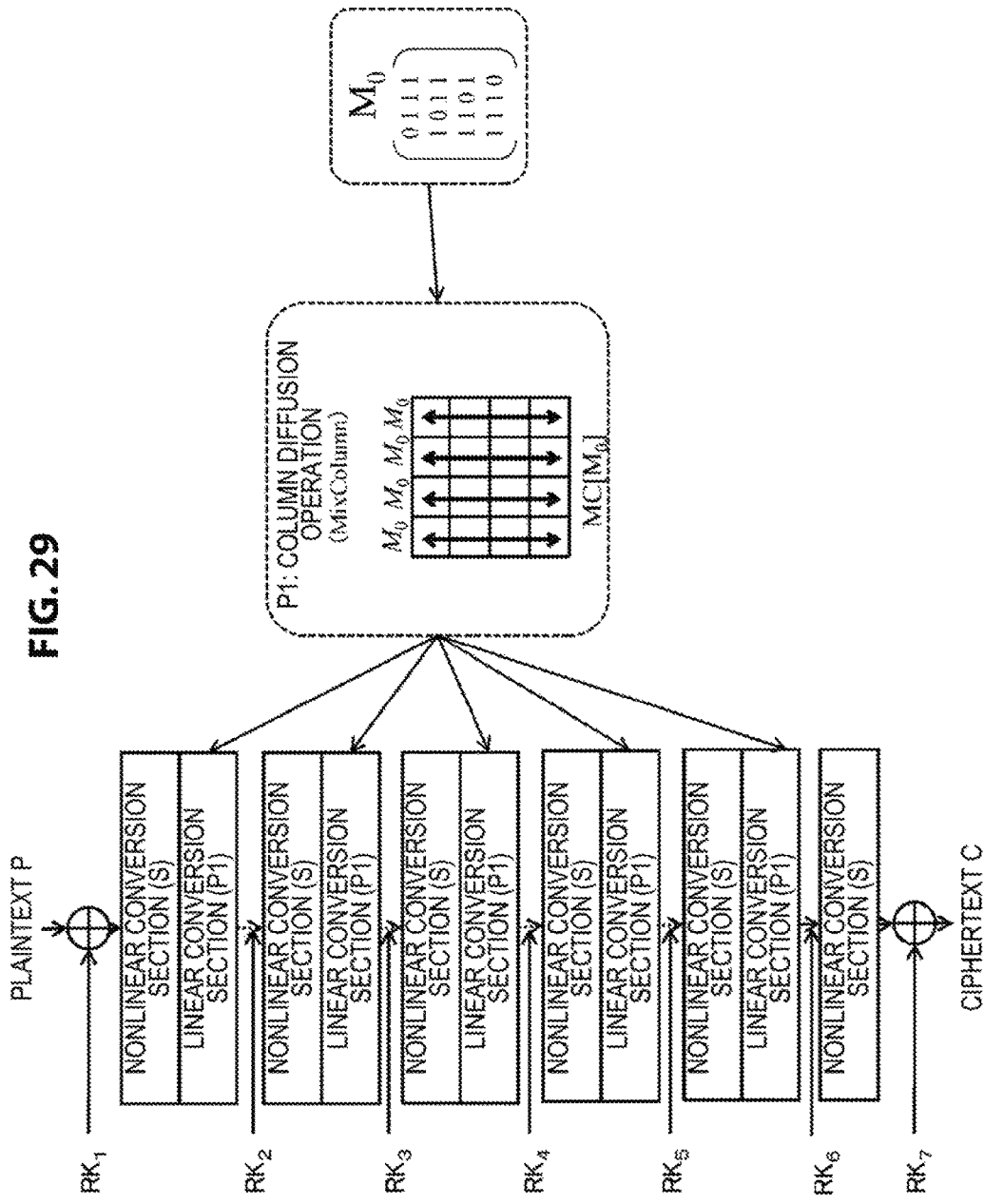
FIG. 29 is a diagram for describing a configuration when the linear conversion sections of the encryption processing section execute the same linear conversion process.

In comparison to the encryption processing device illustrated in FIG. 28, an example of an encryption processing device executing a single kind of linear conversion process of the related art is illustrated in FIG. 29.

The encryption processing device illustrated in FIG. 29 has a configuration in which 6 rounds are configured, but the linear conversion process of each round is the same linear conversion process.

In all of the linear conversion processing sections of the encryption processing device in FIG. 29, the linear conversion process P1 using only the matrix $M_0$ which is also used in the encryption processing device in FIG. 28, that is, the column diffusion operation using the matrix $M_0$, is set to be executed.

For the encryption processing device executing the plurality of different linear conversion processes illustrated in FIG. 28 and the device of the related art executing the single linear conversion process illustrated in FIG. 29, devices of the number of various rounds are configured, and the minimum number of differential active S-boxes and the minimum number of linear active S-boxes have been verified.

The configurations of FIGS. 28 and 29 are set such that the encryption process is executed on 64-bit input plaintext P and 64-bit ciphertext C is output.

The S-boxes are set in the nonlinear conversion sections. As described above with reference to FIG. 22, each S-box has a configuration in which the nonlinear conversion of a 4-bit input and output is executed.

In each nonlinear conversion section of the encryption processing devices in FIGS. 28 and 29, 16 4-bit input and output S-boxes are provided and execute the nonlinear conversion on data of 4×16=64 bits.

In the encryption processing devices of the 6-round type illustrated in FIGS. 28 and 29, 6 nonlinear conversion sections are set, and thus the total number of S-boxes is 16×6=96.

Of the total 96 S-boxes, the number of active S-boxes in all the input patterns has been counted, and the minimum number of differential active S-boxes and the minimum number of linear active S-boxes have been verified.

Figure 31:
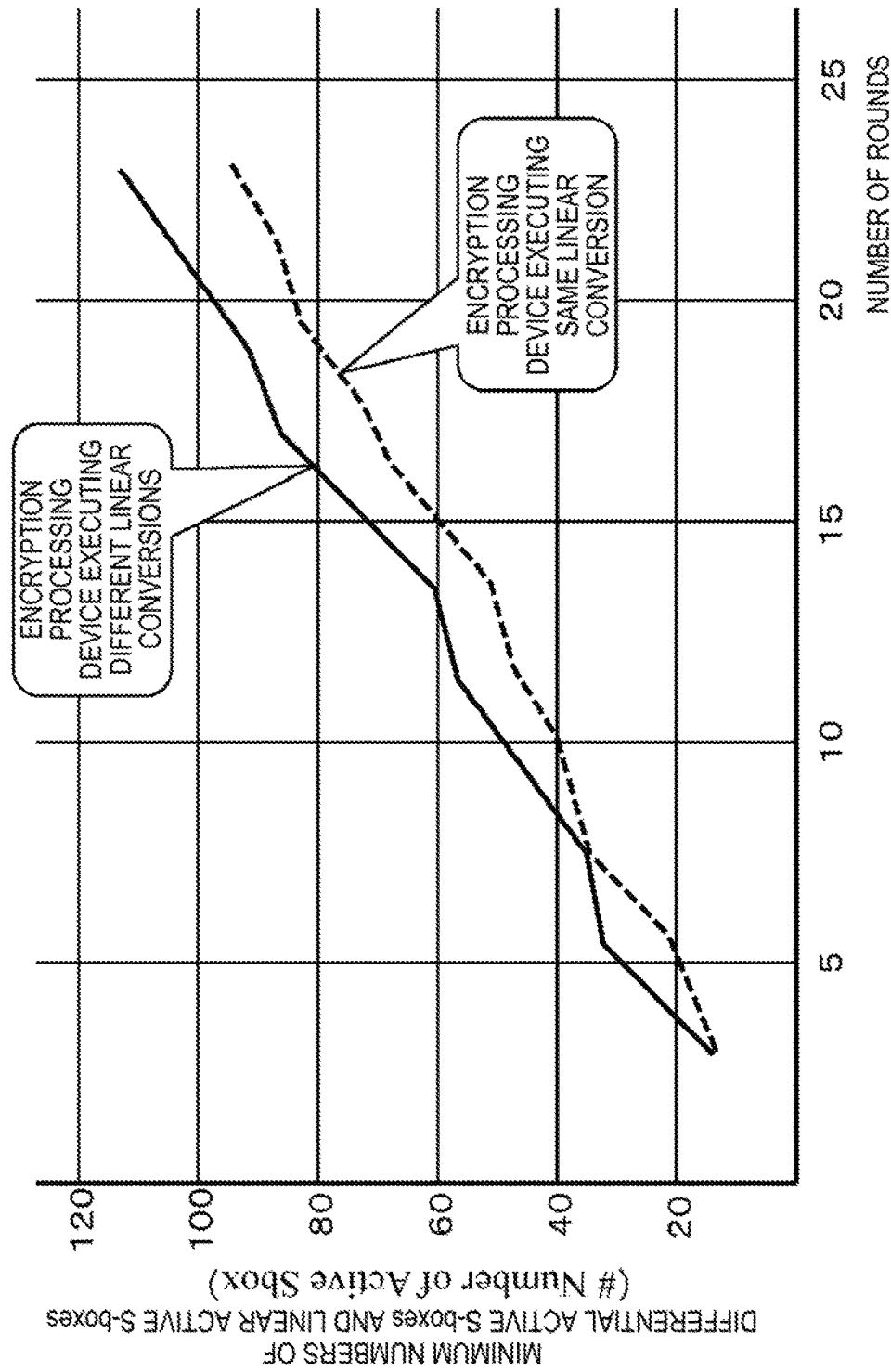
FIG. 31 is a diagram for describing compared data of the numbers of active S-boxes when the linear conversion sections of the encryption processing section have a configuration in which different linear conversion processes are executed and a configuration in which the same linear conversion process is executed.

The verification results are illustrated in FIGS. 30 and 31.

As illustrated in FIG. 30, the encryption processing devices of the different numbers of rounds, that is, 4 to 24 rounds, are configured, and results obtained by counting the minimum numbers of differential active S-boxes and linear active S-are illustrated.

In the number of rounds=4, in both the configuration in which the same linear conversion section of the related art is repeatedly executed and the configuration in which the different linear conversion processes are executed in the present disclosure, the number of active S-boxes is 4 and the same value is set. In all of the cases of the numbers of rounds, 6 to 24 (excluding 8), in any case, the number of active S-boxes is greater in the configuration in which the different linear conversion processes are executed in the present disclosure.

This result is shown as a graph illustrated in FIG. 31.

In the above-described embodiment, the configuration in which the input data is set as the state formed by 4×4 elements, each of which is the 4-bit element, and the linear conversion section executes the linear conversion process by a matrix operation using 4 kinds of matrixes $M_0$, $M_1$, $M_2$, and $M_3$ has been described. However, the foregoing process can be described as having a generalized configuration in the following setting.

When input data is a state formed by m×n elements, each of which is an element of 1 bit or more, the linear conversion section has a configuration in which one of the column diffusion operation of executing the linear conversion by applying a matrix in units of respective column elements of a state and the row diffusion operation of executing the linear conversion by applying a matrix in units of respective row elements of a state is executed in a round operation.

Here, the linear conversion section has a configuration in which the linear conversion process is executed through a matrix operation using a plurality of kinds of matrixes M0 to Mk (where k is an integer of 1 or more), and switches and executes the column diffusion operation of executing the linear conversion by applying a selected matrix selected from the matrixes M0 to Mk to each column in the units of respective column elements of the state in a specific sequence and the row diffusion operations of executing the linear conversion by applying a selected matrix selected from the matrixes M0 to Mk to each row in the units of respective row elements of the state in specific sequences according to round transition.

Examples of specific linear conversion processing configurations are as follows, for example;

(a) a column diffusion operation of executing the linear conversion by applying a selected matrix selected from the matrixes M0 to Mk to each column in the units of respective column elements of a state in a specific sequence;

(b) a row diffusion operation type 1 of executing the linear conversion by applying a selected matrix selected from the matrixes M0 to Mk to each row in the units of respective row elements of the state in a specific sequence A; and (c) a row diffusion operation type 2 of executing the linear conversion by applying a selected matrix selected from the matrixes M0 to Mk to each row in the units of respective row elements of the state in a sequence B different from the specific sequence A.

The encryption processing device switches and executes the foregoing operations according to round transition.

Further, the following configurations in which the column diffusion operation and the row diffusion operations in the foregoing configurations are permutated may also be used:

(a) a column diffusion operation of executing the linear conversion by applying a selected matrix selected from the matrixes M0 to Mk to each row in the units of respective row elements of a state in a specific sequence;

(b) a row diffusion operation type 1 of executing the linear conversion by applying a selected matrix selected from the matrixes M0 to Mk to each column in the units of respective column elements of the state in the specific sequence A; and (c) a row diffusion operation type 2 of executing the linear conversion by applying a selected matrix selected from the matrixes M0 to Mk in the units of respective column elements of the state in the sequence B different from the specific sequence A.

The encryption processing device switches and executes the foregoing operations according to round transition.

As realized configurations of the linear conversion process when input data is a state formed by 4×4 elements, each of which is a 4-bit element, the following configurations are possible:

the linear conversion section has a configuration in which the linear conversion process is executed by a matrix operation using 4 kinds of matrixes M0, M1, M2, and M3;

(a) a column diffusion operation of executing the linear conversion by applying the matrix M0 in the units of respective column elements of the state;

(b) a row diffusion operation type 1 of executing the linear conversion by applying each matrix in the order of the matrixes M0, M1, M2, and M3 in the units of respective row elements of the state; and (c) a row diffusion operation type 2 of executing the linear conversion by applying each matrix in the units of respective row elements of the state in a different order from the foregoing type 1.

The encryption processing device switches and executes the 3 kinds of matrix operations according to round transition.

A combination of matrixes which are applied in the units of respective row elements of a state in the row diffusion operation type 1 and matrixes which are applied in the units of respective row elements of the state in the row diffusion operation type 2 is set as a combination in which a total of 4 matrixes including two matrixes which are applied with the type 1 and two matrixes which are applied with the type 2 in regard to any two rows of the state are configured by at least 3 kinds of matrixes.

For example, when matrixes which are applied to each row among the first to fourth rows of a 4×4 state in the type 1 are M1, M3, M0, and M2, matrixes which are applied to each row of the first to fourth rows of a 4×4 state in the type 2 are set to M0, M2, M3, and M1.

In the foregoing setting, a combination in which a total of 4 matrixes including two matrixes which are applied in the type 1 and two matrixes which are applied in the type 2 to any two rows of the 4×4 state are configured by at least 3 kinds of matrixes is used.

That is, in the foregoing setting, the matrixes which are applied to the first row of the 4×4 state are as follows:

the type 1=M1; and
the type 2=M0.

The matrixes which are applied to the second row of the 4×4 state are as follows:

the type 1=M3;
the type 2=M2.

In the combination, the matrixes which are applied to the first and second rows in both of the types 1 and 2 are 4 kinds of M0 to M3.

In the foregoing setting, a combination of the any other two rows is a combination in which a total of 4 matrixes including two matrixes which are applied in the type 1 and two matrixes which are applied in the type 2 to any two rows of the 4×4 state are configured by at least 3 kinds of matrixes.

Further, the following configurations in which the column diffusion operation and the row diffusion operations in the foregoing configurations are permutated may also be used:

the linear conversion section has a configuration in which the linear conversion process is executed by a matrix operation using 4 kinds of matrixes M0, M1, M2, and M3;

(a) a row diffusion operation of executing the linear conversion by applying the matrix M0 in the units of respective row elements of a state;

(b) a column diffusion operation type 1 of executing the linear conversion by applying each matrix in the order of the matrixes M0, M1, M2, and M3 in the units of respective column units of the state; and (c) a column diffusion operation type 2 of executing the linear conversion by applying each matrix in a different order from the type 1 in the units of respective column elements of the state.

The encryption processing device switches and executes the 3 kinds of matrix operations according to round transition.

In this configuration, a combination of matrixes which are applied in the units of respective column elements of a state in the row diffusion operation type 1 and matrixes which are applied in the units of respective column elements of the state in the row diffusion operation type 2 is set as a combination in which a total of 4 matrixes including two matrixes which are applied with the type 1 and two matrixes which are applied with the type 2 in regard to any two columns of the state are configured by at least 3 kinds of matrixes.

In this way, the minimum number of differential active S-boxes and the minimum number of linear active S-boxes can be increased by changing the linear conversion processes in a one-time encryption processing sequence for each round. Thus, it is possible to improve the resistance to the differential attack or the linear attack.

[5. Process and Configuration of Key Scheduling Section]

Next, a process and configuration of the key scheduling section in the encryption processing device according to the present disclosure will be described.

[5-1. Description of Process and Configuration of Key Scheduling Section]

As described above with reference to FIG. 19, the encryption processing device 100 according to the present disclosure includes the key scheduling section 110 and the encryption processing section 120.

For example, the key scheduling section 110 generates a round key which is applied to each round of the encryption processing section 120 based on a private key K according to a predetermined key generation algorithm and outputs the round key to the encryption processing section 120. When the round keys are input from the key scheduling section 110, the encryption processing section 120 performs data conversion on the plaintext P and outputs the ciphertext C.

The same processes are also executed at the time of the decryption process.

Hereinafter, a process and configuration of the key scheduling section 110 that executes a process of generating and supplying the round keys will be described.

Figure 32:
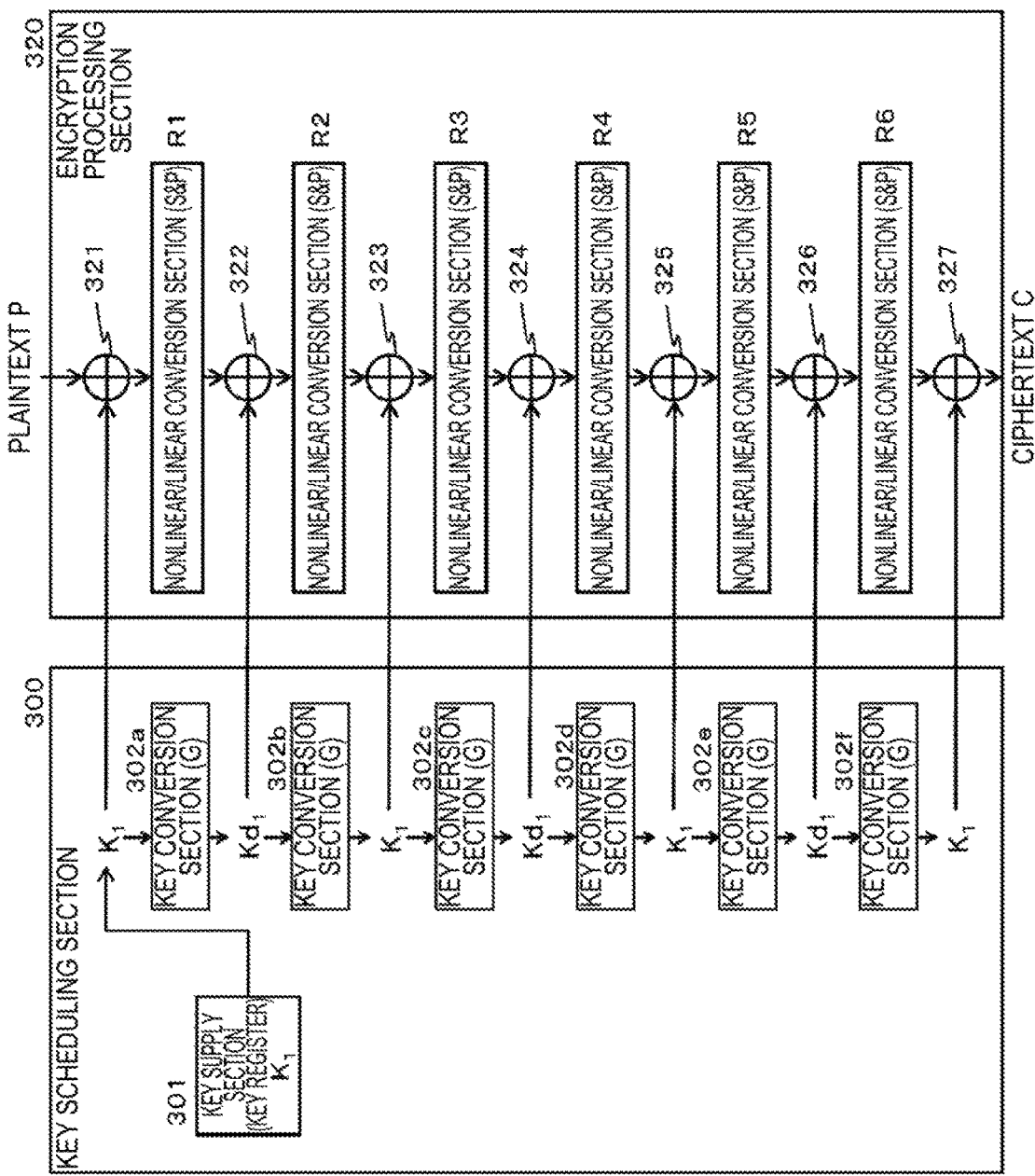
FIG. 32 is a diagram for describing a process and configuration of the key scheduling section.

FIG. 32 is a diagram illustrating one example of the configuration of the key scheduling section in the encryption processing device according to the present disclosure.

A key scheduling section 300 includes a key supply section (key register) 301 serving as a storage section that stores a private key $K_1$.

The key scheduling section 300 outputs the key $K_1$ to an exclusive-OR section (round key operation section) 321 of the first round in an encryption processing section 320. That is, the key $K_1$ is used as a round key of the first round.

Further, the key scheduling section 300 inputs the key $K_1$ to a key conversion section 302a. The key conversion section 302a executes a predetermination operation on the key $K_1$ to generate a converted key $Kd_1$.

Further, the converted key $Kd_1$ generated by the key conversion section 302a is output to an exclusive-OR section (round key operation section) 322 of the second round in the encryption processing section 320. That is, the converted key $Kd_1$ is used as a round key of the second round.

Further, the key scheduling section 300 inputs the converted key $Kd_1$ to a key conversion section 302b. The key conversion section 302b executes a predetermined operation on the converted key $Kd_1$ to generate the key $K_1$.

The key $K_1$ is the same as the key $K_1$ which is a generation source of the converted key $Kd_1$.

The key scheduling section 300 outputs the key $K_1$ generated by the key conversion section 302b to an exclusive-OR section (round key operation section) 323 of the third round in the encryption processing section 320. That is, the key $K_1$ is used as a round key of the third round.

The same processes are repeated hereinafter such that the key $K_1$ and the key $K_{1d}$ are alternately generated by key conversion sections 302c to 302f and the generated keys are output to exclusive-OR sections 324 to 327 of the encryption processing section.

All of the key conversion sections 302c to 302f execute the same operation. That is, through the same operation process, the converted key $Kd_1$ is generated from the key $K_1$ and the key $K_1$ is generated from the converted key $Kd_1$.

The keys are expressed by formulae using a conversion function G and an inverse function $G^{-1}$ as follows:

$$Kd_1 = G(K_1);\text{ and}$$

$$K_1 = G^{-1}(Kd_1).$$

Further, $G = G^{-1}$ is also satisfied.

Figure 33:
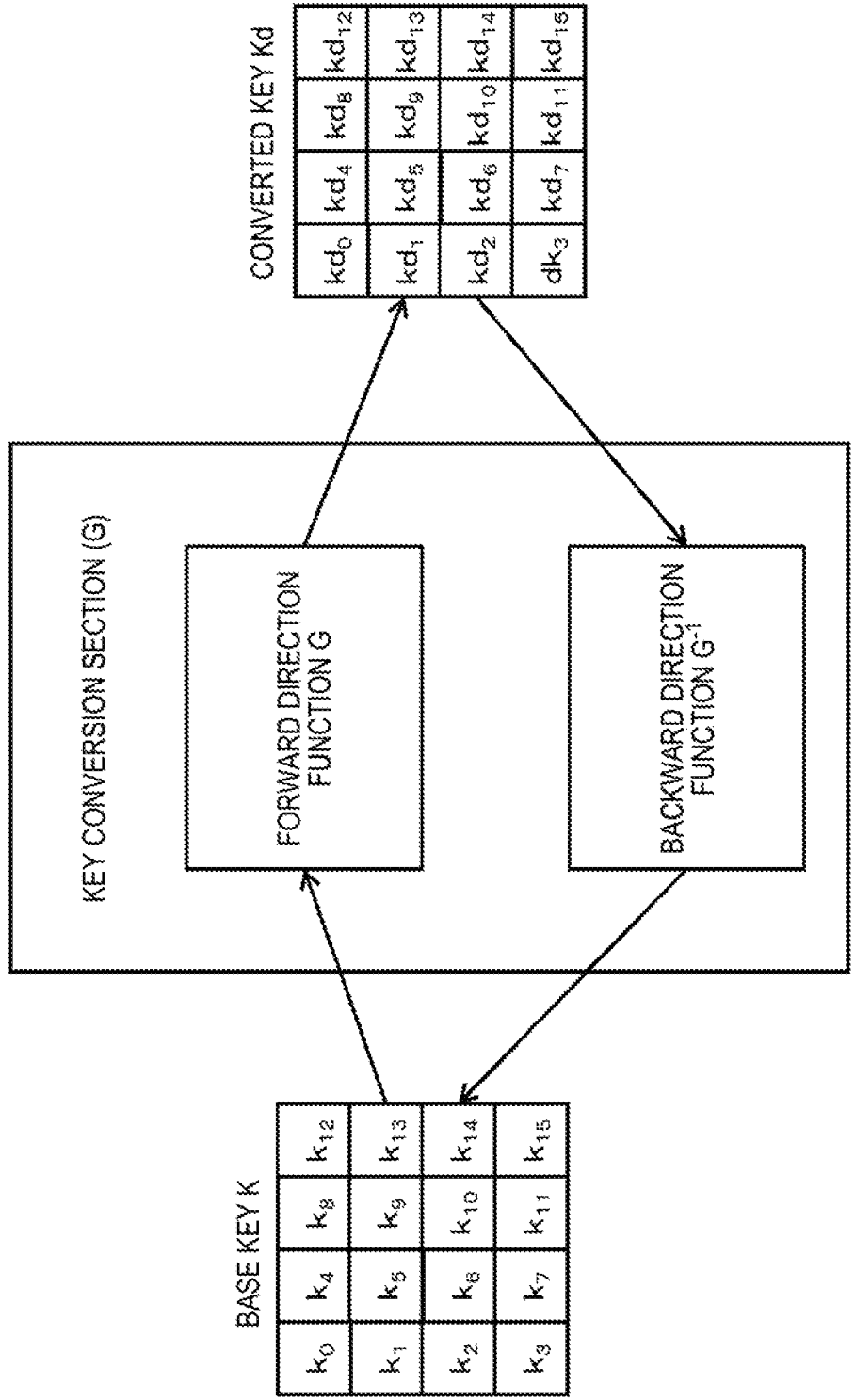
FIG. 33 is a diagram for describing a process and configuration of a key conversion section of the key scheduling section.

That is, the data conversion function G which is applied to the key conversion in the key conversion sections 302a to 302f has an involution property, that is, a nature in which the forward direction function G and the backward direction function $G^{-1}$ are the same function, as illustrated in FIG. 33.

In FIG. 33, the key $K_1$ described in FIG. 32 is illustrated as a base key K and the converted key $Kd_1$ is illustrated as a converted key Kd. The keys illustrated in FIG. 33 are expressed as a 4×4 state that has 16 4-bit elements. That is, key data of 64 bits in total is illustrated.

An example of a key conversion process executed by the key conversion section 302 will be described with reference to FIG. 34.

Figure 34:
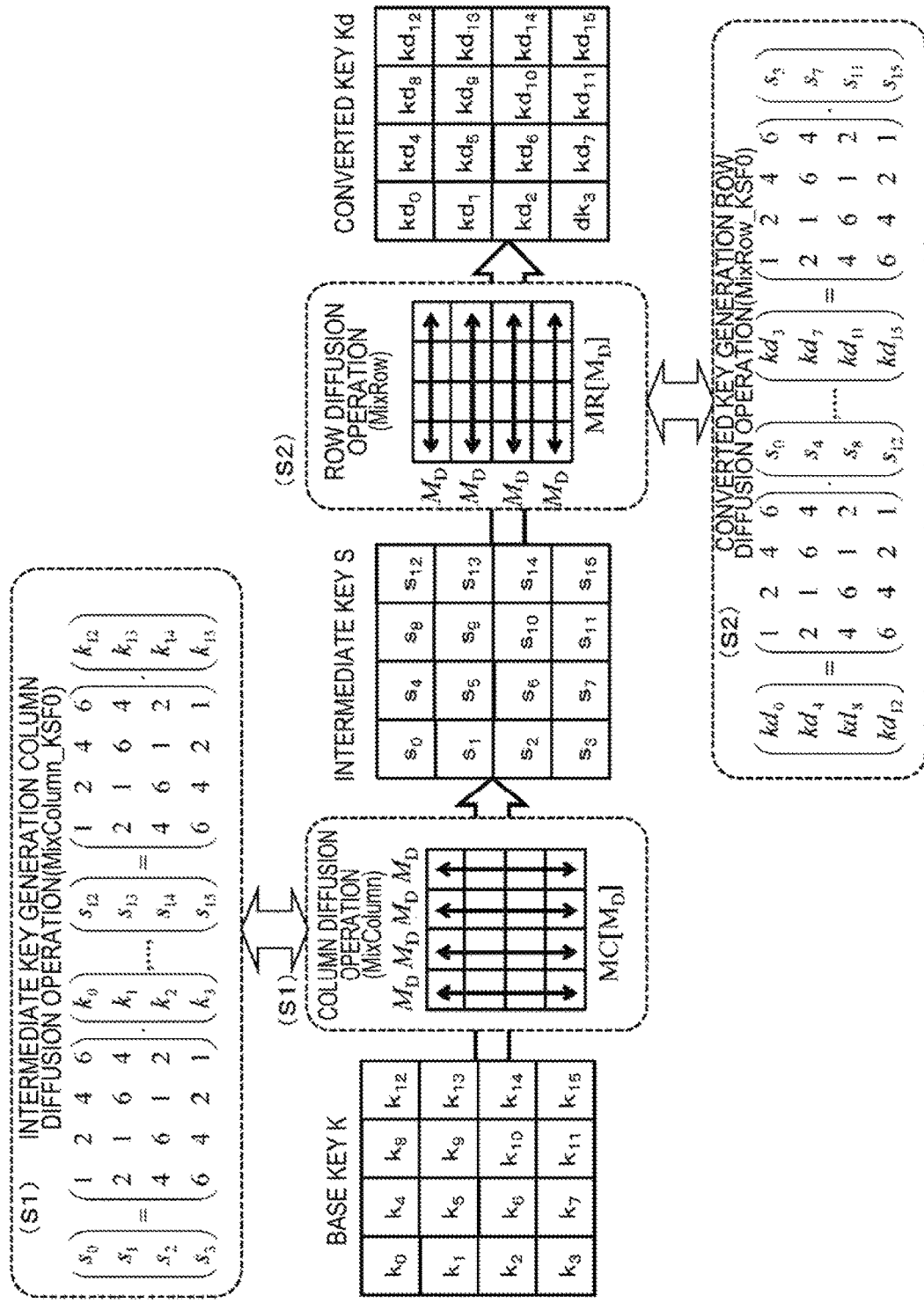
FIG. 34 is a diagram for describing a process and configuration of a key conversion section of the key scheduling section.

FIG. 34 is a diagram illustrating a process of generating the converted key Kd from the base key K.

The process of generating the converted key Kd from the base key K is configured to include the following two steps:

(S1) a step of generating an intermediate key S by executing an operation in which an intermediate key generation column diffusion operation (MixColumn_KSF( )) is applied on the base key K; and (S2) a step of generating the converted key Kd by executing an operation in which a converted key generation column diffusion operation (MixRow_KSF( )) is applied on the intermediate key S.

The column diffusion operation (MixColumn) executed in step S1 and the row diffusion calculation (MixRow) executed in step S2 are the same matrix application operations as those described above with reference to FIGS. 24 to 27.

Here, a matrix MD which is applied in this key conversion process is the following matrix.

$$M_D = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \quad \text{[Math. 9]}$$

The foregoing matrix MD is a matrix called a Hadamard MDS matrix.

An MDS matrix is a matrix in which any submatrix forming a matrix is a regular matrix. A regular matrix is a matrix which has an inverse matrix. When a matrix is A and an inverse matrix is $A^{-1}$, the following is satisfied:

$$AA^{-1}=A^{-1}A=E,$$

where E is a unit matrix.

The matrix A which has the inverse matrix $A^{-1}$ for which the foregoing formula is satisfied is a regular matrix.

As described above, mapping θ in which the number of branches Branch(θ) is b+1 is referred to as optimum diffusion conversion (optimum diffusion mappings). The MDS matrix is a matrix for executing optimum diffusion conversion.

The column diffusion operation of step S1 and the row diffusion operation of step S2 illustrated in FIG. 34 are executed by applying the Hadamard MDS matrix MD.

The column diffusion operation of step S1 is expressed by the following operation formula:

$$MC[M_D]=MC[M_D,M_D,M_D,M_D].$$

The row diffusion operation of step S2 is expressed by the following operation formula:

$$MR[M_D]=MR[M_D,M_D,M_D,M_D].$$

That is, in the column diffusion operation of step S1, a matrix operation in which the same Hadamard MDS matrix $M_D$ is applied to all of the four columns of 4×4 state expression data formed by 4-bit elements is executed.

In the row diffusion operation of step S2, a matrix operation in which the same Hadamard MDS matrix $M_D$ is applied to all of the four rows of 4×4 state expression data formed by 4-bit elements is executed.

An algorithm of the matrix operations in which the Hadamard MDS matrix MD is applied can be expressed as follows.

$$M_D(\ ):\{0,1\}^{16} \rightarrow \{0,1\}^{16}$$

Input: $\{x_0, x_1, x_2, x_3\}$, $x_i \in \{0,1\}^4$
Output: $\{y_0, y_1, y_2, y_3\}$, $y_i \in \{0,1\}^4$
Operation
· $y_0=x_0(+) 2 (\times) x_1 (+) 4 (\times) x_3 (+) 6 (\times) x_4$
· $y_1=2(\times) x_0(+) x_2 (+) 6 (\times) x_3 (+) 4 (\times) x_4$
· $y_2=4(\times) x_0 (+) 6 (\times) x_2 (+) x_3 (+) 2 (\times) x_4$
· $y_3=6(\times) x_0 (\times) 4 (\times) x_2 (+) 2 (\times) x_3 (+) x_4$ Here, (+) indicates an exclusive-OR operation and (×) indicates multiplication of an expansion $GF(2^4)$ defined by an irreducible polynomial $x^4+x+1$.

The column diffusion operation MC [$M_D$] of step S1 illustrated in FIG. 34 is a matrix operation according to the following formula.

[Math. 10]

$$\begin{pmatrix} s_0 \\ s_1 \\ s_2 \\ s_3 \end{pmatrix} = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \cdot \begin{pmatrix} k_0 \\ k_1 \\ k_2 \\ k_3 \end{pmatrix}, \ldots, \begin{pmatrix} s_{12} \\ s_{13} \\ s_{14} \\ s_{15} \end{pmatrix} = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \cdot \begin{pmatrix} k_{12} \\ k_{13} \\ k_{14} \\ k_{15} \end{pmatrix}$$

An algorithm of the foregoing column diffusion operation MC [$M_D$] can be expressed as follows.

$$MixColumn\_KSF(\ ): \{0,1\}^{64} \rightarrow \{0,1\}^{64}$$

Input: $\{k_0, k_1, \ldots, k_{15}\}$, $x_i \in \{0,1\}^4$
Output: $\{s_0, s_1, \ldots, s_{15}\}$, $s_i \in \{0,1\}^4$
Operation
$(s_0, s_1, s_2, s_3)=M_D(k_0, k_1, k_2, k_3)$
$(s_4, s_5, s_6, s_7)=M_D(k_4, k_5, k_6, k_7)$
$(s_8, s_9, s_{10}, s_{11})=M_D(k_8, k_9, k_{10}, k_{11})$
$(s_{12}, s_{13}, s_{14}, s_{15})=M_D(k_{12}, k_{13}, k_{14}, k_{15})$ The row diffusion operation MR [$M_D$] of step S2 illustrated in FIG. 34 is a matrix operation according to the following formula.

[Math. 11]

$$\begin{pmatrix} kd_0 \\ kd_4 \\ kd_8 \\ kd_{12} \end{pmatrix} = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \cdot \begin{pmatrix} s_0 \\ s_4 \\ s_8 \\ s_{12} \end{pmatrix}, \ldots,$$

$$\begin{pmatrix} kd_3 \\ kd_7 \\ kd_{11} \\ kd_{15} \end{pmatrix} = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \cdot \begin{pmatrix} s_3 \\ s_7 \\ s_{11} \\ s_{15} \end{pmatrix}$$

An algorithm of the foregoing row diffusion operation MR [MD] can be expressed as follows.

$$MixRow\_KSF(\ ):\{0,1\}^{64} \in \{0,1\}^{64}$$

Input: $\{s_0, s_1, \ldots s_{15}\}$, $s_i \in \{0,1\}^4$
Output: $\{kd_0, kd_1, \ldots, kd_{15}\}$, $kd_i \in \{0,1\}^4$
Operation
$(kd_0, kd_4, kd_8, kd_{12})=M_D (s_0, s_4, s_8, s_{12})$
$(kd_1, kd_5, kd_9, kd_{13})=M_D (s_1, s_5, s_9, s_{13})$
$(kd_2, kd_6, kd_{10}, kd_{14})=M_D (s_2, s_6, s_{10}, s_{14})$
$(kd_3, kd_7, kd_{11}, kd_{15})=M_D (s_3, s_7, s_{11}, s_{15})$ In this way, the key conversion section 302 of the key scheduling section 300 illustrated in FIG. 32 executes the column operation MC [$M_D$] in which the matrix $M_D$ is applied in step S1 illustrated in FIG. 34 and executes the row diffusion operation MR [$M_D$] in which the matrix $M_D$ is applied in step S2.

The converted key Kd is generated by the base key K by continuously executing the two matrix operations.

Even when the base key K is generated from the converted key Kd, the same process as the process illustrated in FIG. 34 is executed.

That is, as described above with reference to FIG. 33, the function G formed from the continuous processes of the column diffusion operation MC [$M_D$] and the row diffusion operation MR [$M_D$] has the involution property and the forward direction function G and the backward direction function $G^{-1}$ are the same. Therefore, by repeating the operation twice, the original value is calculated.

Further, the key conversion section 302 executes the column diffusion operation MC [$M_D$] in which the matrix $M_D$ is applied and the row diffusion operation MR [$M_D$] in which the matrix $M_D$ is applied, and thus all of the constituent elements of a 4×4 state which forms input data, that is, all of the 16 constituent elements, can affect all of the 16 constituent elements of output data.

That is, data diffusion is achieved among all of the elements of the input and output states. Such a data conversion form is defined as "full diffusion conversion" or diffusion with a full diffusion property.

For example, when each of an input and an output is a state formed by 16 n-bit elements and f is a conversion function which is applied to the input, an output state B is set to be calculated according to the following formula:

$$B=f(A).$$

The input state is $A=(a_0, a_1, a_2, \ldots a_{15})$.
The output state is $B=(b_0, b_1, b_2, \ldots b_{15})$.
Here, $a_i$ and $b_i$ are elements of the states A and B.

At this time, when any element $b_i$ of the output state B can be expressed by the following formula, the function f is assumed to be the full diffusion conversion:

$$b_i = f(a_0, a_1, a_2, \ldots a_{15}).$$

In this way, the execution function G of the key conversion section 302 is a function that has the following two natures:

(1) a full diffusion property in which the full diffusion conversion is realized; and (2) an involution property in which the forward direction function G and the backward direction function $G^{-1}$ are the same.

The key conversion section 302 has these two natures

[5-2. Effects Based on Full-Diffusion Property of Key Scheduling Section]

The full diffusion property which is the nature of the key conversion section 302 consequently ensures the full diffusion property even between conversion target data and a key in the encryption processing section 320 illustrated in FIG. 32. The description will be made with reference to FIG. 35.

Figure 35:
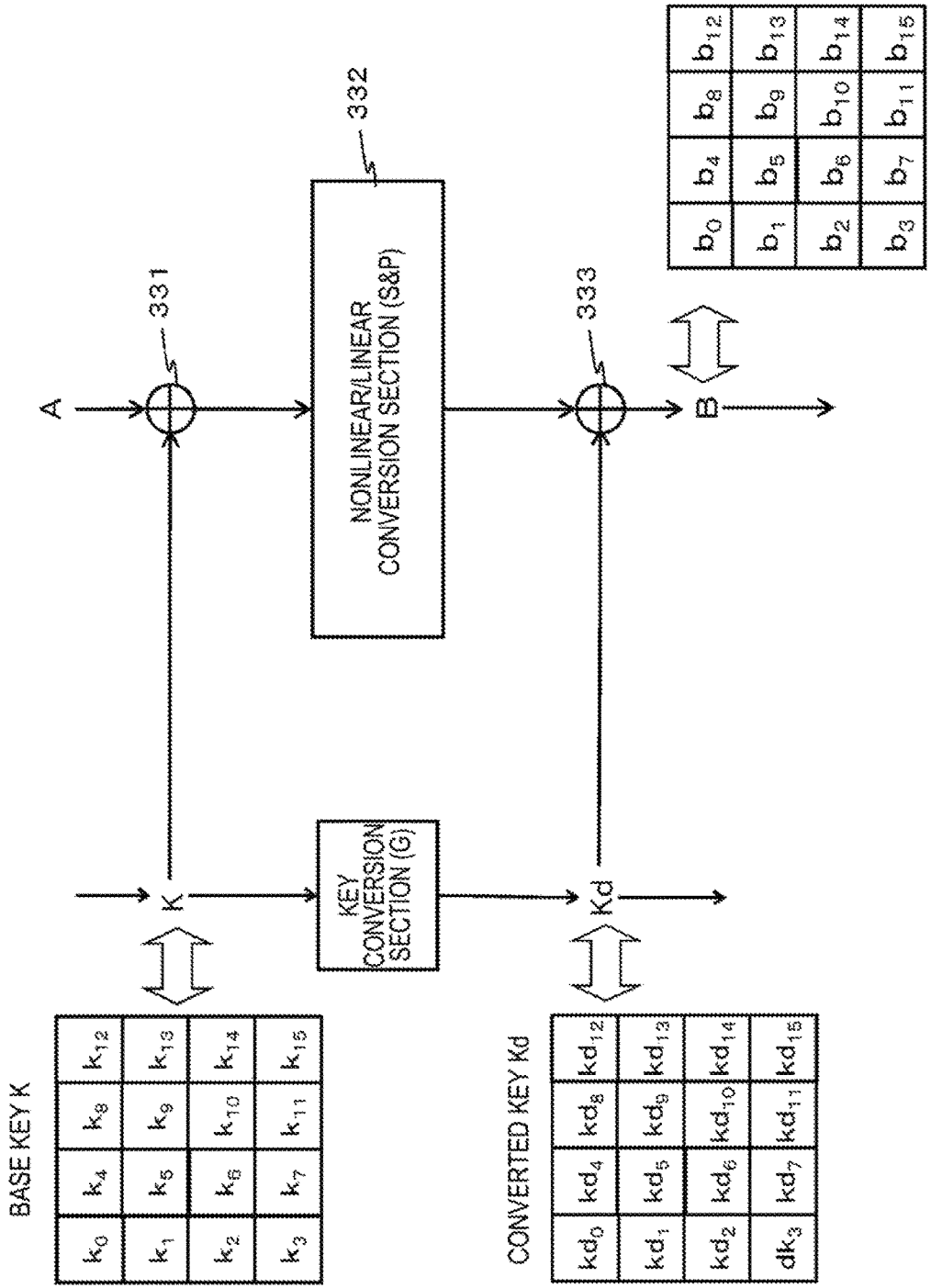
FIG. 35 is a diagram for describing a data diffusion process in the conversion process of the key conversion section of the key scheduling section.

FIG. 35 illustrates the base key $K=(k_0, k_1, k_2, \ldots k_{15})$ and the converted key $Kd=(kd_0, kd_1, kd_2, \ldots kd_{15})$.

The base key K is input to an exclusive-OR section 331 of the encryption processing section and is subjected to an exclusive-OR operation with the input state A. Thereafter, the nonlinear/linear conversion section (S&P) 332 executes the nonlinear conversion process and the linear conversion process.

Further, an exclusive-OR operation section 333 executes an exclusive-OR operation on the output with the converted key Kd.

The output of the exclusive-OR operation section 333 is assumed to be the state B.

At this time, in a relation between the base key K and the converted key Kd, the following relation formula is satisfied:

$$Kd_i = f(k_0, k_1, k_2, \ldots k_{15}),$$

where i=0 to 15.

That is, the full diffusion property is ensured.

From the foregoing relation formula, the following relation formula is also satisfied between the state B and the base key K:

$$b_i = f(k_0, k_1, k_2, \ldots k_{15}),$$

where i=0 to 15.

The relation formula is satisfied

That is, the full diffusion property is also ensured between the base key K and the converted data B.

This nature can be said to be a nature that contribution to security or mounting performance of the encryption processing device.

Specifically, an improvement in a data diffusion property by the key is realized. Thus, even when the number of rounds is reduced, it is possible to have high diffusion performance. As a result, it is possible to improve resistance to various attacks. For example, it is possible to further improve resistance to a key analysis process based on an intermediate value matching process using key dependency.

As described above, by applying the configuration according to the present disclosure, it is possible to improve the diffusion performance of conversion target data in the encryption processing section, and thus it is possible to realize a secure encryption process with fewer rounds, for example, an encryption process in which resistance to various attacks such as key analysis is high.

Figure 36:
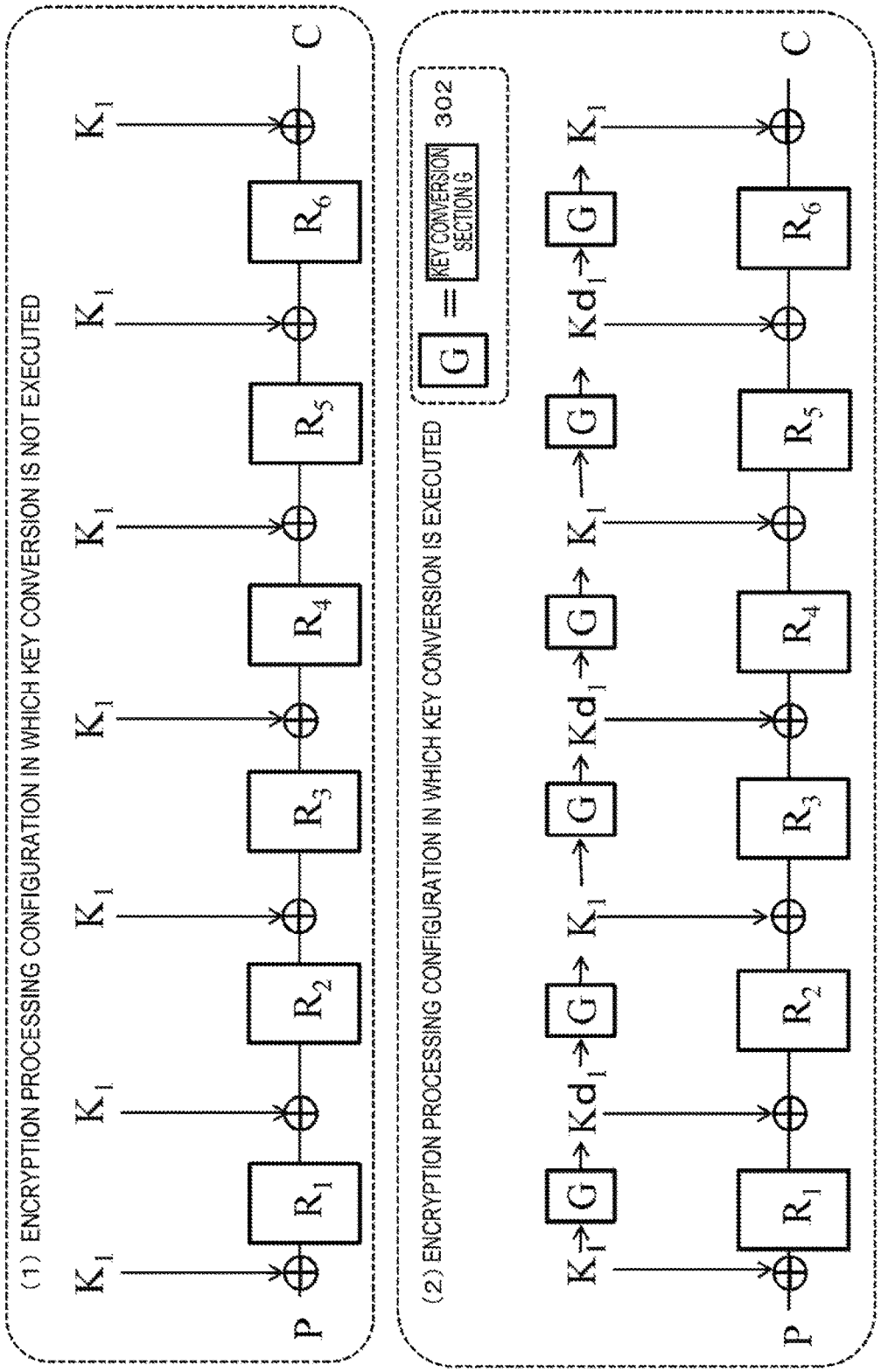
FIG. 36 is a diagram for describing a contrast between configurations for executing the key conversion process and not executing the key conversion process.

FIG. 36 illustrates two examples of encryption processing configurations:

(1) an encryption processing configuration in which the same round key is applied without executing key conversion in each round; and (2) an encryption processing configuration in which two kinds of round keys are alternately applied by executing the key conversion according to the present disclosure.

G boxes illustrated in FIG. 36(2) correspond to the key conversion sections 302 illustrated in FIG. 32.

In the encryption processing configuration in which the key conversion of FIG. 36(1) is not executed, the number of rounds necessary for the diffusion (full diffusion) to all the bits of the input plaintext P in which configuration information (a bit stream) regarding the application keys is conversion target data depends on a process of a round function (R).

Accordingly, when the diffusion performance of the round function is low, the large number of rounds is necessary in order to increase a diffusion level. As a result, it is difficult to realize high-speed processing or weight reduction.

Conversely, in the encryption processing configuration in which the key conversion according to the present disclosure illustrated in FIG. 36(2) is executed, the number of rounds necessary for diffusion (full diffusion) to all the bits of the input plaintext P in which configuration information (bit stream) regarding the application keys is conversion target data depends on the number of rounds in which two keys, the base key $K_1$ and the converted key $Kd_1$, are used.

In the example of the drawing, one round is used.

That is, when the process according to the present disclosure is applied, the diffusion of the configuration information regarding the key data in the conversion target data is realized in one round, and thus greater diffusion performance is ensured without dependency on the process of the round function (R).

That is, the secure encryption process in which resistance to an attack is high is realized with few rounds. As a result, high-speed processing or weight reduction is realized.

[5-3. Effects Based on Involution Property of Key Conversion Section]

As described above with reference to FIGS. 32 and 33, and the like, the key conversion section 302 of the key scheduling section 300 according to the present disclosure has the involution property in which the forward direction function G and the backward direction function $G^{-1}$ are realized by the same function.

Hereinafter, effects based on the involution property will be described.

As hardware mounting configurations of the encryption processing device that repeatedly executes the round functions which are the same data conversion process, there are the following two types:

(a) "unrolled mounting" in which the number of round function execution sections corresponding to the prescribed number of rounds is configured as hardware; and (b) "round mounting" in which one round function execution section is configured as hardware, an output of the round function execution section is input as feedback to the same round function execution section, and the round functions of the prescribed number of rounds are repeatedly executed.

Hereinafter, effects based on the involution property in the two types will be described sequentially.

[5-3-a. Effects in Unrolled Mounting]

Effects produced by the involution property of the key conversion sections according to the present disclosure in the case of the unrolled mounting of the encryption processing sections will be described.

In the unrolled mounting, the number of round function execution sections corresponding to the prescribed number of rounds are configured as hardware in the encryption processing section.

The effects produced by the involution property of the key conversion sections according to the present disclosure in the case of the unrolled mounting of the encryption processing sections will be described with reference to FIGS. 37 and 38.

Figure 37:
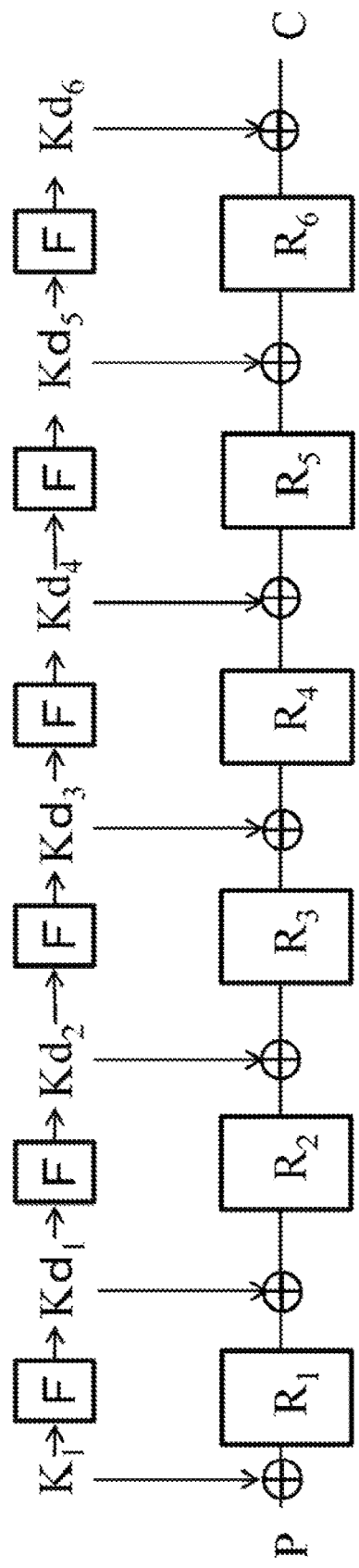
FIG. 37 is a diagram for describing a contrast between configurations for executing the key conversion process and not executing the key conversion process.
Figure 38:
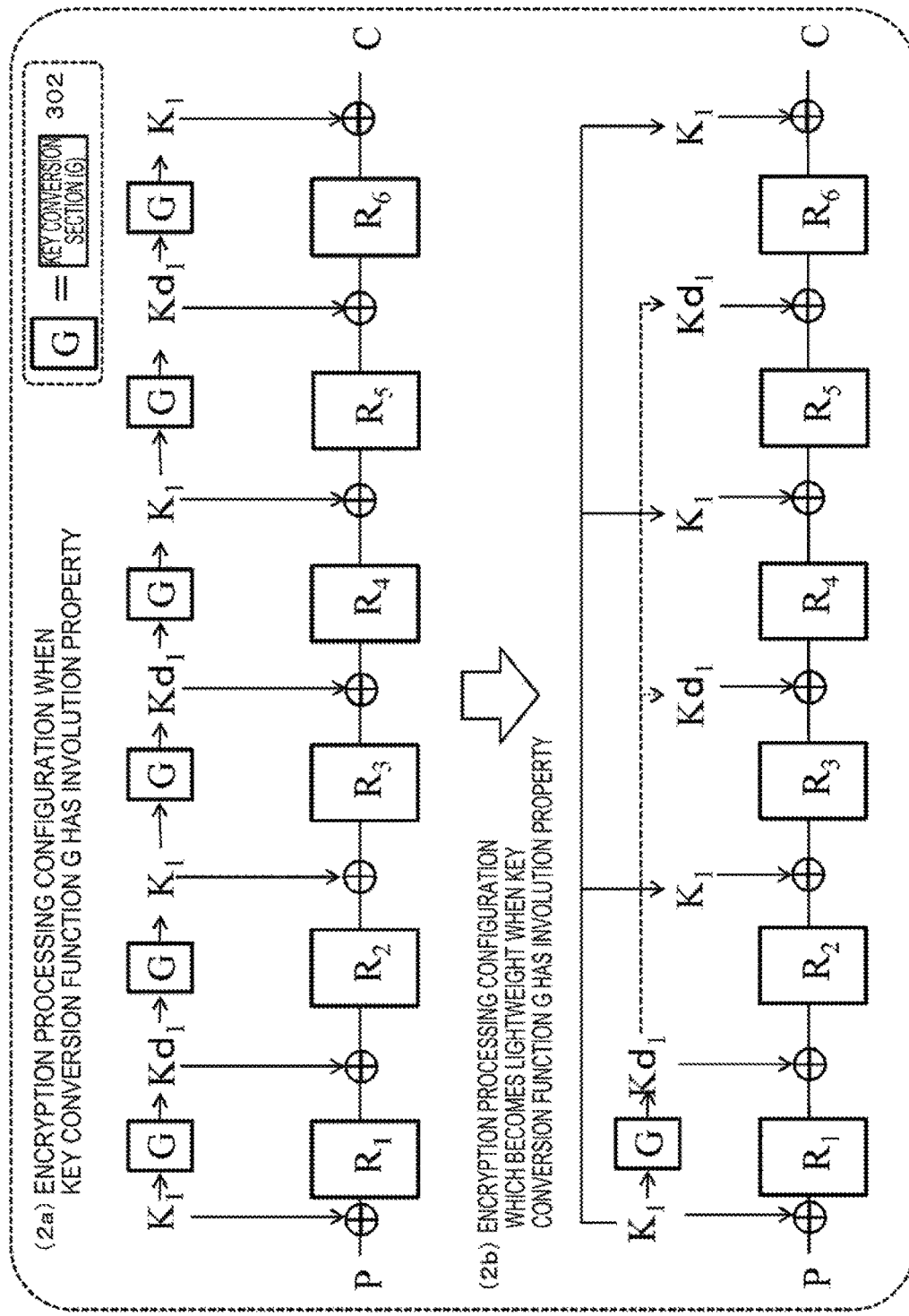
FIG. 38 is a diagram for describing a contrast between configurations for executing the key conversion process and not executing the key conversion process.

FIGS. 37 and 38 illustrate the following mounting examples of the encryption processing device:

hardware mounting example in FIG. 37(1) when the key conversion sections F have no involution property; and hardware mounting example in FIGS. 38(2a) and 38(2b) when the key conversion section (G) has the involution property.

FIGS. 38(2a) and 38(2b) correspond to a mounting example of the key conversion section according to the present disclosure, that is, a mounting example when the key conversion section has the involution property.

Since the key conversion sections F have no involution property in FIG. 37, keys obtained as conversion results by the key conversion sections F sequentially become different keys. FIG. 37 illustrates a configuration in which Kd1, Kd2, Kd3, Kd4, Kd5, and Kd6 are sequentially generated based on the key K1 through the conversion process of the key conversion sections F and these keys are sequentially input as the round keys to the exclusive-OR sections (the round key operation sections) of the encryption processing section.

In contrast, the example illustrated in FIGS. 38(2a) and 38(2b) is a hardware mounting example when the key conversion section (G) has the involution property.

The example illustrated in FIG. 38(2a) shows a configuration in which the key conversion section G that generates an input key (round key) to the exclusive-OR section (the round key operation section) of the encryption processing section is set to be associated with each round as in the hardware configuration illustrated in FIG. 37(1).

On the other hand, FIG. 38(2b) illustrates a configuration in which only one key conversion section G is set, and the base key $K_1$ which is maintained in advance and the converted key $Kd_1$ which is generated by the key conversion section G are set to be alternately input to the exclusive-OR section (the round key operation section) of the encryption processing section.

Since the key conversion section G has the involution property, the keys generated repeatedly through the conversion process of the key conversion section are repeated in the manner of $K_1$, $Kd_1$, $K_1$, $Kd_1$, $K_1$, etc. Based on this nature, as illustrated in FIG. 38(2b), with one key conversion section the base key $K_1$ and the converted key $Kd_1$ generated through a one-time key conversion process by the key conversion section G can be alternately input to the exclusive-OR section (the round key operation section) of the encryption processing section.

As a result, since the number of key conversion sections G can be set to one, lightweightness (miniaturization) of the hardware mounting is realized.

Figure 39:
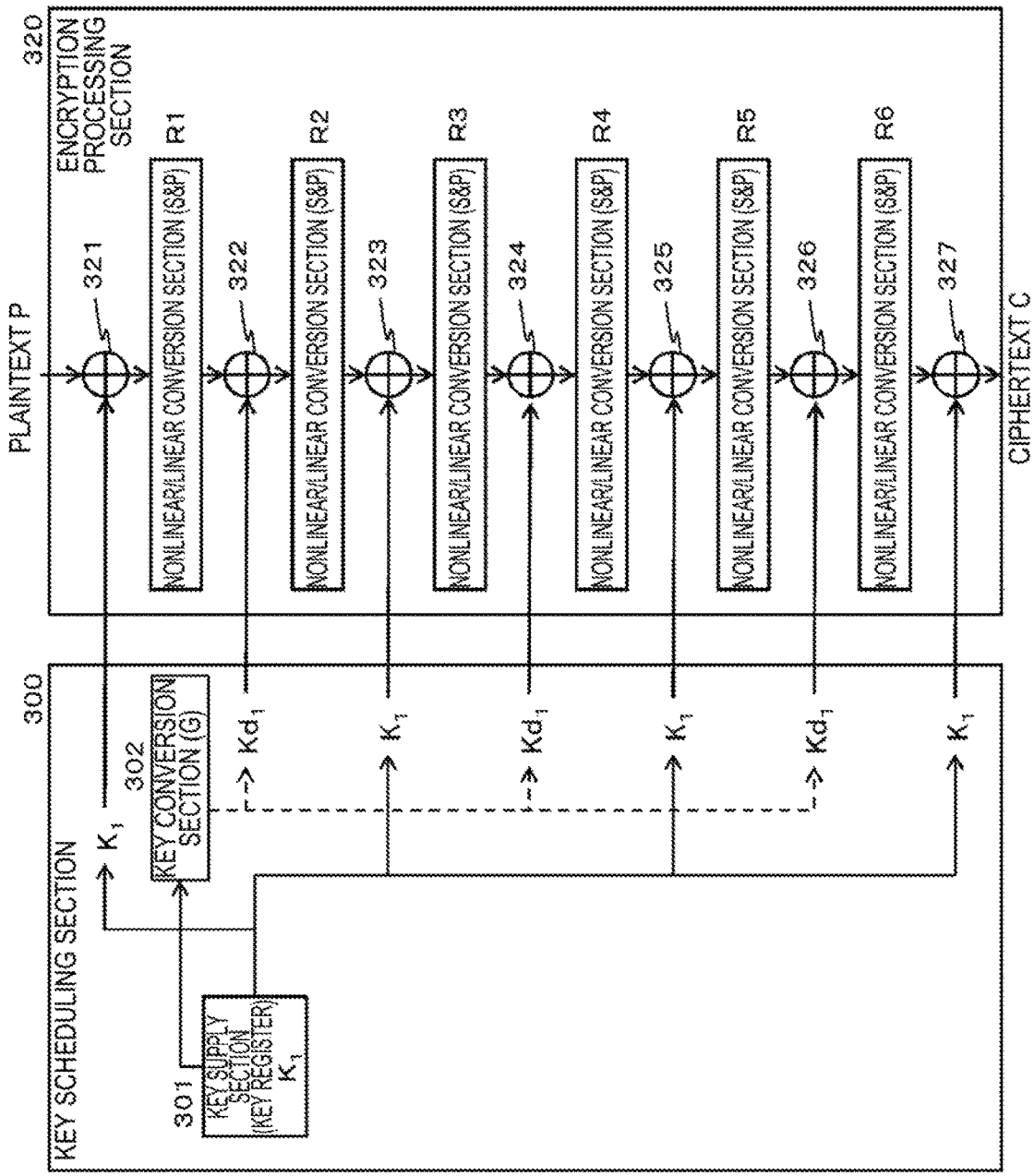
FIG. 39 is a diagram for describing a process and configuration of the key scheduling section.

An example of the configuration of the encryption processing device corresponding to the configuration illustrated in FIG. 38(2b) is illustrated in FIG. 39.

As illustrated in FIG. 39, with only one key conversion section (G) 302 of the key scheduling section 300, the base key $K_1$ which is maintained in advance in each exclusive-OR section (the round key operation section) of the encryption processing section 320 and the converted key $Kd_1$ which is generated by the key conversion section G can be alternately input.

[5-3-b. Effects in Round Mounting]

Next, effects produced by the involution property of the key conversion section according to the present disclosure in the case of round mounting of the encryption processing device will be described.

In the round mounting, one round function set in the encryption processing section is configured to be repeatedly used.

FIG. 40 illustrates (a1) an encryption processing configuration and (a2) a round mounting example when the key conversion section has no involution property.

Figure 41:
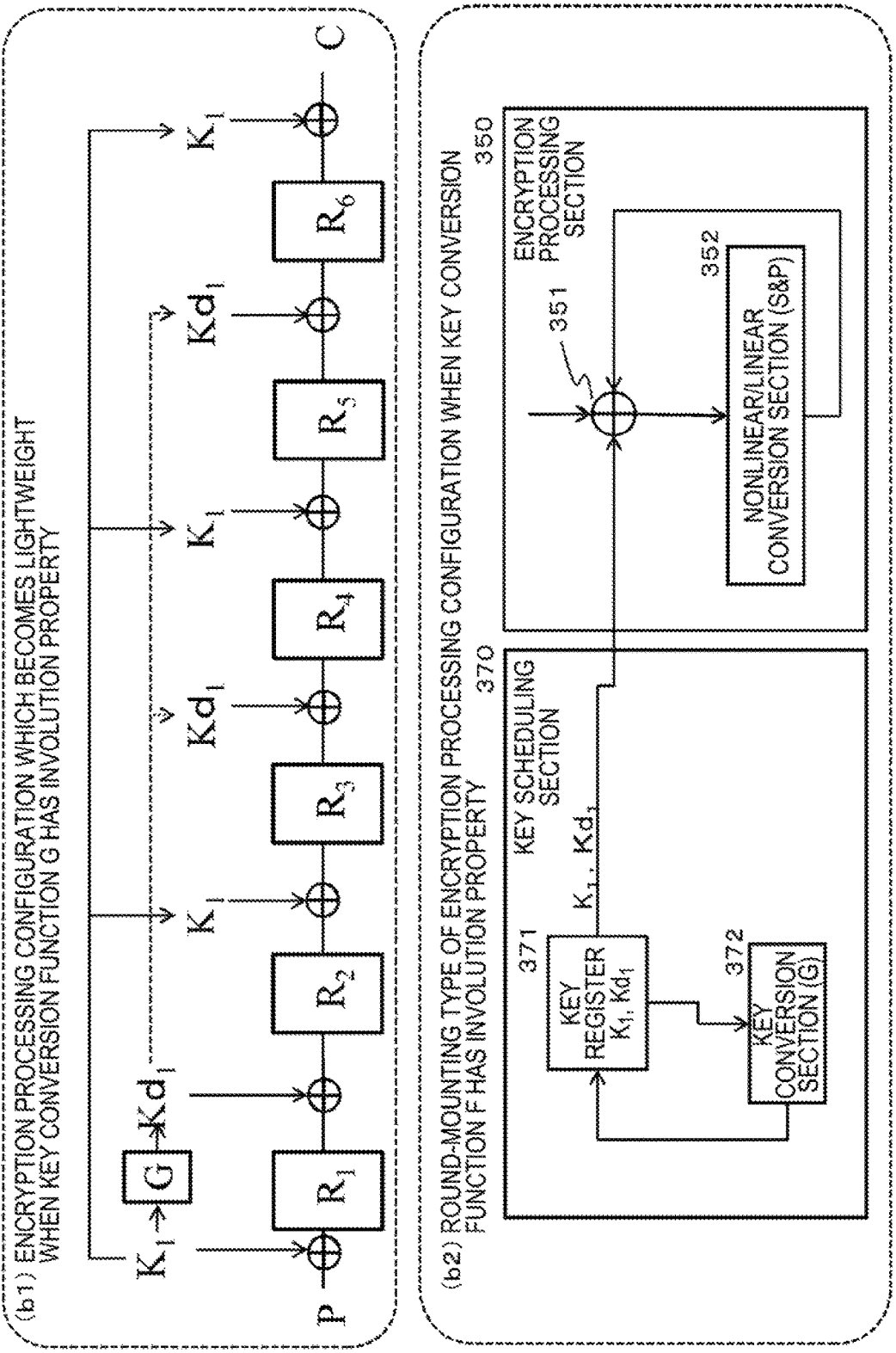
FIG. 41 is a diagram for describing a process and configuration of the key scheduling section when the key conversion function has an involution property.

FIG. 41 illustrates (b1) an encryption processing configuration and (b$_2$) a round mounting example when the key conversion section has the involution property.

The encryption processing configuration illustrated in FIG. 40(a1) is the same configuration as the configuration described above with reference to FIG. 37.

That is, since the key conversion sections F have no involution property, keys obtained as conversion results by the key conversion sections F sequentially become different keys. FIG. 40(a1) illustrates a configuration in which Kd1, Kd2, Kd3, Kd4, Kd5, and Kd6 are sequentially generated based on the key K1 through the conversion process of the key conversion sections F and these keys are sequentially input as the round keys to the exclusive-OR sections (the round key operation sections) of the encryption processing section.

When this configuration is realized in round-type hardware mounting, the configuration illustrated in FIG. 40(a2) is realized. An encryption processing section 350 can be configured to include one exclusive-OR section (round key operation section) 351 and one nonlinear/linear conversion section 352.

On the other hand, a key scheduling section 360 is configured to include a key register 361 that stores and supplies the base key $K_1$, a key register 362 that stores and supplies the converted keys $Kd_1$ to $Kd_6$, a key conversion section (F) 363, and a switch 364 that executes switching of outputs of the key registers 361 and 362.

In contrast, an encryption processing configuration illustrated in FIG. 41(b1) is an encryption processing configuration in which the key conversion section G has the involution property, as in the configuration described above with reference to FIG. 38(2b).

Since the key conversion section G has the involution property, the keys generated repeatedly through the conversion process of the key conversion section are repeated in the manner of $K_1$, $Kd_1$, $K_1$, $Kd_1$, $K_1$, etc. Based on this nature, as illustrated in FIG. 41(b1), with one key conversion section G, the base key $K_1$ and the converted key $Kd_1$ generated through a one-time key conversion process by the key conversion section G can be alternately input to the exclusive-OR section (the round key operation section) of the encryption processing section.

When this configuration is realized in round-type hardware mounting, the configuration illustrated in FIG. 41(b2) is realized. An encryption processing section 350 can be configured to include one exclusive-OR section (round key operation section) 351 and one nonlinear/linear conversion section 352.

On the other hand, a key scheduling section 370 is configured to include a key register 371 that stores and supplies the base key $K_1$ and the converted key $Kd_1$, and a key conversion section (G) 372.

In the example of the round mounting configuration when the key conversion section (F) illustrated in FIG. 40(*a*2) has no involution property, two key registers, one key conversion section, and one switch are necessary in the key scheduling section 360. In contrast, the key scheduling section 370 having the round mounting configuration when the key conversion section (G) illustrated in FIG. 41(*b*2) has the involution property is configured to include one key register and one key conversion section. Thus, it is proved that lightweightness (miniaturization) of the hardware configuration is realized.

For example, in the round mounting configuration when the key conversion section (F) having no involution property, as illustrated in FIG. 40(*a*2), key registers that sequentially generate and supply a plurality of different converted keys are necessary. Thus, a new hardware circuit corresponding to the number of key registers is necessary.

[5-4. Conclusion of Configuration and Effects of Key Scheduling Section According to Present Disclosure]

As described above, the key conversion section of the key scheduling section included in the encryption processing device according to the present disclosure has the following two characteristics:

(1) the full diffusion property in which the full diffusion conversion is realized; and (2) the involution property in which the forward direction function G and the backward direction function $G^{-1}$ are the same.

The key conversion section of the key scheduling section has these two characteristics The following effects can be obtained based on the two characteristics:

(effect 1) the full diffusion property of conversion target data can be realized with few rounds based on the full diffusion property;

as a result, the encryption process with high security can be executed with few rounds, and thus high speed (low delay) of the process and the lightweightness (miniaturization) of the device are realized;

(effect 2) when the unrolled mounting of the hardware configuration is realized, only one key conversion section can be included based on the involution property, and thus the lightweightness (miniaturization) of the device is realized; and (effect 3) when the round mounting of the hardware configuration is realized, the key scheduling section including only one key register and only one key conversion section can be mounted based on the involution property, and thus the lightweightness (miniaturization) of the device is realized.

[5-5. Other Examples of Configuration of Key Scheduling Section]

Next, other examples of the configuration of the key scheduling section including the key conversion section that executes the key conversion process in which the function G having the above-described two characteristics, that is, the following two characteristics, is applied will be described with reference to FIG. 42 and the subsequent drawings:

(1) the full diffusion property in which the full diffusion conversion is realized; and (2) the involution property in which the forward direction function G and the backward direction function $G^{-1}$ are the same.

Figure 42:
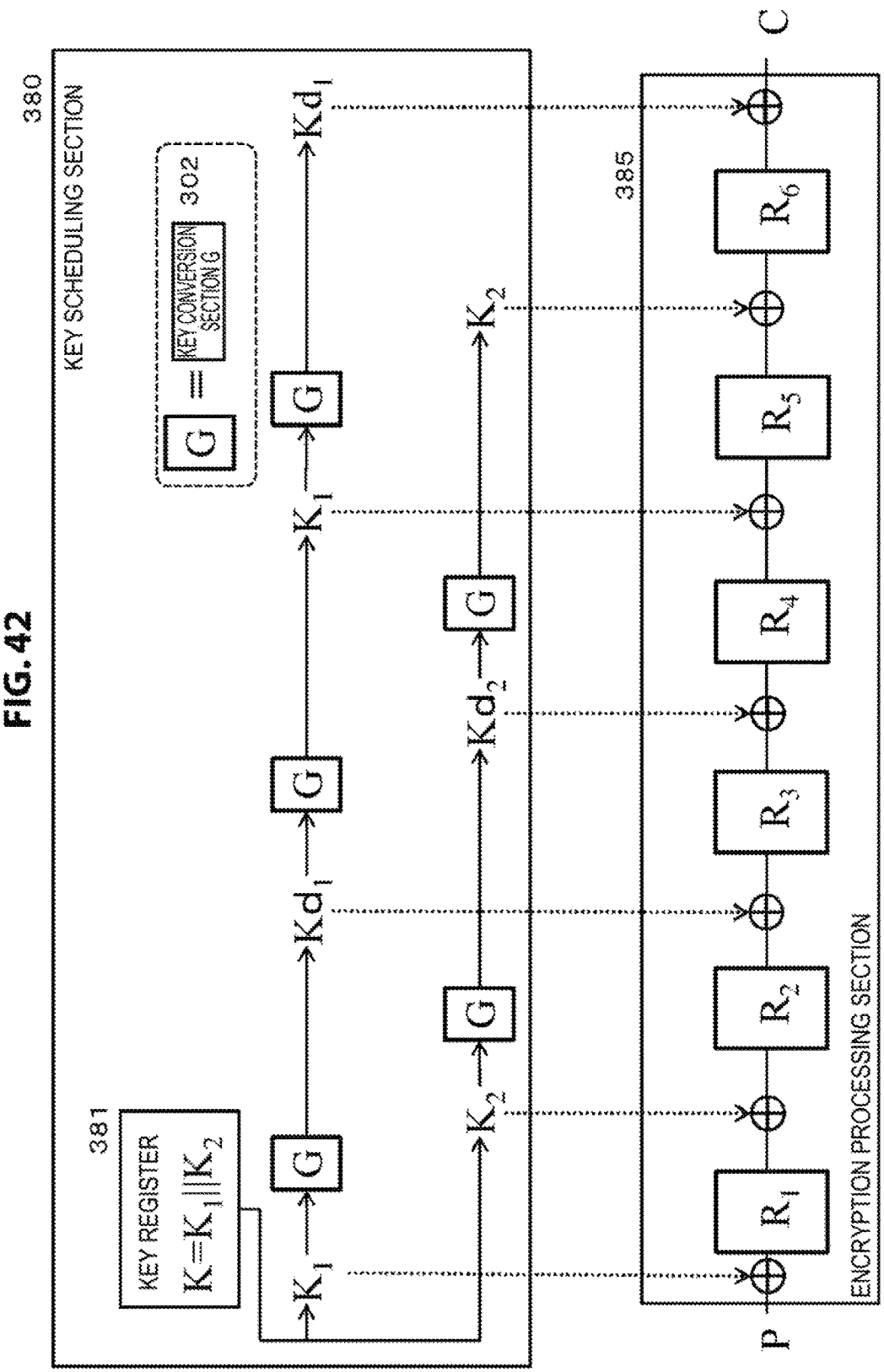
FIG. 42 is a diagram for describing a process and configuration of the key scheduling section.

FIG. 42 is a diagram illustrating one example of the configuration of an encryption processing device including a key scheduling section 380 that includes a key conversion section having the above-described two characteristics.

The encryption processing device illustrated in FIG. 42 includes a key scheduling section 380 and an encryption processing section 385.

A private key K generated in advance is stored in a key register 381 of the key scheduling section 380.

The private key K is link data of keys $K_1$ and $K_2$.

For example, $K_1$ and $K_2$ are 64-bit keys and the private key K which is the link data is 128-bit data.

G illustrated in the drawing denotes a key conversion section which is a key conversion section that executes a key conversion process in which the function G having the two characteristics, that is, the full diffusion property and the involution property, is applied, as in the key conversion section 302 described above with reference to FIG. 32 and the subsequent drawings.

The key scheduling section 380 illustrated in FIG. 42 sequentially outputs the keys $K_1$ and $K_2$ which are pieces of split data of the private key K stored in the key register 381 and further outputs the converted keys $Kd_1$ and $Kd_2$ which are converted from these keys in the key conversion section (G) to the exclusive-OR section (the round key operation section) of the encryption processing section 385.

In the example illustrated in the drawing, when the keys $K_1$ and $K_2$ are 64-bit keys, the plaintext P which is a conversion target of the encryption processing section 385 is also 64-bit data.

In the example illustrated in FIG. 42, the key output sequence is as follows:

the key $K_1$;

the key $K_2$;

the converted key $Kd_1$;

the converted key $Kd_2$;

the key $K_1$;

the key $K_2$; and the converted key $Kd_1$.

In this sequence, 4 kinds of keys are input to the encryption processing section 385.

A key input sequence can be variously set.

In FIG. 42, the plurality of key conversion sections (G) are illustrated. However, when the round mounting described above with reference to FIG. 41 is performed, only one key conversion section (G) can be included.

Another example of the configuration of the key scheduling section will be described with reference to FIG. 43.

Figure 43:
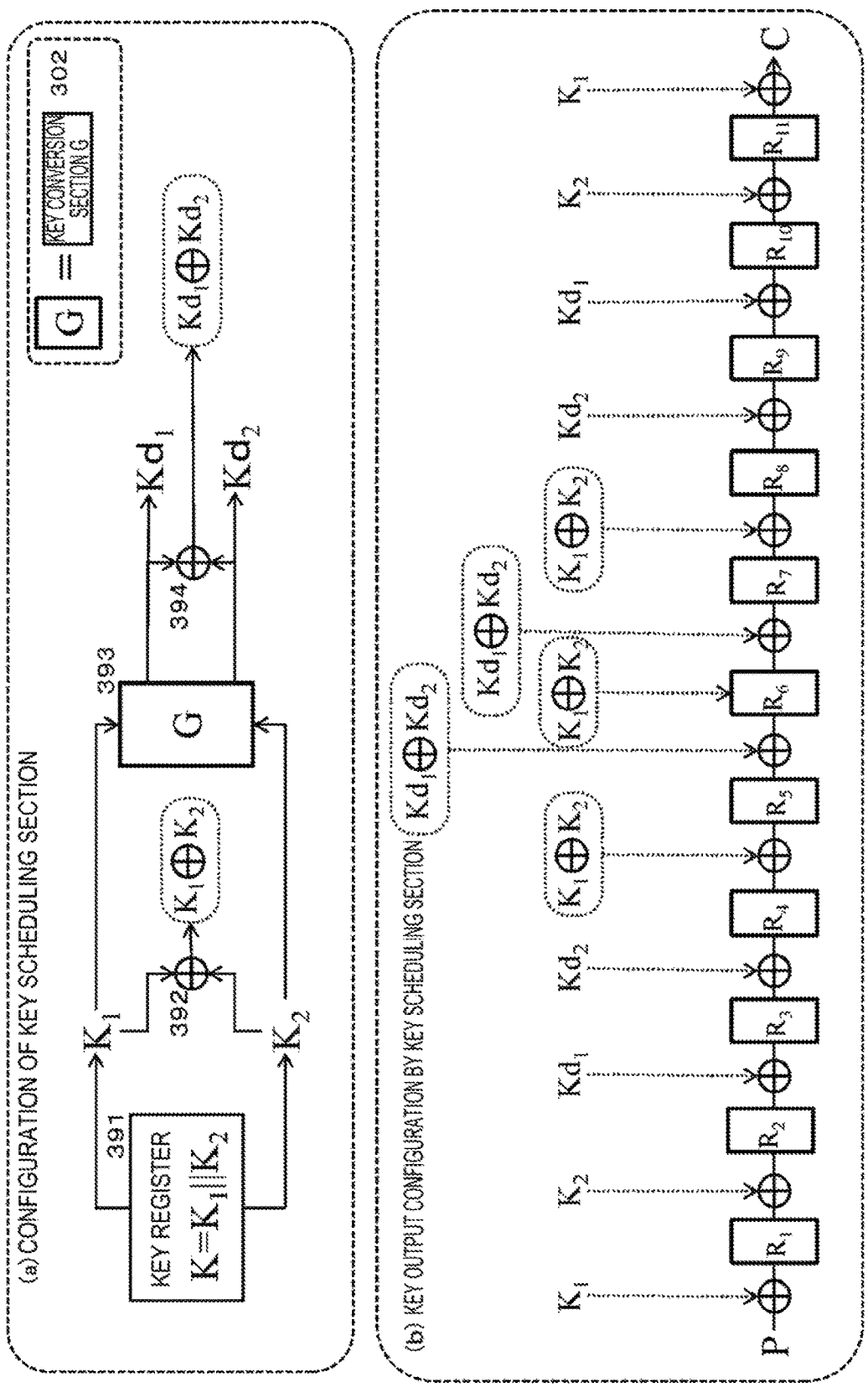
FIG. 43 is a diagram for describing a process and configuration of the key scheduling section.

The following is illustrated in FIG. 43:

(a) the configuration of the key scheduling section; and (b) a key output configuration by the key scheduling section.

As illustrated in FIG. 43(*a*), a private key K generated in advance is stored in a key register 391 of the key scheduling section.

The private key K is link data of keys $K_1$ and $K_2$.

For example, $K_1$ and $K_2$ are 64-bit keys and the private key K which is the link data is 128-bit data.

The key scheduling section illustrated in FIG. 43(*a*) includes a key conversion section G393 and exclusive-OR sections 392 and 394.

The key conversion section G393 is a key conversion section that executes a key conversion process in which the function G having the two characteristics, that is, the full diffusion property and the involution property, is applied, as in the key conversion section 302 described above with reference to FIG. 32 and the subsequent drawings.

The key scheduling section illustrated in FIG. 43(*a*) generates the following 6 kinds of keys based on each configuration:

the key $K_1$;
the key $K_2$;
the converted key $Kd_1$;
the converted key $Kd_2$;
an exclusive-OR operation key $K_1$ (+) $K_2$; and
an exclusive-OR operation converted key $Kd_1$ (+) $Kd_2$.

The key scheduling section illustrated in FIG. 43(a) generate the 6 kinds of keys and sequentially outputs the keys to the encryption processing section.

The foregoing 6 kinds of keys are all 64-bit keys when the key K=128 bits. In this case, the plaintext P which is a conversion target of the encryption processing section is also 64-bit data.

In the example illustrated in FIG. 43(b), a key output sequence is as follows:
the key $K_1$;
the key $K_2$;
the converted key $Kd_1$;
the converted key $Kd_2$;
the exclusive-OR operation key $K_1$ (+) $K_2$;
the exclusive-OR operation converted key $Kd_1$ (+) $Kd_2$;
the exclusive-OR operation key $K_1$ (+) $K_2$;
the exclusive-OR operation converted key $Kd_1$ (+) $Kd_2$;
the exclusive-OR operation key $K_1$ (+) $K_2$;
the converted key $Kd_2$;
the converted key $Kd_1$;
the key $K_2$; and
the key $K_1$.

In this sequence, the 6 kinds of keys are input to the encryption processing section.

The input sequence of the foregoing keys and its reverse sequence are the same sequence.

This means that the key input sequence in the encryption process of generating the ciphertext C from the plaintext P and the key input sequence in the decryption process of generating the plaintext P from the ciphertext C can be set to be the same. This means that hardware or programs which are applied to the encryption process and the decryption process can be common, and thus the setting contributes to lightweightness (miniaturization) of the device.

A specific configuration of the encryption processing device including the key scheduling section illustrated in FIG. 43 will be described further later.

[5-6. Example of Configuration of Key Conversion Section having Full Diffusion Property]

In the above-described embodiment, the case in which the key conversion section generating the converted key Kd through the conversion process in which the conversion function G is applied to the private key K has the two natures of the involution property and the full diffusion property has been described. Even when a key conversion section that does not have the involution property and has only the full diffusion property is applied, an encryption processing configuration in which the diffusion performance to input data is improved and resistance to various attacks is high is realized.

Hereinafter, an embodiment of an encryption processing configuration that has the full diffusion property will be described.

Figure 44:
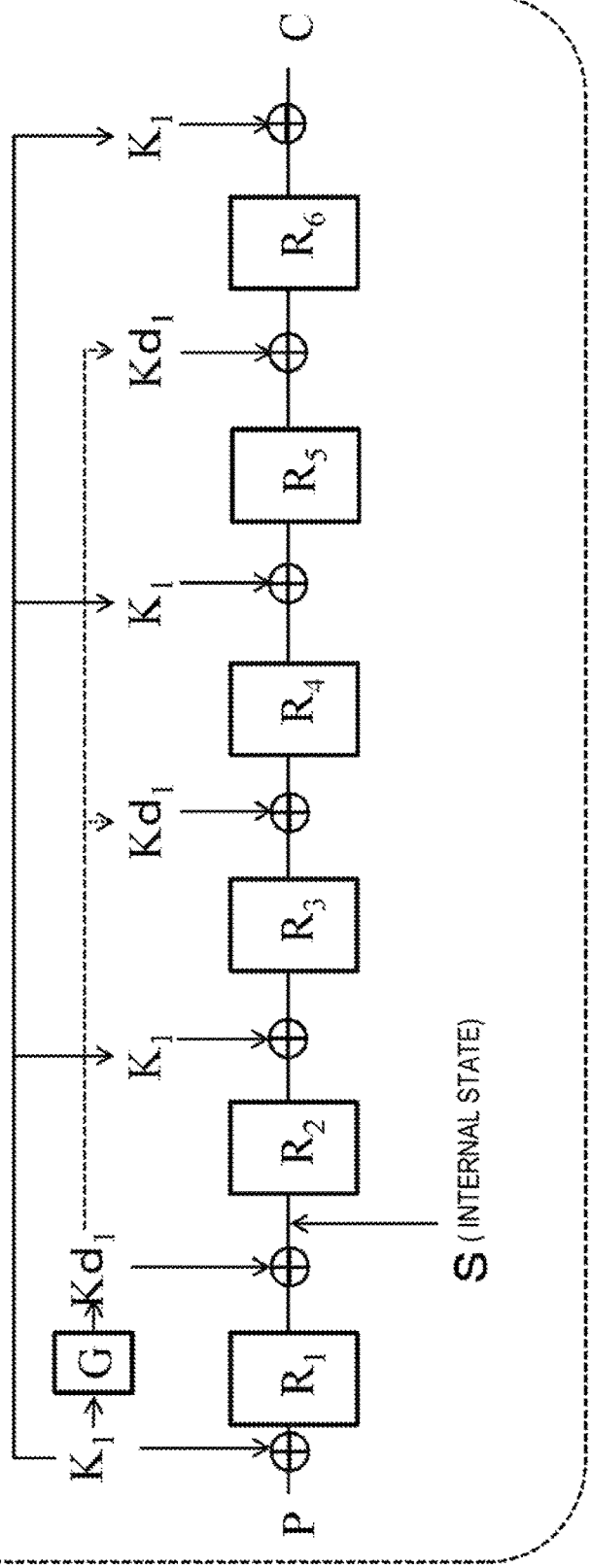
FIG. 44 is a diagram for describing an encryption processing configuration when a key conversion function G has a full-diffusion property.

FIG. 44 is a diagram illustrating ensuring of the full diffusion property of an internal state S of input data (P) when a key conversion function G has the full diffusion property. As described in the previous item [5-2. Effects based on full-diffusion property of key scheduling section] with reference to FIG. 35 and the like, the full diffusion property is also ensured between conversion target data and a key when the key conversion function G of the key conversion section has the full diffusion property.

In the configuration illustrated in FIG. 44, the base key $K_1$ is input to the exclusive-OR section of the encryption processing section to be subjected to an exclusive-OR operation with an input state. Thereafter, a nonlinear conversion process and a linear conversion process are executed in a round operation section $R_1$.

Further, the exclusive-OR operation with the converted key $Kd_1$ is executed on the output in the exclusive-OR operation section.

An output (S) of the exclusive-OR operation section will be examined.

The full diffusion property is ensured between the base key $K_1$ and the converted key $Kd_1$.

The conversion target data is subjected to the nonlinear conversion process and the linear conversion process in the round operation section $R_1$ and is subsequently subjected to the exclusive-OR operation with the converted key $Kd_1$.

As a result, the full diffusion property is ensured even between the base key $K_1$ and the converted data.

This nature can be said to be a nature that contribution to security or mounting performance of the encryption processing device.

Specifically, an improvement in a data diffusion property by the key is realized. Thus, even when the number of rounds is reduced, it is possible to have high diffusion performance. As a result, it is possible to improve resistance to various attacks. For example, it is possible to further improve resistance to a key analysis process based on an intermediate value matching process using key dependency.

Figure 45:
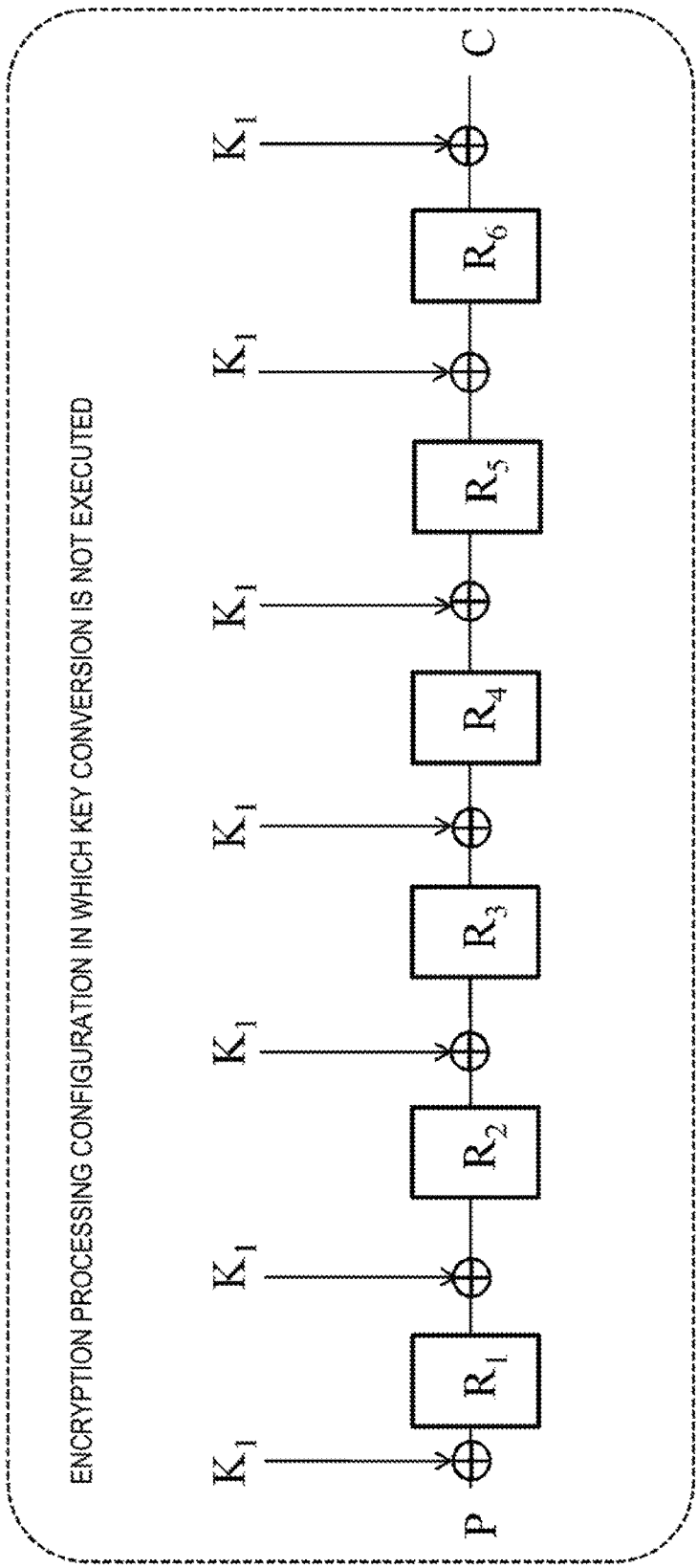
FIG. 45 is a diagram for describing a process and configuration when key conversion is not executed.

In the encryption processing configuration in which the key conversion of FIG. 45 is not executed, the number of rounds necessary for the diffusion (full diffusion) to all the bits of the input plaintext P in which configuration information (a bit stream) regarding the application keys is conversion target data depends on a process of a round function (R).

In contrast, in the configuration in which the key conversion illustrated in FIG. 44 is executed, the number of rounds necessary for the diffusion (full diffusion) to all the bits of the input plaintext P in which configuration information (bit stream) regarding application keys is conversion target data is the number of rounds in which two keys, the base key $K_1$ and the converted key $Kd_1$, are used.

In the example illustrated in the drawing, one round is used.

That is, when the process according to the present disclosure is applied, the diffusion of the configuration information regarding the key data in the conversion target data is realized in one round, and thus greater diffusion performance is ensured without dependency on the process of the round function (R).

That is, the secure encryption process in which resistance to an attack is high is realized with few rounds. As a result, high-speed processing or weight reduction is realized.

A specific example of a G function having the full diffusion property will be described.

The G function to be described below is configured by a combination of the following two functions:
(a) a full diffusion 4-bit function ($Df_4$); and
(b) 16-bit substitution function ($Bp_{16}$).

(a) The full diffusion 4-bit function is a conversion function in which input and output 4 bits are set and a function that has the full diffusion property indicating an influence of the input 4 bits on all of the output 4 bits.

That is,

Input: $x_0, x_1, x_2, x_3$ (each 1 bit); and
Output: $y_0, y_1, y_2, y_3$ (each 1 bit).
At this time, the function f is:
$y_i = f(x_0, x_1, x_2, x_3)$,
where, i=0, 1, 2, 3.

The full diffusion 4-bit function is a function that has the foregoing natures.

Next, (b) the 16-bit substitution function ($Bp_{16}$) will be described with reference to FIG. 46.

Figure 46:
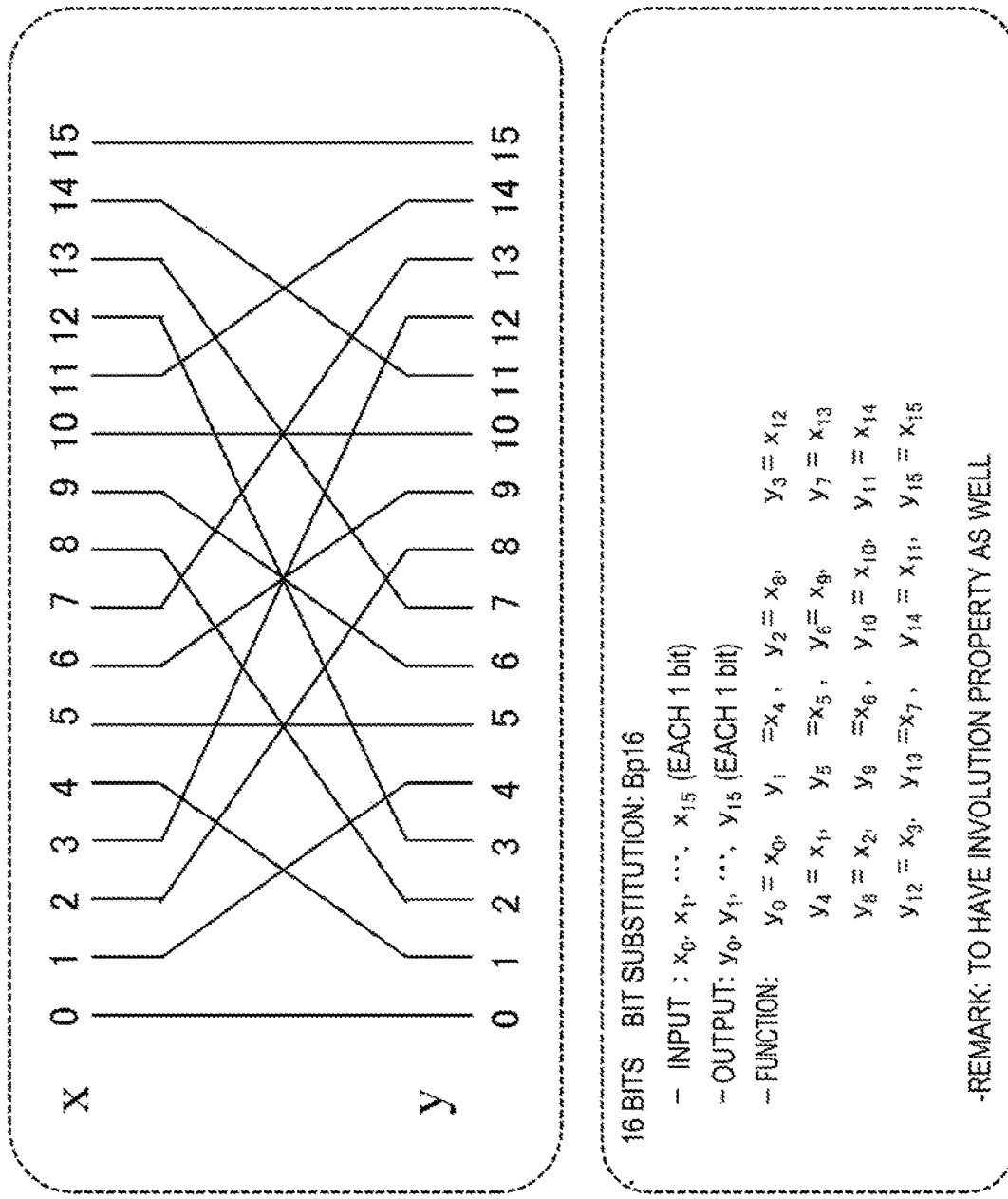
FIG. 46 is a diagram for describing a 16-bit substitution process.

FIG. 46 illustrates an example of the 16-bit substitution function ($Bp_{16}$).

The input X is set to 16-bit data of $x_0, x_1, x_2, \ldots, x_{15}$ and the output Y after conversion of the input X input to the conversion function G is set to 16-bit data of $y_0, y_1, y_2, \ldots, y_{15}$.

Further, $x_i$ and $y_i$ are 1-bit data of 0 or 1.

A relation between the input and output bits by the 16-bit substitution function ($Bp_{16}$) is the following correspondence relation:

input: $x_0, x_1, \ldots, x_{15}$ (each 1 bit);
output: $y_0, y_1, y_2, y_{15}$ (each 1 bit);
function: $y_0=x_0, y_1=x_4, y_2=x_8, y_3=x_{12}$;
$y_4=x_1, y_5=x_5, y_6=x_9, y_7=x_{13}$;
$y_8=x_2, y_9=x_6, y_{10}=x_{10}, y_{11}=x_{14}$; and
$y_{12}=x_3, y_{13}=x_7, y_{14}=x_{11}, y_{15}=x_{15}$.

Figure 47:
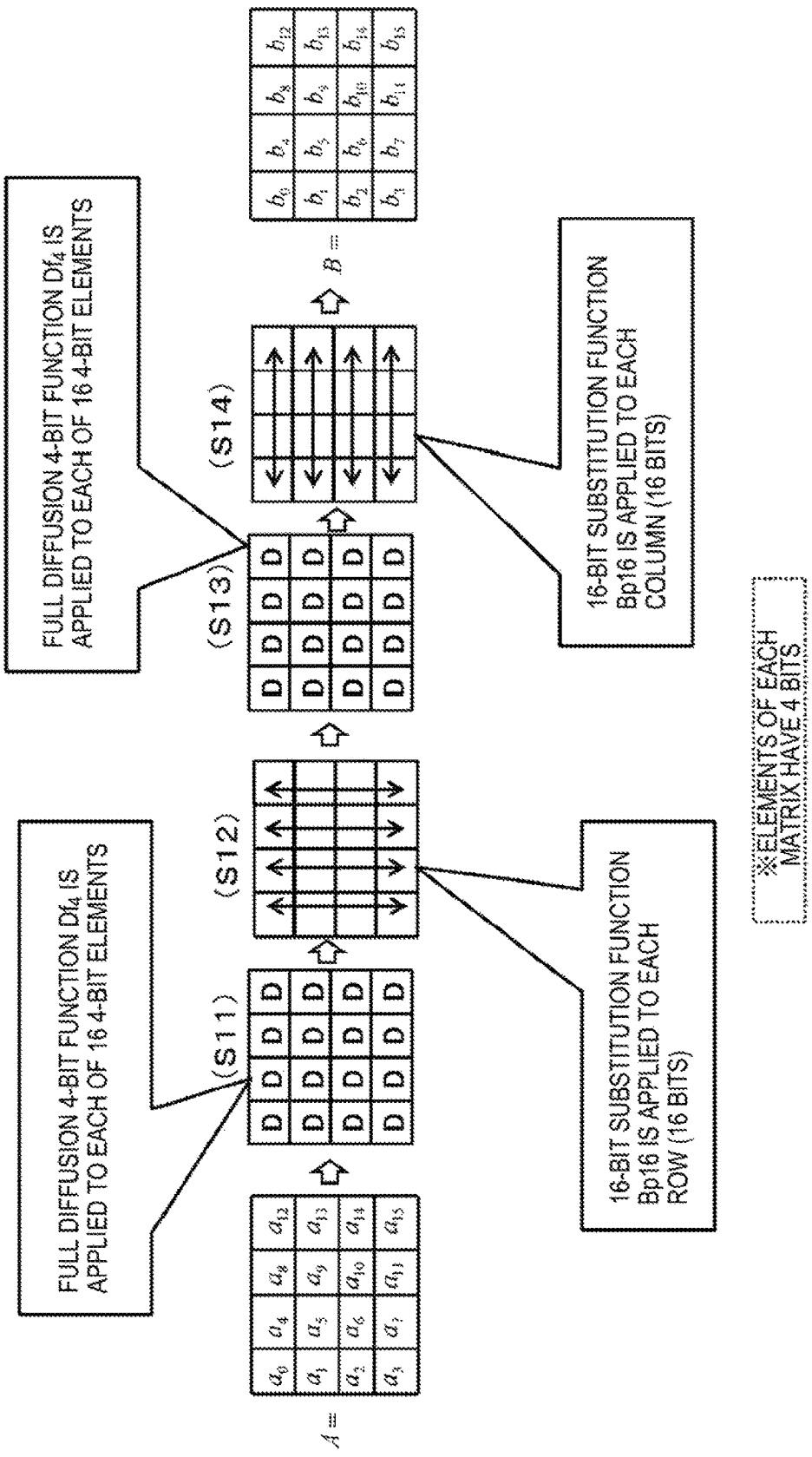
FIG. 47 is a diagram for describing an example of a key conversion process in which a full-diffusion 4-bit function and a 16-bit substitution function are applied.

FIG. 47 is a diagram illustrating an example (process example 1) in which the key conversion process in which the G function that is configured to include the following two functions and has the full diffusion property is applied:

(a) the full diffusion 4-bit function ($Df_4$); and
(b) the 16-bit substitution function ($Bp_{16}$).

A base key is assumed to be A and a converted key is assumed to be B. Both of the keys are 4×4 state data formed by 4-bit elements.

In the example illustrated in FIG. 47, a process of generating the converted key B from the base key A is configured to include the following 4 steps:

(S11) a step of applying the full diffusion 4-bit function ($Df_4$) to each of 16 4-bit elements of the base key A for conversion;

(S12) a step of applying the 16-bit substitution function ($Bp_{16}$) to each piece of column 16-bit data of the data (4×4 state) generated through the conversion process of step S11 for conversion;

(S13) a step of applying the full diffusion 4-bit function ($Df_4$) to each of the 16 4-bit elements of the data (4×4 state) generated through the conversion process of step S12 for conversion; and (S14) a step of applying the 16-bit substitution function ($Bp_{16}$) to each piece of row 16-bit data of the data (4×4 state) generated through the conversion process of step S13 for conversion.

Through such a process, the converted key B is generated from the base key A.

Elements $b_0$ to $b_{15}$ of the converted key B become data which receives the influence of elements $a_0$ to $a_{15}$ of the base key A, and the full diffusion property is ensured between the base key A and the converted key B.

Figure 48:
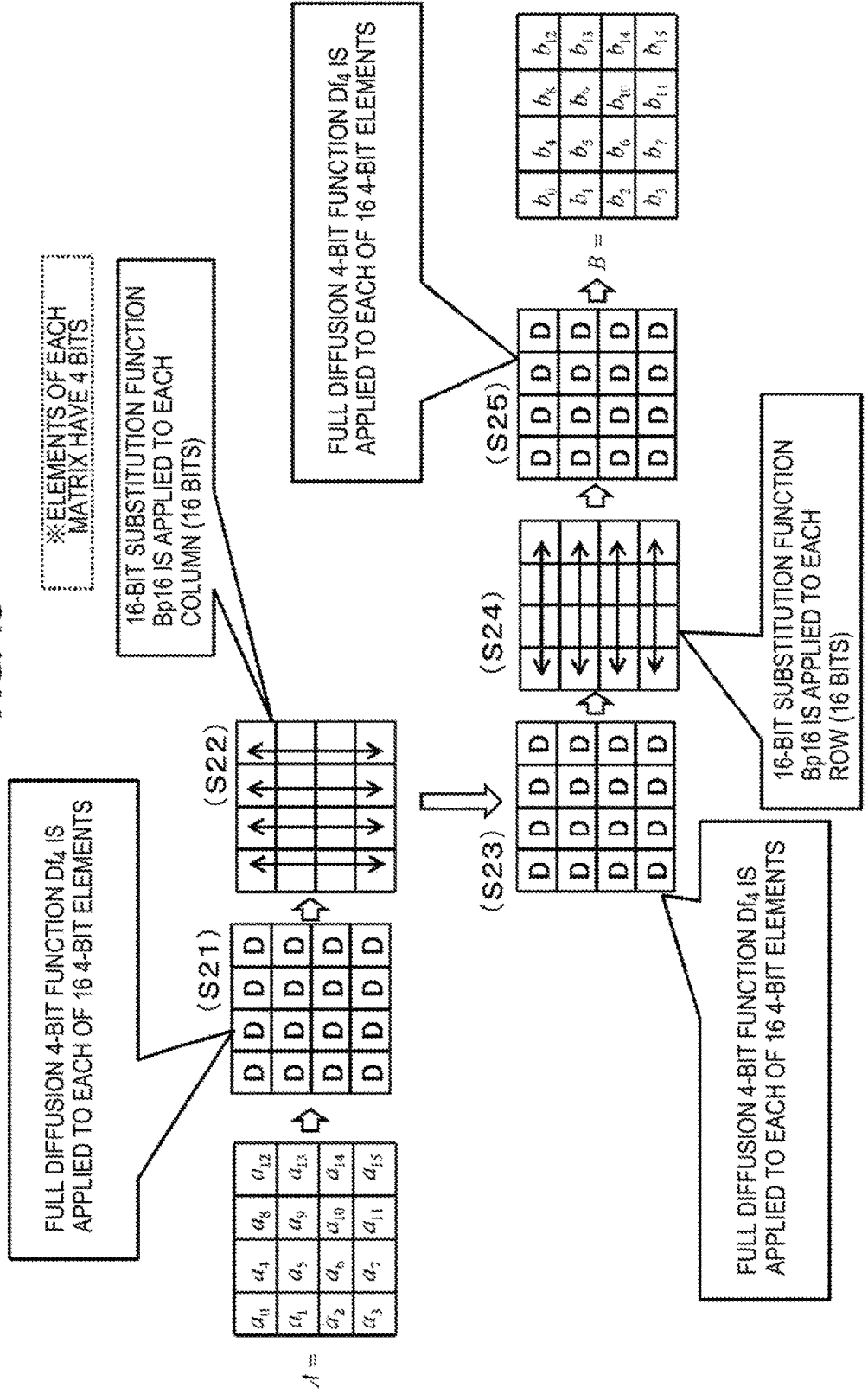
FIG. 48 is a diagram for describing an example of a key conversion process in which a full-diffusion 4-bit function and a 16-bit substitution function are applied.

FIG. 48 is a diagram illustrating an example (process example 2) in which the key conversion process in which the G function that is configured to include the following two functions and has the full diffusion property is applied:

(a) the full diffusion 4-bit function ($Df_4$); and
(b) the 16-bit substitution function ($Bp_{16}$).

A base key is assumed to be A and a converted key is assumed to be B. Both of the keys are 4×4 state data formed by 4-bit elements.

In the example illustrated in FIG. 48, a process of generating the converted key B from the base key A is configured to include the following 5 steps:

(S21) a step of applying the full diffusion 4-bit function ($Df_4$) to each of 16 4-bit elements of the base key A for conversion;

(S22) a step of applying the 16-bit substitution function ($Bp_{16}$) to each piece of column 16-bit data of the data (4×4 state) generated through the conversion process of step S21 for conversion;

(S23) a step of applying the full diffusion 4-bit function ($Df_4$) to each of the 16 4-bit elements of the data (4×4 state) generated through the conversion process of step S22 for conversion;

(S24) a step of applying the 16-bit substitution function ($Bp_{16}$) to each piece of row 16-bit data of the data (4×4 state) generated through the conversion process of step S23 for conversion; and (S25) a step of applying the full diffusion 4-bit function ($Df_4$) to each of the 16 4-bit elements of the data (4×4 state) generated through the conversion process of step S24 for conversion.

Through such a process, the converted key B is generated from the base key A.

Elements $b_0$ to $b_{15}$ of the converted key B become data which receives the influence of elements $a_0$ to $a_{15}$ of the base key A, and the full diffusion property is ensured between the base key A and the converted key B.

Figure 49:
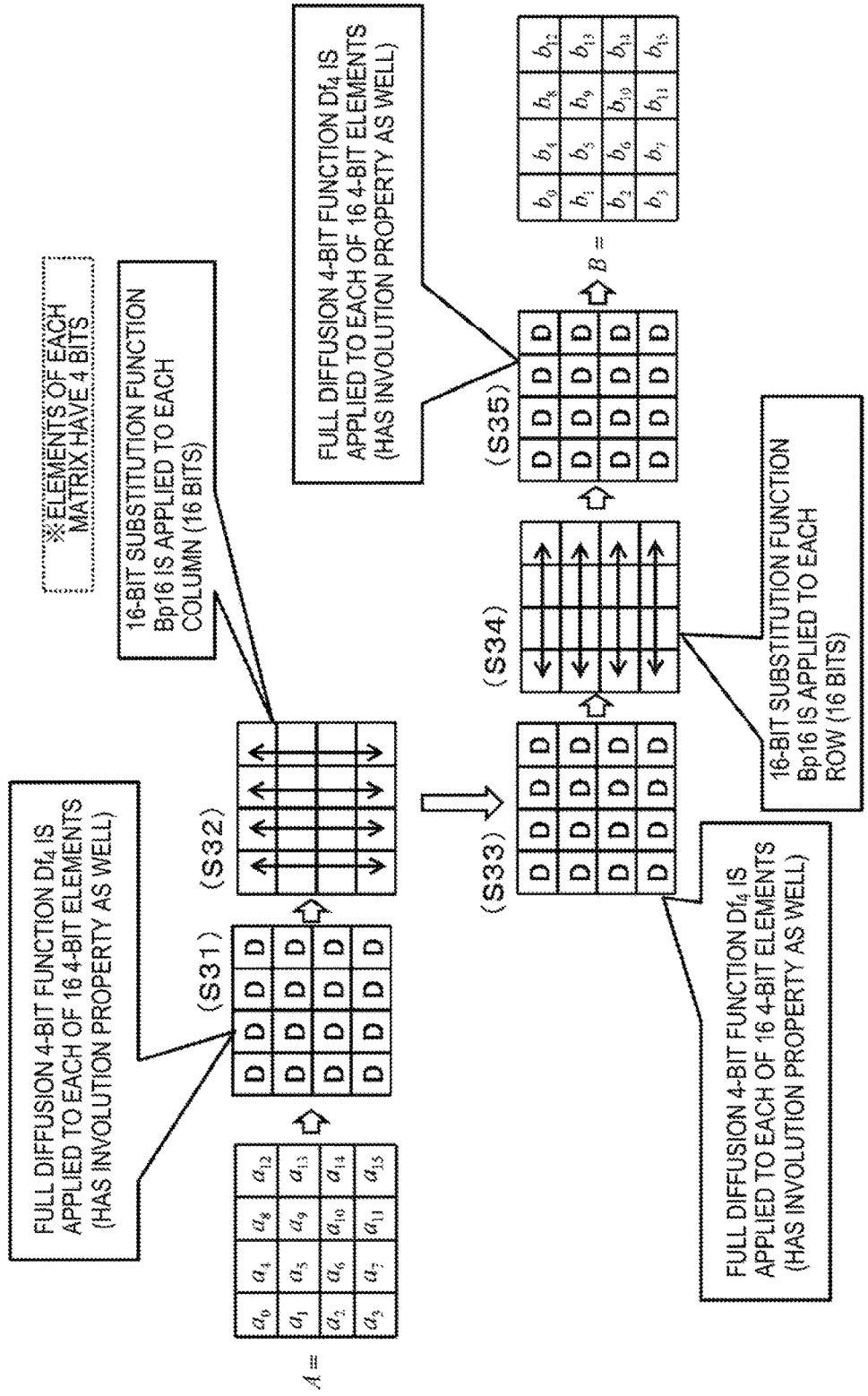
FIG. 49 is a diagram for describing an example of a key conversion process in which a full-diffusion 4-bit function and a 16-bit substitution function are applied.

FIG. 49 is a diagram illustrating an example (process example 3) in which the key conversion process in which the G function that is configured to include the following two functions and has the full diffusion property is applied:

(a) the full diffusion 4-bit function ($Df_4$); and
(b) the 16-bit substitution function ($Bp_{16}$).

A base key is assumed to be A and a converted key is assumed to be B. Both of the keys are 4×4 state data formed by 4-bit elements.

(a) The full diffusion 4-bit function ($Df_4$) applied in this process example 3 is a function that also has the involution property.

In the example illustrated in FIG. 49, the process of generating the converted key B from the base key A is configured to include the following 5 steps:

(S31) a step of applying the 4-bit function ($Df_4$) having the involution property and the full diffusion to each of 16 4-bit elements of the base key A for conversion;

(S32) a step of applying the 16-bit substitution function ($Bp_{16}$) to each piece of column 16-bit data of the data (4×4 state) generated through the conversion process of step S31 for conversion;

(S33) a step of applying the 4-bit function ($Df_4$) having the involution property and the full diffusion to each of the 16 4-bit elements of the data (4×4 state) generated through the conversion process of step S32 for conversion;

(S34) a step of applying the 16-bit substitution function ($Bp_{16}$) to each piece of row 16-bit data of the data (4×4 state) generated through the conversion process of step S33 for conversion; and (S35) a step of applying the 4-bit function ($Df_4$) having the involution property and the full diffusion to each of the 16 4-bit elements of the data (4×4 state) generated through the conversion process of step S34 for conversion.

Through such a process, the converted key B is generated from the base key A.

Elements $b_0$ to $b_{15}$ of the converted key B become data which receives the influence of elements $a_0$ to $a_{15}$ of the base key A, and the full diffusion property is ensured between the base key A and the converted key B. Further, since both (a) the full diffusion 4-bit function ($Df_4$) and (b) the 16-bit substitution function ($Bp_{16}$) have the involution property, the involution property is also ensured between the base key A and the converted key B.

Figure 50:
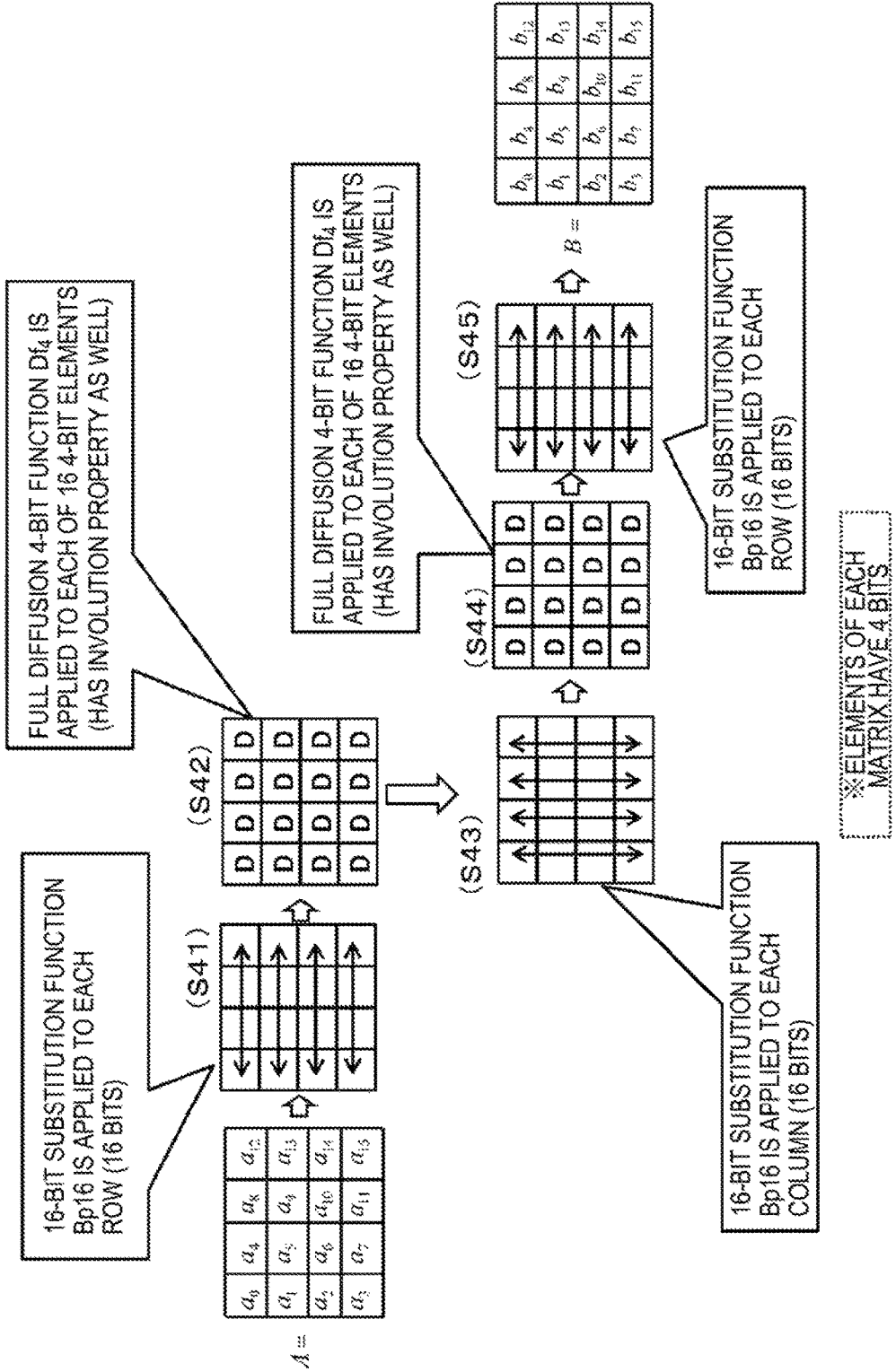
FIG. 50 is a diagram for describing an example of a key conversion process in which a full-diffusion 4-bit function and a 16-bit substitution function are applied.

FIG. 50 is a diagram illustrating an example (process example 4) in which the key conversion process in which the G function that is configured to include the following two functions and has the full diffusion property is applied:

(a) the full diffusion 4-bit function ($Df_4$); and
(b) the 16-bit substitution function ($Bp_{10}$).

A base key is assumed to be A and a converted key is assumed to be B. Both of the keys are 4×4 state data formed by 4-bit elements.

(a) The full diffusion 4-bit function ($Df_4$) applied in this process example 4 is a function that also has the involution property.

In the example illustrated in FIG. 50, a process of generating the converted key B from the base key A is configured to include the following 5 steps:

(S41) a step of applying the 16-bit substitution function ($Bp_{16}$) to each piece of column 16-bit data of the base key A (4×4 state) for conversion;

(S42) a step of applying the 4-bit function ($Df_4$) having the involution property and the full diffusion to each of 16 4-bit elements of the data (4×4 state) generated through the conversion process of step S41 for conversion;

(S43) a step of applying the 16-bit substitution function ($Bp_{16}$) to each piece of column 16-bit data of the data (4×4 state) generated through the conversion process of step S42 for conversion;

(S44) a step of applying the 4-bit function ($Df_4$) having the involution property and the full diffusion to each of 16 4-bit elements of the data (4×4 state) generated through the conversion process of step S43 for conversion; and (S45) a step of applying the 16-bit substitution function ($Bp_{16}$) to each piece of row 16-bit data of the data (4×4 state) generated through the conversion process of step S44 for conversion.

Through such a process, the converted key B is generated from the base key A.

Elements $b_0$ to $b_{15}$ of the converted key B become data which receives the influence of elements $a_0$ to $a_{15}$ of the base key A, and the full diffusion property is ensured between the base key A and the converted key B. Further, since both (a) the full diffusion 4-bit function ($Df_4$) and (b) the 16-bit substitution function ($Bp_{16}$) have the involution property, the involution property is also ensured between the base key A and the converted key B.

Figure 51:
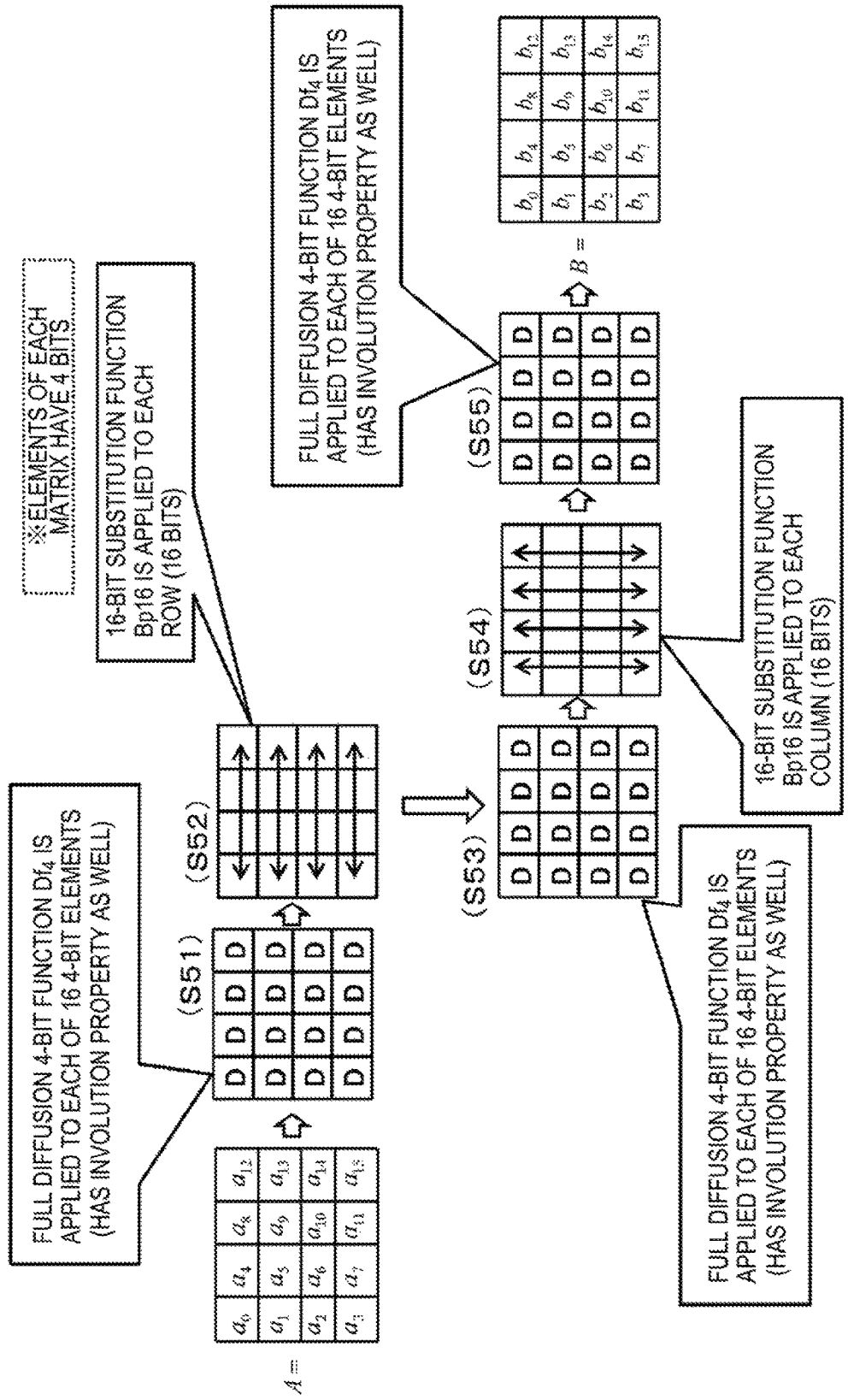
FIG. 51 is a diagram for describing an example of a key conversion process in which a full-diffusion 4-bit function and a 16-bit substitution function are applied.

FIG. 51 is a diagram illustrating an example (process example 5) in which the key conversion process in which the G function that is configured to include the following two functions and has the full diffusion property is applied:

(a) the full diffusion 4-bit function ($Df_4$); and
(b) the 16-bit substitution function ($Bp_{16}$).

A base key is assumed to be A and a converted key is assumed to be B. Both of the keys are 4×4 state data formed by 4-bit elements.

(a) The full diffusion 4-bit function ($Df_4$) applied in this process example 5 is a function that also has the involution property.

In the example illustrated in FIG. 51, the process of generating the converted key B from the base key A is configured to include the following 5 steps:

(S51) a step of applying the 4-bit function ($Df_4$) having the involution property and the full diffusion to each of 16 4-bit elements of the base key A for conversion;

(S52) a step of applying the 16-bit substitution function ($Bp_{16}$) to each piece of row 16-bit data of the data (4×4 state) generated through the conversion process of step S51 for conversion;

(S53) a step of applying the 4-bit function ($Df_4$) having the involution property and the full diffusion to each of the 16 4-bit elements of the data (4×4 state) generated through the conversion process of step S52 for conversion;

(S54) a step of applying the 16-bit substitution function ($Bp_{16}$) to each piece of column 16-bit data of the data (4×4 state) generated through the conversion process of step S53 for conversion; and (S55) a step of applying the 4-bit function ($Df_4$) having the involution property and the full diffusion to each of the 16 4-bit elements of the data (4×4 state) generated through the conversion process of step S54 for conversion.

Through such a process, the converted key B is generated from the base key A.

Elements $b_0$ to $b_{15}$ of the converted key B become data which receives the influence of elements $a_0$ to $a_{15}$ of the base key A, and the full diffusion property is ensured between the base key A and the converted key B. Further, since both (a) the full diffusion 4-bit function ($Df_4$) and (b) the 16-bit substitution function ($Bp_{16}$) have the involution property, the involution property is also ensured between the base key A and the converted key B.

The examples of the configurations of the 5 key conversion functions G from FIGS. 47 to 51 have been described.

These key conversion functions can be applied when the converted key is generated from the base key K and can also be applied to a conversion process on split keys generated by splitting the base key K described above with reference FIG. 42.

Further, the key conversion function which is applied to two split keys may be set differently.

Figure 52:
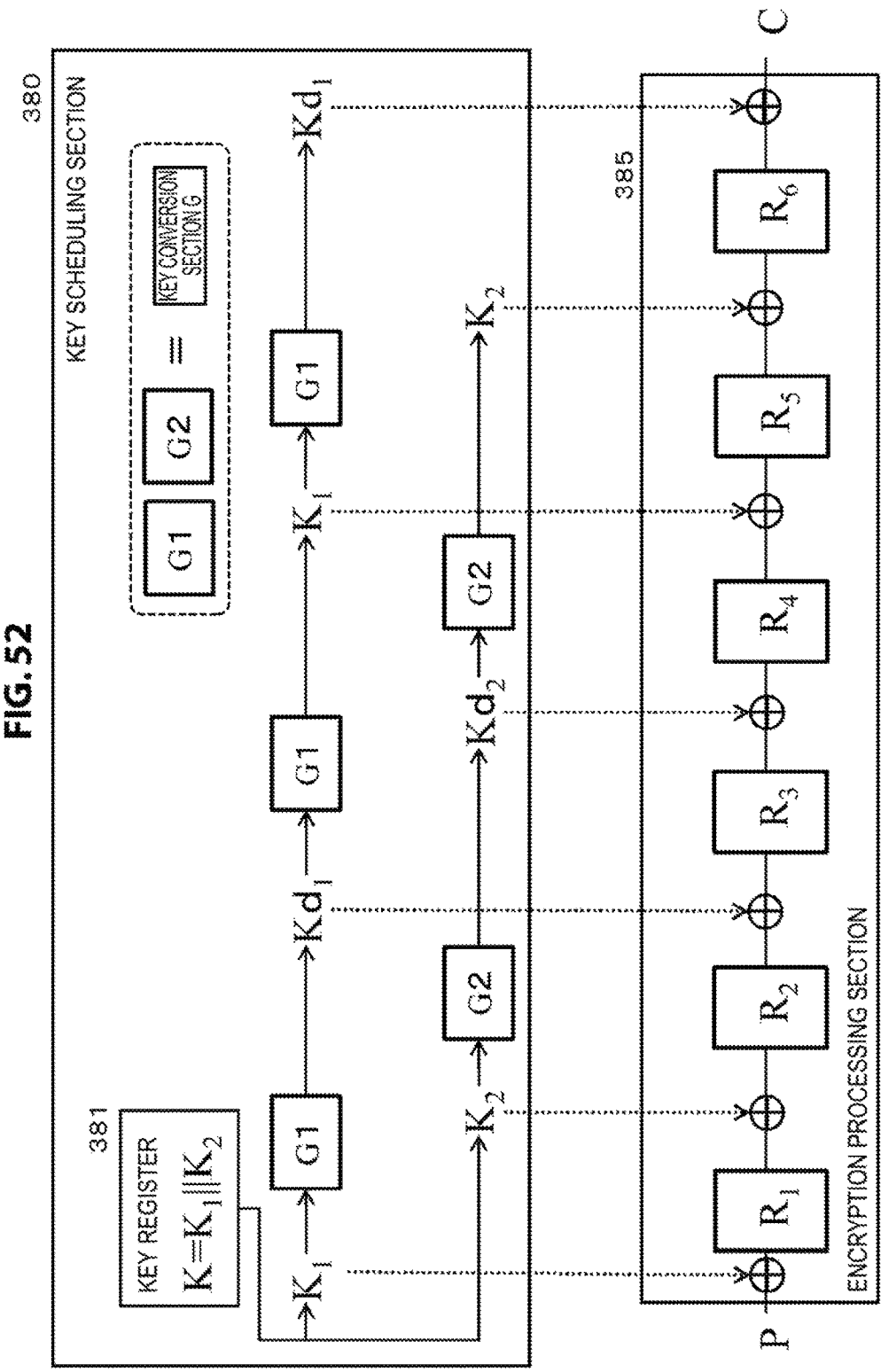
FIG. 52 is a diagram for describing a setting example of substitution functions G1 and G2 for split keys.

The encryption processing device illustrated in FIG. 52 includes the key scheduling section 380 and the encryption processing section 385. A private key K generated in advance is stored in a key register 381 of the key scheduling section 380.

The private key K is link data of keys $K_1$ and $K_2$.

For example, $K_1$ and $K_2$ are 64-bit keys and the private key K which is the link data is 128-bit data.

G1 and G2 illustrated in the drawing are key conversion sections.

These key conversion sections have at least the full diffusion property.

Alternatively, these key conversion sections have two characteristics, the full diffusion property and the involution property.

As combinations of the key conversion functions G1 and G2, for example, the following setting is possible:

(a) G1 and G2 have the full diffusion property without having the involution property;

(b) G1 and G2 have the full diffusion property and the involution property; and (c) G1 and G2 have the full diffusion property, and G1 and G2 are set as inverse functions, that is, a relation of G2=G1$^{-1}$.

As the combinations of the key conversion functions G1 and G2, the foregoing various kinds of setting are possible.

[6. Configuration for Realizing Improvement in Security by Constant Input]

Next, an encryption processing device for which a diffusion performance is improved by inputting a constant to an encryption processing section repeatedly executing a round operation and executing an operation on conversion target data or a round key and the constant will be described.

[6-1. Configuration for Realizing Improvement in Security by Constant Input and Problem in Related Art]

For configurations in which round operations by round functions are repeatedly executed, configurations in which a different constant is worked for each round in order to exclude the sameness of the conversion process for each round have been proposed in the related art.

Such a constant input process is said to be an effective method since resistance to an attack called a slide attack or a reflection attack is high.

First, an overview and a problem of a constant input configuration of the related art will be described.

Figure 53:
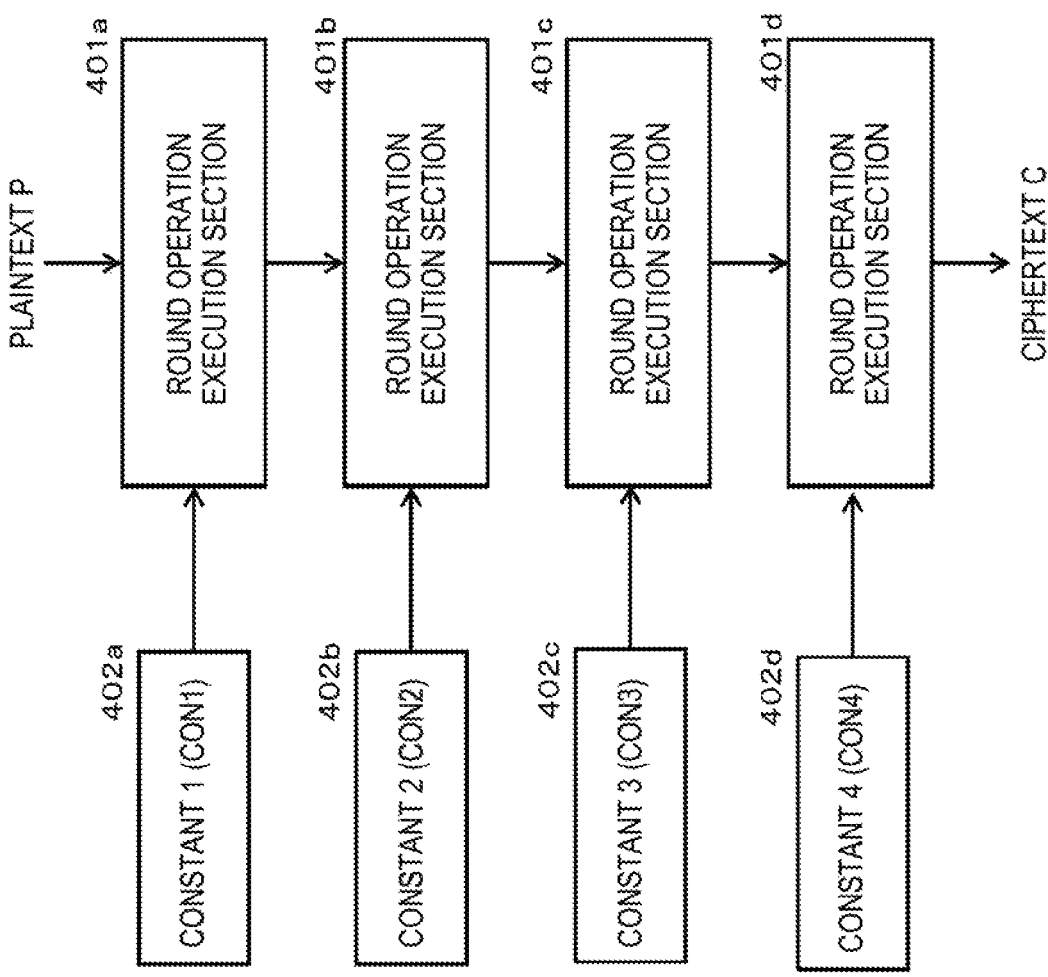
FIG. 53 is a diagram for describing an example of a constant input configuration in the encryption processing section.

As an example of the constant input configuration of the related art, for example, there is a configuration illustrated in FIG. 53.

Round operation execution sections 401a to 401d illustrated in FIG. 53 are round function execution sections that include nonlinear conversion sections, linear conversion sections, and exclusive-OR sections (round key operation sections) in encryption processing sections.

Constant 1 (CON1) to constant 4 (CON4) are sequentially input to the round operation sections 401a to 401d.

The input constants CON are subjected to exclusive-OR operations with round keys or converted data in the round operation sections.

In this way, the sameness between the round operations is excluded by executing the operations using various constants in the rounds, and thus it is possible to improve resistance to various attacks.

Next, a problem in such a constant input configuration will be described.

For an encryption processing device, an encryption process and a decryption process can be executed by the same device by devising setting of round functions.

Figure 54:
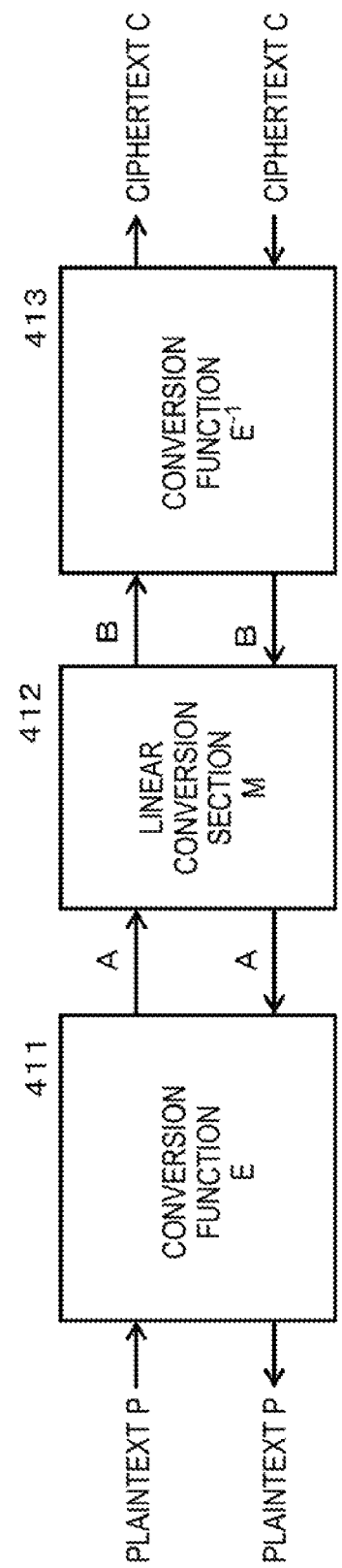
FIG. 54 is a diagram for describing an example of the configuration of the encryption processing section that has an involution property.

Specifically, as illustrated in FIG. 54, when a configuration of a plurality of conversion functions which are applied to an encryption processing section of an encryption processing device is divided into the right and left sides from the center, an encryption process and a decryption process can be executed with the same device by setting a relation of inverse functions between the left half and the right half.

This is called an encryption processing device that has the involution property.

In the example illustrated in FIG. 54, a conversion function E 411 and a conversion function $E^{-1}$ 413 have a relation of inverse functions. A central linear conversion section M outputs an output B for an input A and outputs an output A for an input B.

The ciphertext C can be obtained by applying the conversion function E 411, the linear conversion section 412, and the conversion function $E^{-1}$ 413 to the plaintext P in this sequence.

The conversion sections are applied to the ciphertext C in the same sequence. That is, the original plaintext P can be obtained by applying the conversion function E 411, the linear conversion section 412, and the conversion function $E^{-1}$ 413 in this sequence.

Such encryption processing devices are referred to as encryption processing devices that have the involution property. Of the encryption processing devices that have the involution property, there are encryption processing devices in which execution sequences of round functions are the same sequence in the forward direction and the backward direction and input sequences of round keys which are applied in rounds are also the same in the forward direction and the backward direction.

For example, the key input sequence described above with reference to FIG. 43 is one key input sequence in which the involution property of the encryption processing device is realized.

However, as one problem of the encryption processing device that has such an involution property, there is a problem of security.

Figure 55:
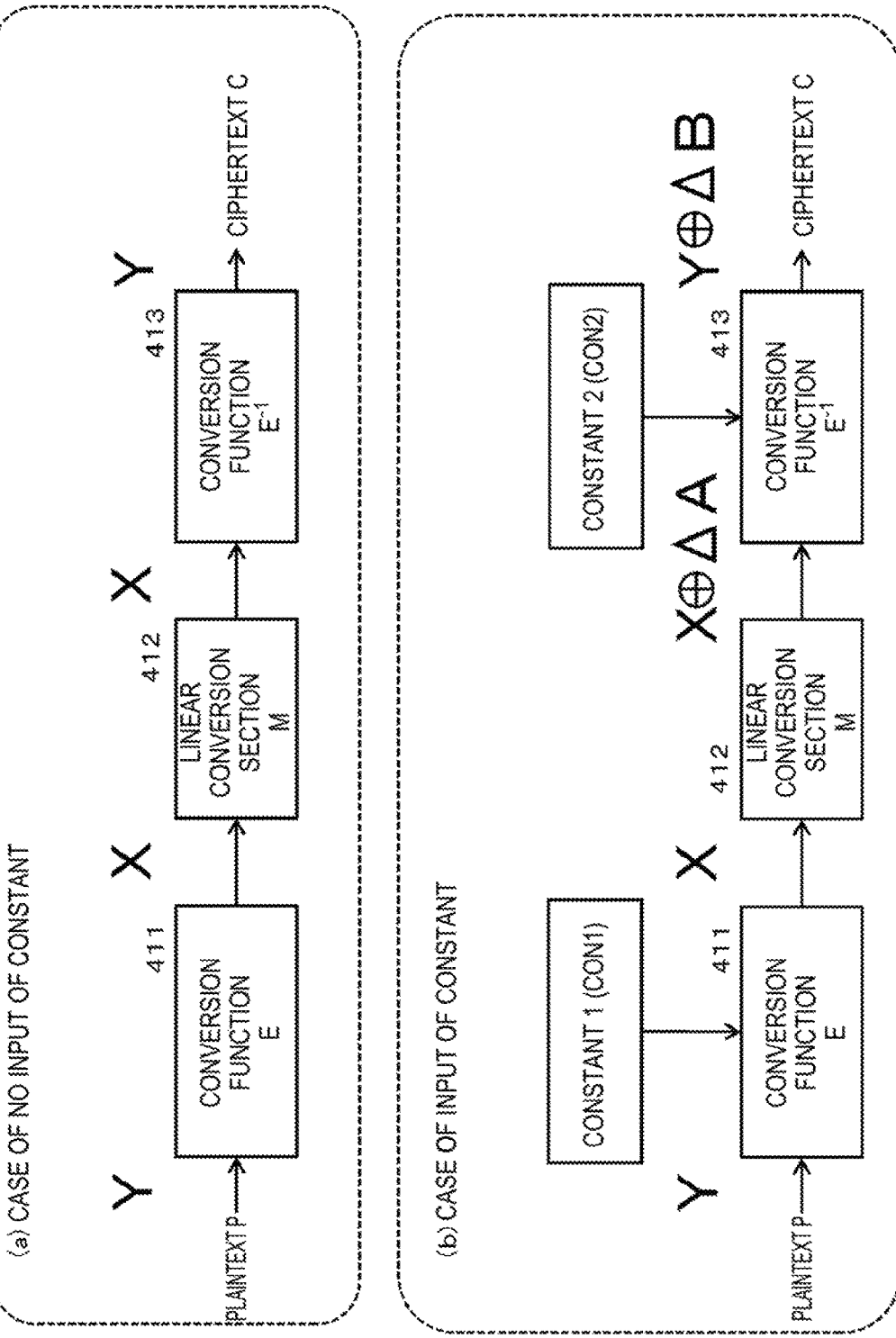
FIG. 55 is a diagram for describing a problem of the configuration of the encryption processing section that has the involution property.

This problem will be described with reference to FIG. 55.

FIG. 55(a) is a diagram for describing a relation between data input and output values of the conversion sections when no constant is input to the encryption processing device that has the involution property.

Partial configuration data of the plaintext P=Y is assumed.

A conversion result of the conversion function E 411 with respect to the data Y is assumed to be X.

The linear conversion section 412 executes the linear conversion on output values from the conversion function E 411, but values of the partial configuration data (bits) are output without being changed in some cases. Points at which the input and output values are the same in the linear conversion are referred to as fixed points. There are several fixed points in linear conversion processes which are applied in many encryption processing devices.

In the example illustrated in FIG. 55(a), input values X to the linear conversion section 412 are assumed to be outputs X of the linear conversion section 412 without change due to working of fixed points of the linear conversion section 412.

In this case, the values X are input to the conversion function $E^{-1}$ 413. Since the conversion function $E^{-1}$ 413 is an inverse function of the conversion function E 411, the input values X return to the original values Y.

That is, partial output values Y that form the ciphertext C become the same values as the configuration values Y of the input plaintext P. That is, fixed points at which the input and output values are not changed occur in the entire encryption processing device.

This nature is a nature which causes weakness against various attacks and is an unpreferable nature which may damage security of the encryption processing device.

In FIG. 55(b), an encryption processing device is the encryption processing device that has the involution property as in FIG. 55(a), but has a configuration in which an operation at the time of input of the constant 1 (CON1) to the conversion function E 411 is executed and an operation at the time of input of the constant 2 (CON2) to the conversion function $E^{-1}$ 413 is executed.

A relation between data input and output values of the conversion sections at the time of inputting such constants is illustrated.

Partial configuration data of the plaintext P=Y is assumed.

A conversion result of the conversion function E 411 with respect to the data Y is assumed to be X.

In this example, the input value X to the linear conversion section 412 is assumed to be converted into X+AA through the linear conversion process by the linear conversion section 412.

In this case, the value X+AA is input to the conversion function $E^{-1}$ 413. The conversion function $E^{-1}$ 413 is an inverse function of the conversion function E 411, has a configuration in which an operation at the time of input of the constant 2 (CON2) is executed, and is not a complete inverse function of the conversion function E 411 that executes an operation at the time of input of the constant 1 (CON1).

However, depending on a constant selection method, as illustrated in the drawing, an output value corresponding to the input X+ΔA to the conversion function $E^{-1}$ 413 is set to be the same as Y+ΔB in some cases.

That is, correspondence of the input and output values of the linear conversion section is X and X+ΔA and correspondence of the input and output values of the encryption processing device is Y and Y+ΔB.

In this way, relevance in which specific difference data is added to input data occurs in some cases.

The relevance between the input and output data is also a nature which causes weakness against various attacks and is an unpreferable nature which may damage security of the encryption processing device.

[6-2. Configuration of Encryption Processing Device having Constant Input Configuration in which Security is High]

Next, the configuration of the encryption processing device that has a constant input configuration in which the problem of the configuration of the related art is solved and security is high will be described.

An example of the configuration of the encryption processing device according to the embodiment will be described with reference to FIG. 56 and the subsequent drawings.

Figure 56:
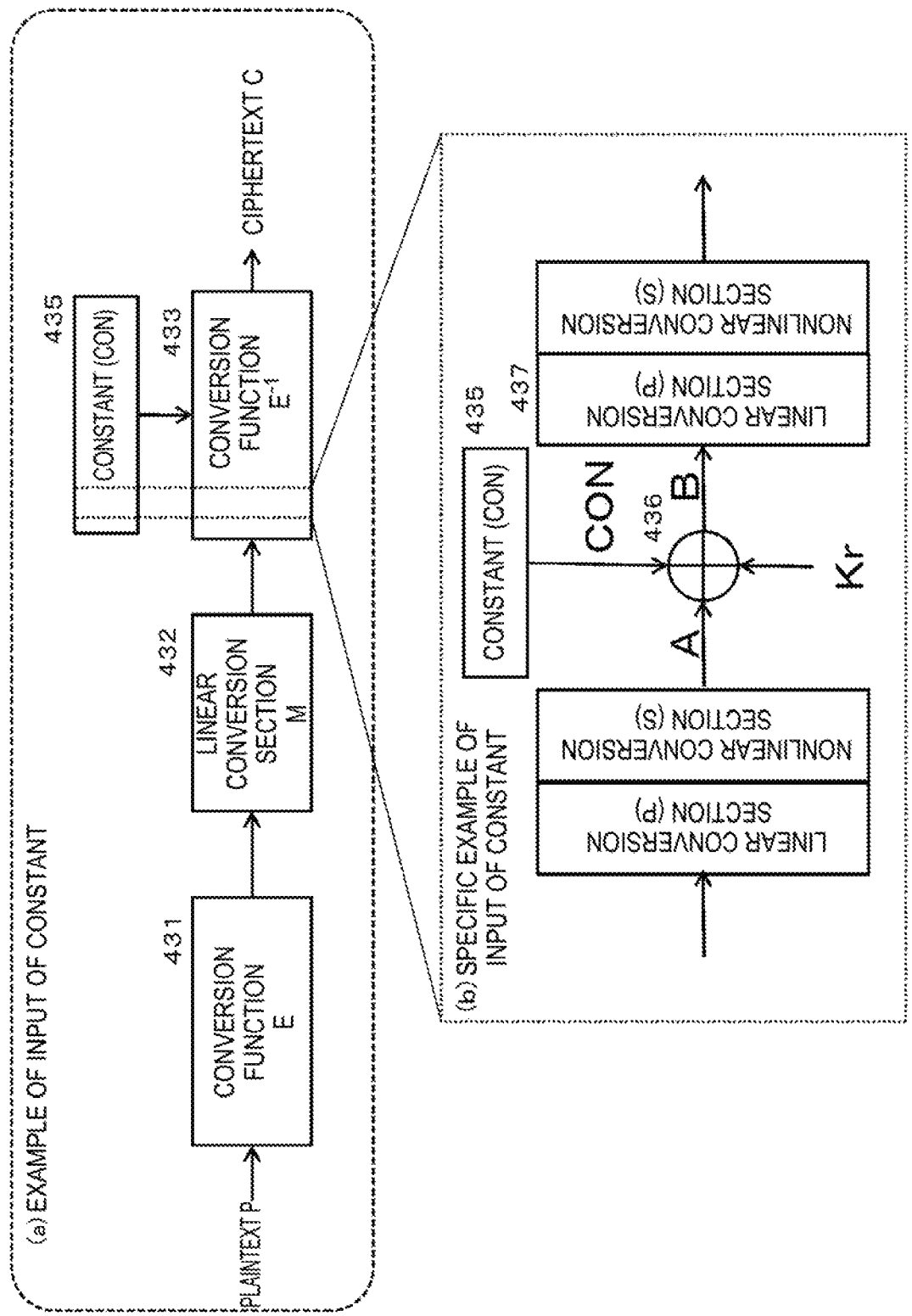
FIG. 56 is a diagram for describing an example of the constant input configuration in the encryption processing section.

FIG. 56 is a diagram for describing an example of a constant input configuration in an encryption processing section according to the embodiment.

In FIG. 56(*a*), the encryption processing section including data conversion sections that have the involution property is illustrated as in the description made with reference to FIG. 54.

That is, the encryption processing section includes the following data conversion sections:

a conversion function E 431;
a linear conversion section 432; and
a conversion function $E^{-1}$ 433.

The conversion function $E^{-1}$ 433 is an inverse function of the conversion function E 431.

In the embodiment, a constant (CON) 435 is input to the conversion function $E^{-1}$ 433.

The conversion function $E^{-1}$ 433 is configured to include a plurality of round functions and the constant (CON) is configured to be input to one or more round function sections.

In the embodiment described herein, as setting of the input section for the constant (CON), the constant is input to the conversion function $E^{-1}$ 433, but the constant may be set to be input to the side of the conversion function E 431.

That is, the encryption processing section has the involution property in which the conversion function E 431 and the conversion function $E^{-1}$ 433 which is an inverse function of the conversion function E 431 are sequentially executed and has a configuration in which a round operation in which the constant is applied once or more is executed in only one of the conversion function E and the inverse function $E^{-1}$.

FIG. 56(*b*) illustrates a specific example of the input configuration of the constant (CON) 435. The constant (CON) 435 is input to an exclusive-OR section 436 at the previous stage of a linear conversion section 437 of the encryption processing section and an exclusive-OR operation is executed with the input data A to the exclusive-OR section 436.

The exclusive-OR section 436 is a round key operation section that executes an exclusive-OR operation with a round key Kr. The exclusive-OR section 436 executes the exclusive-OR operation on data A which is an output from the round operation section at the previous stage illustrated in the drawing, the round key Kr, and the constant CON.

That is, the exclusive-OR section 436 calculates B as an execution result of the following operation and outputs the execution result to the linear conversion section 437 of the round operation section at the rear stage:

$$B = A(+)Kr(+)CON.$$

In the foregoing formula, (+) indicates the exclusive-OR operation.

In this configuration, the following condition is set as a condition of the constant (CON) 435 to be input:

condition: a difference between the input and output values is set to a value which does not decrease in the linear conversion process of the linear conversion section adjacent to the exclusive-OR section 437, that is, the linear conversion section 437 in the example illustrated in the drawing.

The foregoing condition is that all of the elements obtained as the result of a matrix operation on the constant CON and a linear conversion matrix which is applied in the linear conversion section 437 are nonzero, that is, values which are not zero.

This condition will be described with reference to FIG. 57.

Figure 57:
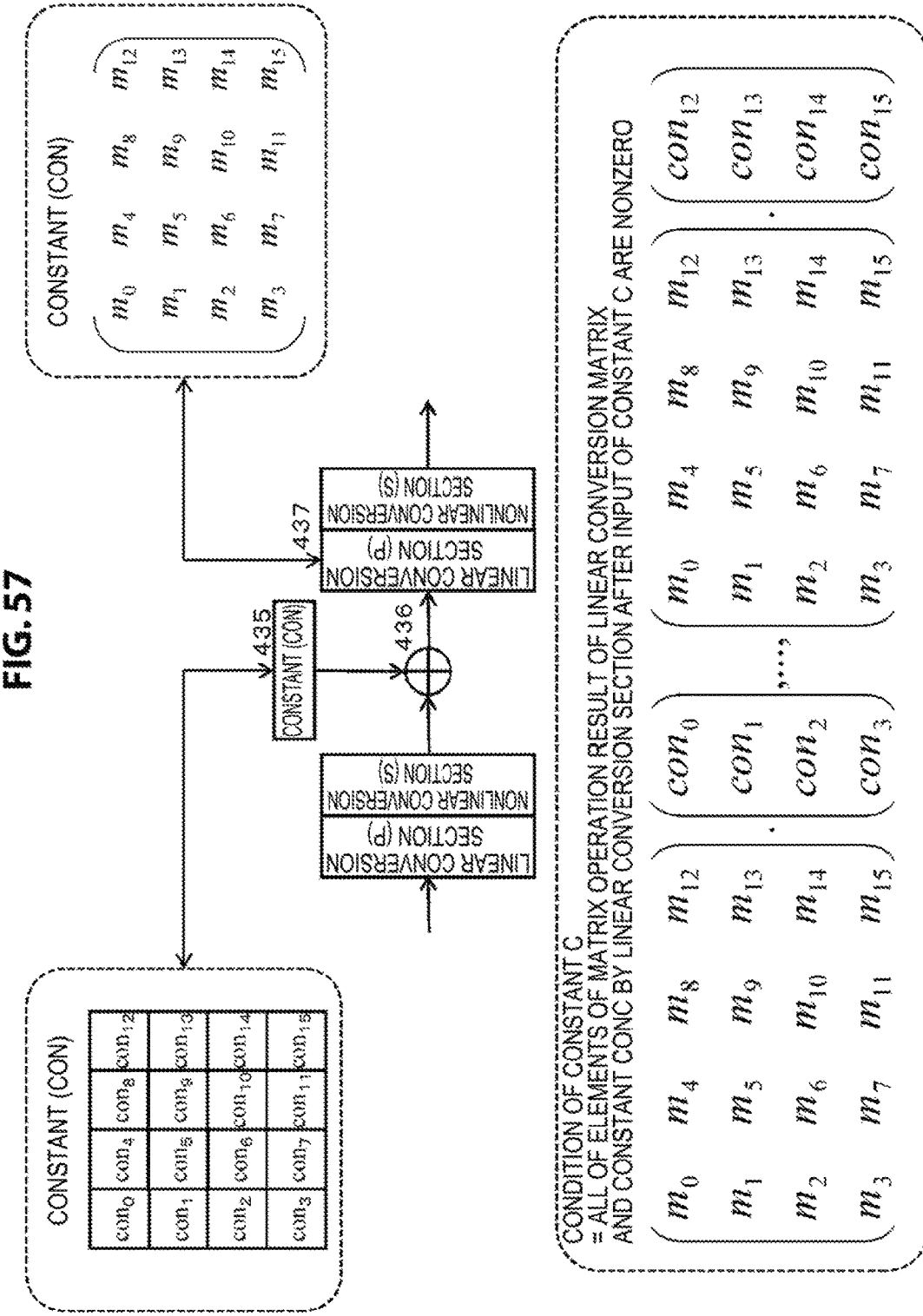
FIG. 57 is a diagram for describing an example of a constant input configuration in the encryption processing section.

FIG. 57 illustrates a 4×4 matrix in which conversion function E 431 forms the constant CON 435 to be input to the exclusive-OR section 436 and a linear conversion matrix M employed in the linear conversion section 437.

The constant CON 435 is a 4×4 state in which each of the elements ($con_0$ to $con_{15}$) is O-bit data and is 64-bit data.

The linear conversion matrix M is 4×4 matrix data.

That is, the linear conversion matrix is the linear conversion matrix shown below.

$$\begin{pmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{pmatrix} \qquad \text{[Math. 12]}$$

The condition of the constant CON is that all of the elements obtained as the result of the matrix operation on the constant CON and the linear conversion matrix which is applied in the linear conversion section 437 are nonzero, that is values which are not zero.

That is, values obtained through the following matrix operation are all nonzero.

$$\begin{pmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{pmatrix} \cdot \begin{pmatrix} con_0 \\ con_1 \\ con_2 \\ con_3 \end{pmatrix}, \ldots, \qquad \text{[Math. 13]}$$

$$\begin{pmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{pmatrix} \cdot \begin{pmatrix} con_{12} \\ con_{13} \\ con_{14} \\ con_{15} \end{pmatrix}$$

The constant CON is set such that none of the 16 values calculated by the foregoing matrix operation formula is zero, that is, all are nonzero.

In such setting, it is possible to prevent a reduction in the difference between the input and output values of the linear conversion process in the linear conversion section adjacent to the exclusive-OR section to which the constant CON is input, that is, the linear conversion section 437 in the example illustrated in FIG. 57. As a result, it is possible to maintain the minimum number of differential active S-boxes at a predetermined number or more.

A specific setting example of the constant CON will be described with reference to FIG. 58.

Figure 58:
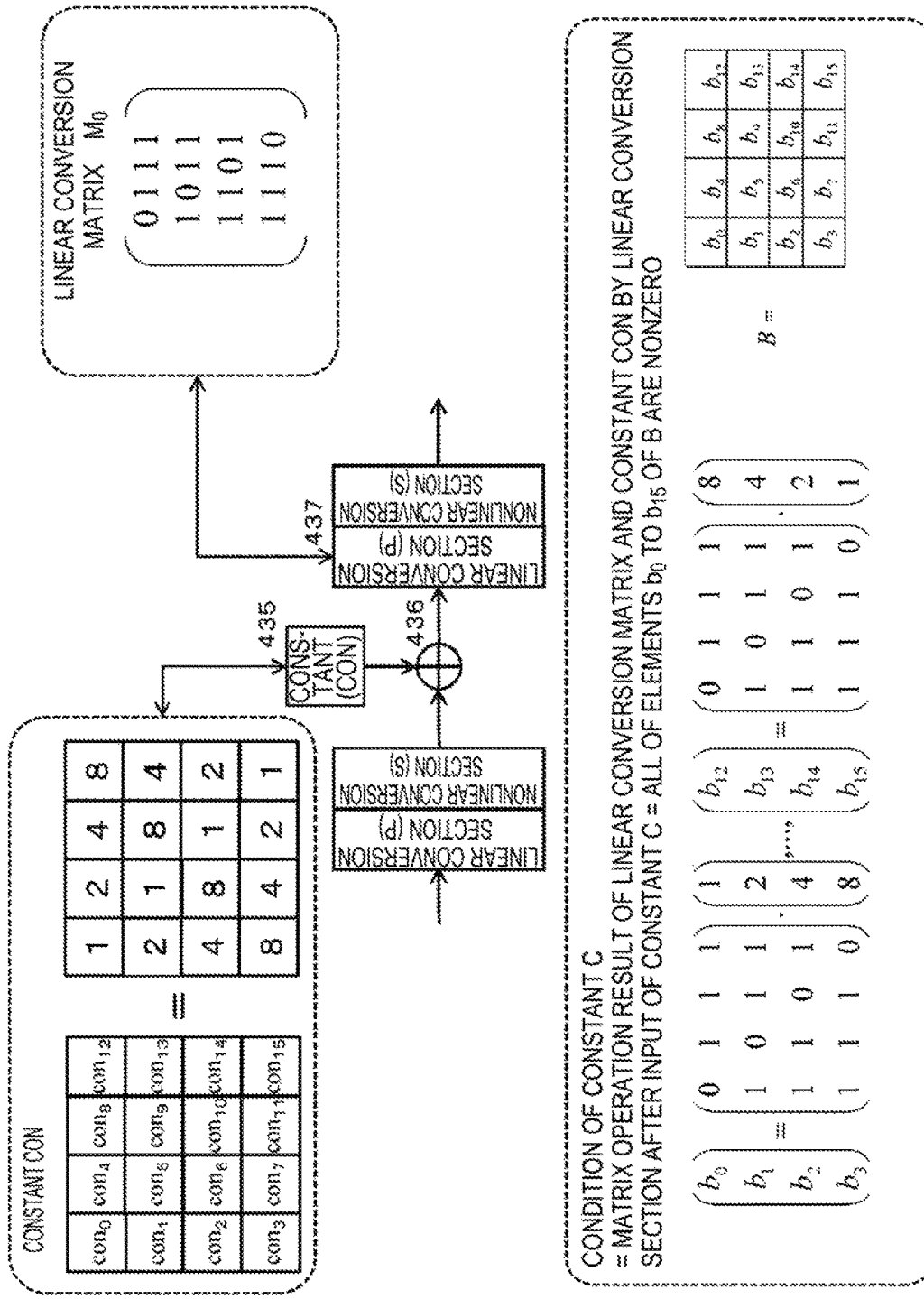
FIG. 58 is a diagram for describing an example of a constant input configuration in the encryption processing section.

The example illustrated in FIG. 58 is setting in which the linear conversion section 437 adjacent to the exclusive-OR section 436 to which the constant CON 435 is input is set to the linear conversion section P1 described above with reference to FIGS. 23 to 30. That is, the example is a setting example in which a column diffusion operation (MixColumn) in which the following matrix is applied is executed.

$$M_0 = \begin{pmatrix} 0 & 1 & 1 & 1 \\ 1 & 0 & 1 & 1 \\ 1 & 1 & 0 & 1 \\ 1 & 1 & 1 & 0 \end{pmatrix}$$ [Math. 14]

The linear conversion section 437 executes a column diffusion operation (MixColumn) in which the foregoing matrix $M_0$ is applied, that is:

MC[$M_0$].

At this time, the condition of the constant CON is that all of the elements obtained as the result of a matrix operation on the constant CON and a linear conversion matrix $M_0$ which is applied in the linear conversion section 437 are nonzero, that is, values which are not zero.

The example of the constant CON is the constant CON illustrated in FIG. 58 and is a 4×4 state that has the following element configuration.

$$\begin{array}{|c|c|c|c|} \hline con_0 & con_4 & con_8 & con_{12} \\ \hline con_1 & con_5 & con_9 & con_{13} \\ \hline con_2 & con_6 & con_{10} & con_{14} \\ \hline con_3 & con_7 & con_{11} & con_{15} \\ \hline \end{array} = \begin{array}{|c|c|c|c|} \hline 1 & 2 & 4 & 8 \\ \hline 2 & 1 & 8 & 4 \\ \hline 4 & 8 & 1 & 2 \\ \hline 8 & 4 & 2 & 1 \\ \hline \end{array}$$ [Math. 15]

The constant of the 4×4 state that has the foregoing setting is input to the exclusive-OR section adjacent to the linear conversion section that executes the column diffusion operation (MixColumn): Mc [$M_0$] in which the matrix $M_0$ is applied, and the exclusive-OR operation is executed. In this configuration, a reduction in the difference by the linear conversion of the linear conversion section is prevented. As a result, it is possible to prevent a reduction in the minimum number of differential active S-boxes. Thus, the encryption processing configuration in which resistance to various attacks is high and security is high is realized.

Figure 59:
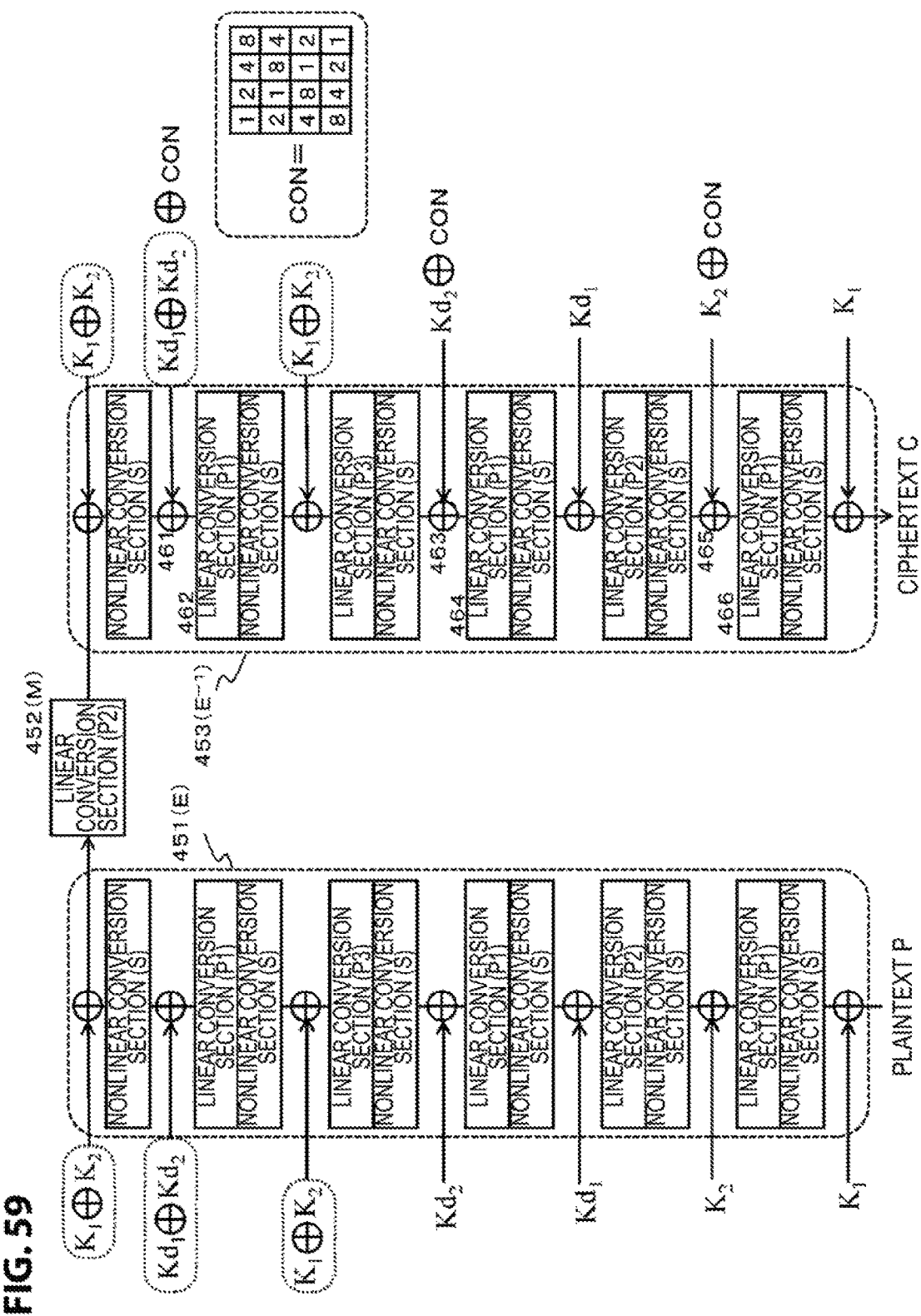
FIG. 59 is a diagram for describing an example of a constant input configuration in the encryption processing section.

FIG. 59 is a diagram illustrating an operation configuration example and an input configuration of the round keys and the constant CON in the encryption processing section of the encryption processing device that has the input configuration of the constant CON satisfying the foregoing constant condition.

In FIG. 59, the plaintext P is input from the bottom left and the ciphertext C is output from the bottom right.

An encryption processing section 451(E) of the encryption processing device illustrated in FIG. 59 corresponds to the conversion function E 431 illustrated in FIG. 56(*a*).

A linear conversion section (P2) 452 corresponds to the linear conversion section 432 illustrated in FIG. 56(*a*).

An encryption processing section 453 ($E^{-1}$) corresponds to the conversion function $E^{-1}$ 433 illustrated in FIG. 56(*a*).

The encryption processing device having the configuration illustrated in FIG. 59 is an encryption processing device that has the involution property.

The input example of the round keys illustrated in FIG. 59 corresponds to the example of the configuration described above with reference to FIG. 43. That is, the input sequence of the round keys to the exclusive-OR sections included in the encryption processing section is as follows:

the key $K_1$;
the key $K_2$;
the converted key $Kd_1$;
the converted key $Kd_2$;
the exclusive-OR operation key $K_1$ (+) $K_2$;
the exclusive-OR operation converted key $Kd_1$ (+) $Kd_2$;
the exclusive-OR operation key $K_1$ (+) $K_2$;
the exclusive-OR operation key $K_1$ (+) $K_2$;
the exclusive-OR operation converted key $Kd_1$ (+) $Kd_2$;
the exclusive-OR operation key $K_1$ (+) $K_2$;
the converted key $Kd_2$;
the converted key $Kd_1$;
the key $K_2$; and
the key $K_1$.

In the setting illustrated in FIG. 43, the exclusive-OR operation key $K_1$ (+) $K_2$ is set to be input to the round operation section $R_6$. In the example illustrated in FIG. 59, however, the exclusive-OR operation key $K_1$ (+) $K_2$ is set to be input repeatedly before and after the linear conversion section 452.

The configuration illustrated in FIG. 59 corresponds to a configuration in which the round operation section $R_6$ illustrated in FIG. 43 is set as a round operation section configured to include the following conversion sections:

the linear conversion section 452;
an exclusive-OR section of two exclusive-OR operation keys $K_1$ (+) $K_2$ before and after the linear conversion section 452; and
a nonlinear conversion section.

The round key supply section of the key scheduling section outputs 6 kinds of keys in the foregoing sequence. The input sequence of these keys and its reverse sequence are the same sequence.

This means that the key input sequence in the encryption process of generating the ciphertext C from the plaintext P and the key input sequence in the decryption process of generating the plaintext P from the ciphertext C can be set to be the same. That is, this key input sequence is the key input sequence having the involution property, hardware or programs which are applied to the encryption process and the decryption process can be common, and thus the setting contributes to lightweightness (miniaturization) of the device.

In the configuration illustrated in FIG. 59, the constant CON is input to the exclusive-OR sections, the exclusive-OR section 461, the exclusive-OR section 463, and the exclusive-OR section 465 of the encryption processing section 453 ($E^{-1}$).

The constant CON is, for example, a constant CON of the 4×4 state described with reference to FIG. 58.

All of the linear conversion sections 462, 464, and 466 adjacent to the three exclusive-OR sections 461, 463, and 465 execute the column diffusion operation (MixColumn) in which the above-described matrix $M_0$ is applied, that is:

$$MC[M_0].$$

The encryption processing section illustrated in FIG. 59 has the involution property in which the plaintext P can also be generated from the ciphertext C by executing the reverse sequence to the sequence in which the ciphertext C is generated from the plaintext P, and can execute the encryption process and the decryption process by applying the same hardware or the same program.

Since the key input sequence is also the same sequence in the encryption and decryption processes, the key supply process of the key scheduling section can also be executed as a process in which the same hardware or the same program is applied.

In the above-described constant input configuration, it is possible to prevent a reduction in the minimum number of differential active S-boxes. Thus, the encryption processing configuration in which resistance to various attacks is high and security is high is realized.

An evaluation process based on the active S-boxes in a general encryption process and an evaluation process based on the active S-boxes in the constant input configuration according to the present disclosure are slightly different. This difference will be described with reference to FIGS. 60 and 61.

As described above, an S-box that executes the nonlinear conversion in an s-bit unit is used in the nonlinear conversion section set with the common key block encryption.

As an index for realizing resistance to a differential attack, there is the minimum number of differential active S-boxes, that is, the minimum number of differential active S-boxes included in a differential path expressing a difference connection relation.

In general block encryption, nonlinear conversion is only a part of a process by an S-box. As illustrated in (A) and (B) of FIG. 60, in a block encryption device that executes the block encryption, data P1 and data P2 having a specific difference $\Delta X$ are individually input and encryption processing results C1 and C2 are obtained.

In the two encryption processes (A) and (B), an S-box to which a difference value is input is defined as an active S-box. Analysis facilitation is improved by specifying the S-box to which the difference value is input. That is, resistance to an attack is weakened.

Figure 60:
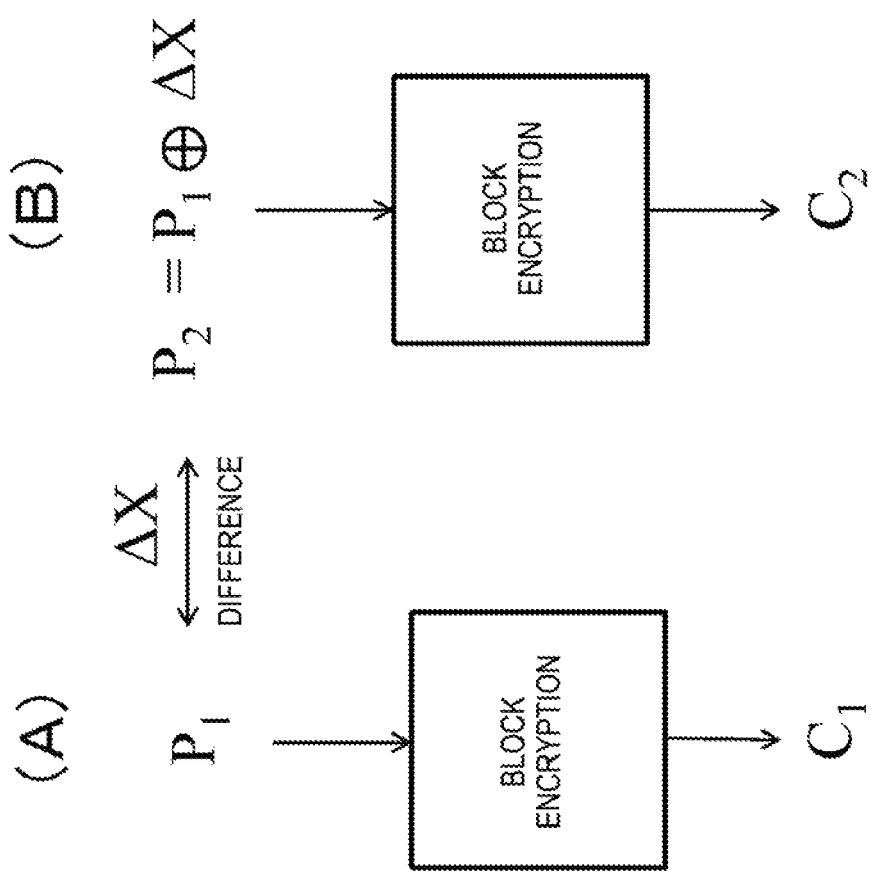
FIG. 60 is a diagram for describing a security evaluation process based on active S-boxes.

In general, the number of S-boxes to which the difference value occurring at the time of setting of two inputs P1 and P2 having the predetermined difference $\Delta X$, as illustrated in FIG. 60, is input is defined as active S-boxes. Security is evaluated by counting this number.

Figure 61:
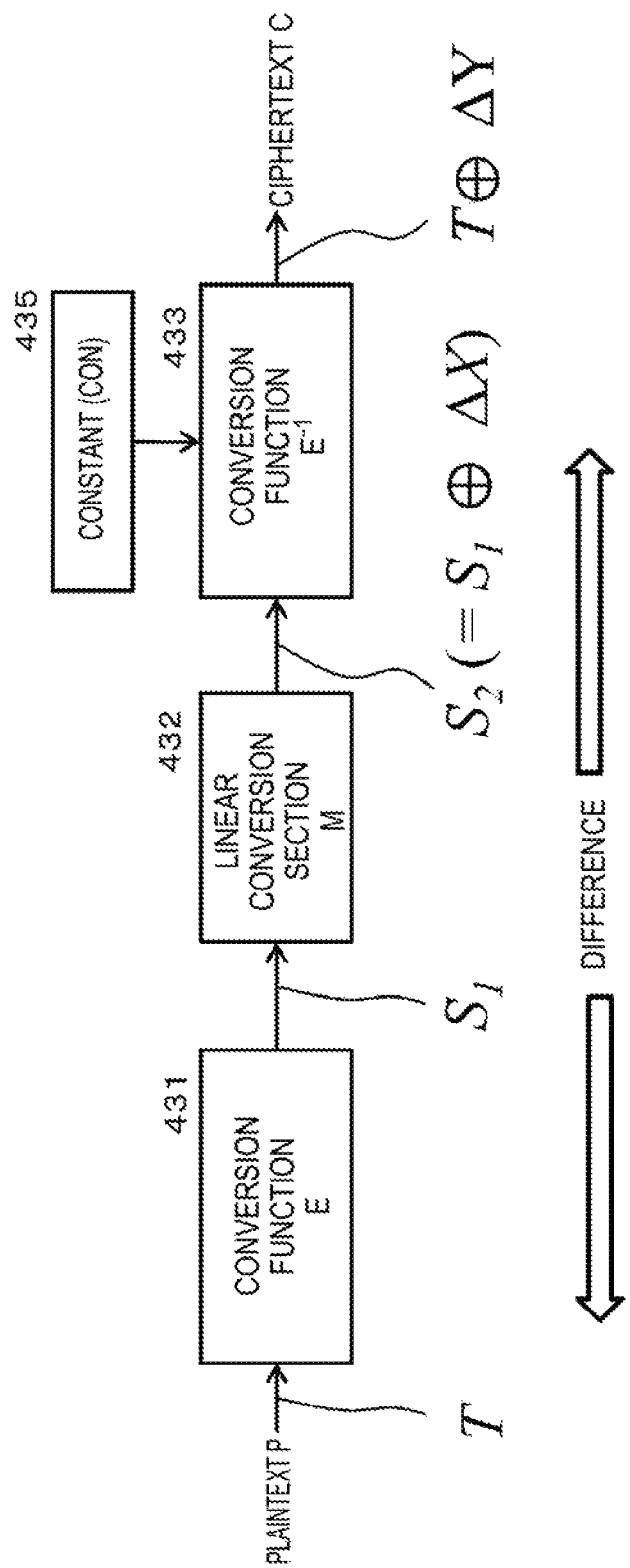
FIG. 61 is a diagram for describing a security evaluation process based on active S-boxes.

FIG. 61 illustrates an encryption processing section configured to include data conversion sections having the involution property illustrated in FIG. 56(a) described above.

That is, the encryption processing section includes the following data conversion sections:
the conversion function E 431;
the linear conversion section 432; and
the conversion function $E^{-1}$ 433.

The conversion function $E^{-1}$ 433 is an inverse function of the conversion function E 431.

The constant (CON) 435 is input to the conversion function $E^{-1}$ 433.

The conversion function $E^{-1}$ 433 is configured to include a plurality of round functions and the constant (CON) is input to one or more round function sections.

The encryption processing section has the involution property in which the conversion function E 431 and the conversion function $E^{-1}$ 433 which is an inverse function of the conversion function E 431 are sequentially executed and a round operation in which the constant is applied once or more is executed in only one of the conversion function E and the inverse function $E^{-1}$.

In this configuration, an input $S_1$ is input from the side of the linear conversion section 432 to the conversion function E 431 to obtain an output T.

On the other hand, similarly, an input $S_2$ (=$S_1$ (+) $\Delta X$) obtained by adding the difference value $\Delta X$ to the foregoing input value $S_1$ is input from the side of the linear conversion section 432 to the conversion function $E^{-1}$ 433 to obtain an output T (+) $\Delta Y$.

When the input values S1 and S2 having the difference $\Delta X$ in the backward direction are input to the two functions, that is, the conversion function E 431 and the conversion function $E^{-1}$ 433 which is an inverse function of the conversion function E 431, as illustrated in FIG. 61, the S-box to which the difference is input among the S-boxes located at correspondence positions of the functions is set to an active S-box.

Figure 62:
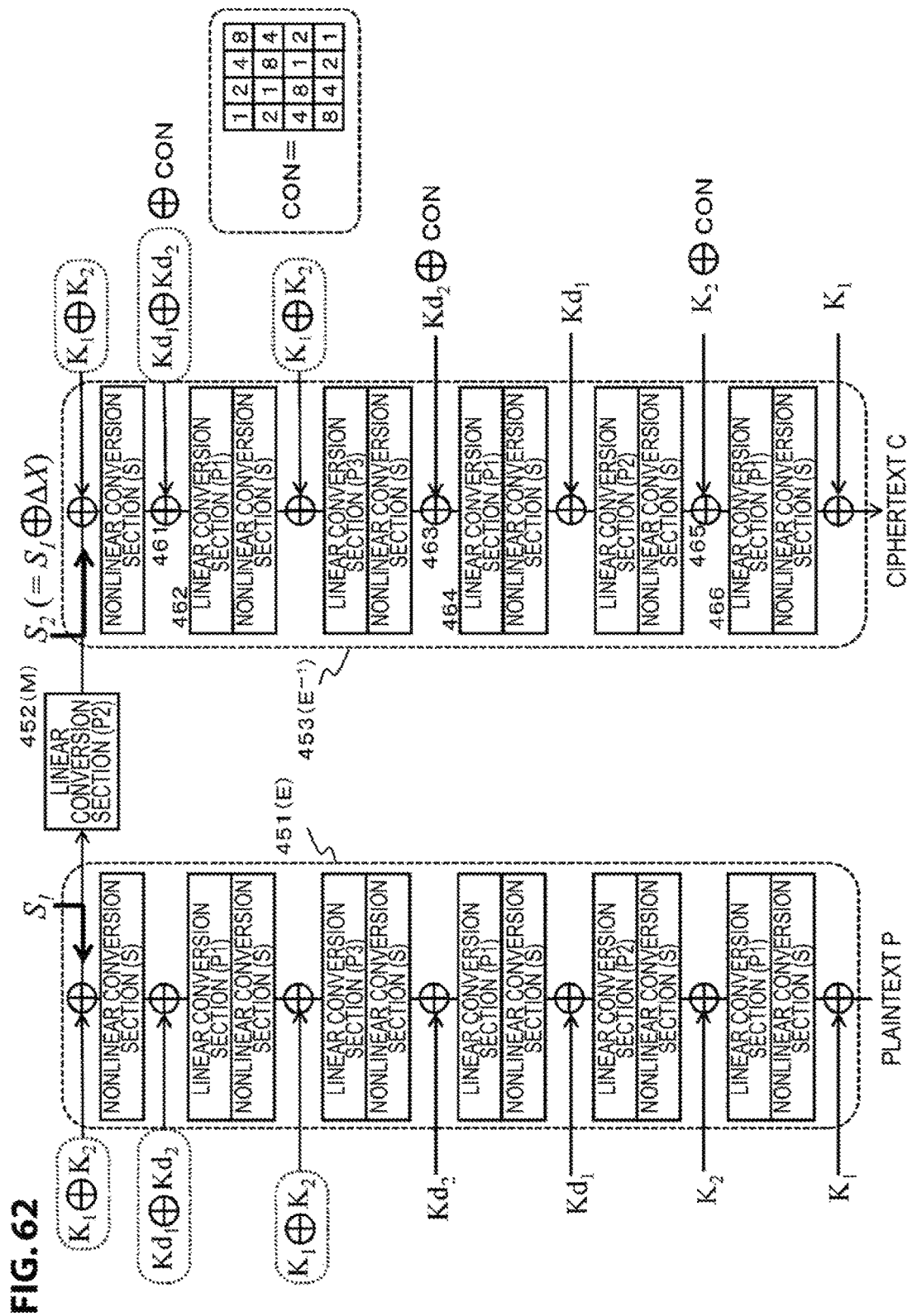
FIG. 62 is a diagram for describing a security evaluation process based on active S-boxes.

FIG. 62 is a diagram for describing a configuration in which the number of active S-boxes is counted in the encryption processing configuration illustrated in FIG. 59 described above.

The input value S1 is input from the side of the linear conversion section 452 of the encryption processing section 451 (E) of the encryption processing device illustrated in FIG. 62, and an encryption process in which the encryption processing section 451 (E) is applied is executed.

The input value S2 in which the difference $\Delta X$ is set in the input value S1 is input from the side of the linear conversion section 452 of the encryption processing section 453 ($E^{-1}$) which is an inverse function of the encryption processing section 451 (E), and an encryption process in which the encryption processing section 453 ($E^{-1}$) is applied is executed.

The S-box to which the difference is input among the S-boxes located at the correspondence positions of the encryption processing sections (E) and ($E^{-1}$) in the two encryption processes is set to an active S-box.

When the number of active S-boxes is reduced, for example, resistance to an attack called a slide attack or a reflection attack is weakened. Thus, by maintaining the number of active S-boxes at a given number, it is possible to improve the resistance to such an attack, and thus it is possible to improve security. In the above-described constant input configuration, it is possible to prevent a reduction in the number of differential active S-boxes. Thus, the encryption processing configuration in which resistance to various attacks is high and security is high is realized.

[6-3. Variation of Input Insertion Position]

In the above-described embodiment, the configuration for executing the round operation in which the constant CON is input to only one of the function E and the inverse function and the constant is applied in the encryption processing device that has the involution property in which the data conversion function E and the inverse function $E^{-1}$ of the data conversion function E are sequentially executed has been described.

In such setting, it is possible to prevent a reduction in the difference between the input and output values of the linear conversion process in the linear conversion section adjacent to the exclusive-OR section to which the constant CON is input, that is, the linear conversion section 437 in the example illustrated in FIG. 57. As a result, it is possible to maintain the minimum number of differential active S-boxes at a predetermined number or more.

The constant input configuration is not limited to only one of the function E and the inverse function $E^{-1}$, but a configuration in which the round operation in which the constant is applied once or more is executed in both the function E and the inverse function $E^{-1}$ may be used. However, a constant application position is set as a deviated position from a correspondence position (non-correspondence position) which is not the correspondence position of the function E and the inverse function $E^{-1}$.

Figure 63:
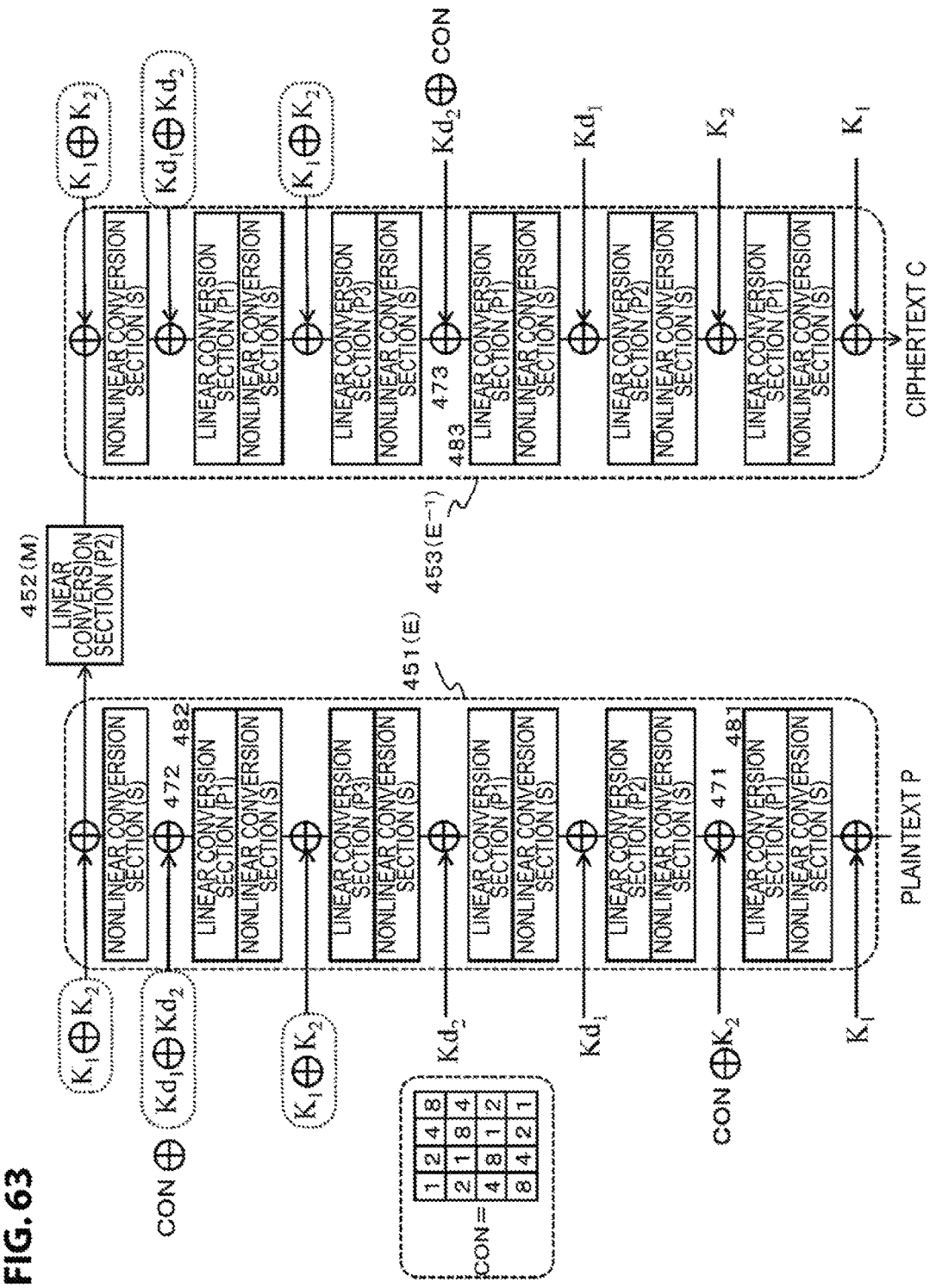
FIG. 63 is a diagram for describing an example of a constant input configuration in the encryption processing section.

An example of the configuration of the encryption processing device having the constant input configuration is illustrated in FIG. 63.

In FIG. 63, the plaintext P is input from the bottom left and the ciphertext C is output from the bottom right.

An encryption processing section 451(E) of the encryption processing device illustrated in FIG. 63 corresponds to the conversion function E 431 illustrated in FIG. 56(*a*).

A linear conversion section (P2) 452 corresponds to the linear conversion section 432 illustrated in FIG. 56(*a*).

An encryption processing section 453 ($E^{-1}$) corresponds to the conversion function $E^{-1}$ 433 illustrated in FIG. 56(*a*).

The encryption processing section having the configuration illustrated in FIG. 63 is an encryption processing section that has the involution property.

The input example of the round keys illustrated in FIG. 63 corresponds to the example of the configuration described above with reference to FIG. 43. That is, the input sequence of the round keys to the exclusive-OR sections included in the encryption processing section is as follows:

the key $K_1$;
the key $K_2$;
the converted key $Kd_1$;
the converted key $Kd_2$;
the exclusive-OR operation key $K_1$ (+) $K_2$;
the exclusive-OR operation converted key $Kd_1$ (+) $Kd_2$;
the exclusive-OR operation key $K_1$ (+) $K_2$;
the exclusive-OR operation key $K_1$ (+) $K_2$;
the exclusive-OR operation converted key $Kd_1$ (+) $Kd_2$;
the exclusive-OR operation key $K_1$ (+) $K_2$;
the converted key $Kd_2$;
the converted key $Kd_1$;
the key $K_2$; and
the key $K_1$.

In the setting illustrated in FIG. 43, the exclusive-OR operation key $K_1$ (+) $K_2$ is set to be input to the round operation section $R_6$. In the example illustrated in FIG. 63, however, the exclusive-OR operation key $K_1$ (+) $K_2$ is set to be input repeatedly before and after the linear conversion section 452.

The configuration illustrated in FIG. 63 corresponds to a configuration in which the round operation section $R_6$ illustrated in FIG. 43 is set as a round operation section configured to include the following conversion sections:

the linear conversion section 452;
an exclusive-OR section of two exclusive-OR operation keys $K_1$ (+) $K_2$ before and after the linear conversion section 452; and
a nonlinear conversion section.

The round key supply section of the key scheduling section outputs 6 kinds of keys in the foregoing sequence. The input sequence of these keys and its reverse sequence are the same sequence.

This means that the key input sequence in the encryption process of generating the ciphertext C from the plaintext P and the key input sequence in the decryption process of generating the plaintext P from the ciphertext C can be set to be the same. That is, this key input sequence is the key input sequence having the involution property, hardware or programs which are applied to the encryption process and the decryption process can be common, and thus the setting contributes to lightweightness (miniaturization) of the device.

In the configuration illustrated in FIG. 63, the constant CON is input to the exclusive-OR sections, the exclusive-OR section 471 and the exclusive-OR section 472 of the encryption processing section 451 (E).

Further, the constant CON is also input to the exclusive-OR section 473 of the encryption processing section 453 ($E^{-1}$).

The constant CON is, for example, a constant CON of the 4×4 state described with reference to FIG. 58.

All of the linear conversion sections 481, 482, and 483 adjacent to the three exclusive-OR sections 471, 472, and 473 execute the column diffusion operation (MixColumn) in which the above-described matrix $M_0$ is applied, that is:

$$MC[M_0].$$

In this way, the constant input configuration is not limited to only one of the function E and the inverse function $E^{-1}$, but a configuration in which the round operation in which the constant is applied once or more is executed in both the function E and the inverse function may be used. However, a constant application position is set as a deviated position (non-correspondence position) which is not the correspondence position of the function E and the inverse function $E^{-1}$.

The encryption processing section illustrated in FIG. 63 has the involution property in which the plaintext P can also be generated from the ciphertext C by executing the reverse sequence to the sequence in which the ciphertext C is generated from the plaintext P, and can execute the encryption process and the decryption process by applying the same hardware or the same program.

Since the key input sequence is also the same sequence in the encryption and decryption processes, the key supply process of the key scheduling section can also be executed as a process in which the same hardware or the same program is applied.

[7. Example of Specific Configuration of S-Boxes which are Applied to Nonlinear Conversion Section]

Next, an example of a specific configuration of the S-boxes which are applied to the nonlinear conversion section will be described.

For example, in the encryption processing device 100 illustrated in FIG. 19, in order for the encryption processing section 120 to have the involution property, that is, in order for hardware or a program generating and outputting the ciphertext C from the plaintext P to be the same as hardware or a program generating and outputting the plaintext P from the ciphertext C, it is also necessary for the nonlinear conversion section 122 included in the encryption processing section 120 to have the involution property.

Hereinafter, an example of a configuration in which the nonlinear conversion section 122 included in the encryption processing section 120 has the involution property will be described.

As described above with reference to FIG. 22, the nonlinear conversion section 122 in the encryption processing section 120 of the encryption processing device 100 illustrated in FIG. 19 has, for example, the configuration that has the plurality of S-boxes, as illustrated in FIG. 22(1).

Each S-box is, for example, a nonlinear conversion section that has a 4-bit input and output configuration, and a nonlinear conversion process of 4×16=64 bits is executed through parallel processes of the 16 S-boxes.

It is necessary for the S-box of the 4-bit input and output to have the configuration of the involution property.

That is, it is necessary to realize a configuration in which an original 4-bit input value is obtained when a certain 4-bit output value is obtained from the 4-bit input value and the 4-bit output value is input to the same S-box.

A function f(x) that has the involution property is a function that satisfies the following formula in regard to all of the input values x:

$$f(f(x))=x.$$

The nonlinear conversion section 122 included in the encryption processing section 120 is necessarily the function f(x) that has the involution property.

An example of the configuration of the 4-bit input and output S-box having the involution property will be described with reference to FIG. 64 and the subsequent drawings.

Figure 64:
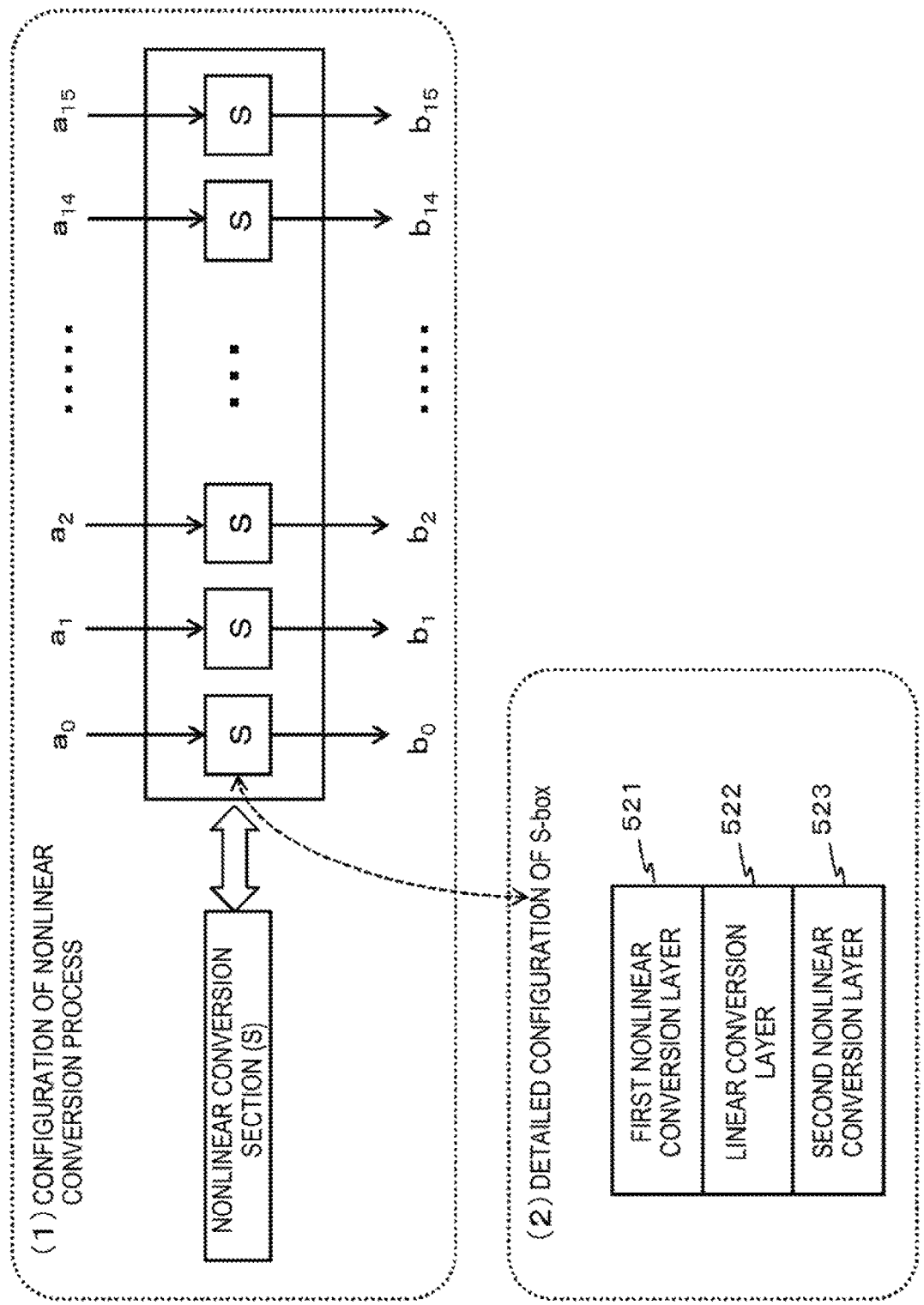
FIG. 64 is a diagram for describing an example of the configuration of an S-box of the nonlinear conversion section of the encryption processing section.

FIG. 64(1) is a diagram illustrating an example of the configuration of the nonlinear conversion section, as in FIG. 22(1) described above.

That is, the drawing illustrates an example of the configuration of the nonlinear conversion section 122 included in the encryption processing section 120 of the encryption processing device 100 illustrated in FIG. 19. The nonlinear conversion section 122 has a configuration in which the plurality of S-boxes executing the nonlinear conversion process are disposed.

Each S-box executes the nonlinear conversion of 4-bit data.

FIG. 64(2) illustrates the configuration of one S-box included in the nonlinear conversion section. The S-box can be divided into 3 layers:
 a first nonlinear conversion layer 521;
 a linear conversion layer 522; and
 a second nonlinear conversion layer 523.

The second nonlinear conversion layer 523 is an inverse function of the first nonlinear conversion layer 521.

Figure 65:
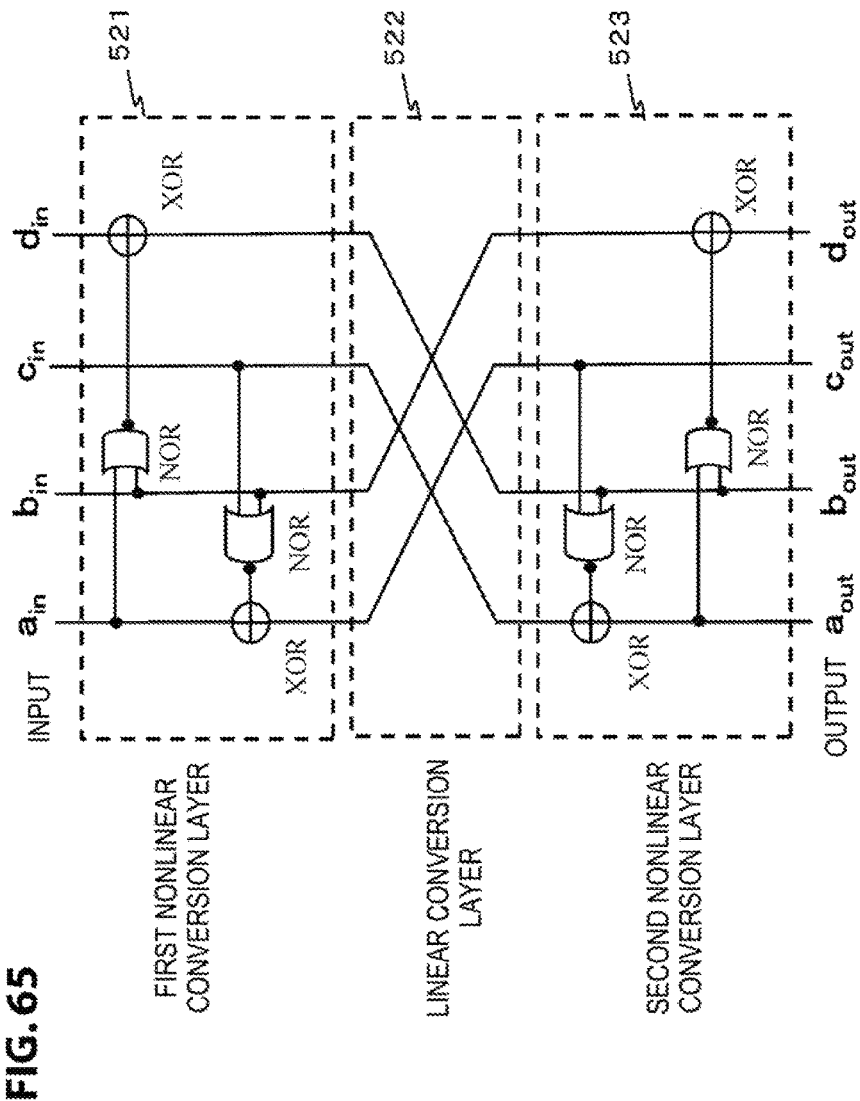
FIG. 65 is a diagram for describing an example of the configuration of an S-box of the nonlinear conversion section of the encryption processing section.

FIG. 65 illustrates an example of a circuit configuration of the specific S-box.

As illustrated in FIG. 65, the first nonlinear conversion layer 521 is configured to include two exclusive-OR operation sections (XOR) and two basic operators.

In the example illustrated in FIG. 65, an example in which NOR circuits are set as the basic operators is illustrated. The basic operator can be substituted with a basic operator that executes an operation of 2 inputs and 1 output of one of an AND circuit, an OR circuit, and a NAND circuit.

The two basic operators may be combined by the same basic operators or may be combined by different basic operators.

The linear conversion layer 522 is a linear conversion layer that executes a permutation process of input 4 bits and basically has the involution property.

The second nonlinear conversion layer 523 is configured by an inverse function of the first nonlinear conversion layer 521.

The S-box circuit configured to include these three layers serves as a nonlinear conversion circuit that has the involution property.

At the bottom of FIG. 65, correspondence relation data of input values (in) and output values (out) in the S-box illustrated in FIG. 65 is illustrated.

All of the input and output values are 4-bit data and are data of 0000 to 1111. A table illustrated in FIG. 65 is shown as a correspondence table of input values and output values of 0 to 15 expressed in decimal notation from 0000 to 1111.

As can be understood from this table, an output value obtained using an output value Y obtained from any input value X as an input value Y becomes the original input value X.

That is, the 4-bit input and output S-box illustrated in FIG. 65 is a nonlinear conversion circuit that has the involution property.

Figure 66:
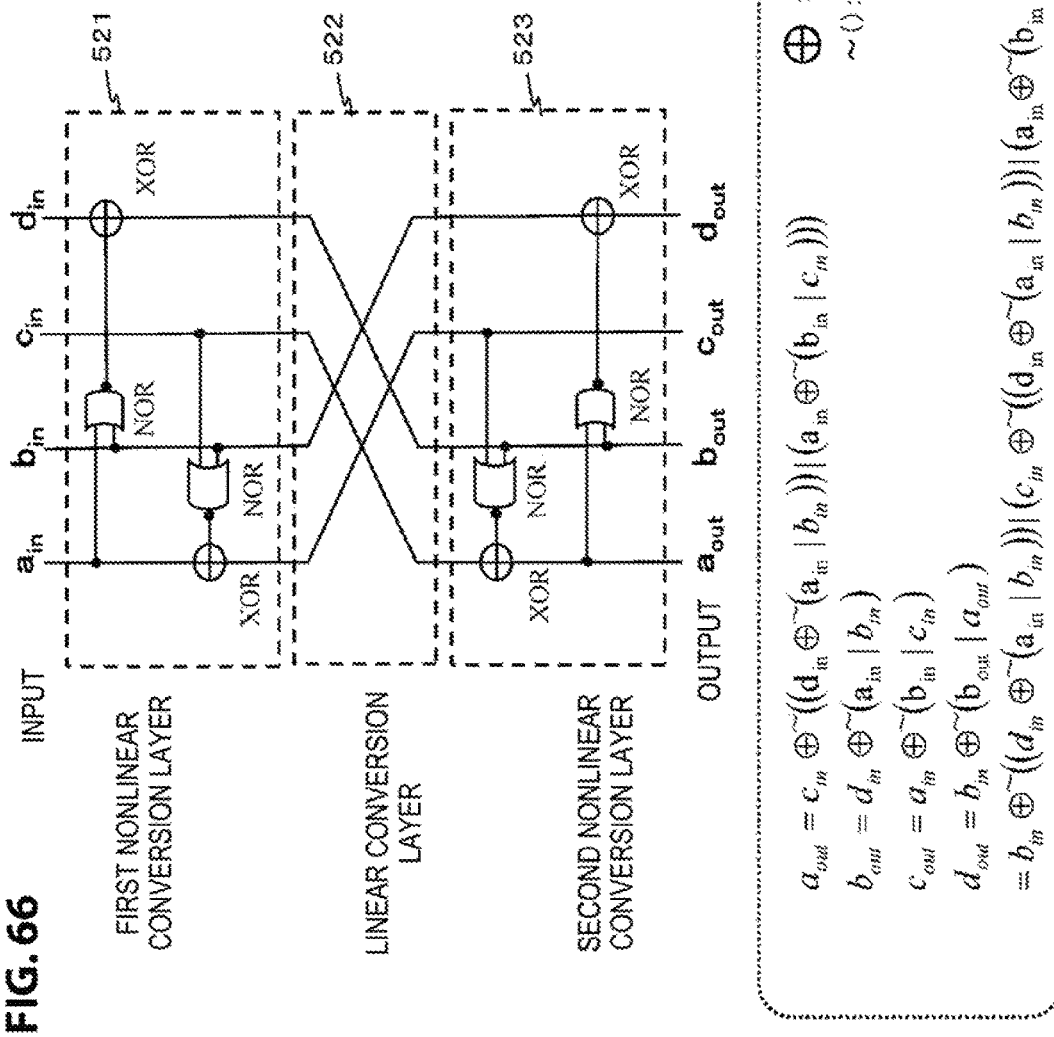
FIG. 66 is a diagram for describing an example of the configuration of an S-box of the nonlinear conversion section of the encryption processing section.

FIG. 66 illustrates data conversion formulae by the S-box.

Here, $a_{in}$, $b_{in}$, $c_{in}$, and $d_{in}$ are assumed to be 4-bit inputs to the S-box and $a_{out}$, $b_{out}$, $c_{out}$, and $d_{out}$ are assumed to be 4-bit outputs from the S-box.

The data conversion formulae in the S-box are as follows.

$$a_{out} = c_{in} \oplus^{\sim} ((d_{in} \oplus^{\sim} (a_{in} | b_{in})) | (a_{in} \oplus^{\sim} (b_{in} | c_{in}))) \quad [\text{Math. 16}]$$
$$b_{out} = d_{in} \oplus^{\sim} (a_{in} | b_{in})$$
$$c_{out} = a_{in} \oplus^{\sim} (b_{in} | c_{in})$$
$$d_{out} = b_{in} \oplus^{\sim} (b_{out} | a_{out})$$
$$= b_{in} \oplus^{\sim} ((d_{in} \oplus^{\sim} (a_{in} | b_{in})) | (c_{in} \oplus^{\sim} ((d_{in} \oplus^{\sim} (a_{in} | b_{in})) |$$
$$(a_{in} \oplus^{\sim} (b_{in} | c_{in}))))$$

In the foregoing formulae, −(x|y) indicates a negation (NOT) of a value in ( ) Specifically, this indicates an output value of an NOR circuit when input values to the NOR circuit are x and y.

The S-box that executes the data conversion expressed by the foregoing operation formulae has the involution property.

The S-box circuit illustrated in FIG. 66 has a differential probability and a linear probability which are both $2^{-2}$ and has sufficient security.

The S-box illustrated in FIG. 66 is configured to include 4 exclusive-OR operators (XOR) and 4 NOR circuits. The number of gates necessary on a hardware circuit is 13.

The necessary number of gates is calculated as the exclusive-OR operators (XOR)=2.25 gates and the NOR circuit=1 gate.

For example, the encryption processing section described with reference to FIG. 54 has the following configuration:
 the conversion function E 411;
 the linear conversion section 412; and
 the conversion function $E^{-1}$ 413.

The involution property of the entire encryption processing section is realized by using the S-boxes illustrated in FIGS. 64 to 66 to configure the nonlinear conversion sections in the conversion function E 411 and the conversion function $E^{-1}$ 413 in the encryption processing section having such a configuration.

The S-box described with reference to FIGS. 65 and 66 has the following 3-layer configuration:

a first nonlinear conversion layer;
a linear conversion layer; and
a second nonlinear conversion layer.

Another example of the S-box having the 3-layer configuration will be described.

It is necessary to realize a configuration that has the involution property as a necessary condition of the linear conversion layer in the 3-layer configuration and bit substitution with no substitution portion in which input and output bits are invariable is executed.

The condition of the linear conversion layer will be described with reference to FIG. 67.

Figure 67:
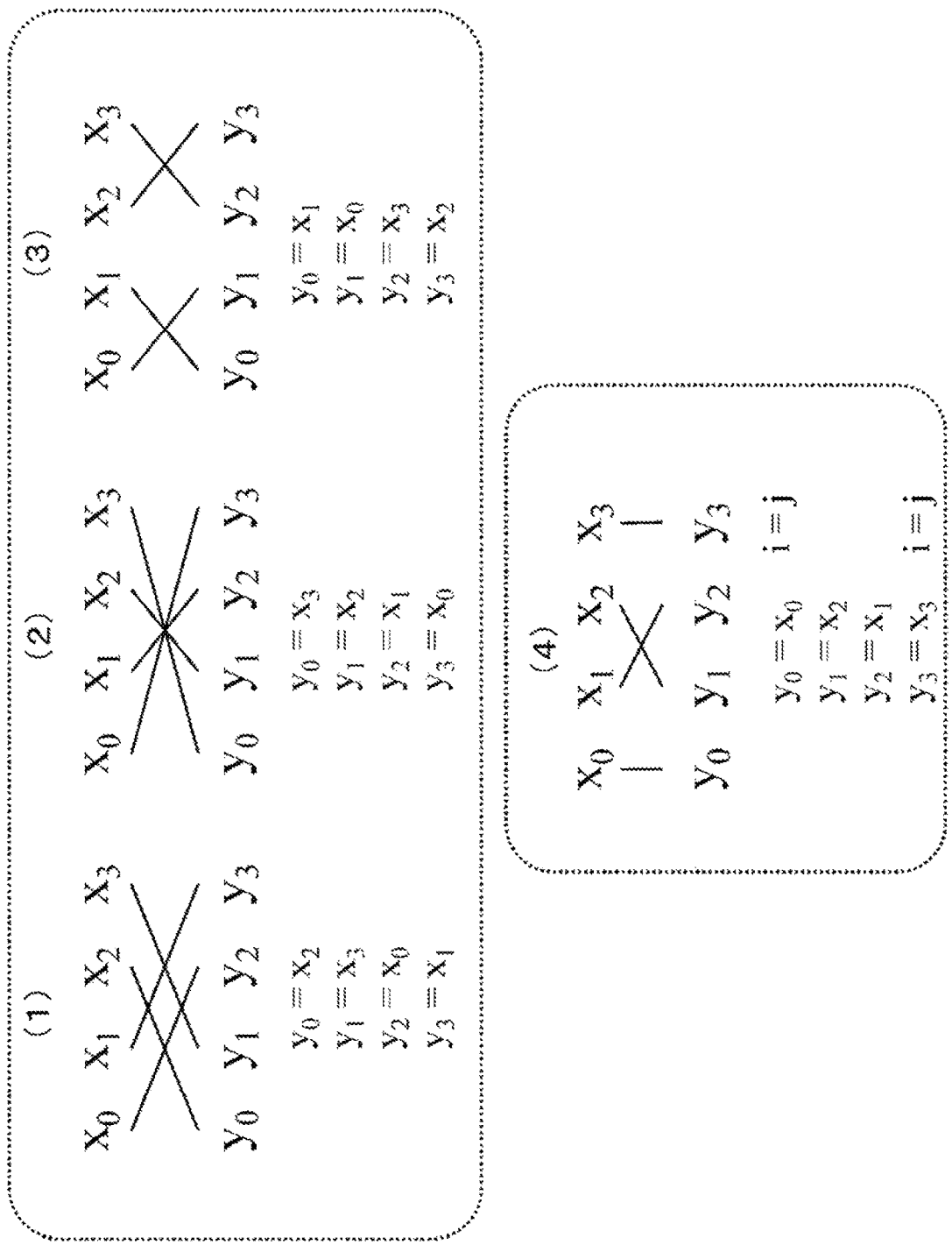
FIG. 67 is a diagram for describing an example of the configuration of a linear conversion layer of the S-box of the nonlinear conversion section of the encryption processing section.

FIG. 67 illustrates a setting example of the linear conversion layer in the 4-bit input and output S-box.

As in the S-box described with reference to FIGS. 65 and 66, the linear conversion layer in the 4-bit input and output S-box that has the following 3-layer configuration has, for example, one setting illustrated in FIG. 67(1):
a first nonlinear conversion layer;
a linear conversion layer; and
a second nonlinear conversion layer.

When input 4 bits are X=(x0, x1, x2, x3) and output 4 bits are Y=(y0, y1, y2, y3) in the linear conversion layer, the configuration has the involution property.

Further, the condition of the linear conversion layer is setting in which input and output bits are not the same, that is, the following formula is satisfied:

$$y_i \neq x_i,$$

where i=0, 1, 2, 3.

A linear conversion configuration illustrated in FIG. 67(2) does not satisfy the foregoing condition and is incompatible.

A substitution function P4 of the linear conversion layer executing 4-bit substitution can be expressed by formulae as follows:

$$P4(P4(X))=X; \text{ and} \quad (a)$$

$$y_i \neq x_i, \quad (b)$$

where i=0, 1, 2, 3.

The foregoing (a) is a conditional formula indicating that the substitution function P4 has the involution property.

The foregoing (b) is a conditional formula indicating that input and output bits are not the same.

It is necessary for the linear conversion layer to have a configuration in which a substitution process satisfying the foregoing condition is executed.

An example of a different configuration from the configuration described with reference to FIGS. 65 and 66 will be described as an example of an S-box executing 4-bit substitution with reference to FIG. 68 and the subsequent drawings.

Figure 68:
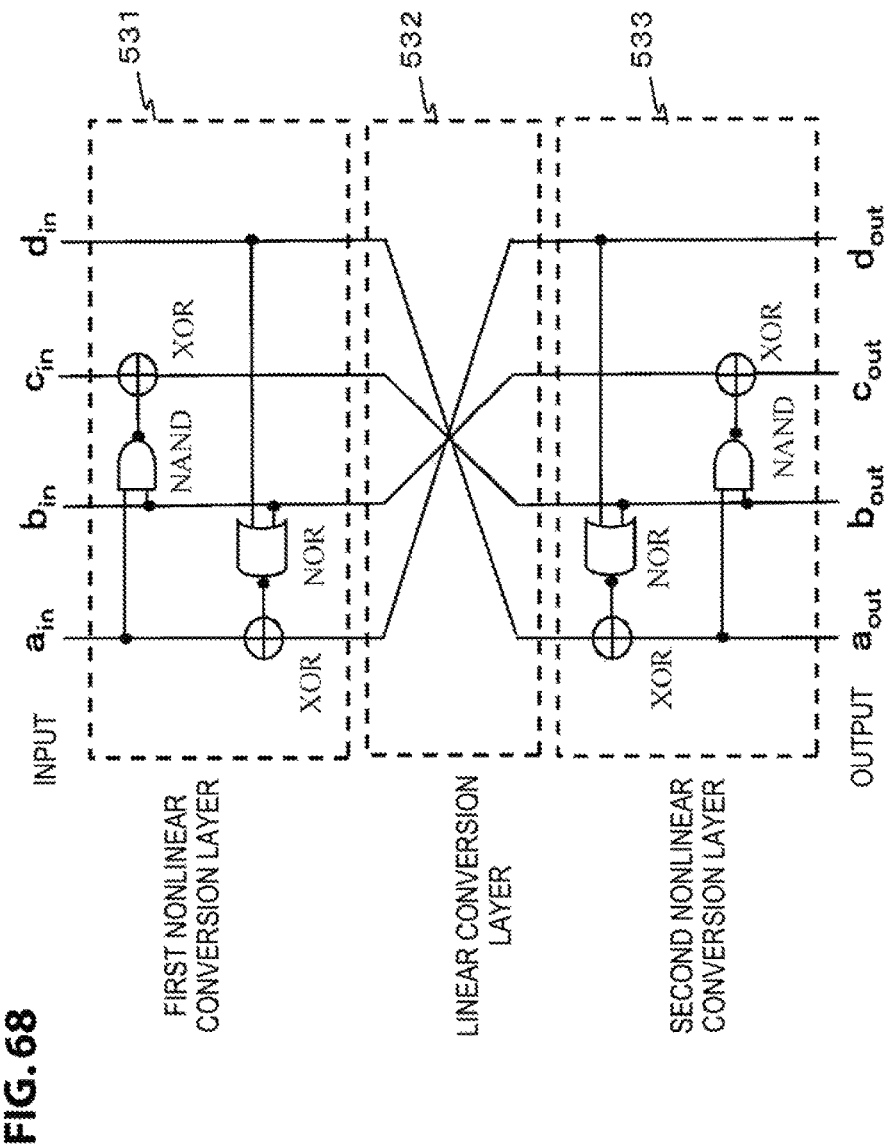
FIG. 68 is a diagram for describing an example of the configuration of an S-box of the nonlinear conversion section of the encryption processing section.

An S-box illustrated in FIG. 68 is a 4-bit input and output S-box that has the following 3-layer configuration:
a first nonlinear conversion layer 531;
a linear conversion layer 532; and
a second nonlinear conversion layer 533.

The first nonlinear conversion layer 531 is configured to include two exclusive-OR operation sections (XOR), NAND circuits, and NOR circuits.

The linear conversion layer 522 is a linear conversion layer that executes a permutation process of input 4 bits and has the involution property.

The second nonlinear conversion layer 533 is configured by an inverse function of the first nonlinear conversion layer 531.

The S-box circuit configured to include these three layers serves as a nonlinear conversion circuit that has the involution property.

At the bottom of FIG. 68, correspondence relation data of input values (in) and output values (out) in the S-box illustrated in FIG. 68 is illustrated.

All of the input and output values are 4-bit data and are data of 0000 to 1111. A table illustrated in FIG. 68 is shown as a correspondence table of input values and output values of 0 to 15 expressed in decimal notation from 0000 to 1111.

As can be understood from this table, an output value obtained using an output value Y obtained from any input value X as an input value Y becomes the original input value X.

That is, the 4-bit input and output S-box illustrated in FIG. 68 is a nonlinear conversion circuit that has the involution property.

Figure 69:
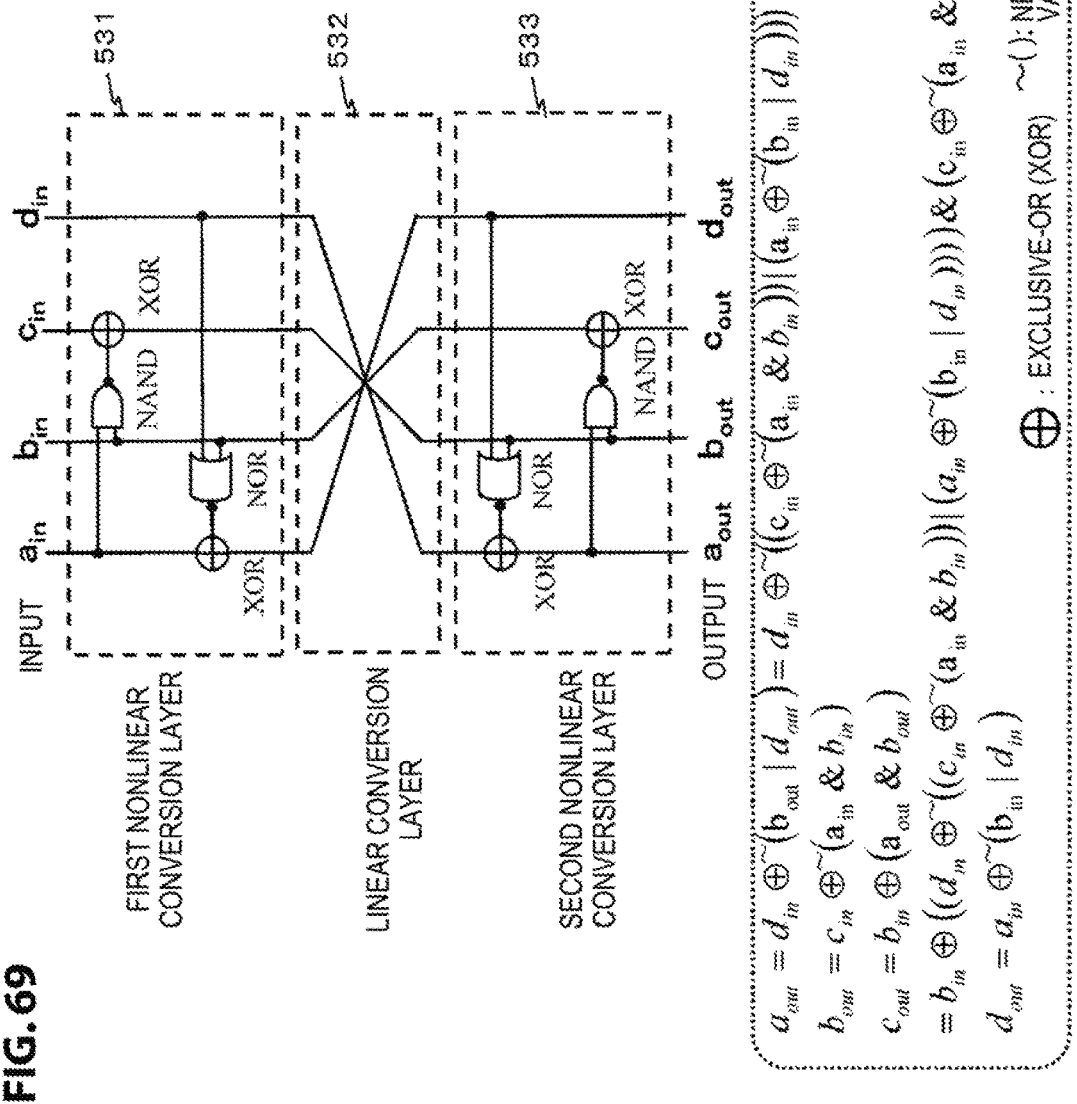
FIG. 69 is a diagram for describing an example of the configuration of an S-box of the nonlinear conversion section of the encryption processing section.

FIG. 69 illustrates data conversion formulae by the S-box.

Here, $a_{in}$, $b_{in}$, $c_{in}$, $b_{in}$, $c_{in}$, and $d_{in}$ are assumed to be 4-bit inputs to the S-box and $a_{out}$, $b_{out}$, $c_{out}$, and $d_{out}$ are assumed to be 4-bit outputs from the S-box.

The data conversion formulae in the S-box are as follows.

$$a_{out} = d_{in} \oplus \sim (b_{out} | d_{out}) = \quad \text{[Math. 17]}$$
$$d_{in} \oplus \sim ((c_{in} \oplus \sim (a_{in} \& b_{in})) | (a_{in} \oplus \sim (b_{in} | d_{in})))$$
$$b_{out} = c_{in} \oplus \sim (a_{in} \& b_{in})$$
$$c_{out} = b_{in} \oplus (a_{out} \& b_{out}) =$$
$$b_{in} \oplus ((d_{in} \oplus \sim ((c_{in} \oplus \sim (a_{in} \& b_{in})) | (a_{in} \oplus \sim (b_{in} | d_{in})))) \&$$
$$(c_{in} \oplus \sim (a_{in} \& b_{in})))$$
$$d_{out} = a_{in} \oplus \sim (b_{in} | d_{in})$$

In the foregoing formulae, ~(x|y) indicates an output value of the NOR circuit when input values to the NOR circuit are x and y.

Further, ~(x&y) indicates an output value of the NAND circuit when input values to the NAND circuit are x and y.

The S-box that executes the data conversion expressed by the foregoing operation formulae has the involution property.

The S-box circuit illustrated in FIG. 69 also has a differential probability and a linear probability which are both $2^{-2}$ and has sufficient security.

The S-box illustrated in FIG. 69 is configured to include 4 exclusive-OR operators (XOR), 2 NOR circuits, and 2 NAND circuits.

For example, the encryption processing section described with reference to FIG. 54 has the following configuration:
the conversion function E 411;
the linear conversion section 412; and
the conversion function $E^{-1}$ 413.

The involution property of the entire encryption processing section is realized by using the S-boxes illustrated in FIG. 69 to configure the nonlinear conversion sections in the conversion function E 411 and the conversion function $E^{-1}$ 413 in the encryption processing section having such a configuration.

Next, an example of the 4-bit input and output S-box that has still another configuration will be described with reference to FIG. 70.

Figure 70:
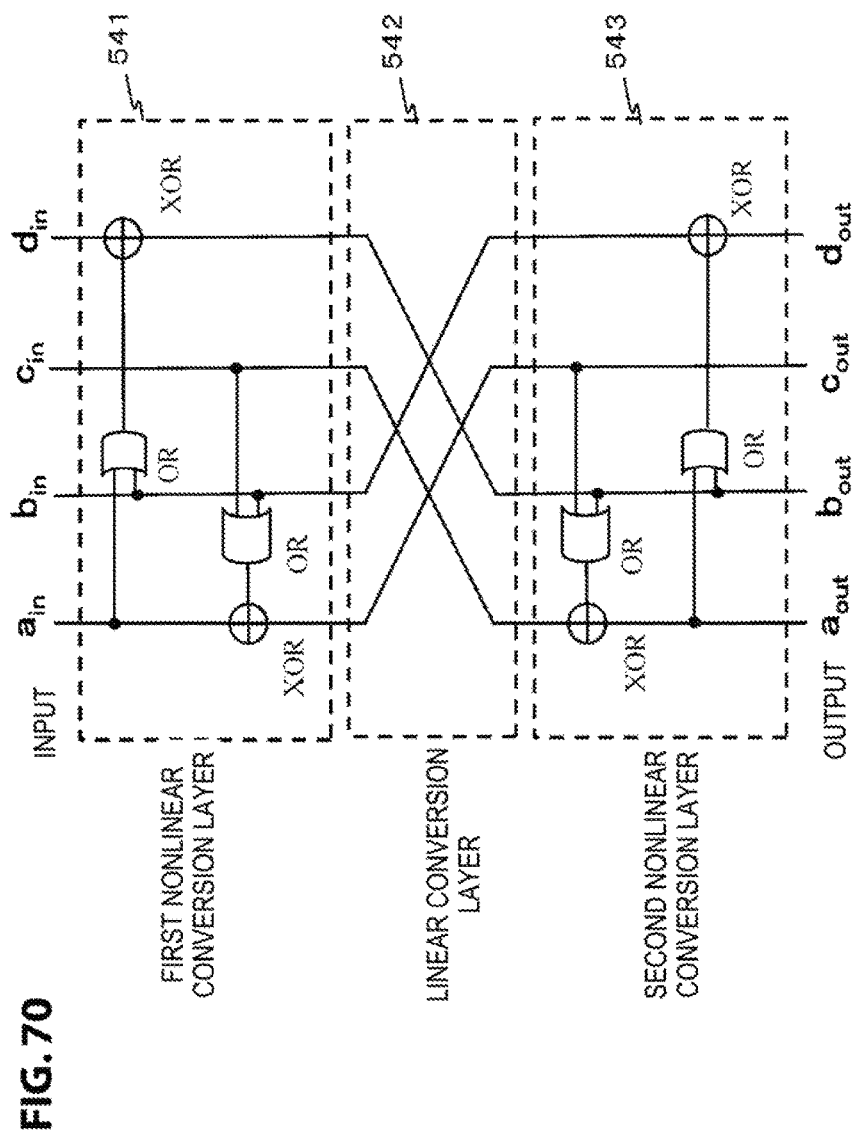
FIG. 70 is a diagram for describing an example of the configuration of an S-box of the nonlinear conversion section of the encryption processing section.

The S-box illustrated in FIG. 70 is a 4-bit input and output S-box that has the following 3-layer configuration:

a first nonlinear conversion layer 541;

a linear conversion layer 542; and a second nonlinear conversion layer 543.

The first nonlinear conversion layer 541 is configured to include two exclusive-OR operation sections (XOR) and two OR circuits.

The linear conversion layer 542 is a linear conversion layer that executes a substitution process of input 4 bits and has the involution property.

The second nonlinear conversion layer 543 is configured by an inverse function of the first nonlinear conversion layer 541.

The S-box circuit configured to include these three layers serves as a nonlinear conversion circuit that has the involution property.

At the bottom of FIG. 70, correspondence relation data of input values (in) and output values (out) in the S-box illustrated in FIG. 70 is illustrated.

All of the input and output values are 4-bit data and are data of 0000 to 1111. A table illustrated in FIG. 70 is shown as a correspondence table of input values and output values of 0 to 15 expressed in decimal notation from 0000 to 1111.

As can be understood from this table, an output value obtained using an output value Y obtained from any input value X as an input value Y becomes the original input value X.

That is, the 4-bit input and output S-box illustrated in FIG. 70 is a nonlinear conversion circuit that has the involution property.

Figure 71:
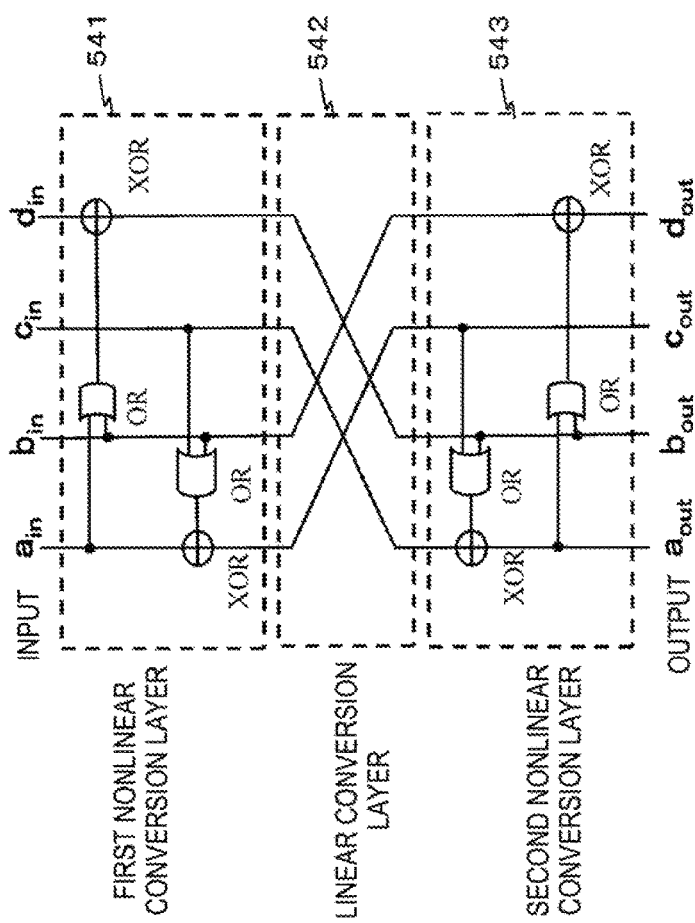
FIG. 71 is a diagram for describing an example of the configuration of an S-box of the nonlinear conversion section of the encryption processing section.

FIG. 71 illustrates data conversion formulae by the S-box.

Here, $a_{in}$, $b_{in}$, $c_{in}$, and $d_{in}$ are assumed to be 4-bit inputs to the S-box and $a_{out}$, $b_{out}$, $c_{out}$, and $d_{out}$ are assumed to be 4-bit outputs from the S-box.

The data conversion formulae in the S-box are as follows.

$$a_{out} = c_{in} \oplus ((d_{in} \oplus (a_{in} | b_{in})) | (a_{in} \oplus (b_{in} | c_{in})))$$ [Math. 18]

$$b_{out} = d_{in} \oplus (a_{in} | b_{in})$$

$$c_{out} = a_{in} \oplus (b_{in} | c_{in})$$

$$d_{out} = b_{in} \oplus (b_{out} | a_{out}) = b_{in} \oplus ((d_{in} \oplus (a_{in} | b_{in})) |$$

$$(c_{in} \oplus ((d_{in} \oplus (a_{in} | b_{in})) | (a_{in} \oplus (b_{in} | c_{in})))))$$

In the foregoing formulae, ~(x|y) indicates an output value of the OR circuit when input values to the OR circuit are x and y.

The S-box that executes the data conversion expressed by the foregoing operation formulae has the involution property.

The S-box circuit illustrated in FIG. 69 also has a differential probability and a linear probability which are both $2^{-2}$ and has sufficient security.

The S-box illustrated in FIG. 69 is configured to include 4 exclusive-OR operators (XOR), and 4 OR circuits.

For example, the encryption processing section described with reference to FIG. 54 has the following configuration:

the conversion function E 411;

the linear conversion section 412; and the conversion function $E^{-1}$ 413.

The involution property of the entire encryption processing section is realized by using the S-boxes illustrated in FIG. 71 to configure the nonlinear conversion sections in the conversion function E 411 and the conversion function $E^{-1}$ 413 in the encryption processing section having such a configuration.

[8. Specific Example of Encryption Processing Device]

Next, an example of the entire configuration of the encryption processing device that includes all of the configurations described above, that is, the following configuration, will be described:

(1) the entire configuration of the common key encryption process in which security is improved (FIGS. 19 to 22);

(2) the configuration in which the linear conversion in which the plurality of different linear conversion matrixes are applied is executed (FIGS. 23 to 31);

(3) the configuration of the key scheduling section that supplies the round keys generated using the base keys and the converted keys and realizes the involution property and the full diffusion property (FIGS. 32 to 52);

(4) the constant input configuration (FIGS. 53 to 63); and (5) the configuration of the nonlinear conversion section in which the S-box having the involution property is applied (FIGS. 64 to 71).

Figure 72:
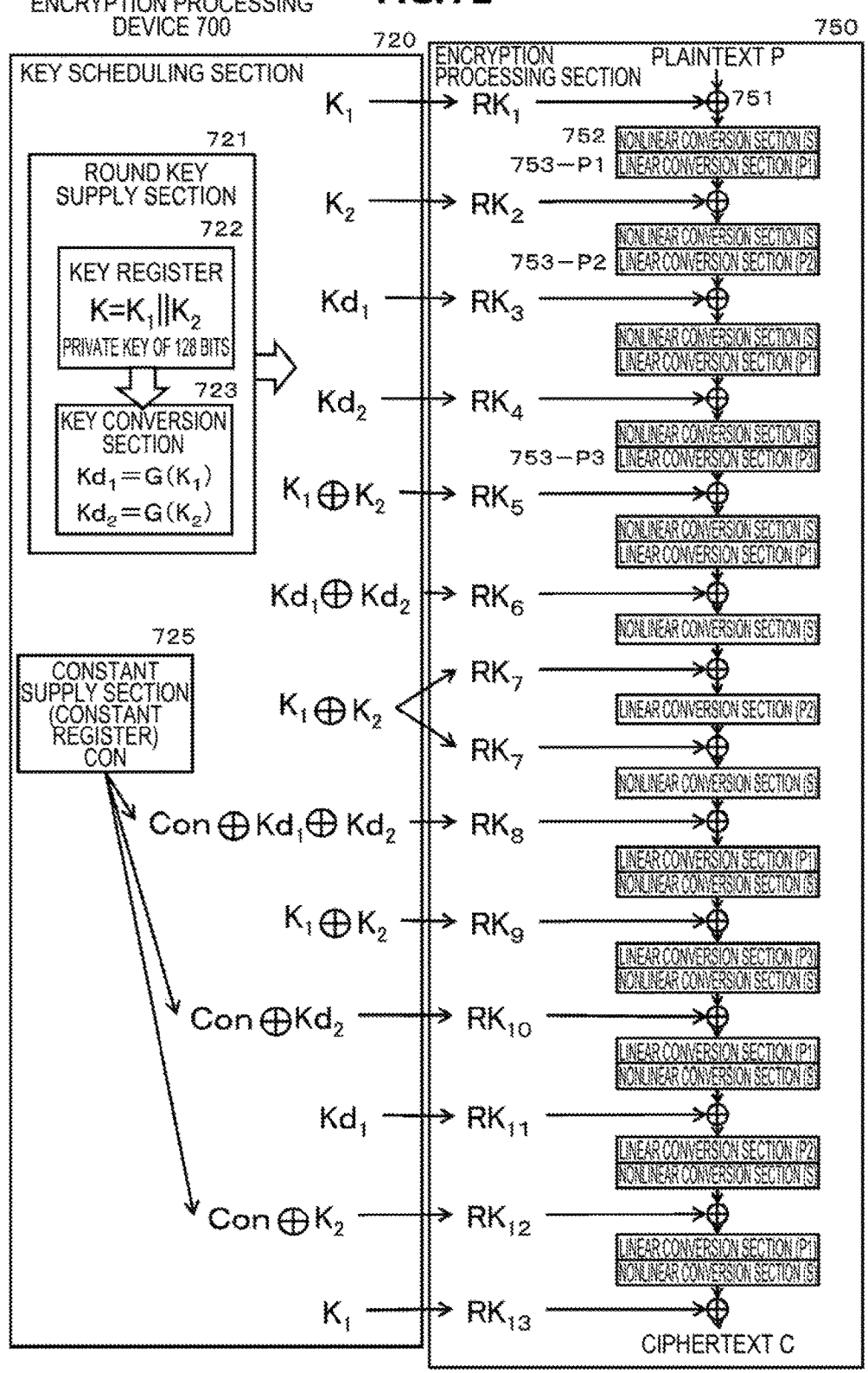
FIG. 72 is a diagram for describing one example of the configuration of the encryption processing device.

An encryption processing device 700 illustrated in FIG. 72 is a diagram illustrating an example of the encryption processing device that has all of the foregoing configurations.

The encryption processing device 700 includes a key scheduling section 720 and an encryption processing section 750.

The encryption processing section 750 includes data conversion sections, an exclusive-OR section 751, a nonlinear conversion section 752, and a linear conversion section 753 and has a configuration in which such processes are repeatedly executed.

The key scheduling section 720 outputs a round key RKn to each of the exclusive-OR sections included in the encryption processing section 750 and executes an exclusive-OR operation with conversion target data.

The key scheduling section 720 includes a round key supply section 721 and a constant supply section (constant register) 725.

The round key supply section 721 includes a key register 722 that stores a private key K and a key conversion section 723.

For example, the encryption processing section 750 of the encryption processing device 700 illustrated in FIG. 72 inputs plaintext P of 64 bits and outputs ciphertext C of 64 bits. By applying this encryption processing section 750, it is possible to input the ciphertext C and output the plaintext P.

When the conversion data has 64 bits, each round key RKn also has 64 bits.

All of the pieces of 64-bit data are 4×4 states that have 16 elements, each of which is a 4-bit element.

The encryption processing section 750 has a configuration of the involution property in which the round operation is repeated using the plaintext P as input data and the ciphertext C is output as output data, and the plaintext P is generable as output data through a data conversion process in which an execution sequence of the round operation using the ciphertext C as input data is set in reverse order.

When the ciphertext C is generated from the plaintext P, each conversion process is executed from the top stage to the bottom stage of the encryption processing section 750 illustrated in the drawing.

Conversely, when the plaintext P is generated from the ciphertext C, each conversion process is executed from the bottom end to the top end of the encryption processing section 750 illustrated in the drawing.

The round key supply section 721 of the key scheduling section 720 has a configuration for executing the key supply process which has the involution property and in which a key supply sequence of a case in which ciphertext C is generated from plaintext P matches a key supply sequence of a case in which the plaintext P is generated from the ciphertext C. When a key supply process to the encryption processing section 750 is executed, the key scheduling section 720 executes an operation on some of supplied keys by the constant and outputs key data which is a result of the operation to the encryption processing section 750.

In this way, the configuration of the encryption processing section 750 illustrated in FIG. 72 is a configuration that has the involution property since the conversion functions are set in the sequences of the conversion function E, the linear conversion function, and the conversion function $E^{-1}$, as in the configuration described above with reference to FIG. 59.

In the encryption processing section 750, the linear conversion processing section executing 3 kinds of different linear conversion processes is set, as described above with reference to FIGS. 23 to 31 in the section [4. Process and configuration of linear conversion sections of encryption processing section].

That is, the encryption processing section 750 includes the following 3 different linear conversion sections:
the linear conversion section P1;
the linear conversion section P2; and
the linear conversion section P3.

The encryption processing section 750 changes the linear conversion process to be executed for each round in the encryption process. That is, the same linear conversion process is set not to be executed in consecutive rounds.

In the linear conversion processing section P1, a matrix operation in which one matrix $M_0$ is applied to elements of each column of the input data of the 4×4 states in a column unit is executed.

This operation is the column diffusion operation (MixColum) described above with reference to FIGS. 24 and 25.

That is, the linear conversion processing section P1 executes the column diffusion operation (MC) expressed by the following formula:

$MC[M_0]$.

MC $[M_0]$ is a formula that expresses a matrix operation in which the same matrix $M_0$ is applied to each column of the state and has the same meaning as the following formula individually indicating a matrix which is applied to each column of the state:

$MC[M_0, M_0, M_0, M_0]$.

As illustrated above with reference to FIGS. 24, 26, and the like, the linear conversion section P2 executes a matrix operation in which different matrixes are applied on elements of each row of the input data of the 4×4 states in each row unit. A matrix operation in which the following matrixes are applied is executed on the high-order first row to the fourth row:
the first row: application matrix $M_0$;
the second row: application matrix $M_1$;
the third row: application matrix $M_2$; and
the fourth row: application matrix $M_3$.

That is, the linear conversion section P2 executes the row diffusion operation (MixRow) expressed by the following formula:

$MR[M_0, M_1, M_2, M_3]$.

In the linear conversion process P3, as illustrated in FIG. 24(2), a matrix operation in which different matrixes are applied is executed on elements of each row of the input data of the 4×4 states in each row unit like the linear conversion process P2. In the linear conversion process P3, a matrix operation in which the following matrixes are applied is executed on the high-order first row to the fourth row, unlike the linear conversion process P2:
the first row: application matrix $M_2$;
the second row: application matrix $M_0$;
the third row: application matrix $M_1$; and
the fourth row: application matrix $M_3$.

This operation is the row diffusion operation (MixRow) described above with reference to FIG. 27.

That is, the linear conversion process P3 is the row diffusion operation (MixRow) expressed by the following formula:

$MR[M_2, M_0, M_1, M_3]$.

By switching the linear conversion process to be executed for each round combining and using the plurality of different linear conversion processes, as described above with reference to FIG. 30, it is possible to increase the number of active S-boxes. Thus, the encryption process (the encryption process and the decryption process) in which security is higher is realized.

The encryption processing section 750 illustrated in FIG. 72 executes the data conversion process in which the following data conversion sections are sequentially applied.
the exclusive-OR section that executes the exclusive-OR operation with the round key $RK_1$
the nonlinear conversion section S
the linear conversion section P1
the exclusive-OR section that executes the exclusive-OR operation with the round key $RK_2$
the nonlinear conversion section S
the linear conversion section P2
the exclusive-OR section that executes the exclusive-OR operation with the round key $RK_3$
the nonlinear conversion section S
the linear conversion section P1
the exclusive-OR section that executes the exclusive-OR operation with the round key $RK_4$
the nonlinear conversion section S
the linear conversion section P3
the exclusive-OR section that executes the exclusive-OR operation with the round key $RK_5$
the nonlinear conversion section S
the linear conversion section P1
the exclusive-OR section that executes the exclusive-OR operation with the round key $RK_6$
the nonlinear conversion section S
the exclusive-OR section that executes the exclusive-OR operation with the round key $RK_7$
the linear conversion section P2
the exclusive-OR section that executes the exclusive-OR operation with the round key $RK_7$
the nonlinear conversion section S
the exclusive-OR section that executes the exclusive-OR operation with the round key $RK_6$
the linear conversion section P1
the nonlinear conversion section S
the exclusive-OR section that executes the exclusive-OR operation with the round key $RK_9$
the linear conversion section P3
the nonlinear conversion section S
the exclusive-OR section that executes the exclusive-OR operation with the round key $RK_{10}$
the linear conversion section P1
the nonlinear conversion section S the exclusive-OR section that executes the exclusive-OR operation with the round key $RK_{11}$
the linear conversion section P2
the nonlinear conversion section S
the exclusive-OR section that executes the exclusive-OR operation with the round key $RK_{12}$
the linear conversion section P1
the nonlinear conversion section S
the exclusive-OR section that executes the exclusive-OR operation with the round key $RK_{13}$ The round operation execution configuration is the same as the configuration described above with reference to FIG. 59 and is set in the following sequence:
the conversion function E;
the linear conversion section; and
the conversion function $E^{-1}$.

The configuration has the involution property.

The nonlinear conversion sections are configured by the S-boxes that have the involution property described above with reference to FIGS. 64 to 66.

The round key supply section 721 of the key scheduling section 720 includes a key register 722 and a key conversion section 723. A process which is executed by the round key supply section 721 is the process described above with reference to FIGS. 32 to 43 in the item [5. Process and configuration of key scheduling section].

That is, the round key generated using the base key and the converted key is supplied to the encryption processing section 750. In the round key supply configuration, the involution property and the full diffusion property are realized.

The private key K stored in the key register is 128-bit key data which is link data of 64-bit base keys $K_1$ and $K_2$.

The key conversion section 723 generates the converted key $Kd_1$ based on the base key $K_1$ and generates the converted key $Kd_2$ through the conversion process based on the base key $K_2$.

The conversion process is expressed as follows by a formula using the conversion function G and the inverse function $G^{-1}$:

$$Kd_1 = G(K_1);$$

$$K_1 = G^{-1}(Kd_1).$$

Here, $G = G^{-1}$ is satisfied.

That is, the data conversion function G which is applied to the key conversion in the key conversion section 723 has the involution property, that is, the nature in which the forward direction function G and the backward direction function $G^{-1}$ are the same function, as illustrated in FIG. 33.

As described with reference to FIG. 34 and the like, this key conversion process is executed by applying the Hadamard MDS matrix MD.

Specifically, the column diffusion operation of step S1 and the row diffusion operation of step S2 illustrated in FIG. 34 are executed.

The column diffusion operation of step S1 is expressed by the following operation formula:

$$MC[M_D] = MC[M_D, M_D, M_D, M_D].$$

The row diffusion operation of step S2 is expressed by the following operation formula:

$$MR[M_D] = MR[M_D, M_D, M_D, M_D].$$

That is, in the column diffusion operation of step S1 of FIG. 34, a matrix operation in which the same Hadamard MDS matrix $M_D$ is applied to all of the four columns of 4×4 state expression data formed by 4-bit elements is executed.

In the row diffusion operation of step S2, a matrix operation in which the same Hadamard MDS matrix $M_D$ is applied to all of the four rows of 4×4 state expression data formed by 4-bit elements is executed.

That is, the function G formed from the continuous processes of the column diffusion operation MC $[M_D]$ and the row diffusion operation MR $[M_D]$ has the involution property and the forward direction function G and the backward direction function $G^{-1}$ are the same. Therefore, by repeating the operation twice, the original value is calculated.

Further, data diffusion between all of the elements of input and output states, that is, "full diffusion conversion," is executed through the column diffusion operation MC $[M_D]$ in which the matrix $M_D$ executed in the key conversion section 723 is applied and the row diffusion operation MR $[M_D]$ in which the matrix $M_D$ is applied.

By inputting the round key having the full diffusion property to the encryption processing section and executing the exclusive-OR with the conversion target data, the diffusion performance of the conversion data is improved and the encryption process in which security is higher is realized.

The round key supply configuration executed by the round key supply section 721 has the following 2 natures:
(1) the full diffusion property in which the full diffusion conversion is realized; and
(2) the involution property in which the forward direction function G and the backward direction function $G^{-1}$ are the same.

As described above, the following effects are obtained in accordance with the two characteristics.

The diffusion of key data configuration information regarding the conversion target data is realized with few rounds based on the full diffusion property in which the full diffusion conversion is realized, and thus greater diffusion performance is ensured without dependency on the process of the round function (R).

That is, the secure encryption process in which resistance to an attack is high is realized with few rounds. As a result, high-speed processing or weight reduction is realized.

As an effect based on the involution property, a configuration in which one key conversion section is repeatedly used is possible and miniaturization of hardware is realized in either the unrolled mounting or the round mounting.

In the example illustrated in FIG. 72, the round key supply section 721 outputs the keys in the following sequence:
the key $K_1$;
the key $K_2$;
the converted key $Kd_1$;
the converted key $Kd_2$;
the exclusive-OR operation key $K_1$ (+) $K_2$;
the exclusive-OR operation converted key $Kd_1$ (+) $Kd_2$;
the exclusive-OR operation key $K_1$ (+) $K_2$;
the exclusive-OR operation converted key $Kd_1$ (+) $Kd_2$;
the exclusive-OR operation key $K_1$ (+) $K_2$;
the converted key $Kd_2$;
the converted key $Kd_1$;
the key $K_2$; and
the key $K_1$.

In this sequence, 6 kinds of keys are output.

The round keys K1 to K13 input to the encryption processing section 750 are generated using the foregoing keys or working the constant CON.

Before and after the linear conversion section P2 located at the central position of the encryption processing section 750, the exclusive-OR operation converted key $Kd_1$ (+) $Kd_2$ is repeatedly used as the round key $K_7$.

The round keys $RK_8$, $RK_{10}$, and $RK_{12}$ are generated by executing the exclusive-OR on the constant CON supplied from the constant supply section 725 and the keys supplied from the round key supply section 721.

The input sequence of these keys is the same as the sequence described above with reference to FIG. 59 and its reverse sequence is the same sequence.

This means that, in the decryption process of generating the plaintext P from the ciphertext C, the round key supply section 721 can generate and output the keys in the same sequence as the key input sequence in the encryption process of generating the ciphertext C from the plaintext P. This means that hardware or programs which are applied to the encryption process and the decryption process can be common, and thus the setting contributes to lightweightness (miniaturization) of the device.

The constant supply section 725 set in the key scheduling section 720 executes a constant supply process according to the process described above with reference to FIGS. 53 to 59 in the item [6. Configuration for realizing improvement in security by constant input].

In the example illustrated in the drawing, the constant (CON) is subjected to the exclusive-OR operation with the key data generated by the round key supply section when the following round keys are generated:
the round key $RK_8$;
the round key $RK_{10}$; and
the round key $RK_{12}$.
That is,
the round key $RK_8=Kd_1$ (+) $Kd_2$ (+) CON;
the round key $RK_{10}=Kd_2$ (+) CON; and
the round key $RK_{12}=K_2$ (+) CON.
Further, (+) means an exclusive-OR operation.

As the result of the process of inputting the constant (CON), setting of the round keys $RK_1$ to $RK_{13}$ input to the encryption processing section 750 is as follows:
$RK_1=K_1$;
$RK_2=K_2$;
$RK_3=Kd_1$;
$RK_4=Kd_2$;
$RK_5=K_1$ (+) $K_2$;
$RK_6=Kd_1$ (+) $Kd_2$;
$RK_7=K_1$ (+) $K_2$;
$RK_7=K_1$ (+) $K_2$;
$RK_8=Kd_1$ (+) $Kd_2$ (+) CON;
$RK_9=K_1$ (+) $K_2$;
$RK_{10}=Kd_2$ (+) CON;
$RK_{11}=Kd_1$;
$RK_{12}=K_2$ (+) CON; and
$RK_{13}=K_1$.
Further, (+) means an exclusive-OR operation.

$RK_7$ is set such that the same round key is input twice before and after the linear conversion section (P2).

In this way, the constant (CON) is subjected to the exclusive-OR process with the keys generated by the round key supply section when the round keys are generated.

Apart from the round keys, the constant may be input to the exclusive-OR section of the encryption processing section and the exclusive-OR process with the conversion data may be executed. The result is the same in this case.

As the constant (CON), as described above, the constant (CON) in which all of the elements of the result of a matrix operation on the constant CON and a linear conversion matrix which is applied in the linear conversion section adjacent to the exclusive-OR section of the encryption processing section to which the constant CON is input are nonzero, that is, values which are not zero, is used.

In this configuration, a reduction in the difference by the linear conversion of the linear conversion section is prevented. As a result, it is possible to prevent a reduction in the minimum number of differential active S-boxes. Thus, the encryption processing configuration in which resistance to various attacks is high and security is high is realized.

Further, the nonlinear conversion section set in the encryption processing section 750 has a configuration in which the plurality of boxes (S-boxes) and the plurality of 4-bit inputs and outputs k having the involution property described above with reference to FIGS. 64 to 66 in the item [7. Example of specific configuration of S-boxes which are applied to nonlinear conversion section] are set.

As described above, the encryption processing section 750 has the configuration that includes the conversion function E, the linear conversion section, and the conversion function $E^{-1}$. By realizing the configuration in which the S-boxes illustrated in FIGS. 64 to 66 are used in the nonlinear conversion section of the conversion function $E^-$ and the conversion function E, the involution property of the entire encryption processing section is realized.

[9. Mounting Example of Encryption Processing Device]

Finally, a mounting example of the encryption processing device that executes the encryption process according to the above-described embodiment will be described.

The encryption processing device that executes the encryption process according to the above-described embodiment can be mounted on various information processing apparatuses that execute encryption processes. Specifically, the encryption processing device can be used in various apparatuses that execute encryption processes associated with data processing or communication processing, such as a PC, a TV, a recorder, a player, a communication apparatus, an RFID, a smart card, a sensor network apparatus, a cell/battery authentication module, a health medical apparatus, and a stand-alone network apparatus.

Figure 73:
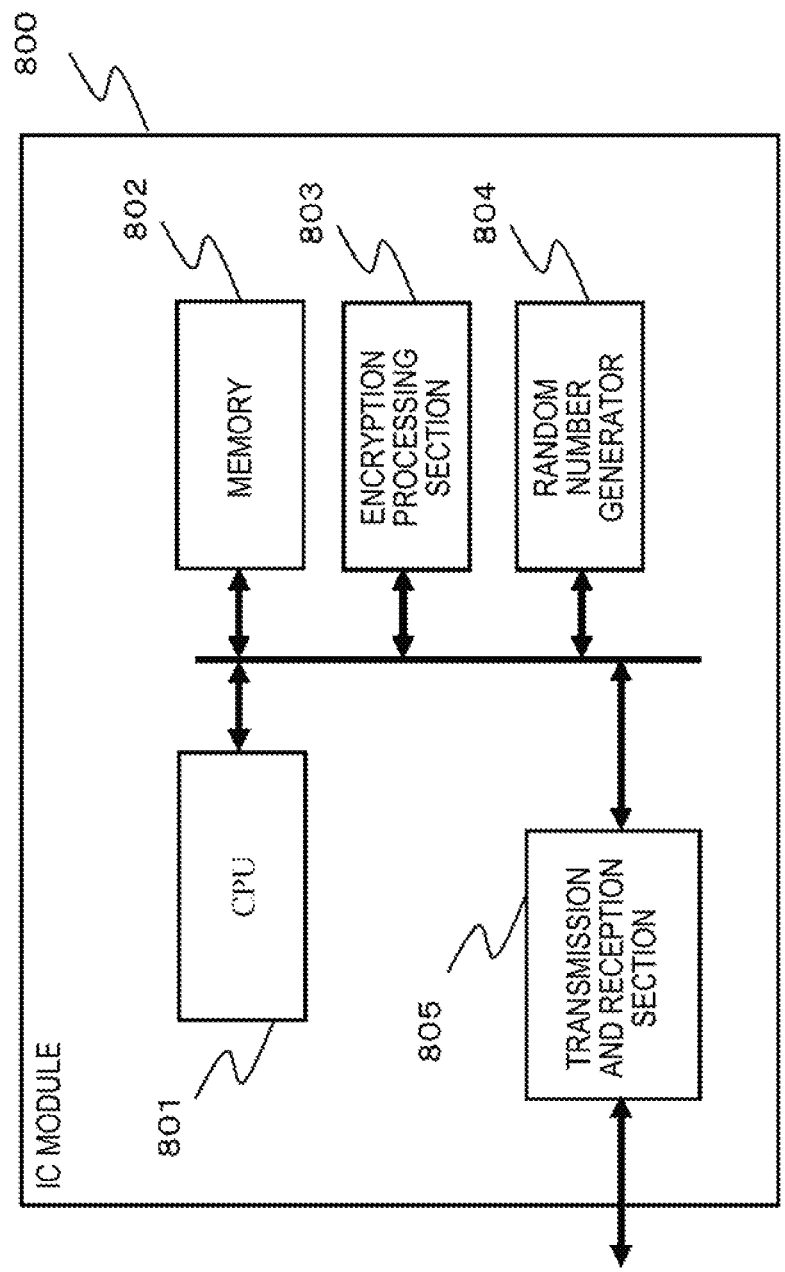
FIG. 73 is a diagram illustrating an example of the configuration of an IC module 700 serving as the encryption processing device.

An example of the configuration of an IC module 800 is illustrated in FIG. 73 as an example of an apparatus that executes the encryption process according to the present disclosure. The above-described process can be executed in various information processing apparatuses such as a PC, an IC card, a reader and writer, a smartphone, and a wearable device. The IC module 800 illustrated in FIG. 73 can be configured in the various apparatuses.

A central processing unit (CPU) 801 illustrated in FIG. 73 is a processor that executes start or end of the encryption process, control of transmission and reception of data, control of data transmission between constituent units, and various programs. A memory 802 is realized by, for example, a read-only-memory (ROM) that stores fixed data such as a program executed by the CPU 801 or an operation parameter, or a random access memory (RAM) that is used as a storage area or a work area of a program executed in a process of the CPU 801 and a parameter appropriately changed in program processing. The memory 802 can be used as a storage area of key data necessary for the encryption process, a conversion table (substitution table) which is applied in the encryption process, data which is applied to a conversion matrix, and the like. The data storage area is preferably configured as a memory that has a tampering-resistant structure.

An encryption processing section 803 has the encryption processing configuration described above and executes an encryption process and a decryption process according to a common key block encryption processing algorithm.

Here, the example in which the encryption processing sections are set as individual modules has been described. For example, an encryption processing program may be configured to be stored in the ROM and the CPU 801 may be configured to read and execute the program stored in the ROM without providing the independent encryption processing modules.

A random number generator 804 executes a process of generating a random number necessary for key generation or the like necessary in the encryption process.

A transmission and reception section 805 is a data communication processing section that executes data communication with the outside, and executes data communication with an IC module such as a reader and writer to output ciphertext generated in the IC module or input data from an apparatus such as an external reader and writer.

The encryption processing device described in the above-described embodiment can be applied not only to an encryption process of encrypting plaintext which is input data but also to a decryption process of restoring ciphertext which is input data to plaintext.

The configuration described in the above-described embodiment can be applied to both the encryption process and the decryption process.

Figure 74:
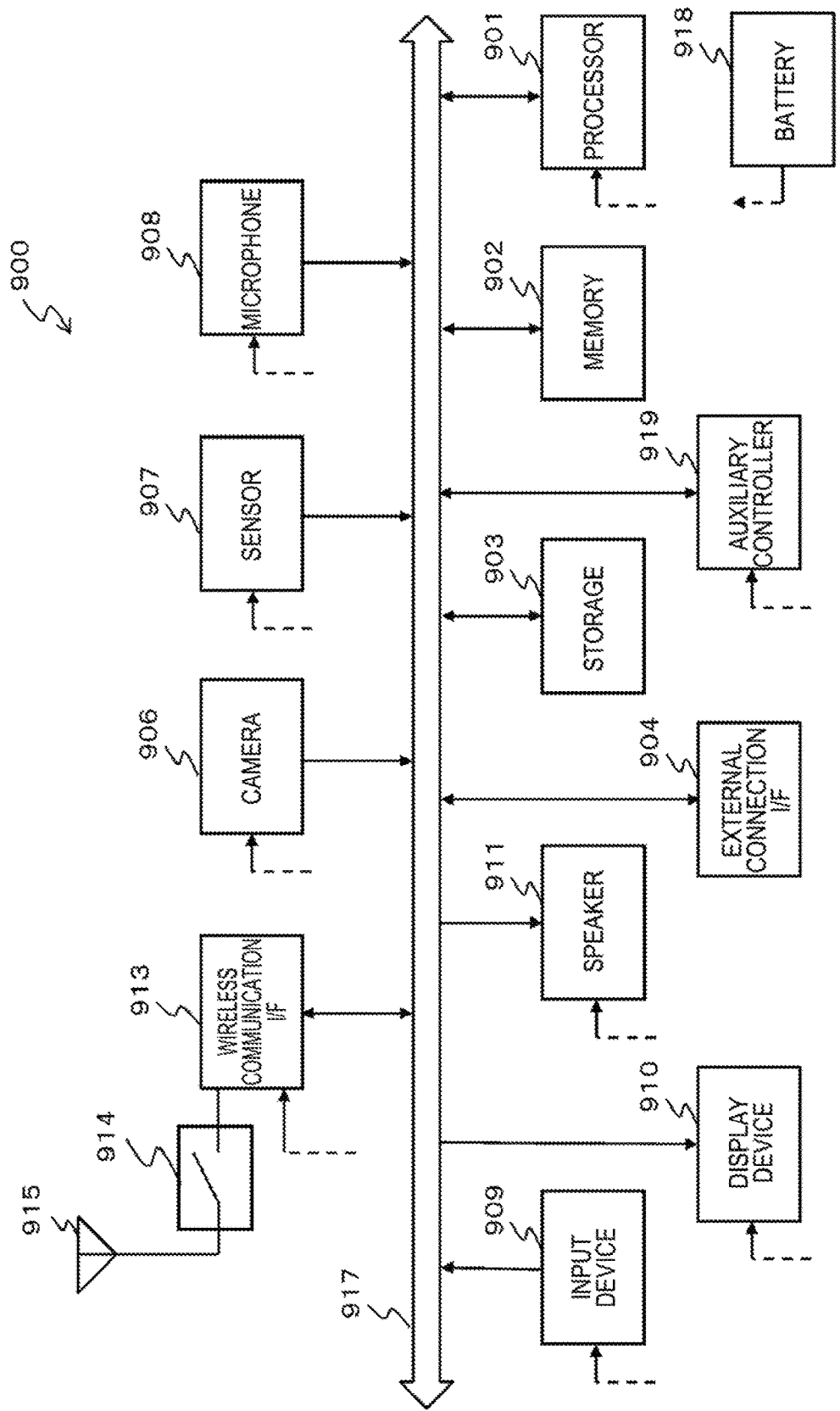
FIG. 74 is a diagram illustrating an example of the configuration of a smartphone that has an encryption process execution function.

FIG. 74 is a block diagram illustrating an example of a schematic configuration of a smartphone 900 that performs an encryption process according to the present disclosure. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a CPU or a system on a chip (SoC), and controls functions of an application layer and another layer of the smartphone 900, and controls the encryption process. The memory 902 includes RAM and ROM, and stores a program that is executed by the processor 901, and data. Further, the memory 902 can be used as a storage area of key data necessary for the encryption process, a conversion table (substitution table) which is applied in the encryption process, data which is applied to a conversion matrix, and the like. The data storage area is preferably configured as a memory that has a tampering-resistant structure. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The image generated with the camera 906 or the sensor data acquired by the sensor 907 and the audio signals acquired by the microphone 908 may be encrypted by the processor 901 and may be transmitted to another apparatus via the wireless communication interface 913. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 performs wireless communication and can typically include a baseband processor, a radio frequency (RF) circuit, and a power amplifier. The wireless communication interface 913 may be a one-chip module in which a memory storing a communication control program, a processor executing the program, and related circuits are integrated. The wireless communication interface 913 may support different kinds of wireless communication schemes such as a short-range wireless communication scheme, a proximity wireless communication scheme, and a cellular communication scheme in addition to a wireless LAN scheme.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 74 via feeder lines, which are partially shown as dashed lines in the figure. The auxiliary controller 919 operates a minimum necessary function of the smartphone 900, for example, in a sleep mode.

An encryption process in the smartphone described in the above-described embodiment can be applied not only to the encryption process of encrypting plaintext which is input data but also to a decryption process of restoring ciphertext which is input data to plaintext.

The configuration described in the above-described embodiment can be applied to both the encryption process and the decryption process.

The IC module 800 illustrated in FIG. 73 may be mounted on the smartphone 900 illustrated in FIG. 74 so that the encryption process according to the above-described embodiment can be executed in the IC module 800.

[10. Conclusion of Constitution of Present Disclosure]

So far, the embodiment of the present disclosure has been described in detail with reference to a specific embodiment. However, it should be noted that various variations and alternative embodiments will become apparent to those skilled in the art without departing from the scope of the present disclosure. That is, it should be noted that the present disclosure is disclosed through embodiments and is not construed in a manner limited by these embodiments. In order to determine the scope of the present disclosure, it is necessary to consider the scope of the claims.

Additionally, the present technology disclosed herein may also be configured as below.

(1) An encryption processing device including:

an encryption processing section configured to execute a round operation on input data and generate output data; and a key scheduling section configured to output a round key to be applied in the round operation by the encryption processing section to the encryption processing section, wherein the encryption processing section has an involution property in which a data conversion function E and an inverse function $E^{-1}$ of the data conversion function E are executed sequentially, and executes the round operation in which a constant is applied once or more in one of the function E and the inverse function $E^{-1}$.

(2) The encryption processing device according to (1),
wherein the encryption processing section executes an exclusive-OR operation on the constant and conversion target data or the constant and the round key as the round operation in which the constant is applied.

(3) The encryption processing device according to (1) or (2),
wherein a round operation section configured to execute the round operation includes a linear conversion processing section configured to execute a linear conversion process, and
the encryption processing section inputs the constant to an exclusive-OR section interrelated with the linear conversion processing section and executes an exclusive-OR operation with conversion target data or the round key.

(4) The encryption processing device according to (3),
wherein the input data and the constant are states formed by m×n elements, each of which is an element of 1 bit or more,
the linear conversion section has a configuration in which a matrix operation in which a linear conversion matrix is applied to the state is executed, and
the constant is a state that satisfies a condition that all of constituent elements of a state which is a result of a matrix operation on the constant and the linear conversion matrix which is applied in the linear conversion process by the linear conversion processing section interrelated with the exclusive-OR section to which the constant is input are nonzero.

(5) The encryption processing device according to (3) or (4),
wherein the input data and the constant are states formed by 4×4 elements, each of which is a 4-bit element,
the linear conversion section has a configuration in which a matrix operation in which a linear conversion matrix is applied to the state is executed, and
the constant is a 4×4 state that satisfies a condition that all of constituent elements of a state which is a result of a matrix operation on the constant and the linear conversion matrix which is applied in the linear conversion process by the linear conversion processing section at a position adjacent to the exclusive-OR section to which the constant is input are nonzero.

(6) The encryption processing device according to any of (3) to (5),
wherein the linear conversion section executes one matrix operation of a column diffusion operation in which the linear conversion is executed by applying a matrix in units of respective column elements of the state and a row diffusion operation in which the linear conversion is executed by applying a matrix in units of respective row elements of the state.

(7) The encryption processing device according to any of (1) to (6),
wherein a round operation section configured to execute the round operation includes a linear conversion processing section configured to execute a linear conversion process, and
the encryption processing section inputs the constant to an exclusive-OR section interrelated with the linear conversion processing section in every other round and executes an exclusive-OR operation with conversion target data or the round key.

(8) The encryption processing device according to any of (1) to (7),
wherein the encryption processing section has a configuration of the involution property in which the round operation is repeated using plaintext P as input data and ciphertext C is output as output data, and the plaintext P is generable as output data through a data conversion process in which an execution sequence of the round operation using the ciphertext C as input data is set in reverse order.

(9) The encryption processing device according to any of (1) to (8),
wherein the key scheduling section has a configuration in which a key supply process having an involution property in which a key supply sequence of a case in which ciphertext C is generated from plaintext P matches a key supply sequence of a case in which the plaintext P is generated from the ciphertext C.

(10) The encryption processing device according to any of (1) to (9),
wherein, when a key supply process to the encryption processing section is executed, the key scheduling section executes an operation on some of supplied keys according to the constant and outputs key data which is a result of the operation to the encryption processing section.

(11) The encryption processing device according to any of (1) to (10),
wherein the round operation repeatedly executed by the encryption processing section is an operation including a linear conversion process by the linear conversion section, and
the linear conversion section changes a linear conversion form according to round transition.

(12) The encryption processing device according to any of (1) to (11),
wherein the round operation includes a nonlinear conversion process, and
an S-box executing the nonlinear conversion process has a configuration of the involution property in which an input value is obtained by re-inputting an output value obtained from the input value.

(13) An encryption processing device including:
an encryption processing section configured to execute a round operation on input data and generate output data; and
a key scheduling section configured to output a round key to be applied in the round operation by the encryption processing section to the encryption processing section,
wherein the encryption processing section has an involution property in which a data conversion function E and an inverse function $E^{-1}$ of the data conversion function E are executed sequentially, and
the encryption processing section has a configuration in which the round operation in which a constant is applied once or more is executed in both the function E and the inverse function $E^{-1}$, and a constant application position is set at a non-correspondence position of the function E and the inverse function $E^{-1}$.

(14) The encryption processing device according to (13),
wherein the encryption processing section executes an exclusive-OR operation on the constant and conversion target data or the constant and the round key as the round operation in which the constant is applied.

(15) The encryption processing device according to (13) or (14),
wherein a round operation section configured to execute the round operation includes a linear conversion processing section configured to execute a linear conversion process, and
the encryption processing section inputs the constant to an exclusive-OR section interrelated with the linear conversion processing section and executes exclusive-OR with conversion target data or the round key.

(16) The encryption processing device according to (15),
wherein the input data and the constant are states formed by m×n elements, each of which is an element of 1 bit or more,
the linear conversion section has a configuration in which a matrix operation in which a linear conversion matrix is applied to the state is executed, and
the constant is a state that satisfies a condition that all of constituent elements of a state which is a result of a matrix operation on the constant and the linear conversion matrix which is applied in the linear conversion process by the linear conversion processing section interrelated with the exclusive-OR section to which the constant is input are nonzero.

(17) An encryption processing method executed in an encryption processing device,
wherein the encryption processing device includes
an encryption processing section configured to execute a round operation on input data and generate output data, and
a key scheduling section configured to output a round key to be applied in the round operation by the encryption processing section to the encryption processing section,
wherein the encryption processing section has an involution property in which a data conversion function E and an inverse function $E^{-1}$ of the data conversion function E are executed sequentially, and executes the round operation in which a constant is applied once or more in one of the function E and the inverse function

(18) An encryption processing method executed in an encryption processing device,
wherein the encryption processing device includes
an encryption processing section configured to execute a round operation on input data and generate output data, and
a key scheduling section configured to output a round key to be applied in the round operation by the encryption processing section to the encryption processing section,
wherein the encryption processing section has an involution property in which a data conversion function E and an inverse function $E^{-1}$ of the data conversion function E are executed sequentially, has a configuration in which a constant application position is set at a non-correspondence position of the function E and the inverse function $E^{-1}$, and executes the round operation in which a constant is applied once or more in both the function E and the inverse function $E^{-1}$.

(19) A program for causing an encryption processing device to execute an encryption processing method,
wherein the encryption processing device includes
an encryption processing section configured to execute a round operation on input data and generate output data, and
a key scheduling section configured to output a round key to be applied in the round operation by the encryption processing section to the encryption processing section,
wherein the encryption processing section has an involution property in which a data conversion function E and an inverse function $E^{-1}$ of the data conversion function E are executed sequentially, and the program causes the encryption processing section to execute the round operation in which a constant is applied once or more in one of the function E and the inverse function $E^{-1}$.

(20) A program for causing an encryption processing device to execute an encryption processing method,
wherein the encryption processing device includes
an encryption processing section configured to execute a round operation on input data and generate output data, and
a key scheduling section configured to output a round key to be applied in the round operation by the encryption processing section to the encryption processing section,
wherein the encryption processing section has an involution property in which a data conversion function E and an inverse function $E^{-1}$ of the data conversion function E are executed sequentially, and has a configuration in which a constant application position is set at a non-correspondence position of the function E and the inverse function $E^{-1}$, and the program causes the encryption processing section to execute the round operation in which a constant is applied once or more in both the function E and the inverse function $E^{-1}$.

The series of processes described in the present specification can be executed by hardware, software, or a combination configuration of hardware and software. When the process is executed by software, a program in which a processing sequence is recorded can be installed in a memory in a computer embedded in dedicated hardware to be executed or the program can be installed in a general computer capable of executing various processes to be executed. For example, the program can be recorded in advance in a recording medium. The program can be installed in a computer from the recording medium, and the program can also be received via a network such as a local area network (LAN) or the Internet and can be installed in a recording medium such as an internal hard disk.

The various processes described in the present specification can be executed chronologically according to the description and can also be executed in parallel or individually according to the processing performance of an apparatus executing the program or as necessary. A system in the present specification is a logical set configuration of a plurality of apparatuses and is not limited to a case in which each configuration is in the same casing.

INDUSTRIAL AVAILABILITY

As described above, according to the configuration of an embodiment of the present disclosure, an encryption process excellent in security and highly resistant to various attacks is realized.

Specifically, the encryption processing device includes: the encryption processing section configured to repeat a round operation on input data and generate output data; and the key scheduling section configured to output a round key to be applied in the round operation by the encryption processing section to the encryption processing section. The encryption processing section has an involution property in which the data conversion function E and the inverse function $E^{-1}$ of the data conversion function E are executed sequentially, and executes the round operation in which a constant is applied once or more in one of the function E and the inverse function $E^{-1}$. The constant is configured as a state that satisfies a condition that all of constituent elements of a state which is a result of a matrix operation with the linear conversion matrix which is applied in the linear conversion processing section at a position adjacent to the exclusive-OR section to which the constant is input are nonzero.

The encryption processing configuration in which resistance to various attacks is improved and security is high is realized by the present configuration.

REFERENCE SIGNS LIST 100 encryption processing device
110 key scheduling section
120 encryption processing section
121 exclusive-OR section
122 nonlinear conversion section
123 linear conversion section
201 linear conversion section P1
202 linear conversion section P2
203 linear conversion section P3
300 key scheduling section
301 key supply section (key register)
302 key conversion section
320 encryption processing section
321 to 327 exclusive-OR section
331, 333 exclusive-OR section
332 nonlinear/linear conversion section (S&P)
350 encryption processing section
351 exclusive-OR section
352 nonlinear/linear conversion section (S&P)
360 key scheduling section
361, 362 key register
363 key conversion section
371 key register
372 key conversion section
381 key register
391 key register
392, 394 exclusive-OR section
393 key conversion section
401 round operation execution section
402 constant input section
411 conversion function E
412 linear conversion section
413 conversion function $E^{-1}$
431 conversion function E
432 linear conversion section
433 conversion function $E^{-1}$
435 constant input section
436 exclusive-OR section
437 linear conversion section
451 conversion function E
452 linear conversion section
453 conversion function $E^{-1}$
521 nonlinear conversion layer 1
522 linear conversion layer
523 nonlinear conversion layer
700 encryption processing device
720 key scheduling section
721 round key supply section
722 key register
723 key conversion section
725 constant input section
750 encryption processing section
751 exclusive-OR section
752 nonlinear conversion section
753 linear conversion section
800 IC module
801 CPU (Central Processing Unit)
802 memory
803 encryption processing section
804 random number generation section
805 transmission and reception section
900 smartphone
901 processor
902 memory
903 storage
904 external connection interface
906 camera
907 sensor
908 microphone
909 input device
910 display device
911 speaker
913 wireless communication interface
914 antenna switch
915 antenna
917 bus
918 battery
919 auxiliary controller

The invention claimed is:

1. An encryption processing device, comprising:
   circuitry configured to:
   output a round key to be applied in a round operation on input data;
   execute the round operation in which a constant is applied at least once in one of a data conversion function E or an inverse function $E^{-1}$, wherein the inverse function $E^{-1}$ is inverse of the data conversion function E, and wherein the data conversion function E and the inverse function $E^{-1}$ are sequentially executed based on an involution property; and
   generate output data based on the round operation and the round key, wherein
      the constant is a state that satisfies a condition that all of constituent elements obtained as a result of a matrix operation on the constant and a linear conversion matrix are nonzero,
      the linear conversion matrix is applied in a linear conversion process interrelated with an exclusive-OR section to which the constant is input, and
      the circuitry has a configuration in which the matrix operation in which the linear conversion matrix is applied is executed.

2. The encryption processing device according to claim 1, wherein the circuitry is further configured to execute an exclusive-OR operation on one of the constant and conversion target data or the constant and the round key, as the round operation.

3. The encryption processing device according to claim 1, wherein the round operation includes the linear conversion process, and
   wherein the circuitry is further configured to:
   input the constant to an exclusive-OR operation; and
   execute the exclusive-OR operation with one of conversion target data or the round key.

4. The encryption processing device according to claim 3, wherein the input data and the constant are states formed by m×n elements, and
   wherein each of the m×n elements is an element greater than or equal to 1 bit.

5. The encryption processing device according to claim 3, wherein the input data and the constant are states formed by 4×4 elements, each of the 4×4 elements is a 4-bit element, and
   wherein the constant is a 4×4 state that satisfies the condition that all of the constituent elements are nonzero.

6. The encryption processing device according to claim 3, wherein the circuitry is further configured to execute the matrix operation of a column diffusion operation in which the linear conversion process is executed by application of a matrix in units of a plurality of column elements of the state, and a row diffusion operation in which the linear conversion process is executed by application of the matrix in units of a plurality of row elements of the state.

7. The encryption processing device according to claim 1, wherein the circuitry is further configured to:
   execute the round operation that includes the linear conversion process;
   input the constant to an exclusive-OR operation; and
   execute the exclusive-OR operation with one of conversion target data or the round key.

8. The encryption processing device according to claim 1, wherein the round operation is repeated using plaintext P as input data and ciphertext C is output as output data, and
   the plaintext P is generated as output data through a data conversion process in which an execution sequence of the round operation using the ciphertext C as input data is set in reverse order.

9. The encryption processing device according to claim 1, wherein the circuitry has a configuration in which a key supply process having the involution property in which a key supply sequence of a case in which ciphertext C is generated from plaintext P matches a key supply sequence of a case in which the plaintext P is generated from the ciphertext C.

10. The encryption processing device according to claim 1, wherein the circuitry is further configured to:
   execute an operation on a plurality of supplied keys based on the constant; and
   output key data which is a result of the operation on the plurality of supplied keys.

11. The encryption processing device according to claim 1, wherein
   the round operation is an operation including the linear conversion process, and
   the circuitry is further configured to change a linear conversion form based on round transition.

12. The encryption processing device according to claim 1, wherein
   the round operation includes a nonlinear conversion process, and
   an S-box that executes the nonlinear conversion process has a configuration of the involution property in which an input value is obtained by re-input of an output value obtained from the input value.

13. An encryption processing device, comprising:
   circuitry configured to:
   output a round key to be applied in a round operation on input data;
   execute the round operation in which a constant is applied at least once in both a data conversion function E and a inverse function $E^{-1}$ of the data conversion function E, and wherein the data conversion function E and the inverse function $E^{-1}$ are sequentially executed based on an involution property; and
   generate output data based on the round operation and the round key, wherein
      the constant is a state that satisfies a condition that all of constituent elements obtained as a result of a matrix operation on the constant and a linear conversion matrix are nonzero,
      the linear conversion matrix is applied in a linear conversion process interrelated with an exclusive-OR section to which the constant is input, and
      the circuitry has a configuration in which the matrix operation in which the linear conversion matrix is applied is executed, and
      a constant application position is set at a non-correspondence position of the data conversion function E and the inverse function $E^{-1}$.

14. The encryption processing device according to claim 13, wherein the circuitry is further configured to execute an exclusive-OR operation on one of the constant and conversion target data or the constant and the round key.

15. The encryption processing device according to claim 13, wherein the circuitry is further configured to:
   execute the round operation that includes the linear conversion process;
   input the constant to an exclusive-OR operation; and
   execute the exclusive-OR operation with one of conversion target data or the round key.

16. The encryption processing device according to claim 15, wherein the input data and the constant are states formed by m×n elements, and
   wherein each of the m×n elements is an element greater than or equal to 1 bit.

17. An encryption processing method, comprising:
   in an encryption processing device:
   outputting a round key to be applied in a round operation on input data;
   executing, by circuitry, the round operation in which a constant is applied at least once in one of a data conversion function E or an inverse function $E^{-1}$, wherein the inverse function $E^{-1}$ is inverse of the data conversion function E, and wherein the data conversion function E and the inverse function $E^{-1}$ are sequentially executed based on an involution property; and
   generating output data based on the round operation and the round key, wherein
      the constant is a state that satisfies a condition that all of constituent elements obtained as a result of a matrix operation on the constant and a linear conversion matrix are nonzero,
      the linear conversion matrix is applied in a linear conversion process interrelated with an exclusive-OR section to which the constant is input, and
      the circuitry has a configuration in which the matrix operation in which the linear conversion matrix is applied is executed.

18. An encryption processing method, comprising:
   in an encryption processing device:
   outputting a round key to be applied in a round operation on input data;
   executing, by circuitry, the round operation in which a constant is applied at least once in both a data conversion function E and an inverse function $E^1$ of the data conversion function E, and wherein the data conversion function E and the inverse function $E^1$ are sequentially executed based on an involution property; and
   generating output data based on the round operation and the round key, wherein
      the constant is a state that satisfies a condition that all of constituent elements obtained as a result of a matrix operation on the constant and a linear conversion matrix are nonzero, the linear conversion matrix is applied in a linear conversion process interrelated with an exclusive-OR section to which the constant is input, and the circuitry has a configuration in which the matrix operation in which the linear conversion matrix is applied is executed, and a constant application position is set at a non-correspondence position of the data conversion function E and the inverse function $E^{-1}$.

* * * * *